(12) United States Patent
Oh et al.

(10) Patent No.: US 10,721,505 B2
(45) Date of Patent: Jul. 21, 2020

(54) BROADCAST SIGNAL TRANSMISSION APPARATUS, BROADCAST SIGNAL RECEPTION APPARATUS, BROADCAST SIGNAL TRANSMISSION METHOD, AND BROADCAST SIGNAL RECEPTION METHOD

(71) Applicant: LG Electronics Inc., Seoul (KR)

(72) Inventors: Sejin Oh, Seoul (KR); Woosuk Ko, Seoul (KR); Sungryong Hong, Seoul (KR)

(73) Assignee: LG ELECTRONIC INC., Seoul (KR)

( * ) Notice: Subject to any disclaimer, the term of this patent is extended or adjusted under 35 U.S.C. 154(b) by 0 days.

(21) Appl. No.: 15/540,551

(22) PCT Filed: Jan. 19, 2016

(86) PCT No.: PCT/KR2016/000544
§ 371 (c)(1),
(2) Date: Jun. 28, 2017

(87) PCT Pub. No.: WO2016/117904
PCT Pub. Date: Jul. 28, 2016

(65) Prior Publication Data
US 2018/0020244 A1 Jan. 18, 2018

Related U.S. Application Data

(60) Provisional application No. 62/105,750, filed on Jan. 21, 2015.

(51) Int. Cl.
*H04N 21/2362* (2011.01)
*H04N 21/236* (2011.01)
(Continued)

(52) U.S. Cl.
CPC ........ *H04N 21/2362* (2013.01); *H04L 12/18* (2013.01); *H04L 12/1836* (2013.01);
(Continued)

(58) Field of Classification Search
None
See application file for complete search history.

(56) References Cited

U.S. PATENT DOCUMENTS 9,414,099 B2 * 8/2016 Herrmann .......... H04N 21/2362
9,843,827 B2 * 12/2017 Herrmann ........ H04N 21/23614
(Continued)

FOREIGN PATENT DOCUMENTS

| KR | 10-2013-0120416 A | 11/2013 |
| WO | 2012/036429 A2 | 3/2012 |
| WO | 2014/209057 A1 | 12/2014 |

*Primary Examiner* — Gregory B Sefcheck
*Assistant Examiner* — Suk Jin Kang
(74) *Attorney, Agent, or Firm* — Dentons US LLP

(57) ABSTRACT

The present invention proposes a method for transmitting a broadcast signal. The method for transmitting a broadcast signal according to the present invention proposes a system which may support a next generation broadcast service, in an environment supporting next generation hybrid broadcast that uses a terrestrial broadcast network and an internet network. Further, the present invention proposes an efficient signaling method which can cover both the terrestrial broadcast network and the internet network, in an environment supporting next generation hybrid broadcast.

8 Claims, 115 Drawing Sheets

(51) Int. Cl.
*H04N 7/08* (2006.01)
*H04N 21/8352* (2011.01)
*H04N 21/858* (2011.01)
*H04L 12/18* (2006.01)
*H04L 29/12* (2006.01)
*H04L 29/06* (2006.01)
*H04L 29/08* (2006.01)

(52) U.S. Cl.
CPC .......... *H04L 61/2007* (2013.01); *H04L 69/16* (2013.01); *H04L 69/323* (2013.01); *H04L 69/324* (2013.01); *H04L 69/326* (2013.01); *H04N 7/08* (2013.01); *H04N 21/236* (2013.01); *H04N 21/8352* (2013.01); *H04N 21/858* (2013.01)

(56) References Cited

U.S. PATENT DOCUMENTS

| | | | | |
|---|---|---|---|---|
| 2010/0296424 A1* | 11/2010 | Kwon | ............... | H04H 20/42 370/310 |
| 2010/0296506 A1* | 11/2010 | Ryu | ............... | H03M 13/2921 370/350 |
| 2011/0110318 A1* | 5/2011 | Park | ............... | H04H 20/28 370/329 |
| 2012/0051320 A1* | 3/2012 | Vare | ............... | H04W 36/0016 370/331 |
| 2012/0307842 A1* | 12/2012 | Petrov | ............... | H04N 21/23608 370/474 |
| 2012/0331508 A1* | 12/2012 | Vare | ............... | H04L 65/4076 725/50 |
| 2013/0034032 A1* | 2/2013 | Vare | ............... | H04L 69/22 370/310 |
| 2013/0121229 A1* | 5/2013 | Vare | ............... | H04H 20/22 370/312 |
| 2013/0223383 A1* | 8/2013 | Park | ............... | H04H 20/28 370/329 |
| 2013/0291027 A1* | 10/2013 | Hwang | ............... | H04N 21/6131 725/62 |
| 2014/0047492 A1* | 2/2014 | Song | ............... | H04L 27/02 725/116 |
| 2014/0269608 A1* | 9/2014 | Jung | ............... | H04L 5/001 370/330 |
| 2014/0317674 A1* | 10/2014 | Hwang | ............... | H04N 21/631 725/118 |
| 2015/0085735 A1* | 3/2015 | Shelby | ............... | H04L 65/80 370/312 |
| 2016/0037192 A1* | 2/2016 | Petrov | ............... | H04N 21/23608 725/116 |
| 2016/0205158 A1* | 7/2016 | Lo | ............... | H04L 65/4076 709/219 |
| 2016/0323059 A1* | 11/2016 | Herrmann | ............... | H04N 21/2362 |
| 2017/0164331 A1* | 6/2017 | Kitazato | ............... | H04W 72/02 |
| 2017/0188112 A1* | 6/2017 | Takahashi | ............... | H04N 21/64322 |
| 2017/0223769 A1* | 8/2017 | Takahashi | ............... | H04W 80/04 |
| 2017/0324509 A1* | 11/2017 | Herrmann | ............... | H04L 1/0025 |
| 2017/0347134 A1* | 11/2017 | Bae | ............... | H04N 21/238 |
| 2018/0183907 A1* | 6/2018 | Yang | ............... | H04L 69/22 |

* cited by examiner

FIG. 2

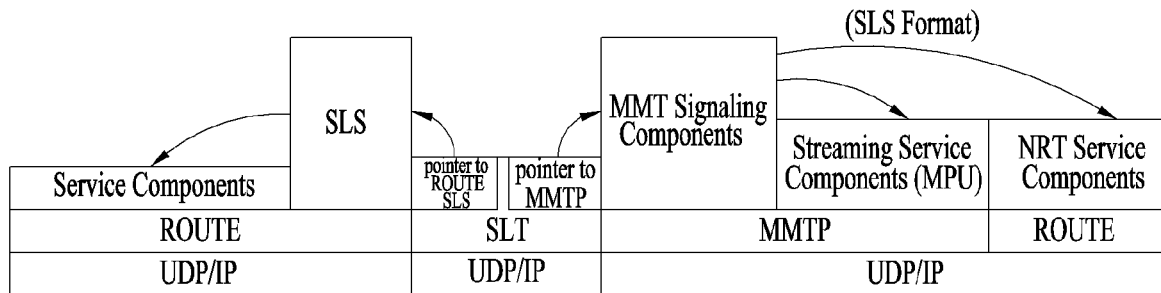

FIG. 3

| Element or Attribute Name | Use |
|---|---|
| SLT | |
|     @bsid | 1 |
|     @sltSectionVersion | 1 |
|     @sltSectionNumber | 0..1 |
|     @totalSltSectionNumbers | 0..1 |
|     @language | 0..1 |
|     @capabilities | 0..1 |
|     InetSigLoc | 0..1 |
|     Service | 1..N |
|         @serviceId | 1 |
|         @SLT serviceSeqNumber | 1 |
|         @protected | 0..1 |
|         @majorChannelNo | 1 |
|         @minorChannelNo | 1 |
|         @serviceCategory | 1 |
|         @shortServiceName | 1 |
|         @hidden | 0..1 |
|         @sls ProtocolType | 1 |
|         BroadcastSignaling | 0..1 |
|         @slsPlpId | 0..1 |
|         @slsDestinationIpAddress | 0..1 |
|         @slsDestinationUdpPort | 0..1 |
|         @slsSourceIpAddress | 0..1 |
|         @slsMajorProtocolVersion | 0..1 |
|         @SlsMinorProtocolVersion | 0..1 |
|         @serviceLanguage | 0..1 |
|         @broadbandAccessRequired | 0..1 |
|         @capabilities | 0..1 |
|         InetSigLoc | 0..1 |

FIG. 5

| Element or Attribute Name | | | | Use |
|---|---|---|---|---|
| bundleDescription | | | | |
| | userServiceDescription | | | |
| | | @serviceId | | M |
| | | @atsc: serviceId | | M |
| | | @atsc: serviceStatus | | OD |
| | | @atsc: fullMPDUri | | M |
| | | @atsc: sTSIDUri | | M |
| | | name | | 0..N |
| | | | lang | CM |
| | | serviceLanguage | | 0...N |
| | | atsc: capabilityCode | | 0...1 |
| | | deliveryMethod | | 1..N |
| | | | r12: broadcastAppService | 1..N |
| | | | | basePattern | 1..N |
| | | | r12: unicastAppService | 0..N |
| | | | | basePattern | 1..N |

FIG. 6

| Element and Attribute Names | | | | Use |
|---|---|---|---|---|
| S - TSID | | | | |
| | @serviceId | | | O |
| | RS | | | 1..N |
| | | @bsid | | OD |
| | | @sIpAddr | | OD |
| | | @dIpAddr | | OD |
| | | @dport | | OD |
| | | @PLPID | | OD |
| | | LS | | 1..N |
| | | | @tsi | M |
| | | | @PLPID | OD |
| | | | @bw | O |
| | | | @startTime | O |
| | | | @endTime | O |
| | | | SrcFlow | 0..1 |
| | | | RprFlow | 0..1 |

FIG. 7

| Element or Attribute Name | | | | | Use |
|---|---|---|---|---|---|
| bundleDescription | | | | | |
| | userServiceDescription | | | | |
| | | @serviceId | | | M |
| | | @atsc: serviceId | | | M |
| | | Name | | | 0..N |
| | | | Lang | | CM |
| | | serviceLanguage | | | 0..N |
| | | atsc: capabilityCode | | | 0..1 |
| | | atsc: Channel | | | 1 |
| | | | @atsc: majorChannelNo | | M |
| | | | @atsc: minorChannelNo | | M |
| | | | @atsc: serviceLang | | O |
| | | | @atsc: serviceGenre | | O |
| | | | @atsc: serviceIcon | | M |
| | | | atsc: ServiceDescription | | 0..N |
| | | | | @atsc: serviceDescrText | M |
| | | | | @atsc: serviceDescrLang | O |
| | | atsc:mpuComponent | | | 0..1 |
| | | | @atsc: mmtPackageId | | M |
| | | | @atsc: next MmtPackageId | | O |
| | | atsc: routeComponent | | | 0..1 |
| | | | @atsc: sTSIDUri | | M |
| | | | @slsPlpId | | OD |
| | | | @slsDestinationIpAddress | | OD |
| | | | @slsDestinationUdpPort | | M |
| | | | @slsSourceIpAddress | | M |
| | | | @slsMajorProtocolVersion | | OD |
| | | | @SlsMinorProtocolVersion | | OD |
| | | atsc: broadbandComponent | | | 0..1 |
| | | | @atsc: fullfMPDUri | | M |
| | | atsc: ComponentInfo | | | 1..N |
| | | | @atsc: component Type | | M |
| | | | @atsc: component Role | | M |
| | | | @atsc: component ProtectedFlag | | OD |
| | | | @atsc: component Id | | M |
| | | | @atsc: component Name | | O |

FIG. 13
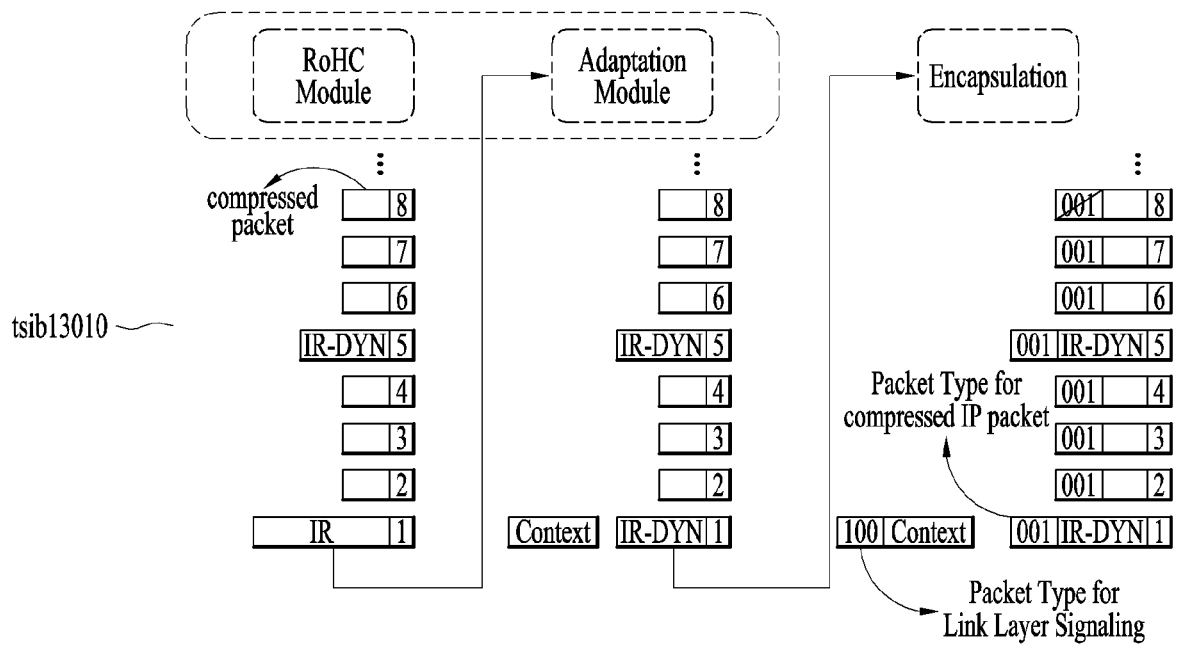
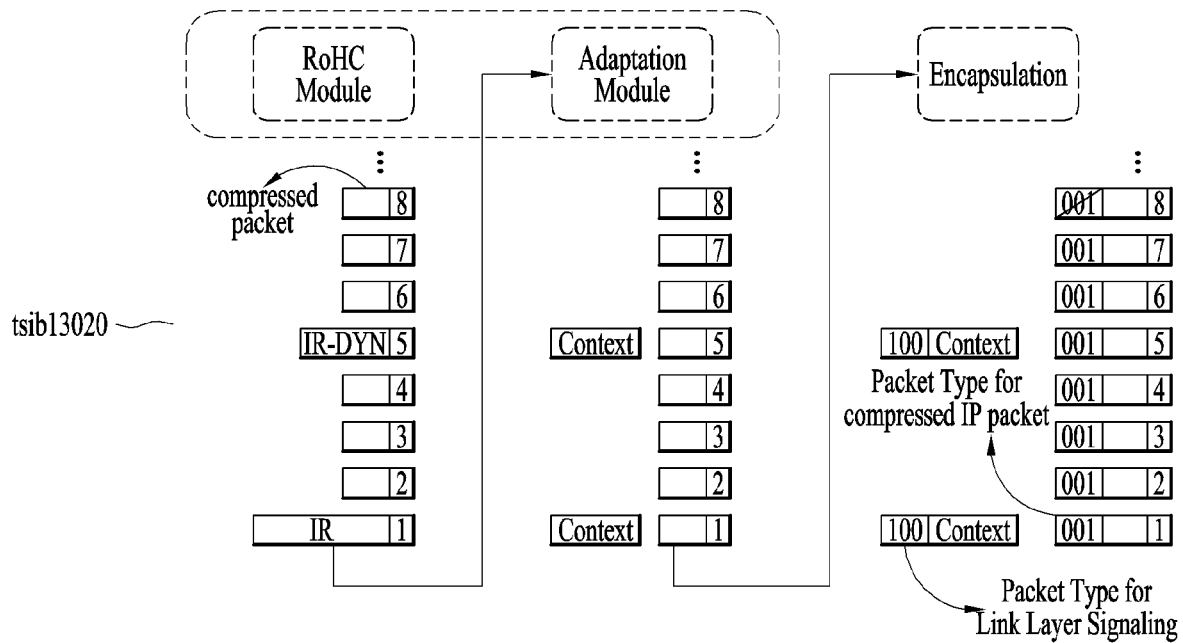

FIG. 14

Link_Mapping_Table — tsib14010

| Syntax | Number of bits | Mnemonic |
|---|---|---|
| Link_Mapping_Table() { | | |
| signaling_type | 8 | "0x01" |
| PLP_ID | 6 | uimsbf |
| Reserved | 2 | |
| num_session | 8 | uimsbf |
| for(i = 0; i < num_session; i++) { | | |
| src_IP_add | 32 | uimsbf |
| dst_IP_add | 32 | uimsbf |
| src_UDP_port | 16 | uimsbf |
| dst_UDP_port | 16 | uimsbf |
| SID_flag | 1 | bslbf |
| compressed_flag | 1 | bslbf |
| reserved | 6 | '000000' |
| if (SID_flag == "1") { | | |
| SID | 8 | uimsbf |
| } | | |
| if (compressed_flag == "1") { | | |
| context_id | 8 | uimsbf |
| } | | |
| } | | |
| } | | |

ROHC-U_description_table — tsib14020

| Syntax | Number of bits | Mnemonic |
|---|---|---|
| ROHC-U_description_table { | | |
| signaling_type | 8 | "0x02" |
| PLP_ID | 6 | uimsbf |
| adaptation_mode | 2 | uimsbf |
| context_config | 2 | bslbf |
| reserved | 6 | bslbf |
| context_id | 8 | uimsbf |
| context_profile | 8 | uimsbf |
| if (context_config = 0x01) { | | |
| context_length | 8 | uimsbf |
| static_chain_byte () | var | uimsbf |
| } | | |
| else if (context_config = 0X02) { | | |
| context_length | 8 | uimsbf |
| dynamic_chain_byte () | var | uimsbf |
| } | | |
| else if (context_config = 0x03) { | | |
| context_length | 8 | uimsbf |
| static_chain_byte () | var | uimsbf |
| dynamic_chain_byte () | var | uimsbf |
| } | | |
| } | | |

(a)
$S_{demux\_in}(i) = \{b_i(0), b_i(1), b_i(2), ..., b_i(\eta_{MOD}-1)\},$
$S_{demux\_out}(i) = \{c_i(0), c_i(1), c_i(2), ..., c_i(\eta_{MOD}-1)\},$
$c_i(1) = b_i(i\%\eta_{MOD}), c_i(2) = b_i((i+1)\%\eta_{MOD}), ..., c_i(\eta_{MOD}-1) = b_i((i+1)\%\eta_{MOD})$ a) Bit-Interleaving Output b) Bit-Demultiplexer Output

FIG. 24

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|     FRU_PHY_PROFILE | 3 |
|     FRU_FRAME_LENGTH | 2 |
|     FRU_GI_FRACTION | 3 |
|     RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_DYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MOD | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

FIG. 25

| Content | Bits |
|---|---|
| FIC_FLAG | 1 |
| AUX_FLAG | 1 |
| NUM_DP | 6 |
| for i = 1 : NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
| | |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1: NUM_DP | |
| DP_ID | 6 |
| DP_START | 15 (or13) |
| DP_NUM_BLOCK | 10 |
| end      RESERVED | 8 |
| EAC_FLAG | 1 |
| EAS_WAKE_UP_VERSION_NUM | 8 |
| if EAC_FLAG == 1 | |
| EAC_LENGTH_BYTE | 12 |
| else | |
| EAC_COUNTER | 12 |
| end | |
| for i=1:NUM_AUX | |
| AUX_PRIVATE_DYN | 48 |
| end | |
| CRC 32 | 32 |

FIG. 29
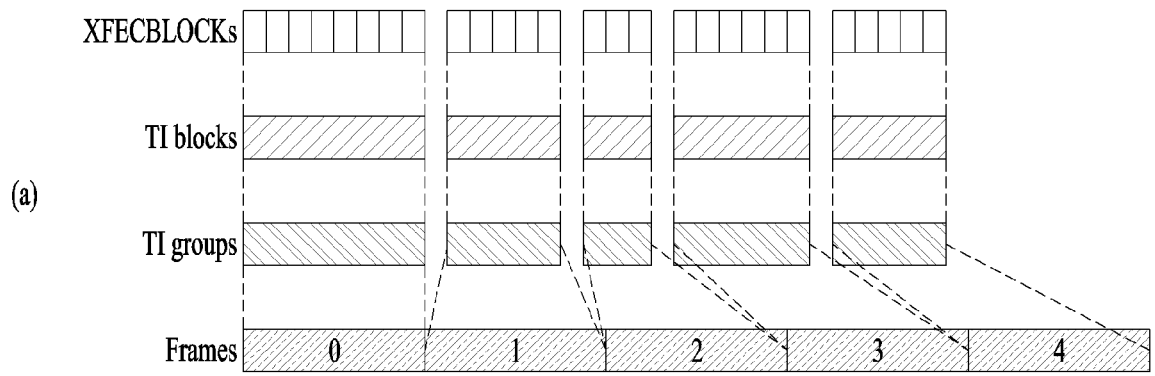
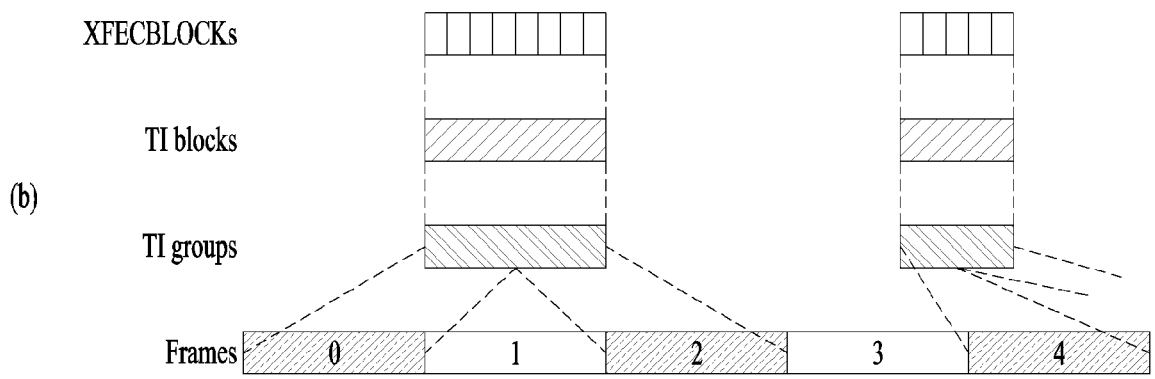
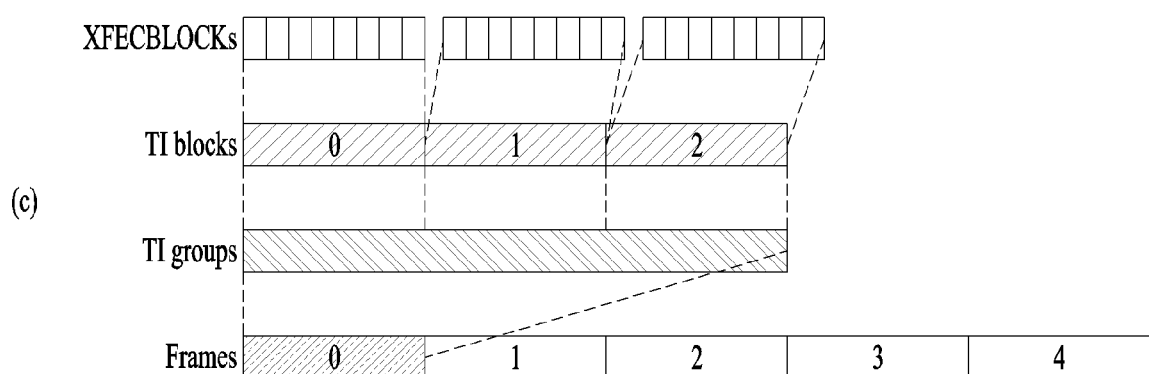

FIG. 33

The main-PRBS generator is defined based on the $(N_a - 1)$-bit binary word sequence $R_n$ with $N_a = \log_2 N_{max}$ $0 \leq n < 2$
$\quad R_n[N_a - 2, N_a - 3, \ldots, 1, 0] = 0, 0, , \ldots, 0, 0$
$n = 2$
$\quad R_n[N_a - 2, N_a - 3, \ldots, 1, 0] = 0, 0, , \ldots, 0, 1$
$2 < n < N_{max}$
$\quad R_n[N_a - 3, N_a - 4, \ldots, 1, 0] = R_n[N_a - 2, N_a - 3, \ldots, 2, 1]$
where
$R_n[N_a - 2]$ is defined as :

in 8K FFT mode: $R_n[11] = R_{n-1}[0] \oplus R_{n-1}[1] \oplus R_{n-1}[4] \oplus R_{n-1}[6]$
in 16K FFT mode: $R_n[12] = R_{n-1}[0] \oplus R_{n-1}[1] \oplus R_{n-1}[4] \oplus R_{n-1}[5] \oplus R_{n-1}[9] \oplus R_{n-1}[11]$
in 32K FFT mode: $R_n[13] = R_{n-1}[0] \oplus R_{n-1}[1] \oplus R_{n-1}[2] \oplus R_{n-1}[12]$ (a)

| FFT mode | Nmax |
|---|---|
| 8K | 8192 |
| 16K | 16384 |
| 32K | 32768 |

The sub-PRBS generator is defined based on the $(N_b-1)$-bit binary word sequence $G_k$ with $N_b = \log_2(0.5 N_{max})$ $0 \leq k < 4$
$\quad G_k[N_b-2, N_b-3,\ldots,1,0] = 0,0,,\ldots,0,0$
$k = 4$
$\quad G_k[N_b-2, N_b-3,\ldots,1,0] = 1,1,,\ldots,1,1$
$4 < k < N_{max}$
$\quad G_k[N_b-3, N_b-4,\ldots,1,0] = G_k[N_b-2, N_b-3,\ldots,2,1]$ where
$\quad G_k[N_b-2]$ is defined as:

in 8K FFT mode: $G_k[10] = G_{k-1}[0] \oplus G_{k-1}[2]$
in 16K FFT mode: $G_k[11] = G_{k-1}[0] \oplus G_{k-1}[1] \oplus G_{k-1}[4] \oplus G_{k-1}[6]$
in 32K FFT mode: $G_k[12] = G_{k-1}[0] \oplus G_{k-1}[1] \oplus G_{k-1}[4] \oplus G_{k-1}[5] \oplus G_{k-1}[9] \oplus G_{k-1}[11]$ (a)

$p = 0;$
$for\ (n=0; n<N_{max}; n=n+1)$
$\quad \{T(n) = (n \bmod 2) \cdot 2^{N_a-1} + \sum_{i=0}^{N_a-2}(2^i\ ?R_n[i]);$
$\quad S_l(n) = (T(n) + A_{\lfloor l/2 \rfloor}) \bmod N_{max};$
$\quad if\ S_l(n) < N_{data}$
$\quad\quad \{H_l(p) = S_l(n);$
$\quad\quad p = p+1;\ \}$
$\}$ $(n \bmod 2) \cdot 2^{N_a-1}$ denotes 1-bit toggling, i.e., $R_n[N_a-1] = 0,1,0,1,\ldots$ and the cyclic-shifting value $A_{\lfloor l/2 \rfloor}$ is calculated for every OFDM symbol pair (b)

FIG. 35

FIG. 36
| PLP_NUM | 1 | >1 |
|---|---|---|
| Interleaving type | CI | CI+BI |
FIG. 37
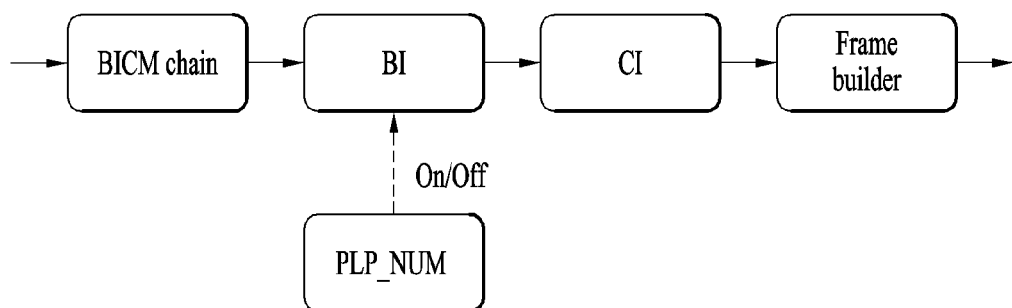
<Hybrid TI structure: example-1>
FIG. 38
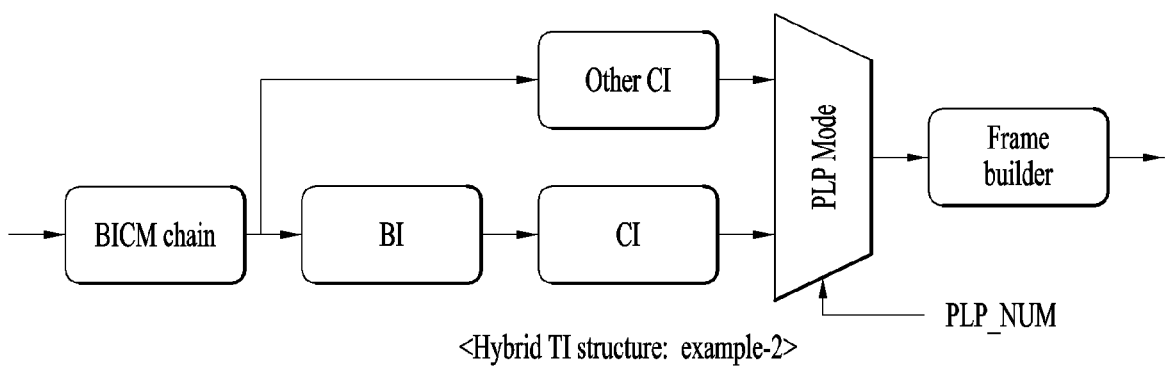
<Hybrid TI structure: example-2>

<Hybrid TI structure: example-1>

<Hybrid TI structure: example-2>

FIG. 46
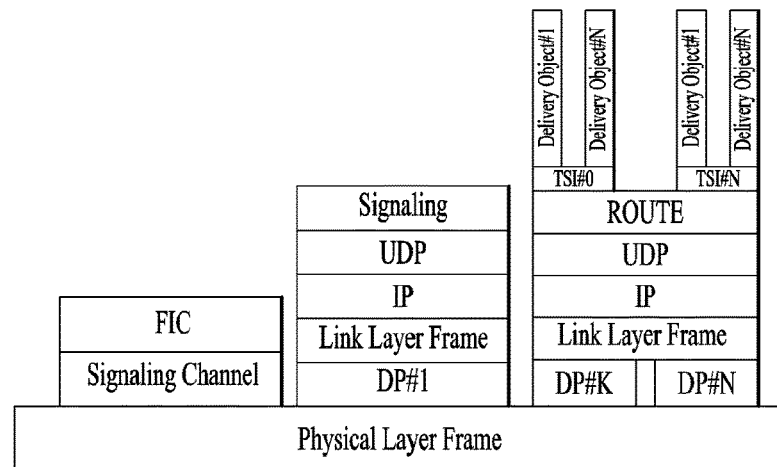
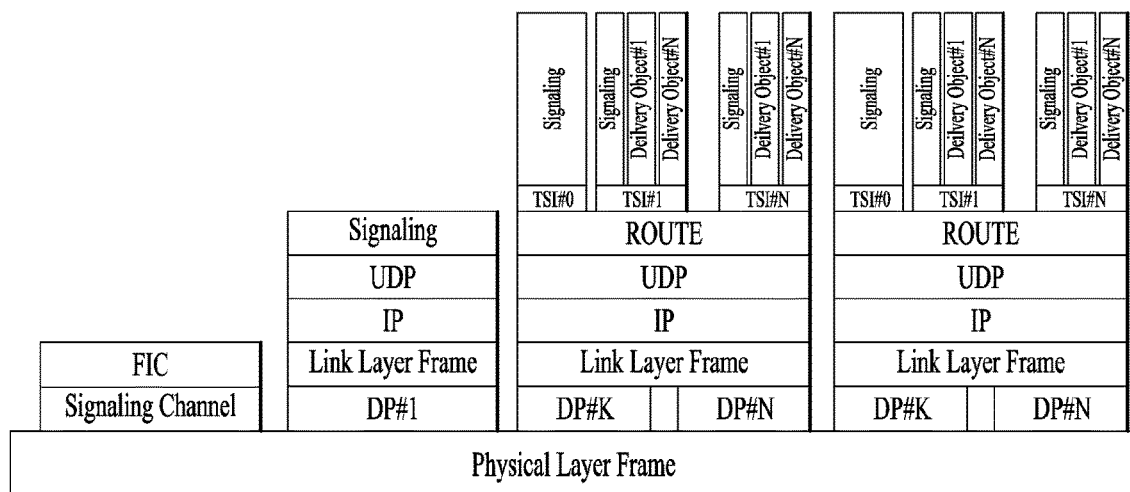
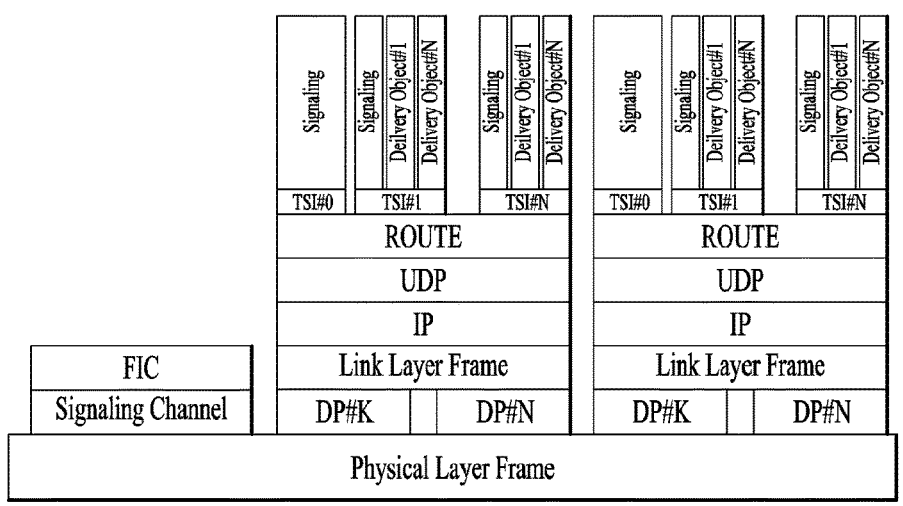

FIG. 47

| Syntax | No. Bits | Format |
|---|---|---|
| FIC(){ | | |
|     FIC_protocol_version | 8 | uimsbf |
|     TSID | 16 | uimsbf |
|     FIC_data_version | 8 | uimsbf |
|     num_partitions | 8 | uimsbf |
|     for (i-0; i<num_partitions ; i++) { | | |
|         partition_protocol_version | 8 | uimsbf |
|         base_DP_ID | 8 | uimsbf |
|         base_DP_version | 8 | uimsbf |
|         num_services | 8 | uimsbf |
|         For (j= 0 ; j< num_services ; j++) { | | |
|             service_id | 16 | uimsbf |
|             channel_number | 16 | uimsbf |
|             service_category | 5 | uimsbf |
|             short_service_name _length /*m*/ | 3 | uimsbf |
|             short_service_name | 16*m | var |
|             service_status | 2 | uimsbf |
|             service_distribution | 2 | uimsbf |
|             sp_indicator | 1 | uimsbf |
|             reserved | 3 | '111' |
|             } | | |
|         } | | |
|     } | | |

FIG. 48

| Syntax | No. Bits | Format |
|---|---|---|
| FIC( ){ | | |
|     FIC_protocol_version | 8 | uimsbf |
|     transport_stream_ID | 16 | uimsbf |
|     FIC_data_version | 8 | uimsbf |
|     num_partitions | 8 | uimsbf |
|     for (i-0 ; i<num_partitions ; i++) { | | |
|         partition_id | 8 | uimsbf |
|         partition_protocol_version | 8 | uimsbf |
|         num_services | 8 | uimsbf |
|         For (j= 0 ; j<num_services ; j++) { | | |
|             service_id | 16 | uimsbf |
|             service_data_version | 8 | uimsbf |
|             channel_number | 16 | uimsbf |
|             service_category | 5 | uimsbf |
|             short_service_name _ length /*m*/ | 3 | uimsbf |
|             short_service_name | 16*m | var |
|             service_status | 3 | uimsbf |
|             service_distribution | 2 | uimsbf |
|             sp_indicator | 1 | uimsbf |
|             IP_version_flag | 1 | bslbf |
|             source_IP_address_flag | 1 | bslbf |
|             num_transport_sessions | 8 | uimsbf |
|             for ( int k=0; k< num_transport_sessions;k ++){ | | |
|                 if( source_IP_address_flag ) | | |
|                     source_IP_addr | 32 or 128 | uimsbf |
|                 dest_IP_addr | 32 or 128 | uimsbf |
|                 dest_UDP_port | 16 | uimsbf |
|                 LSID_DP | 8 | uimsbf |
|                 service_signaling_flag | 8 | uimsbf |
|             [transport_session_descriptors] | | |
|             } | | |
|         [service_descriptors] | | |
|         } | | |
|     [partition_descriptors] | | |
|     } | | |
|     [FIC_descriptors] | | |
| } | | |

FIG. 50

| Syntax | No. Bits | Format |
|---|---|---|
| FIC(){ | | |
|     FIC_protocol_version | 8 | uimsbf |
|     transport_stream_ID | 16 | uimsbf |
|     FIC_data_version | 8 | uimsbf |
|     num_partitions | 8 | uimsbf |
|     for (i-0 ; i<num_partitions ; i++) { | | |
|         partition_id | 8 | uimsbf |
|         partition_protocol_version | 8 | uimsbf |
|         num_services | 8 | uimsbf |
|         For (j=0 ; j<num_services ; j++) { | | |
|             service_id | 16 | uimsbf |
|             service_data_version | 8 | uimsbf |
|             channel_number | 16 | uimsbf |
|             service_category | 5 | uimsbf |
|             short_service_name_length /*m*/ | 3 | uimsbf |
|             short_service_name | 16*m | var |
|             service_status | 3 | uimsbf |
|             service_distribution | 2 | uimsbf |
|             sp_indicator | 1 | uimsbf |
|             IP_version_flag | 1 | bslbf |
|             source_IP_address_flag | 1 | bslbf |
|             num_transport_sessions | 8 | uimsbf |
|             for ( int k=0; k< num_transport_sessions;k ++){ | | |
|                 if( source_IP_address_flag ) | | |
|                     source_IP_addr | | |
|                 dest_IP_addr | | |
|                 dest_UDP_port | 32 or 128 | uimsbf |
|                 LSID_DP | 32 or 128 | uimsbf |
|                 service_signaling_flag | 16 | uimsbf |
|                 if( service_signaling_flag == TRUE){ | 8 | uimsbf |
|                     signaling_data_version | 8 | uimsbf |
|                     signaling_DP | | |
|                 } | 8 | uimsbf |
|                 [transport_session_descriptors] | 8 | uimsbf |
|             } | | |
|             [service_descriptors] | | |
|         } | | |
|         [partition_descriptors] | | |
|     } | | |
|     [FIC_descriptors] | | |
| } | | |

FIG. 52

| Signaling message header | Signaling message data (binary or XML formatted) |

| Syntax | No. Bits | Format |
|---|---|---|
| signaling_message_header ( ){ | | |
|     signaling_id | 8 | uimsbf |
|     signaling_length | 16 | uimsbf |
|     signaling_id_extension | 16 | uimsbf |
|     version_number | 4 | uimsbf |
|     current_next_indicator | 1 | uimsbf |
|     indicator_flags { | | |
|       fragmentation_indicator | 1 | bslbf |
|       payload_format_indicator | 1 | bslbf |
|       expiration _indicator | 1 | bslbf |
|     } | | |
|     if( fragmentation_availability == '1'){ | | |
|       fragment_number | 4 | uimsbf |
|       last_fragment_number | 4 | uimsbf |
|     } | | |
|     if( payloadformat_availability == '1'){ | | |
|       payload_format | 8 | uimsbf |
|     } | | |
|     if(expiration_availability == '1'){ | | |
|       expiration | 32 | uimsbf |
|     } | | |
|   } | | |
| } | | |

FIG. 53

| Service Mapping Table |
|---|
| Signaling_id(SMT) |
| .. |
| protocol_version |
| broadcast_id |
| signaling_version |
| .. |
| num_services |
| for i=0..num_services-1{ |
|     service_id |
|     service_category |
|     service_status |
|     sp_indicator |
|     num_ROUTE_session |
|     .. |
| } |

| MPD Delivery Table |
|---|
| Signaling_id(MPDT) |
| .. |
| protocol_version |
| sequence_number |
| signaling_version |
| .. |
| MPD_id |
| version |
| delivery_mode |
| If(delivery_mode==embedded |
|     MPD_data( ) |
| else if(delivery_mode==referenced) |
|     MPD_URL |
| .. |

| Component Mapping Table |
|---|
| Signaling_id(CMT) |
| .. |
| protocol_version |
| .. |
| signaling_version |
| .. |
| service_id |
| num_component |
| for i=0..num_component-1{ |
|     mpd_id |
|     period_id |
|     representation_id |
|     IP |
|     port |
|     tsi |
|     DP_id |
|     .. |
| } |

| LSID Table |
|---|
| signaling_id(LSIDT) |
| .. |
| protocol_version |
| .. |
| signaling_version |
| .. |
| .... |

| Application Parameter Table |
|---|
| Signaling_id(APT) |
| .. |
| protocol_version |
| .. |
| signaling_version |
| .. |
| service_id |
| tpt_id |
| num_app |
| for i=0..num_app-1{ |
|     app_name |
|     .. |
| } |

| Initialization Segment Delivery Table |
|---|
| Signaling_id(ISDT) |
| .. |
| protocol_version |
| sequence_number |
| signaling_version |
| .. |
| mpd_id |
| period_id |
| representation_id |
| Initialization_segment_data( ) |
| ... |

FIG. 54

| Signaling message header | Service signaling message or part thereof |

| | Element or Attribute Name | Use | Description |
|---|---|---|---|
| | Service | 1..N | specifies the service |
| | @id | M | Service identifier |
| | @serviceType | M | service type |
| | @serviceName | O | service name |
| | @channelNumber | M | channel number associated with this service |
| | .. | | |
| | ROUTE Session | 0..N | ROUTE session information |
| | @sourceIP | O | the source address of the IP datagrams carrying ROUTE packets |
| | @destinationIP | O | the destination address of the IP datagrams carrying ROUTE packets |
| | @destinationPort | O | the destination port number of the IP datagrams carrying ROUTE packets |
| | LSID | 0..1 | LCT session instance description used in this ROUTE session |
| | LSIDLocation | 0..1 | The location where LSID can be acquired |
| | @deliveryMode | M | The delivery mode of this LSID location signalling |
| | BootstrapInfo | 1 | Bootstrap information of LSID according to the delivery mode |
| | MPD | 0...1 | DASH media presentation description (MPD) |
| | @version | 0..1 | Version of the MPD |
| | MPDSignalingLocation | 0...1 | The location where MPD or MPD URL can be acquired |
| | @deliveryMode | O | The delivery mode of this MPD location signalling |
| | BootstrapInfo | 1 | Bootstrap information of MPD or MPD URL according to the delivery mode |
| | ComponentSignalingLocation | 1...N | Component location signalling |
| | @deliveryMode | O | The delivery mode of this component location signalling |
| | BootstrapInfo | 1 | Bootstrap information of this component location signalling according to the delivery mode |

Legend:
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs=0>
Elements are bold ; attributes are non-bold and preceded with an @.

| Element or Attribute Name | Use | Description |
|---|---|---|
| BootstrapInfo | | |
| @sourceIP | O | the source address of the IP datagrams carrying associated data |
| @destinationIP | O | the destination address of the IP datagrams carrying associated data |
| @destinationPort | O | the destination port number of the IP datagrams carrying associated data |
| @tsi | O | Application layer transport session identifier of session-based transport packets carrying associated data |
| @URL | O | URL where associated data can be acquired |
| @packetid | O | The identifier of transport packets carrying the associated data |

FIG. 55

| Syntax | No. of Bits | Format |
|---|---|---|
| Service_signaling_table { | | |
|     SST_protocol_version | 8 | uimsbf |
|     partition_id | 8 | uimsbf |
|     SST_data_version | 8 | uimsbf |
|     num_services | 8 | uimsbf |
|     for (i-0 ; i<num_services ; i++) { | | |
|         service_id   {same as service_channel?} | 16 | uimsbf |
|         service_name   {string} | var | |
|         Component_signaling_locations { | | |
|             availability_flags { | | |
|                 MPD_availability | 4 | uimsbf |
|                 CMT_availability | 4 | uimsbf |
|                 AST_availability | 4 | uimsbf |
|                 reserved | 4 | uimsbf |
|             } | | |
|             DP_ID | 8 | uimsbf |
|             LCT_IP_address | 32 | uimsbf |
|             LCT_UDP_port | 16 | uimsbf |
|             LCT_TSI | 16 | uimsbf |
|             MPD_TOI | 16 | uimsbf |
|             CMT_TOI | 16 | uimsbf |
|             AST_TOI | 16 | uimsbf |
|             MPD_URL   {string} | var | |
|             CMT_URL   {string} | var | |
|             AST_URL   {string} | var | |
|         } | | |
|     } | | |

FIG. 57

Component Mapping Table Description Semantics

| Element/Attribute | | | Cardinality | Description |
|---|---|---|---|---|
| Component Mapping TableDescription | | | | |
| | @ service_id | | 1 | Identifier associated with the component |
| | Broadcast Comp | | 0..N | Component transmitted through the same broadcast stream |
| | | @ mpdID | 0 | Associated DASH MPD identifier |
| | | @perID | 0 | Associated period identifier in the corresponding MPD |
| | | @ reptnID | 0 | DASH representation identifier associated with the corresponding component |
| | | @ baseURL | 0 | Specifies the base URL of the DASH segment associated with the corresponding component. |
| | | @ datapipe ID | 1 | Identifier of the data pipe through which corresponding component data is transmitted in the broadcast stream |
| | BBComp | | 0..N | Component transmitted through the broadband network |
| | | @ mpdID | 0 | Associated DASH MPD identifier |
| | | @ perID | 0 | Associated period identifier in the corresponding MPD |
| | | @ reptnID | 0 | DASH representation identifier associated with the corresponding component |
| | | @ baseURL | 0 | Specifies the base URL of the DASH segment associated with the corresponding component |
| | ForeignComp | | 0..N | Component transmitted through the broadcast streams |
| | | @mpdID | 0 | Associated DASH MPD identifier |
| | | @ perID | 0 | Associated period identifier in the corresponding MPD |
| | | @ reptnID | 0 | DASH representation identifier associated with the corresponding component |
| | | @ baseURL | 0 | Specifies the base URL of the DASH segment associated with the corresponding component. |
| | | @ transportStreamID | 1 | Identifier of the broadcast stream including the corresponding component data |
| | | @ sourceIPAddr | 1 | Source IP address of IP datagram including the corresponding component data |
| | | @ destIPAddr | 1 | Destination IP address of IP datagram including the corresponding component data |
| | | @ destUDPPort | 1 | Destination UDP port number of IP datagram including the corresponding component data |
| | | @ datapipe ID | 1 | Identifier of the data pipe through which the corresponding component data is transmitted in the corresponding broadcast stream |

Legend:
　　For attributes: M=Mandatory, O=Optional, OD=Optional with Default Value, CM=Conditionally Mandatory.
　　For elements: < minOccurs >...< maxOccurs > (N=unbounded)
　　Note that the conditions only holds without using xlink:href . If linking is used, then all attributes are
　　"optional" and < minOccurs = 0 >
Elements are bold ; attributes are non-bold and preceded with an @.

| Signaling message header | Component mapping description 혹은 일부 |
|---|---|

FIG. 58

| Syntax | No. of Bits | Format |
|---|---|---|
| Component_mapping_table { | | |
|     CMT_protocol_version | 8 | uimsbf |
|     service_id | 16 | uimsbf |
|     CMT_data_version | 8 | uimsbf |
|     num_broadcast_streams | 8 | uimsbf |
|     for (i-0; i<num_broadcast_streams; i++) { | | |
|         TSID | 16 | uimsbf |
|         num_partitions | 8 | uimsbf |
|         for (j-0; j<num_partitions; j++) { | | |
|             partition_id | 8 | uimsbf |
|             num_data_pipes | 8 | uimsbf |
|             for (k-0; k<num_data_pipes; k++) { | | |
|                 DP_ID | 8 | uimsbf |
|                 num_transort_sessions | 8 | |
|                 for (l-0; l<num_transport_sessions; l++) { | | |
|                     IP_address | 32 | uimsbf |
|                     UDP_port | 16 | uimsbf |
|                     num_LCT_channels | 8 | uimsbf |
|                     for (l-0; l<num_LCT_channels; l++) { | 8 | uimsbf |
|                         LCT_TSI | 16 | uimsbf |
|                         Representation_ID | | |
|                         Internet_availability | 1 | bslbf |
|                         reserved | 7 | '1111111' |
|                     } | | |
|                 } | | |
|             } | | |
|         } | | |
|     } | | |
|     num_internet_only_reptns | 8 | uimsbf |
|     for (l-0; l<num_internet_only_reptns; l++) { | | |
|         Representation_ID | 8 | uimsbf |
|     } | | |
| } | | |

FIG. 59

The semantics of URL Signaling Table Description

| Element/Attribute | Cardinality | Description |
|---|---|---|
| URL Signaling Table Description | | |
| @ service_id | 1 | Associated Service identifier |
| @ mpdURL | 0..1 | URL of broadband MPD |
| @ cstURL | 0..1 | URL of broadband CMT (component mapping table) |
| @ astURL | 0..1 | URL of broadband AST (application signaling table) |
| Legend:<br>For attributes: M=Mandatory, O=Optional, OD=Optional with Default Value, CM=Conditionally Mandatory.<br>For elements: < minOccurs >...< maxOccurs > (N=unbounded)<br>Note that the conditions only holds without using xlink:href . If linking is used, then all attributes are "optional" and < minOccurs = 0 ><br>Elements are bold ; attributes are non -bold and preceded with an @. | | |

| Signaling message header | URL Signaling Table Description or part thereof |
|---|---|

FIG. 60

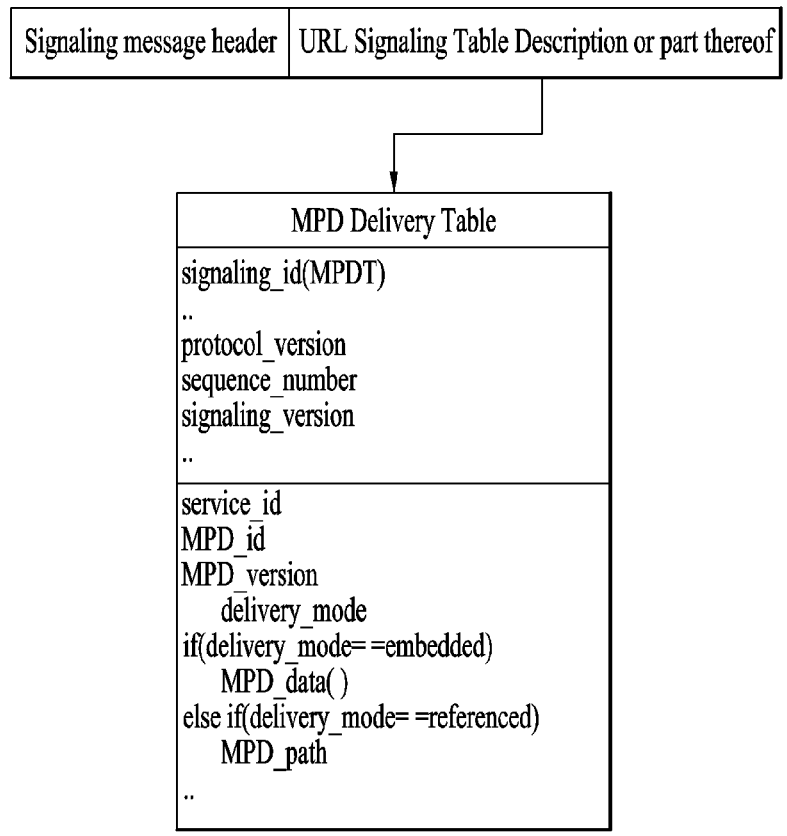

MDP Delivery Table Description Semantics

| | Element/Attribute | Cardinality | Description |
|---|---|---|---|
| | MPD Table Description | | |
| | @ service_id | 1 | Associated broadcast service identifier |
| | @ MPD_id | 1 | MPD identifier |
| | @ MPD_version | 1 | Version information indicating information about variation of MPD |
| | @MPD_URL | 0 | URL information by which MPD can be acquired |
| | MPD | 0 | MPD element |

Legend:
 For attributes: M=Mandatory, O=Optional, OD=Optional with Default Value, CM=Conditionally Mandatory.
 For elements: <minOccurs>...< maxOccurs > (N=unbounded)
 Note that the conditions only holds without using xlink:href . If linking is used, then all attributes are "optional" and < minOccurs = 0 >
Elements are bold ; attributes are non-bold and preceded with an @.

FIG. 61

| Signaling message header | MPD delivery table information or part thereof |

| Syntax | No. Bits | Format |
|---|---|---|
| service_id | 16 | uimsbf |
| MPD_id_length /* M */ | 16 | uimsbf |
| MPD_id_bytes() | 8*M | var |
| MPD_version | 8 | uimsbf |
| availability_flag { | | |
|   MPD_URL_availabilty | 1 | bslbf |
|   MPD_data_availability | 1 | bslbf |
| } | | |
| if( MPD_URL_availabilty ) { | | |
|   MPD_URL_length /* L */ | 14 | uimsbf |
|   MPD_URL_bytes() | 8*L | var |
| } | | |
| if( MPD_data_availability ) { | | |
|   MPD_coding | 2 | uimsbf |
|   MPD_byte_length /* N */ | 14 | uimsbf |
|   MPD_bytes() | 8*N | var |
| } | | |
| } | | |

| Value | Designation |
|---|---|
| 0×00 | Plain text |
| 0×01 | Compressed by gzip |
| 0×02-0×03 | Reserved for future use |

FIG. 62

LCT Session Instance Dscription Semantics

| Element or Attribute Name | | | Use | Description |
|---|---|---|---|---|
| LSID | | | | LCT Session Instance Description |
| | @version | | O | Version of this LCT Session Instance Description. The version is increased by one when the descriptor is updated. The received LSID with highest version number is the currently valid version. |
| | @validFrom | | O | The date and time from which the LSID is valid. The validFrom attribute may or may not be present. If not present, the receiver can assume the LSID version is valid immediately. |
| | @expiration | | O | The date and time when the LSID expires. The expiration attribute may or may not be present. If not present the receiver can assume the LSID is valid for all time, or until it receives a newer LSID with an associated expiration value. |
| | TransportSession | | 1...N | Provides information about LCT transport sessions |
| | | @ tsi | M | Specifies the transport session identifier. The session identifiers must not be 0. |
| | | SourceFlow | 0 ... 1 | Provides information of a source flow carried on this tsi |
| | | RepairFlow | 0 ... 1 | Provides information of a repair flow carried on the tsi. |

Legend:

For attributes: M=Mandatory, O=Optional, OD=Optional with Default Value, CM=Conditionally Mandatory.

For elements: <minOccurs >...< maxOccurs > (N=unbounded)

Note that the conditions only holds without using xlink:href . If linking is used, then all attributes are "optional" and < minOccurs = 0 >

Elements are bold; attributes are non bold and preceded with an @.

FIG. 63

| Element or Attribute Name | | | Use | Description |
|---|---|---|---|---|
| SourceFlow | | | | defines a source flow in session |
| | EFDT | | 0 ... 1 | If provided, it specifies the details of the file delivery data. This is the extended File Delivery Table(FDT) instance.<br>The EFDT may either be embedded or may be provided as a reference. If provided as a reference the EFDT may be updated independently of the LSID. |
| | @idRef | | 0? | Identification of the EFDT, it can be represented as a URI by the corresponding Transport Session. |
| | @realtime | | OD<br>default: false | If not present it is false. If present and set to true, LCT packets contain extension headers including timestamps that express the presentation time of the included delivery object. |
| | @ minBufferSize | | O | Defines the maximum amount of data that needs to be stored in the receiver. This value may be present if @ realtime is set to true. |
| | ApplicationIdentifier | | 0 ... 1 | May provide additional information that can be mapped to the application that is carried in this transport session, e.g. Representation ID of a DASH content or the Adaptation Set parameters of a DASH Representation in order to select the LCT transport session for rendering. |
| | PayloadFormat | | 1 ... N | Defines payload formats of ROUTE packets carrying the objects of the source flow |
| | | @codePoint | OD<br>default=0 | Defines what CodePoint value is used for this payload. This is the value of the CP field in the LCT header. When signalling this this value, the delivery of the object can follow the rules below. |
| | | @deliveryObjectFormat | M | Specifies the payload format of the delivery object |
| | | @fragmentation | OD<br>default=0 | Specifies the type of fragmentation<br>0 : arbitrary<br>1: application specific (sample based)<br>2 : application specific (e.g., a collection of boxes) |
| | | @deliveryOrder | OD<br>default=0 | Specifies the ordering of delivery of objects<br>0 : arbitrary<br>1: in -order delivery<br>2: in -order delivery of media samples and prior to movie fragment box |
| | | @ sourceFecPayloadID | OD<br>default=1 | Defines the format of the Source FEC Payload ID. The following values can be defined :<br>- 0: the source FEC payload ID is absent and the entire delivery object is contained in this packet.<br>- 1: the source FEC payload ID is 32 bit and expresses the start offset in the object.<br>- 2: FECParameters defines the Format of the Source FEC Payload ID. |
| | | FECParameters | 0 ... 1 | Defines the FEC parameters . This includes the FEC-encoding -id , the instance -id , etc. It is specifically used to signal the applied Source FEC Payload ID. |

Legend:
For attributes: M=Mandatory, O=Optional, OD=Optional with Default Value, CM=Conditionally Mandatory.
For elements: <minOccurs >...< maxOccurs > (N=unbounded)
Note that the conditions only holds without using xlink:href . If linking is used, then all attributes are "optional" and <minOccurs = 0 >
Elements are bold; attributes are non bold and preceded with an @.

FIG. 64

| Element or Attribute Name | Use | Description |
|---|---|---|
| EFDT | | extended FDT instance descriptor |
| @ idRef | 0...1 | Identification of the EFDT, |
| @version | O | Version of this extended FDT instance descriptor. The version if increased by one when the descriptor is updated. The received EFDT with highest version number is the currently valid version. |
| @ maxExpiresDelta | O | The maximum expiry time for an object in the Transport Session after sending the first packet associated to this object. |
| @ maxTransportSize | O | The maximum transport size of any object described by this EFDT. |
| FileTemplate | 0...1 | Specifies the file URL or file template in the body |
| Legend: | | |
| For attributes: M=Mandatory, O=Optional, OD=Optional with Default Value, CM=Conditionally Mandatory. | | |
| For elements: <minOccurs>...< maxOccurs> (N=unbounded) | | |
| Note that the conditions only holds without using xlink:href . If linking is used, then all attributes are "optional" and < minOccurs = 0 > | | |
| Elements are bold ; attributes are non -bold and preceded with an @ . | | |

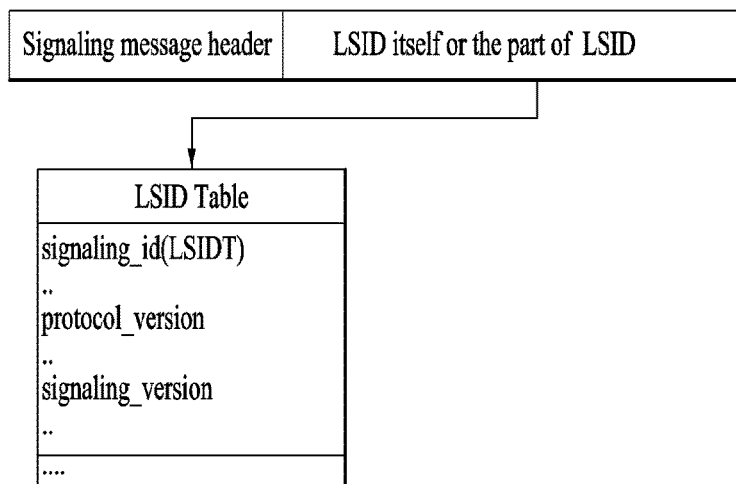

FIG. 67

| Syntax | No. Bits | Format |
|---|---|---|
| FIC( ){ | | |
|    FIC_protocol_version | 8 | uimsbf |
|    transport_stream_ID | 16 | uimsbf |
|    FIC_data_version | 8 | uimsbf |
|    num_partitions | 8 | uimsbf |
|    for (i-0 ; i<num_partitions ; i++) { | | |
|       partition_id | 8 | uimsbf |
|       partition_protocol_version | 8 | uimsbf |
|       num_services | 8 | uimsbf |
|       For (j=0 ; j<num_services ; j++) { | | |
|          service_id | 16 | uimsbf |
|          service_data_version | 8 | uimsbf |
|          channel_number | 16 | uimsbf |
|          service_category | 5 | uimsbf |
|          short_service_name _ length /*m*/ | 3 | uimsbf |
|          short_service_name | 16*m | var |
|          service_status | 3 | uimsbf |
|          service_distribution | 2 | uimsbf |
|          sp_indicator | 1 | uimsbf |
|          IP_version_flag | 1 | bslbf |
|          source_IP_address_flag | 1 | bslbf |
|          num_transport_sessions | 8 | uimsbf |
|          for ( int k=0; k< num_transport_sessions;k ++){ | | |
|             if( source_IP_address_flag ) | | |
|                source_IP_addr | 32 or 128 | uimsbf |
|             dest_IP_addr | 32 or 128 | uimsbf |
|             dest_UDP_port | 16 | uimsbf |
|             LSID_DP | 8 | uimsbf |
|             LSID_tsi | 16 | uimsbf |
|             service_signaling_flag | 8 | uimsbf |
|             if( service_signaling_flag ){ | | |
|                signaling_data_version | 8 | uimsbf |
|                signaling_DP | 8 | uimsbf |
|                signaling_tsi | 16 | uimsbf |
|             } | | |
|          [transport_session_descriptors ] | | |
|          } | | |
|       [service_descriptors ] | | |
|       } | | |
|    [partition_descriptors ] | | |
|    } | | |
|    [FIC_descriptors] | | |
| } | | |

FIG. 68

| Field | # Bits |
|---|---|
| FIC( ){ | |
|     FIC_protocol_version | 8 |
|     transport_stream_ID | 16 |
|     num_partitions | 8 |
|     for i=0..num_partitions-1 | |
|         partition_id | 8 |
|         partition_protocol_version | 8 |
|         num_services | 8 |
|         for j=0..num_services -1 | |
|             service_id | 16 |
|             service_data_version | 8 |
|             service_channel_number | 16 |
|             service_category | 5 |
|             service_short_name_length /*m*/ | 3 |
|             service_short_name | m*16 |
|             service_status | 3 |
|             service_distribution | 2 |
|             sp_indicator | 1 |
|             IP_version_flag | 1 |
|             reserved | 1 |
|             num_ROUTE_sessions | 8 |
|             for k=0..num_ROUTE_sessions -1 | |
|                 source_IP_addr | 32 or 128 |
|                 dest_IP_addr | 32 or 128 |
|                 dest_UDP_port | 16 |
|                 LSID_DP | 8 |
|                 LSID_tsi | 16 |
|                 component_signaling_flag | 8 |
|             [ROUTE_session_descriptors] | |
|         [service_descriptors] | |
|     [partition_descriptors] | |
| [FIC_descriptors] | |
| } | |

FIG. 69

Component Mapping Table Description Semantics

| Element/Attribute | | | Cardinality | Description |
|---|---|---|---|---|
| Component Mapping Table Description | | | | |
| | @ service_id | | 1 | Associated broadcast service identifier |
| | Broadcast Comp | | 0..N | Component transmitted through the same broadcast stream |
| | | @ mpdID | O | Associated DASH MPD identifier |
| | | @ perID | O | Associated period identifier in the corresponding MPD |
| | | @ reptnID | O | DASH representation identifier associated with the corresponding component |
| | | @ baseURL | O | Specifies the base URL of segments constituting DASH representation associated with the corresponding component. |
| | | @ datapipe ID | 1 | Identifier of the data pipe through which the corresponding component data is transmitted in the broadcast stream |
| | BBComp | | 0..N | Component transmitted through the broadband network |
| | | @ mpdID | O | Associated DASH MPD identifier |
| | | @ perID | O | Associated period identifier in the corresponding MPD |
| | | @ reptnID | O | DASH representation identifier associated with the corresponding component |
| | | @ baseURL | O | Specifies the base URL of segments constituting DASH representation associated with the corresponding component. |
| | ForeignComp | | 0..N | Component transmitted through the broadcast streams |
| | | @mpdID | O | Associated DASH MPD identifier |
| | | @ perID | O | Associated period identifier in the corresponding MPD |
| | | @ reptnID | O | DASH representation identifier associated with the corresponding component |
| | | @ baseURL | O | Specifies the base URL of segments constituting DASH representation associated with the corresponding component. |
| | | @ transportStreamID | 1 | Identifier of the broadcast stream including corresponding component data |
| | | @ sourceIPAddr | O | Source IP address of IP datagram including the corresponding component data |
| | | @ destIPAddr | O | Destination IP address of IP datagram including the corresponding component data |
| | | @ destUDPPort | O | Destination UDP port number of IP datagram including the corresponding component data |
| | | @ datapipe ID | O | Identifier of the data pipe through which the corresponding component data is transmitted in the corresponding broadcast stream |
| Legend: For attributes: M=Mandatory, O=Optional, OD=Optional with Default Value, CM=Conditionally Mandatory. For elements: < minOccurs >...< maxOccurs > (N=unbounded) Note that the conditions only holds without using xlink:href . If linking is used, then all attributes are "optional" and < minOccurs = 0 > Elements are bold ; attributes are non-bold and preceded with an @. | | | | |

| Signaling message header | Component mapping description or part thereof |
|---|---|

FIG. 70

Component Mapping Table Description Semantics

| Element/Attribute | | | Cardinality | Description |
|---|---|---|---|---|
| Component Mapping Table Description | | | | |
| | @ service_id | | 1 | Associated broadcast service identifier |
| | Broadcast Comp | | 0..N | Component transmitted through the same broadcast stream |
| | | @ mpdID | 0 | Associated DASH MPD identifier |
| | | @ perID | 0 | Associated period identifier in the corresponding MPD |
| | | @ reptnID | 0 | DASH representation identifier associated with the corresponding component |
| | | @ baseURL | 0 | Specifies the base URL of segments constituting DASH representation associated with the corresponding component. |
| | | @ tsi | 0 | Identifier of the transport session through which the corresponding component data is transmitted in the broadcast stream. |
| | | @ datapipe ID | 1 | Identifier of the data pipe through which the corresponding component data is transmitted in the broadcast stream |
| | BBComp | | 0..N | Component transmitted through the broadband network |
| | | @ mpdID | 0 | Associated DASH MPD identifier |
| | | @ perID | 0 | Associated period identifier in the corresponding MPD |
| | | @ reptnID | 0 | DASH representation identifier associated with the corresponding component |
| | | @ baseURL | 0 | Specifies the base URL of segments constituting DASH representation associated with the corresponding component. |
| | ForeignComp | | 0..N | Component transmitted through the broadcast streams |
| | | @mpdID | 0 | Associated DASH MPD identifier |
| | | @ perID | 0 | Associated period identifier in the corresponding MPD |
| | | @ reptnID | 0 | DASH representation identifier associated with the corresponding component |
| | | @ baseURL | 0 | Specifies the base URL of segments constituting DASH representation associated with the corresponding component. |
| | | @ transportStreamID | 1 | Identifier of the broadcast stream including corresponding component data |
| | | @ sourceIPAddr | 0 | Source IP address of IP datagram including the corresponding component data |
| | | @ destIPAddr | 0 | Destination IP address of IP datagram including the corresponding component data |
| | | @ destUDPPort | 0 | Destination UDP port number of IP datagram including the corresponding component data |
| | | @ tsi | 0 | Identifier of the transport session through which the corresponding component data is transmitted in the corresponding broadcast stream. |
| | | @ datapipe ID | 0 | Identifier of the data pipe through which the corresponding component data is transmitted in the corresponding broadcast stream |

Legend:
For attributes: M=Mandatory, O=Optional, OD=Optional with Default Value, CM=Conditionally Mandatory.
For elements: < minOccurs >...< maxOccurs > (N=unbounded)
Note that the conditions only holds without using xlink:href . If linking is used, then all attributes are "optional" and < minOccurs = 0 >
Elements are bold ; attributes are non -bold and preceded with an @.

| Signaling message header | Component mapping description or part thereof |
|---|---|

FIG. 71

Component Mapping Table Description Semantics

| Element/Attribute | Cardinality | Description |
|---|---|---|
| Component Mapping Table Description | | |
| @ service_id | 1 | Associated broadcast service identifier |
| Component | 0..N | Component in the corresponding broadcast service |
| @ mpdID | O | Associated DASH MPD identifier |
| @perID | O | Associated period identifier in the corresponding MPD |
| @ reptnID | M | DASH representation identifier associated with the corresponding component |
| @ baseURL | O | Specifies the base URL of segments constituting DASH representation associated with the corresponding component |
| DeliveryParameter | 0..N | Includes detailed information about the path through which the corresponding component is transmitted. |
| PayloadFormat | 0..N | |

Legend:
    For attributes: M=Mandatory, O=Optional, OD=Optional with Default Value, CM=Conditionally Mandatory.
    For elements: < minOccurs >...< maxOccurs > (N=unbounded)
    Note that the conditions only holds without using xlink:href . If linking is used, then all attributes are "optional" and < minOccurs = 0 >
Elements are bold ; attributes are non -bold and preceded with an @.

FIG. 72

| Element/Attribute | | Cardinality | Description |
|---|---|---|---|
| DeliveryParameter | | | |
| | @ transportStreamID | O | Identifier of the broadcast stream including component data |
| | @ sourceIPAddr | O | Source IP address of IP datagram including the component data |
| | @ destIPAddr | O | Destination IP address of IP datagram including the component data |
| | @ destUDPPort | O | Destination UDP port number of IP datagram including the component data |
| | @ tsi | O | Identifier of the transport session through which the corresponding component data is transmitted in the broadcast stream. |
| | @ datapipe ID | O | Identifier of the physical layer data pipe through which the corresponding component data is transmitted in the broadcast stream |
| | @URL | O | Indicates URL information by which the corresponding component data can be acquired through the Internet. |

| Element/Attribute | | Cardinality | Description |
|---|---|---|---|
| PayloadFormat | | 1 ... N | Defines payload formats of packets carrying the component data |
| | @ codePoint | OD default=0 | Defines what CodePoint value is used for this payload. This is the value of the CP field in the LCT header. When signalling this this value, the delivery of the object can follow the rules below. |
| | @ deliveryObjectFormat | M | Specifies the payload format of the delivery object |
| | @fragmentation | OD default=0 | Specifies the type of fragmentation<br>0 : arbitrary<br>1: application specific (sample based)<br>2 : application specific (e.g., a collection of boxes) |
| | @deliveryOrder | OD default=0 | Specifies the ordering of delivery of objects<br>0 : arbitrary<br>1: in -order delivery<br>2: in -order delivery of media samples and prior to movie fragment box |
| | @ sourceFecPayloadID | OD default=1 | Defines the format of the Source FEC Payload ID. The following values can be defined :<br>• 0: the source FEC payload ID is absent and the entire delivery object is contained in this packet.<br>• 1: the source FEC payload ID is 32 bit and expresses the start offset in the object.<br>• 2: FECParameters defines the Format of the Source FEC Payload ID. |
| FECParameters | | 0 ... 1 | Defines the FEC parameters. This includes the FEC - encoding id , the - instance -id , etc. It is specifically used to signal the applied Source FEC Payload ID . |

FIG. 73

Component Mapping Table Description Semantics

| Element/Attribute | | | Cardinality | Description |
|---|---|---|---|---|
| Component Mapping Table Description | | | | |
| | @ service_id | | 1 | Identifier associated with component |
| | @ mpdID | | 0..1 | Associated DASH MPD identifier |
| | @ perID | | 0..1 | Associated period identifier in the corresponding MPD |
| | Broadcast Comp | | 0..N | Component transmitted through the same broadcast stream |
| | | @ reptnID | O | DASH representation identifier associated with the corresponding component |
| | | @ baseURL | O | Specifies the base URL of segments constituting DASH representation associated with the corresponding component. |
| | | @ tsi | O | Identifier of the transport session through which the corresponding component data is transmitted in the broadcast stream. |
| | | @ datapipe ID | 1 | Identifier of the data pipe through which the corresponding component data is transmitted in the broadcast stream |
| | BBComp | | 0..N | Component transmitted through the broadband network |
| | | @ reptnID | O | DASH representation identifier associated with the corresponding component |
| | | @ baseURL | O | Specifies the base URL of segments constituting DASH representation associated with the corresponding component. |
| | ForeignComp | | 0..N | Component transmitted through the broadcast streams |
| | | @ reptnID | O | DASH representation identifier associated with the corresponding component |
| | | @ baseURL | O | Specifies the base URL of segments constituting DASH representation associated with the corresponding component. |
| | | @ transportStreamID | 1 | Identifier of the broadcast stream including the corresponding component data |
| | | @ sourceIPAddr | O | Source IP address of IP datagram including the corresponding component data |
| | | @ destIPAddr | O | Destination IP address of IP datagram including the corresponding component data |
| | | @ destUDPPort | O | Destination UDP port number of IP datagram including the corresponding component data |
| | | @ tsi | O | Identifier of the transport session through which the corresponding component data is transmitted in the corresponding broadcast stream. |
| | | @ datapipe ID | O | Identifier of the data pipe through which the corresponding component data is transmitted in the corresponding broadcast stream |
| Legend: For attributes: M=Mandatory, O=Optional, OD=Optional with Default Value, CM=Conditionally Mandatory. For elements: < minOccurs >...< maxOccurs > (N=unbounded) Note that the conditions only holds without using xlink:href . If linking is used, then all attributes are "optional" and < minOccurs = 0 > Elements are bold ; attributes are non bold and preceded with an @. | | | | |

(1) BBComp means a broadband component.
(2) ForeignComp means component is another broadcast stream.
(3) The mpdID, perID and reptnID of each component identify the service component; the URLs of the component Segments can be determined from the current MPD for the service.
(4) The mpdID, perID and reptnID of a foreign component identify the service component. The precise location of the service component can be determined from the signaling in the other broadcast stream.

FIG. 74

| Element/Attribute | Cardinality | Description |
|---|---|---|
| Common attributes and elements | | |
| @profiles | O | specifies the profiles which the associated Representation( s ) conform to of the list of Media Presentation |
| @width | O | specifies the horizontal visual presentation size of the video media type on a grid determined by the @ sar attribute |
| @height | O | specifies the vertical visual presentation size of the video media type, on a grid determined by the @sar attribute. |
| @ sar | O | specifies the sample aspect ratio of the video media component type, |
| @ frameRate | O | specifies the output frame rate of the video media type in the Representation. |
| @ audioSamplingRate | O | Either a single decimal integer value specifying the sampling rate or a whitespace separated pair of decimal integer values specifying the minimum and maximum sampling rate of the audio media component type |
| @ mimeType | O | specifies the MIME type of the concatenation of the Initialization Segment, if present, and all consecutive Media Segments in the Representation. |
| @ segmentProfiles | O | specifies the profiles of Segments that are essential to process the Representation. The detailed semantics depend on the value of the @ mimeType attribute. |
| @codecs | O | specifies the codecs present within the Representation. |
| @ maximumSAPPeriod | O | when present, specifies the maximum SAP interval in seconds of all contained media streams |
| @ startWithSAP | O | specifies that in the associated Representations, each Media Segment starts with a SAP of type less than or equal to the value of this attribute value in each media stream. |
| @ maxPlayoutRate | O | specifies the maximum playout rate |
| @ codingDependency | O | When present and 텍rue? for all contained media streams, specifies that there is at least one access unit that depends on one or more other access units for decoding. |
| @ scanType | O | specifies the scan type of the source material of the video media component type. |
| FramePacking | 0...N | specifies frame-packing arrangement information of the video media component type. |
| AudioChannelConfiguration | 0...N | specifies the audio channel configuration of the audio media component type. |
| ContentProtection | 0...N | specifies information about content protection schemes used for the associated Representations. |
| EssentialProperty | 0...N | specifies information about the containing element that is considered essential by the Media Presentation author for processing the containing element. |
| SupplementalProperty | 0...N | specifies supplemental information about the containing element that may be used by the DASH client optimizing the processing. |
| InbandEventStream | 0...N | specifies the presence of an inband event stream in the associated Representations. |
| Location | 0...N | specifies a location at which the associated Representation(s) are available, for example, it can indicate a broadcast stream, or the physical layer data pipe(s) carrying the associated Representation(s) |

Legend:
For attributes: M=Mandatory, O=Optional, OD=Optional with Default Value, CM=Conditionally Mandatory.
For elements: < minOccurs >...< maxOccurs > (N=unbounded)
Note that the conditions only holds without using xlink:href . If linking is used, then all attributes are "optional" and <minOccurs = 0 >
Elements are bold ; attributes are non -bold and preceded with an @.

FIG. 75

LCT Session Instance Description Semantics

| Element or Attribute Name | | | Use | Description |
|---|---|---|---|---|
| LSID | | | | LCT Session Instance Description |
| | @version | | O | Version of this LCT Session Instance Description. The version is increased by one when the descriptor is updated. The received LSID with highest version number is the currently valid version. |
| | @ validFrom | | O | The date and time from which the LSID is valid. The validFrom attribute may or may not be present. If not present, the receiver can assume the LSID version is valid immediately. |
| | @expiration | | O | The date and time when the LSID expires. The expiration attribute may or may not be present. If not present the receiver can assume the LSID is valid for all time, or until it receives a newer LSID with an associated expiration value. |
| | TransportSession | | 1...N | Provides information about LCT transport sessions |
| | | @ tsi | M | Specifies the transport session identifier. The session identifiers must not be 0. |
| | | SourceFlow | 0 ... 1 | Provides information of a source flow carried on this tsi |
| | | RepairFlow | 0 ... 1 | Provides information of a repair flow carried on the tsi . |
| | | TransportSessionProperty | 0...N | provides additional property information about this transport session |

Legend:
    For attributes: M=Mandatory, O=Optional, OD=Optional with Default Value, CM=Conditionally Mandatory.
    For elements: < minOccurs >...< maxOccurs > (N=unbounded)
    Note that the conditions only holds without using xlink:href . If linking is used, then all attributes are "optional" and < minOccurs = 0 >
Elements are bold; attributes are non-bold and preceded with an @.

FIG. 76

| Element or Attribute Name | | Use | Description |
|---|---|---|---|
| SourceFlow | | | defines a source flow in session |
| | EFDT | 0...1 | If provided, it specifies the details of the file delivery data. This is the extended File Delivery Table(FDT) instance.<br>The EFDT may either be embedded or may be provided as a reference. If provided as a reference the EFDT may be updated independently of the LSID. |
| | @idRef | 0? | Identification of the EFDT, it can be represented as a URI by the corresponding Transport Session. |
| | @ realtime | OD<br>default: false | If not present it is false. If present and set to true, LCT packets contain extension headers including timestamps that express the presentation time of the included delivery object. |
| | @ minBufferSize | O | Defines the maximum amount of data that needs to be stored in the receiver. This value may be present if @ realtime is set to true. |
| | ApplicationIdentifier | 0...1 | May provide additional information that can be mapped to the application that is carried in this transport session, e.g. Representation ID of a DASH content or the Adaptation Set parameters of a DASH Representation in order to select the LCT transport session for rendering. |
| | PayloadFormat | 1...N | Defines payload formats of ROUTE packets carrying the objects of the source flow |
| | | @ codePoint | OD<br>default=0 | Defines what CodePoint value is used for this payload. This is the value of the CP field in the LCT header. When signalling this this value, the delivery of the object can follow the rules below. |
| | | @ deliveryObjectFormat | M | Specifies the payload format of the delivery object |
| | | @fragmentation | OD<br>default=0 | Specifies the type of fragmentation<br>0 : arbitrary<br>1: application specific (sample based)<br>2 : application specific (e.g., a collection of boxes) |
| | | @deliveryOrder | OD<br>default=0 | Specifies the ordering of delivery of objects<br>0 : arbitrary<br>1: in -order delivery<br>2: in -order delivery of media samples and prior to movie fragment box |
| | | @ sourceFecPayloadID | OD<br>default=1 | Defines the format of the Source FEC Payload ID. The following values can be defined :<br>• 0: the source FEC payload ID is absent and the entire delivery object is contained in this packet.<br>• 1: the source FEC payload ID is 32 bit and expresses the start offset in the object.<br>• 2: FECParameters defines the Format of the Source FEC Payload ID. |
| | FECParameters | 0...1 | Defines the FEC parameters . This includes the FEC-encoding - id , the instance -id , etc. It is specifically used to signal the applied Source FEC Payload ID . |
| | SourceFlowProperty | 0...N | provides property information about this source flow, e.g., broadcast location (e.g., data pipe within the broadcast stream) carrying this source flow data. |

Legend:
For attributes: M=Mandatory, O=Optional, OD=Optional with Default Value, CM=Conditionally Mandatory.
For elements: < minOccurs >...< maxOccurs > (N=unbounded)
Note that the conditions only holds without using xlink:href . If linking is used, then all attributes are "optional" and < minOccurs = 0 >
Elements are bold; attributes are non -bold and preceded with an @.

FIG. 77

| Syntax | No. Bits | Format |
|---|---|---|
| FIC( ){ | | |
|     FIC_protocol_version | 8 | uimsbf |
|     transport_stream_ID | 16 | uimsbf |
|     FIC_data_version | 8 | uimsbf |
|     num_partitions | 8 | uimsbf |
|     for (i-0; i<num_partitions; i++) { | | |
|         partition_id | 8 | uimsbf |
|         partition_protocol_version | 8 | uimsbf |
|         num_services | 8 | uimsbf |
|         For (j=0; j<num_services; j++) { | | |
|             service_id | 16 | uimsbf |
|             service_data_version | 8 | uimsbf |
|             channel_number | 16 | uimsbf |
|             service_category | 5 | uimsbf |
|             short_service_name_length /*m*/ | 3 | uimsbf |
|             short_service_name | 16*m | var |
|             service_status | 3 | uimsbf |
|             service_distribution | 2 | uimsbf |
|             sp_indicator | 1 | uimsbf |
|             IP_version_flag | 1 | bslbf |
|             source_IP_address_flag | 1 | bslbf |
|             num_transport_sessions | 8 | uimsbf |
|             for (int k=0; k<num_transport_sessions;k++){ | | |
|                 if(source_IP_address_flag) | | |
|                     source_IP_addr | 32 or 128 | uimsbf |
|                 dest_IP_addr | 32 or 128 | uimsbf |
|                 dest_UDP_port | 16 | uimsbf |
|                 LSID_DP | 8 | uimsbf |
|                 LSID_tsi | 16 | uimsbf |
|                 service_signaling_flag | 8 | uimsbf |
|                 if(service_signaling_flag=='1'){ | | |
|                     signaling_data_version | 8 | uimsbf |
|                     signaling_DP | 8 | uimsbf |
|                     signaling_tsi | 16 | uimsbf |
|                 } | | |
|                 link_layer_signaling_flag | 8 | uimsbf |
|                 if(link_layer_signaling_flag=='1'){ | | |
|                     link_layer_signaling_data_version | 8 | uimsbf |
|                     link_layer_signaling_DP | 8 | uimsbf |
|                 } | | |
|             [transport_session_descriptors] | | |
|             } | | |
|         [service_descriptors] | | |
|         } | | |
|     [partition_descriptors] | | |
|     } | | |
|     [FIC_descriptors] | | |
| } | | |

FIG. 78

| Field | # Bits | format |
|---|---|---|
| FIC( ){ | | |
|   FIC_protocol_version | 8 | uimsbf |
|   transport_stream_ID | 16 | uimsbf |
|   num_partitions | 8 | uimsbf |
|   for i=0..num_partitions-1 | | |
|     partition_id | 8 | uimsbf |
|     partition_protocol_version | 8 | uimsbf |
|     num_services | 8 | uimsbf |
|     for j=0..num_services-1 | | |
|       service_id | 16 | uimsbf |
|       service_data_version | 8 | uimsbf |
|       service_channel_number | 16 | uimsbf |
|       service_category | 5 | uimsbf |
|       service_short_name_length /*m*/ | 3 | uimsbf |
|       service_short_name | m*16 | var |
|       service_status | 3 | uimsbf |
|       service_distribution | 2 | uimsbf |
|       sp_indicator | 1 | bslbf |
|       IP_version_flag | 1 | bslbf |
|       reserved | 1 | '1' |
|       num_ROUTE_sessions | 8 | uimsbf |
|       for k=0..num_ROUTE_sessions-1 | | |
|         source_IP_addr | 32 or 128 | uimsbf |
|         dest_IP_addr | 32 or 128 | uimsbf |
|         dest_UDP_port | 16 | uimsbf |
|         LSID_DP | 8 | uimsbf |
|         LSID_tsi | 16 | uimsbf |
|         reserved | 6 | '111111' |
|         component_signaling_flag | 1 | bslbf |
|         link_layer_signaling_flag | 1 | bslbf |
|         if(link_layer_signaling_flag=='1'){ | | |
|           link_layer_signaling_data_version | 8 | uimsbf |
|           link_layer_signaling_DP | 8 | uimsbf |
|         } | | |
|       [ROUTE_session_descriptors] | | |
|       [service_descriptors] | | |
|     [partition_descriptors] | | |
|   [FIC_descriptors] | | |
| } | | |

FIG. 89

| Syntax | No. Bits | Format |
|---|---|---|
| signaling_message_header ( ){ | | |
|    signaling_id | 8 | uimsbf |
|    signaling_length | 16 | uimsbf |
|    signaling_id_extension | 16 | uimsbf |
|    version_number | 4 | uimsbf |
|    current_next_indicator | 1 | uimsbf |
|    reserved | 3 | '111' |
|    indicator_flags { | | |
|      fragmentation_indicator | 1 | bslbf |
|      payload_format_indicator | 1 | bslbf |
|      expiration _indicator | 1 | bslbf |
|      validfrom_indicator | 1 | bslbf |
|    } | | |
|    reserved | 4 | '1111' |
|    if( fragmentation_indicator ){ | | |
|      fragment_number | 4 | uimsbf |
|      last_fragment_number | 4 | uimsbf |
|    } | | |
|    if( payload_format_indicator ){ | | |
|      payload_format | 8 | uimsbf |
|    } | | |
|    if( validfrom_indicator ){ | | |
|      validfrom | 32 | uimsbf |
|    } | | |
|    if( expiration _indicator ){ | | |
|      expiration | 32 | uimsbf |
|    } | | |
| } | | |

FIG. 91

| PayloadFormat | 1 ... N | Defines payload formats of ROUTE packets carrying the objects of the source flow |
|---|---|---|
| @ codePoint | OD default=0 | Defines what CodePoint value is used for this payload. This is the value of the CP field in the LCT header. When signalling this this value, the delivery of the object can follow the rules below. |
| @ deliveryObjectFormat | M | Specifies the payload format of the delivery object<br>0: Signalling Message Format<br>1: File Mode<br>2: Entity Mode<br>3: Package<br>4: metadata including Initialization Segment<br>5...: Reserved |
| @fragmentation | OD default=0 | Specifies the type of fragmentation<br>0 : arbitrary<br>1: application specific (sample based)<br>2 : application specific (e.g., a collection of boxes) |
| @ deliveryOrder | OD default=0 | Specifies the ordering of delivery of objects<br>0 : arbitrary<br>1: in -order delivery<br>2: in -order delivery of media samples and prior to movie fragment box |
| @ sourceFecPayloadID | OD default=1 | Defines the format of the Source FEC Payload ID. The following values can be defined :<br>· 0: the source FEC payload ID is absent and the entire delivery object is contained in this packet.<br>· 1: the source FEC payload ID is 32 bit and expresses the start offset in the object.<br>· 2: FECParameters defines the Format of the Source FEC Payload ID. |

FIG. 92

| Element or Attribute Name | | | Use | Description |
|---|---|---|---|---|
| SOD | | | | Signaling Object Description |
| | @ protocolVersion | | O | Indicates the version of Signaling Object Description. |
| | @ dataVersion | | O | Indicates the version of the current SOD instance.<br>@dataVersion can be changed when contents of SOD are varied. |
| | @ validFrom | | O | Indicates the time from which the current SOD instance is valid.<br>A receiver can recognize the time from which SOD is valid and<br>use SOD information from the time using this field. |
| | @expiration | | O | Indicates the time when the current SOD instance expires.<br>The receiver can recognize the time when the current SOD instance expires and<br>manage SOD information using this field. |
| | Signaling Object | | 1..N | |
| | | @ toi | M | Specifies information such as the type and version of<br>a signaling message carried by each object by being mapped to<br>TOI or the TOI packet allocated to the signaling object. |
| | | @type | M | Type of the signaling message included in the object. For example,<br>0: LSID (LCT Session Instance Description), 1: CMD (Component Mapping<br>Description), 2: ASD (Application Signaling Description), 3: MPD (Media<br>Presentation Description), 4: USD (URL Signaling Description),<br>5: IS (Initialization Segment) are respectively allocated to<br>signaling messages to specify the types thereof. |
| | | @version | M | Indicates the version of a signaling message.<br>Change of the signaling message can be indicated by variation of this field value. |
| | | @instance Id | O | Specifies an instance of a signaling message.<br>This is used to identify instances of signaling messages, present in one service,<br>such as initialization segments. |
| | | @ validFrom | O | Indicates the time from which the signaling message included in the object is valid.<br>The receiver can recognize the time from which the signaling message<br>included in the object is valid and use the signaling message from<br>the time using this field. |
| | | @expiration | O | Indicates the time when the signaling message included in the object expires.<br>The receiver can recognize the time when the signaling message<br>included in the object expires and manage the signaling message using this field. |
| | | @ payloadFormat | O | Specifies the format of signaling message data included in the object.<br>This can indicate binary, XML, etc. |
| Legend:<br>　　For attributes: M=Mandatory, O=Optional, OD=Optional with Default Value, CM=Conditionally Mandatory.<br>　　For elements: < minOccurs >...< maxOccurs > (N=unbounded)<br>　　Note that the conditions only holds without using xlink:href . If linking is used, then all attributes are "optio<br>　　nal" and < minOccurs = 0 ><br>Elements are bold; attributes are non-bold and preceded with an @. | | | | |

FIG. 93

| 0 | | 7 | | | | | 15 | | | 23 | 31 |
|---|---|---|---|---|---|---|---|---|---|---|---|
| V | C | PSI | S | O | H | Res | A | B | HDR_LEN | Codepoint (CP) | |
| Congestion Control Information (CCI) ||||||||||||
| Transport Session Identifier (TSI) ||||||||||||
| Type |||||| Version ||||||
| Header Extensions ||||||||||||
| FEC Payload ID ||||||||||||
| Encoding Symbol (s) ||||||||||||

FIG. 94

| Element or Attribute Name | Use | Description |
|---|---|---|
| TCD | | TOI Configuration Description. |
| @protocolVersion | O | Indicates the version of TOI Configuration Description. |
| @dataVersion | O | Indicates the version of the current TCD instance, @dataVersion can be changed when contents of TCD are varied. |
| @validFrom | O | Indicates the time from which the current TCD instance is valid. The receiver can recognize the time from which TCD is valid and use TCD information from the time using this information. |
| @expiration | O | Indicates the time when the current TCD instance expires. The receiver can recognize the time when the current TCD instance expires and manage TCD information using this information. |
| @typeBits | M | Indicates the length of the type field in the TOI field in bits. |
| @versionBits | M | Indicates the length of the version field in the TOI field in bits |
| @instanceIdBits | O | Indicates the length of the instanceId field in the TOI field in bits |
| @validFromBits | O | Indicates the length of the validFrom field in the TOI field in bits |
| @expirationBits | O | Indicates the length of the expiration field in the TOI field in bits |
| @payloadFormatBits | O | Indicates the length of the payloadFormat field in the TOI field in bits |

FIG. 95

| PayloadFormat | 1 ... N | Defines payload formats of ROUTE packets carrying the objects of the source flow |
|---|---|---|
| @ codePoint | OD default=0 | Defines what CodePoint value is used for this payload. This is the value of the CP field in the LCT header. When signalling this this value, the delivery of the object can follow the rules below. |
| @ deliveryObjectFormat | M | Specifies the payload format of the delivery object<br>0: Signalling Message Format<br>1: File Mode<br>2: Entity Mode<br>3: Package<br>4: metadata including Initialization Segment<br>5?: Reserved |
| @fragmentation | OD default=0 | Specifies the type of fragmentation<br>0: arbitrary<br>1: application specific (sample based)<br>2: application specific (e.g., a collection of boxes) |
| @ deliveryOrder | OD default=0 | Specifies the ordering of delivery of objects<br>0: arbitrary<br>1: in -order delivery<br>2: in -order delivery of media samples and prior to movie fragment box |
| @ sourceFecPayloadID | OD default=1 | Defines the format of the Source FEC Payload ID. The following values can be defined :<br>• 0: the source FEC payload ID is absent and the entire delivery object is contained in this packet.<br>• 1: the source FEC payload ID is 32 bit and expresses the start offset in the object.<br>• 2: FECParameters defines the Format of the Source FEC Payload ID. |
| TCID | 0...1 | TOI Configuration Instance Description |

FIG. 96

| Element or Attribute Name | Use | Description |
|---|---|---|
| TCID | | TOI Configuration Instance Description |
| @ typeBits | M | Indicates the length of the type field in the TOI field in bits. |
| @ versionBits | M | Indicates the length of the version field in the TOI field in bits |
| @ instanceIdBits | O | Indicates the length of the instanceId field in the TOI field in bits |
| @ validFromBits | O | Indicates the length of the validFrom field in the TOI field in bits |
| @ expirationBits | O | Indicates the length of the expiration field in the TOI field in bits |
| @ payloadFormatBits | O | Indicates the length of the payloadFormat field in the TOI field in bits |

FIG. 97

| Syntax | No. of Bits | Format |
|---|---|---|
| FIC_payload( ) { | | |
|     FIC_protocol_version | 8 | uimsbf |
|     transport_stream_id | 16 | uimsbf |
|     num_partitions | 8 | uimsbf |
|     for (i=0; i<num_partitions; i++) { | | |
|         partition_id | 8 | uimsbf |
|         partition_protocol_version | 8 | uimsbf |
|         num_services | 8 | uimsbf |
|         for (j=0; j<num_services; j++) { | | |
|             service_id | 16 | uimsbf |
|             service_data_version | 8 | uimsbf |
|             service_channel_number | 16 | uimsbf |
|             service_category | 5 | uimsbf |
|             short_service_name_length /*m*/ | 3 | uimsbf |
|             short_service_name | 16*m | bslbf |
|             service_status | 3 | uimsbf |
|             service_distribution | 2 | uimsbf |
|             sp_indicator | 1 | bslbf |
|             IP_version_flag | 1 | bslbf |
|             SSC_source_IP_address_flag | 1 | bslbf |
|             if(SSC_source_IP_address_flag ){ | | |
|                 SSC_source_IP_address | 32 or 128 | uimsbf |
|             } | | |
|             SSC_destination_IP_address | 32 or 128 | uimsbf |
|             SSC_destination_UDP_port | 16 | uimsbf |
|             SSC_TSI | 16 | uimsbf |
|             SSC_DP_ID | 8 | uimsbf |
|         } | | |
|         num_partition_level_descriptors | 8 | uimsbf |
|         for (k=0; k<num_partition_level_descriptors; k++) { | | |
|             partition_level_descriptor ( ) | | |
|     } | var | |
|     num_FIC_level_descriptors | | |
|     for (n=0; n<num_FIC_level_descriptors; n++) { | 8 | uimsbf |
|         FIC_level_descriptor ( ) | | |
| } | var | |

FIG. 98

| Syntax | No. of Bits | Format |
|---|---|---|
| FIC_payload( ) { | | |
|     FIC_protocol_version | 8 | uimsbf |
|     transport_stream_id | 16 | uimsbf |
|     num_partitions | 8 | uimsbf |
|     for (i=0; i<num_partitions; i++) { | | |
|         partition_id | 8 | uimsbf |
|         partition_protocol_version | 8 | uimsbf |
|         num_services | 8 | uimsbf |
|         for (j=0; j<num_services; j++) { | | |
|             service_id | 16 | uimsbf |
|             service_data_version | 8 | uimsbf |
|             service_channel_number | 16 | uimsbf |
|             service_category | 5 | uimsbf |
|             short_service_name_length /*m*/ | 3 | uimsbf |
|             short_service_name | 16*m | bslbf |
|             service_status | 3 | uimsbf |
|             service_distribution | 2 | uimsbf |
|             sp_indicator | 1 | bslbf |
|             IP_version_flag | 1 | bslbf |
|             reserved | 1 | '1' |
|             SSC_delivery_type | 4 | uimsbf |
|             reserved | 4 | '1111' |
|             if( SSC_delivery_type == 0x01 ){ | | |
|                 reserved | 7 | '1111111' |
|                 SSC_source_IP_address_flag | 1 | bslbf |
|                 if( SSC_source_IP_address_flag ){ | | |
|                     SSC_source_IP_address | 32 or 128 | uimsbf |
|                 } | | |
|                 SSC_destination_IP_address | 32 or 128 | uimsbf |
|                 SSC_destination_UDP_port | 16 | uimsbf |
|                 SSC_TSI | 16 | uimsbf |
|                 SSC_DP_ID | 8 | uimsbf |
|             } | | |
|             } | 16 | bslbf |
|             else if( SSC_delivery_type == 0x02 ){ | 8*K | |
|                 SSC_URL_length /*K*/ | 8 | |
|                 SSC_URL_data | var | uimsbf |
|             } | | |
|         } | 8 | |
|         num_partition_level_descriptors | | uimsbf |
|         for (k=0; k<num_partition_level_descriptors; k++) | | |
|             partition_level_descriptor( ) | var | uimsbf |
|     } | | |
|     num_FIC_level_descriptors | | |
|     for (n=0; n<num_FIC_level_descriptors; n++) | | |
|         FIC_level_descriptor( ) | | |
| } | | |

FIG. 99

| Signaling message header | Service signaling message or part thereof |

| Element/Attribute | | | Cardinality | Description |
|---|---|---|---|---|
| Service | | | | |
| | @service_id | | 1 | Service identifier |
| | @service_category | | 1 | Service type |
| | @service_name | | 1 | Service name |
| | @channel_number | | 0..1 | Service related channel information |
| | @service_status | | 0..1 | Service status |
| | @service_distribution | | 0..1 | |
| | @SP_indicator | | 0..1 | Presence or absence of service protection |
| | ROUTE Session | | 0..N | ROUTE session information |
| | | @sourceIPAddr | 0..1 | the source address of the IP datagrams carrying ROUTE packets |
| | | @destIPAddr | 1 | the destination address of the IP datagrams carrying ROUTE packets |
| | | @destUDPPort | 1 | the destination port number of the IP datagrams carrying ROUTE packets |
| | | @LSID_DP | 1 | Identifier of the data pipe through which LSID including information such as transport parameters of each ROUTE session is delivered |
| | Targeting | | 0..1 | Targeting parameter for the service |
| | Content Advisory | | 0..1 | Content advisory information associated with the service |
| | Right Issuer Service | | 0..1 | Includes information about rights issuer associated with the service. |
| | Current Program | | 0..1 | Includes information about the current program |
| | Original Service Identification | | 0..1 | Includes identification information about the original service |
| | Content Labeling | | 0..1 | Includes information about content labeling. |
| | Genre | | 0..1 | Includes information about service genre. |
| | Caption | | 0..1 | Includes information about service caption. |
| | Protection | | 0..1 | Includes information about service protection. |

FIG. 100

| Element/Attribute | | Cardinality | Description |
|---|---|---|---|
| Component Mapping Description | | | |
| | @ service_id | 1 | Identifier associated with component |
| | @ mpdID | 0..1 | Associated DASH MPD identifier |
| | @ perID | 0..1 | Associated period identifier in the corresponding MPD |
| | Broadcast Comp | 0..N | Component transmitted through the same broadcast stream |
| | @ reptnID | O | DASH representation identifier associated with the corresponding component |
| | @ baseURL | O | Specifies the base URL of segments constituting DASH representation associated with the corresponding component. |
| | @ tsi | O | Identifier of the transport session through which the corresponding component data is transmitted in the broadcast stream. |
| | @ datapipe ID | 1 | Identifier of the data pipe through which the corresponding component data is transmitted in the broadcast stream |
| | BBComp | 0..N | Component transmitted through the broadband network |
| | @ reptnID | O | DASH representation identifier associated with the corresponding component |
| | @ baseURL | O | Specifies the base URL of segments constituting DASH representation associated with the corresponding component. |
| | ForeignComp | 0..N | Component transmitted through the broadcast streams |
| | @ reptnID | O | DASH representation identifier associated with the corresponding component |
| | @ baseURL | O | Specifies the base URL of segments constituting DASH representation associated with the corresponding component. |
| | @ transportStreamID | 1 | Identifier of the broadcast stream including the corresponding component data |
| | @ partitionID | O | Identifier of a partition indicating a broadcasting station in the corresponding broadcast stream |
| | @ sourceIPAddr | O | Source IP address of IP datagram including the corresponding component data |
| | @ destIPAddr | O | Destination IP address of IP datagram including the corresponding component data |
| | @ destUDPPort | O | Destination UDP port number of IP datagram including the corresponding component data |
| | @ tsi | O | Identifier of the transport session through which the corresponding component data is transmitted in the corresponding broadcast stream. |
| | @ datapipe ID | O | Identifier of the data pipe through which the corresponding component data is transmitted in the corresponding broadcast stream |
| Legend: For attributes: M=Mandatory, O=Optional, OD=Optional with Default Value, CM=Conditionally Mandatory. For elements: < minOccurs >...< maxOccurs > (N=unbounded) Note that the conditions only holds without using xlink:href . If linking is used, then all attributes are "optional" and < minOccurs = 0 > Elements are bold ; attributes are non-bold and preceded with an @. | | | |

FIG. 101

| Element/Attribute | Cardinality | Description |
|---|---|---|
| URL Signaling Description | | |
| @service_id | 1 | service identifier |
| @sm tURL | 0..1 | URL of broadband SMT (service map table) |
| @mpdURL | 0..1 | URL of broadband MPD |
| @c m tURL | 0..1 | URL of broadband CMT (component mapping table) |
| @astURL | 0..1 | URL of broadband AST (application signaling table) |
| @gatURL | 0..1 | URL of broadband GAT (guide access table) |
| @eatURL | 0..1 | URL of broadband EAT (emergency alert table) |

FIG. 102

| Element or Attribute Name | | Use | Description |
|---|---|---|---|
| SourceFlow | | | defines a source flow in session |
| | EFDT | 0...1 | If provided, it specifies the details of the file delivery data. This is the extended File Delivery Table(FDT) instance. The EFDT may either be embedded or may be provided as a reference. If provided as a reference the EFDT may be updated independently of the LSID. |
| | @ idRef | 0...1 | Identification of the EFDT, it can be represented as a URI by the corresponding Transport Session. |
| | @ realtime | OD default: false | If not present it is false. If present and set to true, LCT packets contain extension headers including timestamps that express the presentation time of the included delivery object. |
| | @ minBufferSize | O | Defines the maximum amount of data that needs to be stored in the receiver. This value may be present if @ realtime is set to true. |
| | ApplicationIdentifier | 0...1 | May provide additional information that can be mapped to the application that is carried in this transport session, e.g. Representation ID of a DASH content or the Adaptation Set parameters of a DASH Representation in order to select the LCT transport session for rendering. |
| | @location | O | location (e.g., data pipe within the broadcast stream) carrying this source flow data. |
| | PayloadFormat | 1...N | Defines payload formats of ROUTE packets carrying the objects of the source flow |
| | @ codePoint | OD default=0 | Defines what CodePoint value is used for this payload. This is the value of the CP field in the LCT header. When signalling this this value, the delivery of the object can follow the rules below. |
| | @ deliveryObjectFormat | M | Specifies the payload format of the delivery object |
| | @fragmentation | OD default=0 | Specifies the type of fragmentation 0 : arbitrary 1: application specific (sample based) 2: application specific (e.g., a collection of boxes) |
| | @ deliveryOrder | OD default=0 | Specifies the ordering of delivery of objects 0 : arbitrary 1: in -order delivery 2: in -order delivery of media samples and prior to movie fragment box |
| | @ sourceFecPayloadID | OD default=1 | Defines the format of the Source FEC Payload ID. The following values can be defined :     0: the source FEC payload ID is absent and the entire delivery object is contained in this packet.     1: the source FEC payload ID is 32 bit and expresses the start offset in the object.     2: FECParameters defines the Format of the Source FEC Payload ID. |
| | FECParameters | 0...1 | Defines the FEC parameters . This includes the FEC-encoding -id, the insta nce -id , etc. It is specifically used to signal the applied Source FEC Payloa d ID. |
| | SourceFlowProperty | 0...N | provides property information about this source flow, e.g., broadcast location (e.g., data pipe within the broadcast stream) carrying this source flow data. |

Legend:
For attributes: M=Mandatory, O=Optional, OD=Optional with Default Value, CM=Conditionally Mandatory.
For elements: < minOccurs >...< maxOccurs > (N=unbounded)
Note that the conditions only holds without using xlink:href . If linking is used, then all attributes are "optional" and < minOccurs = 0 >
Elements are bold; attributes are non -bold and preceded with an @.

FIG. 109

| Syntax | No. of Bits | Format |
|---|---|---|
| FIC_payload() { | | |
|     FIC_protocol_version | 8 | uimsbf |
|     transport_stream_id | 16 | uimsbf |
|     num_partitions | 8 | uimsbf |
|     for (i=0; i<num_partitions ; i++) { | | |
|         partition_id | 8 | uimsbf |
|         partition_protocol_version | 8 | uimsbf |
|         num_services | 8 | uimsbf |
|         for (j=0; j<num_services ; j++) { | | |
|             service_id | 16 | uimsbf |
|             service_data_version | 8 | uimsbf |
|             service_channel_number | 16 | uimsbf |
|             service_category | 5 | uimsbf |
|             short_service_name_length   /*m*/ | 3 | uimsbf |
|             short_service_name | 16*m | bslbf |
|             service_status | 3 | uimsbf |
|             service_distribution | 2 | uimsbf |
|             sp_indicator | 1 | bslbf |
|             IP_version_flag | 1 | bslbf |
|             source_IP_address_flag | 1 | bslbf |
|             reserved | 4 | '1111' |
|             bootstrap_mode | 4 | uimsbf |
|             if(source_IP_address_flag ){ | | |
|                 source_IP_address | 32 or 128 | uimsbf |
|             } | | |
|             destination_IP_address | 32 or 128 | uimsbf |
|             destination_UDP_port | 16 | uimsbf |
|             SSC_tsi | 16 | uimsbf |
|             SSC_dp_id | 8 | uimsbf |
|             If(bootstrap_mode ==0x02){ | | |
|                 num_component | 8 | uimsbf |
|                 for(c=0;c<num_component;c ++){ | | |
|                 component_id | 8 | uimsbf |
|                 component_tsi | 16 | uimsbf |
|                 compoent_dp_id | 8 | uimsbf |
|                 num_component_descriptor | 8 | uimsbf |
|                 for(d=0;d< num_component_desriptor;d  ++) | | |
|                     component_level_descriptor () | var | |
|                 } | | |
|             } | | |
|         } | | |
|         num_partition_level_descriptors | 8 | uimsbf |
|         for (k=0; k<num_partition_level_descriptors ; k++) | | |
|             partition_level_descriptor () | var | |
|     } | | |
|     num_FIC_level_descriptors | 8 | uimsbf |
|     for (n=0; n<num_FIC_level_descriptors; n++) | | |
|         FIC_level_descriptor() | var | |
| } | | |

FIG. 110

| Syntax | No. of Bits | Format |
|---|---|---|
| FIC_payload() { | | |
|     FIC_protocol_version | 8 | uimsbf |
|     transport_stream_id | 16 | uimsbf |
|     num_partitions | 8 | uimsbf |
|     for (i=0; i<num_partitions ; i++) { | | |
|         partition_id | 8 | uimsbf |
|         partition_protocol_version | 8 | uimsbf |
|         num_services | 8 | uimsbf |
|         for (j=0; j<num_services ; j++) { | | |
|             service_id | 16 | uimsbf |
|             service_data_version | 8 | uimsbf |
|             service_channel_number | 16 | uimsbf |
|             service_category | 5 | uimsbf |
|             short_service_name_length    /*m*/ | 3 | uimsbf |
|             short_service_name | 16*m | bslbf |
|             service_status | 3 | uimsbf |
|             service_distribution | 2 | uimsbf |
|             sp_indicator | 1 | bslbf |
|             IP_version_flag | 1 | bslbf |
|             reserved | 1 | '1' |
|             num_ROUTE_session | 8 | uimsbf |
|             for(r=0;r< num_ROUTE_session;r ++){ | | |
|                 reserved | 2 | '11' |
|                 source_IP_address_flag | 1 | bslbf |
|                 ssc_flag | 1 | bslbf |
|                 bootstrap_mode | 4 | uimsbf |
|                 if(source_IP_address_flag) | | |
|                     source_IP_address | 32 or 128 | uimsbf |
|                 destination_IP_address | 32 or 128 | uimsbf |
|                 destination_UDP_port | 16 | uimsbf |
|                 if(ssc_flag) { | | |
|                     SSC_tsi | 16 | uimsbf |
|                     SSC_dp_id | 8 | uimsbf |
|                 } | | |
|                 If(bootstrap_mode ==0x02){ | | |
|                     num_component | 8 | uimsbf |
|                     for(c=0;c<num_component;c ++){ | | |
|                         component_id | 8 | uimsbf |
|                         component_tsi | 16 | uimsbf |
|                         compoent_dp_id | 8 | uimsbf |
|                         num_component_descriptor | 8 | uimsbf |
|                         for(d=0;d< num_component_desriptor;d ++) | | |
|                             component_level_descriptor () | var | |
|                     } | | |
|                 } | | |
|             } | | |
|         } | | |
|         num_partition_level_descriptors | 8 | uimsbf |
|         for (k=0; k<num_partition_level_descriptors ; k++) | | |
|             partition_level_descriptor () | var | |
|     } | | |
|     num_FIC_level_descriptors | 8 | uimsbf |
|     for (n=0; n<num_FIC_level_descriptors ; n++) | | |
|         FIC_level_descriptor() | var | |
| } | | |

FIG. 111

| Syntax | No. of Bits | Format |
|---|---|---|
| transport_parameter_descriptor() { | | |
|     descriptor_tag | 8 | uimsbf |
|     descriptor_length | 16 | uimsbf |
|     reserved | 3 | '111' |
|     codepoint_flag | 1 | bslbf |
|     delivery_object_format_flag | 1 | bslbf |
|     fragmentation_flag | 1 | bslbf |
|     delivery_order_flag | 1 | bslbf |
|     payload_id_scheme_flag | 1 | bslbf |
|     if(codepoint_flag) | | |
|         code_point | 8 | uimsbf |
|     if(delivery_object_format_flag) | | |
|         delivery_object_format | 8 | uimsbf |
|     if(fragmentation_flag) | | |
|         fragmentation_scheme | 8 | uimsbf |
|     if(delivery_order_flag){ | | |
|         reserved | 4 | '1111' |
|         delivery_order | 4 | uimsbf |
|     } | | |
|     if(payload_id_scheme_flag) | | |
|         payload_id_scheme | 8 | uimsbf |
| } | | |

FIG. 115

| Syntax | No. of Bits | Format |
|---|---|---|
| FIC_payload() { | | |
|     FIC_protocol_version | 8 | uimsbf |
|     transport_stream_id | 16 | uimsbf |
|     num_partitions | 8 | uimsbf |
|     for (i=0; i<num_partitions; i++) { | | |
|         partition_id | 8 | uimsbf |
|         partition_protocol_version | 8 | uimsbf |
|         transport_protocol_type | 8 | uimsbf |
|         num_services | 8 | uimsbf |
|         for (j=0; j<num_services; j++) { | | |
|             service_id | 16 | uimsbf |
|             service_data_version | 8 | uimsbf |
|             service_channel_number | 16 | uimsbf |
|             service_category | 5 | uimsbf |
|             short_service_name_length /*m*/ | 3 | uimsbf |
|             short_service_name | 16*m | bslbf |
|             service_status | 3 | uimsbf |
|             service_distribution | 2 | uimsbf |
|             sp_indicator | 1 | bslbf |
|             IP_version_flag | 1 | bslbf |
|             Reserved | 1 | '1' |

FIG. 116

| | | |
|---|---|---|
| num_session | 8 | uimsbf |
| for(r=0;r<num_session;r++){ | | |
|   reserved | 6 | '111111' |
|   source_IP_address_flag | 1 | bslbf |
|   ssc_flag | 1 | bslbf |
|   if(source_IP_address_flag) | | |
|     source_IP_address | 32 or 128 | uimsbf |
|   destination_IP_address | 32 or 128 | uimsbf |
|   destination_UDP_port | 16 | uimsbf |
|   if(transport_protocol_type==0x01) | | |
|   { | | |
|     packet_id | 16 | uimsbf |
|     dp_id | 8 | uimsbf |
|   } | | |
|   else if(transport_protocol_type==0x02) | | |
|   { | | |
|     if(ssc_flag) { | | |
|       SSC_tsi | 16 | uimsbf |
|       SSC_dp_id | 8 | uimsbf |
|     } | | |
|     LSID_tsi | 16 | uimsbf |
|     dp_id | 8 | uimsbf |
|     } | | |
|   } | | |
| } | | |
| } | | |

FIG. 117

| Syntax | No. of Bits | Format |
|---|---|---|
| FIC_payload() { | | |
|     FIC_protocol_version | 8 | uimsbf |
|     transport_stream_id | 16 | uimsbf |
|     num_partitions | 8 | uimsbf |
|     for (i=0; i<num_partitions; i++) { | | |
|         partition_id | 8 | uimsbf |
|         partition_protocol_version | 8 | uimsbf |
|         transport_protocol_type | 8 | uimsbf |
|         num_services | 8 | uimsbf |
|         for (j=0; j<num_services; j++) { | | |
|             service_id | 16 | uimsbf |
|             service_data_version | 8 | uimsbf |
|             service_channel_number | 16 | uimsbf |
|             service_category | 5 | uimsbf |
|             short_service_name_length /*m*/ | 3 | uimsbf |
|             short_service_name | 16*m | bslbf |
|             service_status | 3 | uimsbf |
|             service_distribution | 2 | uimsbf |
|             sp_indicator | 1 | bslbf |
|             IP_version_flag | 1 | bslbf |
|             Reserved | 1 | '1' |
|             num_session | 8 | uimsbf |
|             for(r=0;r<num_session;r++){ | | |
|                 reserved | 2 | '11' |
|                 source_IP_address_flag | 1 | bslbf |
|                 ssc_flag | 1 | bslbf |
|                 bootstrap_mode | 4 | uimsbf |

FIG. 118

| | | |
|---|---|---|
| if(source_IP_address_flag) | | |
|    source_IP_address | 32 or 128 | uimsbf |
| destination_IP_address | 32 or 128 | uimsbf |
| destination_UDP_port | 16 | uimsbf |
| if(transport_protocol_type==0x01) | | |
| { | | |
|   packet_id | 16 | uimsbf |
|   dp_id | 8 | uimsbf |
| } | | |
| else if(transport_protocol_type==0x02) | | |
| { | | |
|   if(ssc_flag) { | | |
|     SSC_tsi | 16 | uimsbf |
|     SSC_dp_id | 8 | uimsbf |
|   } | | |
|   LSID_tsi | 16 | uimsbf |
|   dp_id | 8 | uimsbf |
| } | | |
| If(bootstrap_mode ==0x02){ | | |
|   num_component | 8 | uimsbf |
|   for(c=0;c<num_component;c++){ | | |
|     component_id | 8 | uimsbf |
|     if(transport_protocol_type==0x01) | | |
|       component_packet_id | 16 | uimsbf |
|     else if(transport_protocol_type==0x02) | | |
|       component_tsi | 16 | uimsbf |
|       compoent_dp_id | 8 | uimsbf |
|     num_component_descriptor | 8 | uimsbf |
|     for(d=0;d<num_component_desriptor;d++) | | |
|       component_level_descriptor() | var | |
|     } | | |
|   } | | |
| } | | |
| } | | |
| num_partition_level_descriptors | 8 | uimsbf |
| for (k=0; k<num_partition_level_descriptors; k++) | | |
|   partition_level_descriptor() | var | |
| } | | |
| num_FIC_level_descriptors | 8 | uimsbf |
| for (n=0; n<num_FIC_level_descriptors; n++) | | |
|   FIC_level_descriptor() | var | |
| } | | |

FIG. 119

| Syntax | No. of Bits | Format |
|---|---|---|
| FIC_payload() { | | |
|     FIC_protocol_version | 8 | uimsbf |
|     transport_stream_id | 16 | uimsbf |
|     num_partitions | 8 | uimsbf |
|     for (i=0; i<num_partitions; i++) { | | |
|         partition_id | 8 | uimsbf |
|         partition_protocol_version | 8 | uimsbf |
|         num_services | 8 | uimsbf |
|         for (j=0; j<num_services; j++) { | | |
|             service_id | 16 | uimsbf |
|             service_data_version | 8 | uimsbf |
|             transport_protocol_type | 8 | uimsbf |
|             service_channel_number | 16 | uimsbf |
|             service_category | 5 | uimsbf |
|             short_service_name_length /*m*/ | 3 | uimsbf |
|             short_service_name | 16*m | bslbf |
|             service_status | 3 | uimsbf |
|             service_distribution | 2 | uimsbf |
|             sp_indicator | 1 | bslbf |
|             IP_version_flag | 1 | bslbf |
|             Reserved | 1 | '1' |
|             num_session | 8 | uimsbf |
|             for(r=0;r<num_session;r++){ | | |
|                 reserved | 6 | '111111' |
|                 source_IP_address_flag | 1 | bslbf |
|                 ssc_flag | 1 | bslbf |

FIG. 120

```
        if(source_IP_address_flag)
            source_IP_address                       32 or 128    uimsbf
        destination_IP_address                      32 or 128    uimsbf
        destination_UDP_port                        16           uimsbf
        if(transport_protocol_type==0x01)
        {
            packet_id                               16           uimsbf
            dp_id                                   8            uimsbf
        }
        else if(transport_protocol_type==0x02)
        {
            if(ssc_flag) {
                SSC_tsi                             16           uimsbf
                SSC_dp_id                           8            uimsbf
            }
            LSID_tsi                                16           uimsbf
            dp_id                                   8            uimsbf
        }
      }
    }
  }
}
```

BROADCAST SIGNAL TRANSMISSION APPARATUS, BROADCAST SIGNAL RECEPTION APPARATUS, BROADCAST SIGNAL TRANSMISSION METHOD, AND BROADCAST SIGNAL RECEPTION METHOD

This application is a National Stage Application of International Application No. PCT/KR2016/000544 filed on Jan. 19, 2016, and claims priority to U.S. Provisional Application No. 62/105,750 filed on Jan. 21, 2015, all of which are hereby incorporated by reference in their entireties as if fully set forth herein.

TECHNICAL FIELD

The present invention relates to an apparatus for transmitting a broadcast signal, an apparatus for receiving a broadcast signal and methods for transmitting and receiving a broadcast signal.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE

Technical Problem

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

Technical Solution

The present invention provides a system capable of effectively supporting future broadcast services in an environment supporting future hybrid broadcasting using terrestrial broadcast networks and the Internet and related signaling methods.

Advantageous Effects

The present invention can control quality of service (QoS) with respect to services or service components by processing data on the basis of service characteristics, thereby providing various broadcast services.

The present invention can achieve transmission flexibility by transmitting various broadcast services through the same radio frequency (RF) signal bandwidth.

The present invention can provide methods and apparatuses for transmitting and receiving broadcast signals, which enable digital broadcast signals to be received without error even when a mobile reception device is used or even in an indoor environment.

The present invention can effectively support future broadcast services in an environment supporting future hybrid broadcasting using terrestrial broadcast networks and the Internet.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a relation between an SLT and service layer signaling (SLS) according to an embodiment of the present invention;

FIG. 3 illustrates an SLT according to an embodiment of the present invention;

FIG. 5 illustrates a USBD fragment for ROUTE/DASH according to an embodiment of the present invention;

FIG. 6 illustrates an S-TSID fragment for ROUTE/DASH according to an embodiment of the present invention;

FIG. 7 illustrates a USBD/USD fragment for MMT according to an embodiment of the present invention;

FIG. 13 illustrates an example of adaptation modes in IP header compression according to an embodiment of the present invention (transmitting side);

FIG. 14 illustrates a link mapping table (LMT) and an RoHC-U description table according to an embodiment of the present invention;

FIG. 24 is a table illustrating PLS1 data according to an embodiment of the present invention;

FIG. 25 is a table illustrating PLS2 data according to an embodiment of the present invention;

FIG. 29 illustrates time interleaving according to an embodiment of the present invention;

FIG. 33 illustrates a main PRBS used for all FFT modes according to an embodiment of the present invention;

FIG. 34 illustrates a sub-PRBS used for FFT modes and an interleaving address for frequency interleaving according to an embodiment of the present invention;

FIG. 35 illustrates a write operation of a time interleaver according to an embodiment of the present invention;

FIG. 36 is a table illustrating an interleaving type applied according to the number of PLPs;

FIG. 37 is a block diagram including a first example of a structure of a hybrid time interleaver;

FIG. 38 is a block diagram including a second example of the structure of the hybrid time interleaver;

FIG. 46 illustrates a method for transmitting signaling data by a future broadcast system according to an embodiment of the present invention;

FIG. 47 illustrates signaling data transmitted, for fast broadcast service scan of a receiver, by the future broadcast system according to an embodiment of the present invention;

FIG. 48 illustrates signaling data transmitted, for fast broadcast service scan of the receiver, by the future broadcast system according to an embodiment of the present invention;

FIG. 50 illustrates signaling data transmitted, for fast broadcast service scan of the receiver, by the future broadcast system according to an embodiment of the present invention;

FIG. 52 illustrates a service signaling message format of the future broadcast system according to an embodiment of the present invention;

FIG. 53 shows service signaling tables used in the future broadcast system according to an embodiment of the present invention;

FIG. 54 shows a service mapping table used in the future broadcast system according to an embodiment of the present invention;

FIG. 55 shows a service signaling table used in the future broadcast system according to an embodiment of the present invention;

FIG. 57 illustrates component mapping table description according to an embodiment of the present invention;

FIG. 58 illustrates a syntax of the component mapping table of the future broadcast system according to an embodiment of the present invention;

FIG. 59 illustrates a method for transmitting signaling related to each service through a broadband network in the future broadcast system according to an embodiment of the present invention;

FIG. 60 illustrates a method for signaling an MPD in the future broadcast system according to an embodiment of the present invention;

FIG. 61 illustrates a syntax of an MPD delivery table used in the future broadcast system according to an embodiment of the present invention;

FIG. 62 illustrates transport session instance description of the future broadcast system according to an embodiment of the present invention;

FIG. 63 illustrates a SourceFlow element of the future broadcast system according to an embodiment of the present invention;

FIG. 64 illustrates an EFDT of the future broadcast system according to an embodiment of the present invention;

FIG. 67 illustrates signaling data transmitted, for fast broadcast service scan of the receiver, by the future broadcast system according to an embodiment of the present invention;

FIG. 68 illustrates signaling data transmitted, for fast broadcast service scan of the receiver, by the future broadcast system according to an embodiment of the present invention;

FIG. 69 illustrates component mapping table description according to an embodiment of the present invention;

FIG. 70 illustrates a component mapping table description according to an embodiment of the present invention;

FIGS. 71 and 72 illustrate component mapping table description according to an embodiment of the present invention;

FIG. 73 illustrates component mapping table description according to an embodiment of the present invention;

FIG. 74 illustrates common attributes and elements of an MPD according to an embodiment of the present invention;

FIG. 75 illustrates transport session instance description according to an embodiment of the present invention;

FIG. 76 illustrates a SourceFlow element of the future broadcast system according to an embodiment of the present invention;

FIG. 77 illustrates signaling data transmitted, for fast broadcast service scan of a receiver, by a future broadcast system according to another embodiment of the present invention;

FIG. 78 illustrates signaling data transmitted, for fast broadcast service scan of the receiver, by a future broadcast system according to another embodiment of the present invention;

FIG. 89 illustrates a syntax of a header of a signaling message according to another embodiment of the present invention;

FIG. 91 illustrates part of layered coding transport (LCT) session instance description (LSID) according to an embodiment of the present invention;

FIG. 92 illustrates signaling object description (SOD) providing information for filtering a service signaling message according to an embodiment of the present invention;

FIG. 93 illustrates an object including a signaling message according to an embodiment of the present invention;

FIG. 94 illustrates TOI configuration description (TCD) according to an embodiment of the present invention;

FIG. 95 illustrates a payload format element of a transport packet according to an embodiment of the present invention;

FIG. 96 illustrates TOI configuration instance description (TCD) according to an embodiment of the present invention;

FIG. 97 illustrates a syntax of a payload of a fast information channel (FIC) according to an embodiment of the present invention;

FIG. 98 illustrates a syntax of a payload of an FIC according to another embodiment of the present invention;

FIG. 99 illustrates a syntax of serving level signaling according to another embodiment of the present invention;

FIG. 100 illustrates component mapping description according to another embodiment of the present invention;

FIG. 101 illustrates a syntax of URL signaling description according to another embodiment of the present invention;

FIG. 102 illustrates a SourceFlow element according to another embodiment of the present invention;

FIG. 109 is a diagram showing the syntax of a payload of a FIC according to another embodiment of the present invention;

FIG. 110 is a diagram showing the syntax of a payload of a FIC according to another embodiment of the present invention;

FIG. 111 is a diagram showing a transport_parameter_descriptor according to an embodiment of the present invention;

FIG. 115 is a diagram showing some of fast information channel (FIC) data according to another embodiment of the present invention;

FIG. 116 is a diagram showing the other of the FIC data according to another embodiment of the present invention;

FIG. 117 is a diagram showing some of fast information channel (FIC) data according to another embodiment of the present invention;

FIG. 118 is a diagram showing the other of the FIC data according to another embodiment of the present invention;

FIG. 119 is a diagram showing some of fast information channel (FIC) data according to another embodiment of the present invention;

FIG. 120 is a diagram showing the other of the FIC data according to another embodiment of the present invention;

FIG. 121 is a diagram illustrating a method of processing service data according to an embodiment of the present invention; and FIG. 122 is a diagram showing an apparatus for processing service data according to an embodiment of the present invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
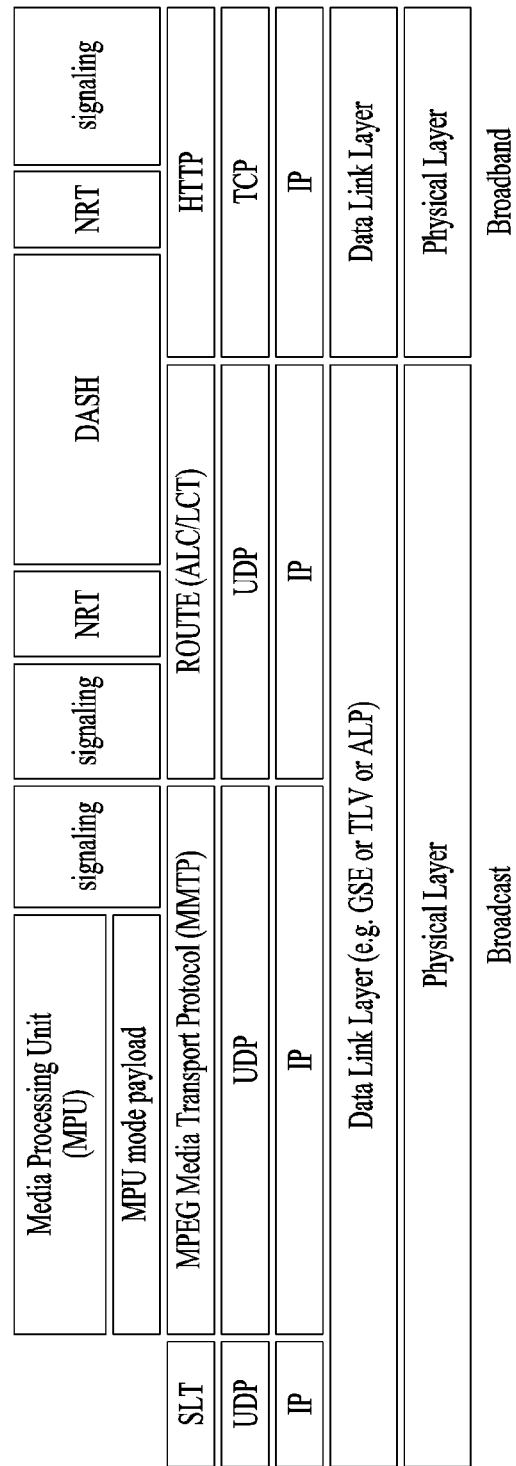
FIG. 1 illustrates a receiver protocol stack according to an embodiment of the present invention.

FIG. 1 illustrates a receiver protocol stack according to an embodiment of the present invention.

Two schemes may be used in broadcast service delivery through a broadcast network.

In a first scheme, media processing units (MPUs) are transmitted using an MMT protocol (MMTP) based on MPEG media transport (MMT). In a second scheme, dynamic adaptive streaming over HTTP (DASH) segments may be transmitted using real time object delivery over unidirectional transport (ROUTE) based on MPEG DASH.

Non-timed content including NRT media, EPG data, and other files is delivered with ROUTE. Signaling may be delivered over MMTP and/or ROUTE, while bootstrap signaling information is provided by the means of the Service List Table (SLT).

In hybrid service delivery, MPEG DASH over HTTP/TCP/IP is used on the broadband side. Media files in ISO Base Media File Format (BMFF) are used as the delivery, media encapsulation and synchronization format for both broadcast and broadband delivery. Here, hybrid service delivery may refer to a case in which one or more program elements are delivered through a broadband path.

Services are delivered using three functional layers. These are the physical layer, the delivery layer and the service management layer. The physical layer provides the mechanism by which signaling, service announcement and IP packet streams are transported over the broadcast physical layer and/or broadband physical layer. The delivery layer provides object and object flow transport functionality. It is enabled by the MMTP or the ROUTE protocol, operating on a UDP/IP multicast over the broadcast physical layer, and enabled by the HTTP protocol on a TCP/IP unicast over the broadband physical layer. The service management layer enables any type of service, such as linear TV or HTML5 application service, to be carried by the underlying delivery and physical layers.

In this figure, a protocol stack part on a broadcast side may be divided into a part transmitted through the SLT and the MMTP, and a part transmitted through ROUTE.

The SLT may be encapsulated through UDP and IP layers. Here, the SLT will be described below. The MMTP may transmit data formatted in an MPU format defined in MMT, and signaling information according to the MMTP. The data may be encapsulated through the UDP and IP layers. ROUTE may transmit data formatted in a DASH segment form, signaling information, and non-timed data such as NRT data, etc. The data may be encapsulated through the UDP and IP layers. According to a given embodiment, some or all processing according to the UDP and IP layers may be omitted. Here, the illustrated signaling information may be signaling information related to a service.

The part transmitted through the SLT and the MMTP and the part transmitted through ROUTE may be processed in the UDP and IP layers, and then encapsulated again in a data link layer. The link layer will be described below. Broadcast data processed in the link layer may be multicast as a broadcast signal through processes such as encoding/interleaving, etc. in the physical layer.

In this figure, a protocol stack part on a broadband side may be transmitted through HTTP as described above. Data formatted in a DASH segment form, signaling information, NRT information, etc. may be transmitted through HTTP. Here, the illustrated signaling information may be signaling information related to a service. The data may be processed through the TCP layer and the IP layer, and then encapsulated into the link layer. According to a given embodiment, some or all of the TCP, the IP, and the link layer may be omitted. Broadband data processed thereafter may be transmitted by unicast in the broadband through a process for transmission in the physical layer.

Service can be a collection of media components presented to the user in aggregate; components can be of multiple media types; a Service can be either continuous or intermittent; a Service can be Real Time or Non-Real Time; Real Time Service can consist of a sequence of TV programs.

FIG. 2 illustrates a relation between the SLT and SLS according to an embodiment of the present invention.

Service signaling provides service discovery and description information, and comprises two functional components: Bootstrap signaling via the Service List Table (SLT) and the Service Layer Signaling (SLS). These represent the information which is necessary to discover and acquire user services. The SLT enables the receiver to build a basic service list, and bootstrap the discovery of the SLS for each service.

The SLT can enable very rapid acquisition of basic service information. The SLS enables the receiver to discover and access services and their content components. Details of the SLT and SLS will be described below.

As described in the foregoing, the SLT may be transmitted through UDP/IP. In this instance, according to a given embodiment, data corresponding to the SLT may be delivered through the most robust scheme in this transmission.

The SLT may have access information for accessing SLS delivered by the ROUTE protocol. In other words, the SLT may be bootstrapped into SLS according to the ROUTE protocol. The SLS is signaling information positioned in an upper layer of ROUTE in the above-described protocol stack, and may be delivered through ROUTE/UDP/IP. The SLS may be transmitted through one of LCT sessions included in a ROUTE session. It is possible to access a service component corresponding to a desired service using the SLS.

In addition, the SLT may have access information for accessing an MMT signaling component delivered by MMTP. In other words, the SLT may be bootstrapped into SLS according to the MMTP. The SLS may be delivered by an MMTP signaling message defined in MMT. It is possible to access a streaming service component (MPU) corresponding to a desired service using the SLS. As described in the foregoing, in the present invention, an NRT service component is delivered through the ROUTE protocol, and the SLS according to the MMTP may include information for accessing the ROUTE protocol. In broadband delivery, the SLS is carried over HTTP(S)/TCP/IP.

FIG. 3 illustrates an SLT according to an embodiment of the present invention.

First, a description will be given of a relation among respective logical entities of service management, delivery, and a physical layer.

Services may be signaled as being one of two basic types. First type is a linear audio/video or audio-only service that may have an app-based enhancement. Second type is a service whose presentation and composition is controlled by a downloaded application that is executed upon acquisition of the service. The latter can be called an "app-based" service.

The rules regarding presence of ROUTE/LCT sessions and/or MMTP sessions for carrying the content components of a service may be as follows.

For broadcast delivery of a linear service without app-based enhancement, the service's content components can be carried by either (but not both): (1) one or more ROUTE/LCT sessions, or (2) one or more MMTP sessions.

For broadcast delivery of a linear service with app-based enhancement, the service's content components can be carried by: (1) one or more ROUTE/LCT sessions, and (2) zero or more MMTP sessions.

In certain embodiments, use of both MMTP and ROUTE for streaming media components in the same service may not be allowed.

For broadcast delivery of an app-based service, the service's content components can be carried by one or more ROUTE/LCT sessions.

Each ROUTE session comprises one or more LCT sessions which carry as a whole, or in part, the content components that make up the service. In streaming services delivery, an LCT session may carry an individual component of a user service such as an audio, video or closed caption stream. Streaming media is formatted as DASH Segments.

Each MMTP session comprises one or more MMTP packet flows which carry MMT signaling messages or as a whole, or in part, the content component. An MMTP packet flow may carry MMT signaling messages or components formatted as MPUs.

For the delivery of NRT User Services or system metadata, an LCT session carries file-based content items. These content files may consist of continuous (time-based) or discrete (non-time-based) media components of an NRT service, or metadata such as Service Signaling or ESG fragments. Delivery of system metadata such as service signaling or ESG fragments may also be achieved through the signaling message mode of MMTP.

A broadcast stream is the abstraction for an RF channel, which is defined in terms of a carrier frequency centered within a specified bandwidth. It is identified by the pair [geographic area, frequency]. A physical layer pipe (PLP) corresponds to a portion of the RF channel Each PLP has certain modulation and coding parameters. It is identified by a PLP identifier (PLPID), which is unique within the broadcast stream it belongs to. Here, PLP can be referred to as DP (data pipe).

Each service is identified by two forms of service identifier: a compact form that is used in the SLT and is unique only within the broadcast area; and a globally unique form that is used in the SLS and the ESG. A ROUTE session is identified by a source IP address, destination IP address and destination port number. An LCT session (associated with the service component(s) it carries) is identified by a transport session identifier (TSI) which is unique within the scope of the parent ROUTE session. Properties common to the LCT sessions, and certain properties unique to individual LCT sessions, are given in a ROUTE signaling structure called a service-based transport session instance description (S-TSID), which is part of the service layer signaling. Each LCT session is carried over a single physical layer pipe. According to a given embodiment, one LCT session may be transmitted through a plurality of PLPs. Different LCT sessions of a ROUTE session may or may not be contained in different physical layer pipes. Here, the ROUTE session may be delivered through a plurality of PLPs. The properties described in the S-TSID include the TSI value and PLPID for each LCT session, descriptors for the delivery objects/files, and application layer FEC parameters.

A MMTP session is identified by destination IP address and destination port number. An MMTP packet flow (associated with the service component(s) it carries) is identified by a packet_id which is unique within the scope of the parent MMTP session. Properties common to each MMTP packet flow, and certain properties of MMTP packet flows, are given in the SLT. Properties for each MMTP session are given by MMT signaling messages, which may be carried within the MMTP session. Different MMTP packet flows of a MMTP session may or may not be contained in different physical layer pipes. Here, the MMTP session may be delivered through a plurality of PLPs. The properties described in the MMT signaling messages include the packet_id value and PLPID for each MMTP packet flow. Here, the MMT signaling messages may have a form defined in MMT, or have a deformed form according to embodiments to be described below.

Hereinafter, a description will be given of low level signaling (LLS).

Signaling information which is carried in the payload of IP packets with a well-known address/port dedicated to this function is referred to as low level signaling (LLS). The IP address and the port number may be differently configured depending on embodiments. In one embodiment, LLS can be transported in IP packets with address 224.0.23.60 and destination port 4937/udp. LLS may be positioned in a portion expressed by "SLT" on the above-described protocol stack. However, according to a given embodiment, the LLS may be transmitted through a separate physical channel (dedicated channel) in a signal frame without being subjected to processing of the UDP/IP layer.

UDP/IP packets that deliver LLS data may be formatted in a form referred to as an LLS table. A first byte of each UDP/IP packet that delivers the LLS data may correspond to a start of the LLS table. The maximum length of any LLS table is limited by the largest IP packet that can be delivered from the PHY layer, 65,507 bytes.

The LLS table may include an LLS table ID field that identifies a type of the LLS table, and an LLS table version field that identifies a version of the LLS table. According to a value indicated by the LLS table ID field, the LLS table may include the above-described SLT or a rating region table (RRT). The RRT may have information about content advisory rating.

Hereinafter, the SLT will be described. LLS can be signaling information which supports rapid channel scans and bootstrapping of service acquisition by the receiver, and SLT can be a table of signaling information which is used to build a basic service listing and provide bootstrap discovery of SLS.

The function of the SLT is similar to that of the program association table (PAT) in MPEG-2 Systems, and the fast information channel (FIC) found in ATSC Systems. For a receiver first encountering the broadcast emission, this is the place to start. SLT supports a rapid channel scan which allows a receiver to build a list of all the services it can receive, with their channel name, channel number, etc., and SLT provides bootstrap information that allows a receiver to discover the SLS for each service. For ROUTE/DASH-delivered services, the bootstrap information includes the destination IP address and destination port of the LCT session that carries the SLS. For MMT/MPU-delivered services, the bootstrap information includes the destination IP address and destination port of the MMTP session carrying the SLS.

The SLT supports rapid channel scans and service acquisition by including the following information about each service in the broadcast stream. First, the SLT can include information necessary to allow the presentation of a service list that is meaningful to viewers and that can support initial service selection via channel number or up/down selection. Second, the SLT can include information necessary to locate the service layer signaling for each service listed. That is, the SLT may include access information related to a location at which the SLS is delivered.

The illustrated SLT according to the present embodiment is expressed as an XML document having an SLT root element. According to a given embodiment, the SLT may be expressed in a binary format or an XML document.

The SLT root element of the SLT illustrated in the figure may include @bsid, @sltSectionVersion, @sltSectionNumber, @totalSltSectionNumbers, @language, @capabilities, InetSigLoc and/or Service. According to a given embodiment, the SLT root element may further include @providerId. According to a given embodiment, the SLT root element may not include @language.

The service element may include @serviceId, @SLTserviceSeqNumber, @protected, @majorChannelNo, @minorChannelNo, @serviceCategory, @shortServiceName, @hidden, @slsProtocolType, BroadcastSignaling, @slsPlpId, @slsDestinationIpAddress, @slsDestinationUdpPort, @slsSourceIpAddress, @slsMajorProtocolVersion, @SlsMinorProtocolVersion, @serviceLanguage, @broadbandAccessRequired, @capabilities and/or InetSigLoc.

According to a given embodiment, an attribute or an element of the SLT may be added/changed/deleted. Each element included in the SLT may additionally have a separate attribute or element, and some attribute or elements according to the present embodiment may be omitted. Here, a field which is marked with @ may correspond to an attribute, and a field which is not marked with @ may correspond to an element.

@bsid is an identifier of the whole broadcast stream. The value of BSID may be unique on a regional level.

@providerId can be an index of broadcaster that is using part or all of this broadcast stream. This is an optional attribute. When it's not present, it means that this broadcast stream is being used by one broadcaster. @providerId is not illustrated in the figure.

@sltSectionVersion can be a version number of the SLT section. The sltSectionVersion can be incremented by 1 when a change in the information carried within the slt occurs. When it reaches maximum value, it wraps around to 0.

@sltSectionNumber can be the number, counting from 1, of this section of the SLT. In other words, @sltSectionNumber may correspond to a section number of the SLT section. When this field is not used, @sltSectionNumber may be set to a default value of 1.

@totalSltSectionNumbers can be the total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. In other words, when the SLT is transmitted, transmission through fragmentation may be supported. When this field is not used, @totalSltSectionNumbers may be set to a default value of 1. A case in which this field is not used may correspond to a case in which the SLT is not transmitted by being fragmented.

@language can indicate primary language of the services included in this slt instance. According to a given embodiment, a value of this field may have be a three-character language code defined in the ISO. This field may be omitted.

@capabilities can indicate required capabilities for decoding and meaningfully presenting the content for all the services in this slt instance.

InetSigLoc can provide a URL telling the receiver where it can acquire any requested type of data from external server(s) via broadband. This element may include @urlType as a lower field. According to a value of the @urlType field, a type of a URL provided by InetSigLoc may be indicated. According to a given embodiment, when the @urlType field has a value of 0, InetSigLoc may provide a URL of a signaling server. When the @urlType field has a value of 1, InetSigLoc may provide a URL of an ESG server. When the @urlType field has other values, the field may be reserved for future use.

The service field is an element having information about each service, and may correspond to a service entry. Service element fields corresponding to the number of services indicated by the SLT may be present. Hereinafter, a description will be given of a lower attribute/element of the service field.

@serviceId can be an integer number that uniquely identify this service within the scope of this broadcast area. According to a given embodiment, a scope of @serviceId may be changed. @SLTserviceSeqNumber can be an integer number that indicates the sequence number of the SLT service information with service ID equal to the serviceId attribute above. SLTserviceSeqNumber value can start at 0 for each service and can be incremented by 1 every time any attribute in this service element is changed. If no attribute values are changed compared to the previous Service element with a particular value of ServiceID then SLTserviceSeqNumber would not be incremented. The SLTserviceSeqNumber field wraps back to 0 after reaching the maximum value.

@protected is flag information which may indicate whether one or more components for significant reproduction of the service are in a protected state. When set to "1" (true), that one or more components necessary for meaningful presentation is protected. When set to "0" (false), this flag indicates that no components necessary for meaningful presentation of the service are protected. Default value is false.

@majorChannelNo is an integer number representing the "major" channel number of the service. An example of the field may have a range of 1 to 999.

@minorChannelNo is an integer number representing the "minor" channel number of the service. An example of the field may have a range of 1 to 999.

@serviceCategory can indicate the category of this service. This field may indicate a type that varies depending on embodiments. According to a given embodiment, when this field has values of 1, 2, and 3, the values may correspond to a linear A/V service, a linear audio only service, and an app-based service, respectively. When this field has a value of 0, the value may correspond to a service of an undefined category. When this field has other values except for 1, 2, and 3, the field may be reserved for future use. @shortServiceName can be a short string name of the Service.

@hidden can be boolean value that when present and set to "true" indicates that the service is intended for testing or proprietary use, and is not to be selected by ordinary TV receivers. The default value is "false" when not present.

@ slsProtocolType can be an attribute indicating the type of protocol of Service Layer Signaling used by this service. This field may indicate a type that varies depending on embodiments. According to a given embodiment, when this field has values of 1 and 2, protocols of SLS used by respective corresponding services may be ROUTE and MMTP, respectively. When this field has other values except for 0, the field may be reserved for future use. This field may be referred to as @slsProtocol.

BroadcastSignaling and lower attributes/elements thereof may provide information related to broadcast signaling. When the BroadcastSignaling element is not present, the child element InetSigLoc of the parent service element can be present and its attribute urlType includes URL_type 0x00 (URL to signaling server). In this case attribute url supports the query parameter svc=<service_id> where service_id corresponds to the serviceId attribute for the parent service element.

Alternatively when the BroadcastSignaling element is not present, the element InetSigLoc can be present as a child element of the slt root element and the attribute urlType of that InetSigLoc element includes URL_type 0x00 (URL to signaling server). In this case, attribute url for URL_type 0x00 supports the query parameter svc=<service_id> where service_id corresponds to the serviceId attribute for the parent Service element.

@slsPlpId can be a string representing an integer number indicating the PLP ID of the physical layer pipe carrying the SLS for this service.

@slsDestinationIpAddress can be a string containing the dotted-IPv4 destination address of the packets carrying SLS data for this service.

@slsDestinationUdpPort can be a string containing the port number of the packets carrying SLS data for this service. As described in the foregoing, SLS bootstrapping may be performed by destination IP/UDP information.

@slsSourceIpAddress can be a string containing the dotted-IPv4 source address of the packets carrying SLS data for this service.

@slsMajorProtocolVersion can be major version number of the protocol used to deliver the service layer signaling for this service. Default value is 1.

@SlsMinorProtocolVersion can be minor version number of the protocol used to deliver the service layer signaling for this service. Default value is 0.

@serviceLanguage can be a three-character language code indicating the primary language of the service. A value of this field may have a form that varies depending on embodiments.

@broadbandAccessRequired can be a Boolean indicating that broadband access is required for a receiver to make a meaningful presentation of the service. Default value is false. When this field has a value of True, the receiver needs to access a broadband for significant service reproduction, which may correspond to a case of hybrid service delivery.

@capabilities can represent required capabilities for decoding and meaningfully presenting the content for the service with service ID equal to the service Id attribute above.

InetSigLoc can provide a URL for access to signaling or announcement information via broadband, if available. Its data type can be an extension of the any URL data type, adding an @urlType attribute that indicates what the URL gives access to. An @urlType field of this field may indicate the same meaning as that of the @urlType field of InetSigLoc described above. When an InetSigLoc element of attribute URL_type 0x00 is present as an element of the SLT, it can be used to make HTTP requests for signaling metadata. The HTTP POST message body may include a service term. When the InetSigLoc element appears at the section level, the service term is used to indicate the service to which the requested signaling metadata objects apply. If the service term is not present, then the signaling metadata objects for all services in the section are requested. When the InetSigLoc appears at the service level, then no service term is needed to designate the desired service. When an InetSigLoc element of attribute URL_type 0x01 is provided, it can be used to retrieve ESG data via broadband. If the element appears as a child element of the service element, then the URL can be used to retrieve ESG data for that service. If the element appears as a child element of the SLT element, then the URL can be used to retrieve ESG data for all services in that section.

In another example of the SLT, @sltSectionVersion, @sltSectionNumber, @totalSltSectionNumbers and/or @language fields of the SLT may be omitted In addition, the above-described InetSigLoc field may be replaced by @sltInetSigUri and/or @sltInetEsgUri field. The two fields may include the URI of the signaling server and URI information of the ESG server, respectively. The InetSigLoc field corresponding to a lower field of the SLT and the InetSigLoc field corresponding to a lower field of the service field may be replaced in a similar manner.

The suggested default values may vary depending on embodiments. An illustrated "use" column relates to the respective fields. Here, "1" may indicate that a corresponding field is an essential field, and "0 . . . 1" may indicate that a corresponding field is an optional field.

Figure 4:
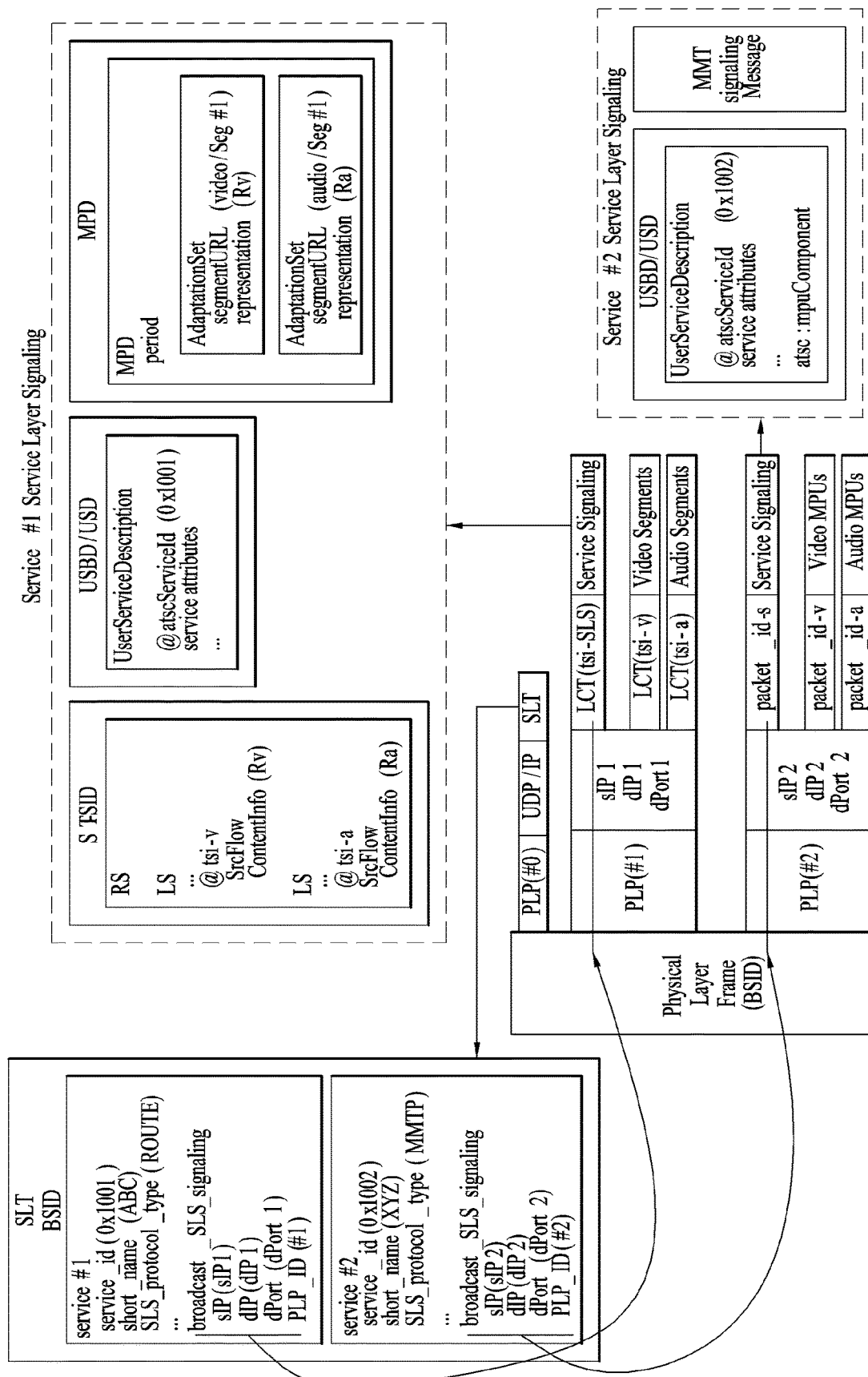
FIG. 4 illustrates SLS bootstrapping and a service discovery process according to an embodiment of the present invention.

FIG. 4 illustrates SLS bootstrapping and a service discovery process according to an embodiment of the present invention.

Hereinafter, SLS will be described.

SLS can be signaling which provides information for discovery and acquisition of services and their content components.

For ROUTE/DASH, the SLS for each service describes characteristics of the service, such as a list of its components and where to acquire them, and the receiver capabilities required to make a meaningful presentation of the service. In the ROUTE/DASH system, the SLS includes the user service bundle description (USBD), the S-TSID and the DASH media presentation description (MPD). Here, USBD or user service description (USD) is one of SLS XML fragments, and may function as a signaling herb that describes specific descriptive information. USBD/USD may be extended beyond 3GPP MBMS. Details of USBD/USD will be described below.

The service signaling focuses on basic attributes of the service itself, especially those attributes needed to acquire the service. Properties of the service and programming that are intended for viewers appear as service announcement, or ESG data.

Having separate Service Signaling for each service permits a receiver to acquire the appropriate SLS for a service of interest without the need to parse the entire SLS carried within a broadcast stream.

For optional broadband delivery of Service Signaling, the SLT can include HTTP URLs where the Service Signaling files can be obtained, as described above.

LLS is used for bootstrapping SLS acquisition, and subsequently, the SLS is used to acquire service components delivered on either ROUTE sessions or MMTP sessions. The described figure illustrates the following signaling sequences. Receiver starts acquiring the SLT described above. Each service identified by service_id delivered over ROUTE sessions provides SLS bootstrapping information: PLPID(#1), source IP address (sIP1), destination IP address (dIP1), and destination port number (dPort1). Each service identified by service_id delivered over MMTP sessions provides SLS bootstrapping information: PLPID(#2), destination IP address (dIP2), and destination port number (dPort2).

For streaming services delivery using ROUTE, the receiver can acquire SLS fragments carried over the IP/UDP/LCT session and PLP; whereas for streaming services delivery using MMTP, the receiver can acquire SLS fragments carried over an MMTP session and PLP. For service delivery using ROUTE, these SLS fragments include USBD/USD fragments, S-TSID fragments, and MPD fragments. They are relevant to one service. USBD/USD fragments describe service layer properties and provide URI references to S-TSID fragments and URI references to MPD fragments. In other words, the USBD/USD may refer to S-TSID and MPD. For service delivery using MMTP, the USBD references the MMT signaling's MPT message, the MP Table of which provides identification of package ID and location information for assets belonging to the service. Here, an asset is a multimedia data entity, and may refer to a data entity which is combined into one unique ID and is used to generate one multimedia presentation. The asset may correspond to a service component included in one service. The MPT message is a message having the MP table of MMT. Here, the MP table may be an MMT package table having information about content and an MMT asset. Details may be similar to a definition in MMT. Here, media presentation may correspond to a collection of data that establishes bounded/unbounded presentation of media content.

The S-TSID fragment provides component acquisition information associated with one service and mapping between DASH Representations found in the MPD and in the TSI corresponding to the component of the service. The S-TSID can provide component acquisition information in the form of a TSI and the associated DASH representation identifier, and PLPID carrying DASH segments associated with the DASH representation. By the PLPID and TSI values, the receiver collects the audio/video components from the service and begins buffering DASH media segments then applies the appropriate decoding processes.

For USBD listing service components delivered on MMTP sessions, as illustrated by "Service #2" in the described figure, the receiver also acquires an MPT message with matching MMT_package_id to complete the SLS. An MPT message provides the full list of service components comprising a service and the acquisition information for each component. Component acquisition information includes MMTP session information, the PLPID carrying the session and the packet_id within that session.

According to a given embodiment, for example, in ROUTE, two or more S-TSID fragments may be used. Each fragment may provide access information related to LCT sessions delivering content of each service.

In ROUTE, S-TSID, USBD/USD, MPD, or an LCT session delivering S-TSID, USBD/USD or MPD may be referred to as a service signaling channel. In MMTP, USBD/UD, an MMT signaling message, or a packet flow delivering the MMTP or USBD/UD may be referred to as a service signaling channel.

Unlike the illustrated example, one ROUTE or MMTP session may be delivered through a plurality of PLPs. In other words, one service may be delivered through one or more PLPs. As described in the foregoing, one LCT session may be delivered through one PLP. Unlike the figure, according to a given embodiment, components included in one service may be delivered through different ROUTE sessions. In addition, according to a given embodiment, components included in one service may be delivered through different MMTP sessions. According to a given embodiment, components included in one service may be delivered separately through a ROUTE session and an MMTP session. Although not illustrated, components included in one service may be delivered via broadband (hybrid delivery).

FIG. 5 illustrates a USBD fragment for ROUTE/DASH according to an embodiment of the present invention.

Hereinafter, a description will be given of SLS in delivery based on ROUTE.

SLS provides detailed technical information to the receiver to enable the discovery and access of services and their content components. It can include a set of XML-encoded metadata fragments carried over a dedicated LCT session. That LCT session can be acquired using the bootstrap information contained in the SLT as described above. The SLS is defined on a per-service level, and it describes the characteristics and access information of the service, such as a list of its content components and how to acquire them, and the receiver capabilities required to make a meaningful presentation of the service. In the ROUTE/DASH system, for linear services delivery, the SLS consists of the following metadata fragments: USBD, S-TSID and the DASH MPD. The SLS fragments can be delivered on a dedicated LCT transport session with TSI=0. According to a given embodiment, a TSI of a particular LCT session (dedicated LCT session) in which an SLS fragment is delivered may have a different value. According to a given embodiment, an LCT session in which an SLS fragment is delivered may be signaled using the SLT or another scheme.

ROUTE/DASH SLS can include the user service bundle description (USBD) and service-based transport session instance description (S-TSID) metadata fragments. These service signaling fragments are applicable to both linear and application-based services. The USBD fragment contains service identification, device capabilities information, references to other SLS fragments required to access the service and constituent media components, and metadata to enable the receiver to determine the transport mode (broadcast and/or broadband) of service components. The S-TSID fragment, referenced by the USBD, provides transport session descriptions for the one or more ROUTE/LCT sessions in which the media content components of a service are delivered, and descriptions of the delivery objects carried in those LCT sessions. The USBD and S-TSID will be described below.

In streaming content signaling in ROUTE-based delivery, a streaming content signaling component of SLS corresponds to an MPD fragment. The MPD is typically associated with linear services for the delivery of DASH Segments as streaming content. The MPD provides the resource identifiers for individual media components of the linear/streaming service in the form of Segment URLs, and the context of the identified resources within the Media Presentation. Details of the MPD will be described below.

In app-based enhancement signaling in ROUTE-based delivery, app-based enhancement signaling pertains to the delivery of app-based enhancement components, such as an application logic file, locally-cached media files, an network content items, or a notification stream. An application can also retrieve locally-cached data over a broadband connection when available.

Hereinafter, a description will be given of details of USBD/USD illustrated in the figure.

The top level or entry point SLS fragment is the USBD fragment. An illustrated USBD fragment is an example of the present invention, basic fields of the USBD fragment not illustrated in the figure may be additionally provided according to a given embodiment. As described in the foregoing, the illustrated USBD fragment has an extended form, and may have fields added to a basic configuration.

The illustrated USBD may have a bundleDescription root element. The bundleDescription root element may have a userServiceDescription element. The userServiceDescription element may correspond to an instance for one service.

The userServiceDescription element may include @serviceId, @atsc:serviceId, @atsc:serviceStatus, @atsc:fullMPDUri, @atsc:sTSIDUri, name, serviceLanguage, atsc:capabilityCode and/or deliveryMethod.

@serviceId can be a globally unique URI that identifies a service, unique within the scope of the BSID. This parameter can be used to link to ESG data (Service@globalServiceID).

@atsc:serviceId is a reference to corresponding service entry in LLS(SLT). The value of this attribute is the same value of serviceId assigned to the entry.

@atsc:serviceStatus can specify the status of this service. The value indicates whether this service is active or inactive. When set to "1" (true), that indicates service is active. When this field is not used, @atsc:serviceStatus may be set to a default value of 1.

@atsc:fullMPDUri can reference an MPD fragment which contains descriptions for contents components of the service delivered over broadcast and optionally, also over broadband.

@atsc:sTSIDUri can reference the S-TSID fragment which provides access related parameters to the Transport sessions carrying contents of this service.

name can indicate name of the service as given by the lang attribute. name element can include lang attribute, which indicating language of the service name. The language can be specified according to XML data types.

serviceLanguage can represent available languages of the service. The language can be specified according to XML data types.

atsc:capabilityCode can specify the capabilities required in the receiver to be able to create a meaningful presentation of the content of this service. According to a given embodiment, this field may specify a predefined capability group. Here, the capability group may be a group of capability attribute values for significant presentation. This field may be omitted according to a given embodiment.

deliveryMethod can be a container of transport related information pertaining to the contents of the service over broadcast and (optionally) broadband modes of access. Referring to data included in the service, when the number of the data is N, delivery schemes for respective data may be described by this element. The deliveryMethod may include an r12:broadcastAppService element and an r12:unicastAppService element. Each lower element may include a basePattern element as a lower element.

r12:broadcastAppService can be a DASH Representation delivered over broadcast, in multiplexed or non-multiplexed form, containing the corresponding media component(s) belonging to the service, across all Periods of the affiliated media presentation. In other words, each of the fields may indicate DASH representation delivered through the broadcast network.

r12:unicastAppService can be a DASH Representation delivered over broadband, in multiplexed or non-multiplexed form, containing the constituent media content component(s) belonging to the service, across all periods of the affiliated media presentation. In other words, each of the fields may indicate DASH representation delivered via broadband.

basePattern can be a character pattern for use by the receiver to match against any portion of the segment URL used by the DASH client to request media segments of a parent representation under its containing period. A match implies that the corresponding requested media segment is carried over broadcast transport. In a URL address for receiving DASH representation expressed by each of the r12:broadcastAppService element and the r12:unicastAppService element, a part of the URL, etc. may have a particular pattern. The pattern may be described by this field. Some data may be distinguished using this information. The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

FIG. 6 illustrates an S-TSID fragment for ROUTE/DASH according to an embodiment of the present invention.

Hereinafter, a description will be given of the S-TSID illustrated in the figure in detail.

S-TSID can be an SLS XML fragment which provides the overall session description information for transport session(s) which carry the content components of a service. The S-TSID is the SLS metadata fragment that contains the overall transport session description information for the zero or more ROUTE sessions and constituent LCT sessions in which the media content components of a service are delivered. The S-TSID also includes file metadata for the delivery object or object flow carried in the LCT sessions of the service, as well as additional information on the payload formats and content components carried in those LCT sessions.

Each instance of the S-TSID fragment is referenced in the USBD fragment by the @atsc:sTSIDUri attribute of the userServiceDescription element. The illustrated S-TSID according to the present embodiment is expressed as an XML document. According to a given embodiment, the S-TSID may be expressed in a binary format or as an XML document.

The illustrated S-TSID may have an S-TSID root element. The S-TSID root element may include @serviceId and/or RS.

@serviceID can be a reference corresponding service element in the USD. The value of this attribute can reference a service with a corresponding value of service_id.

The RS element may have information about a ROUTE session for delivering the service data. Service data or service components may be delivered through a plurality of ROUTE sessions, and thus the number of RS elements may be 1 to N.

The RS element may include @bsid, @slpAddr, @dlpAddr, @dport, @PLPID and/or LS.

@bsid can be an identifier of the broadcast stream within which the content component(s) of the broadcastAppService are carried. When this attribute is absent, the default broadcast stream is the one whose PLPs carry SLS fragments for this service. Its value can be identical to that of the broadcast_stream_id in the SLT.

@slpAddr can indicate source IP address. Here, the source IP address may be a source IP address of a ROUTE session for delivering a service component included in the service. As described in the foregoing, service components of one service may be delivered through a plurality of ROUTE sessions. Thus, the service components may be transmitted using another ROUTE session other than the ROUTE session for delivering the S-TSID. Therefore, this field may be used to indicate the source IP address of the ROUTE session. A default value of this field may be a source IP address of a current ROUTE session. When a service component is delivered through another ROUTE session, and thus the ROUTE session needs to be indicated, a value of this field may be a value of a source IP address of the ROUTE session. In this case, this field may correspond to M, that is, an essential field.

@dIpAddr can indicate destination IP address. Here, a destination IP address may be a destination IP address of a ROUTE session that delivers a service component included in a service. For a similar case to the above description of @sIpAddr, this field may indicate a destination IP address of a ROUTE session that delivers a service component. A default value of this field may be a destination IP address of a current ROUTE session. When a service component is delivered through another ROUTE session, and thus the ROUTE session needs to be indicated, a value of this field may be a value of a destination IP address of the ROUTE session. In this case, this field may correspond to M, that is, an essential field.

@dport can indicate destination port. Here, a destination port may be a destination port of a ROUTE session that delivers a service component included in a service. For a similar case to the above description of @sIpAddr, this field may indicate a destination port of a ROUTE session that delivers a service component. A default value of this field may be a destination port number of a current ROUTE session. When a service component is delivered through another ROUTE session, and thus the ROUTE session needs to be indicated, a value of this field may be a destination port number value of the ROUTE session. In this case, this field may correspond to M, that is, an essential field.

@PLPID may be an ID of a PLP for a ROUTE session expressed by an RS. A default value may be an ID of a PLP of an LCT session including a current S-TSID. According to a given embodiment, this field may have an ID value of a PLP for an LCT session for delivering an S-TSID in the ROUTE session, and may have ID values of all PLPs for the ROUTE session.

An LS element may have information about an LCT session for delivering a service data. Service data or service components may be delivered through a plurality of LCT sessions, and thus the number of LS elements may be 1 to N.

The LS element may include @tsi, @PLPID, @bw, @startTime, @endTime, SrcFlow and/or RprFlow.

@tsi may indicate a TSI value of an LCT session for delivering a service component of a service.

@PLPID may have ID information of a PLP for the LCT session. This value may be overwritten on a basic ROUTE session value.

@bw may indicate a maximum bandwidth value. @startTime may indicate a start time of the LCT session. @endTime may indicate an end time of the LCT session. A SrcFlow element may describe a source flow of ROUTE. A RprFlow element may describe a repair flow of ROUTE.

The proposed default values may be varied according to an embodiment. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for ROUTE/DASH.

The MPD is an SLS metadata fragment which contains a formalized description of a DASH Media Presentation, corresponding to a linear service of a given duration defined by the broadcaster (for example a single TV program, or the set of contiguous linear TV programs over a period of time). The contents of the MPD provide the resource identifiers for Segments and the context for the identified resources within the Media Presentation. The data structure and semantics of the MPD fragment can be according to the MPD defined by MPEG DASH.

One or more of the DASH Representations conveyed in the MPD can be carried over broadcast. The MPD may describe additional Representations delivered over broadband, e.g. in the case of a hybrid service, or to support service continuity in handoff from broadcast to broadcast due to broadcast signal degradation (e.g. driving through a tunnel).

FIG. 7 illustrates a USBD/USD fragment for MMT according to an embodiment of the present invention.

MMT SLS for linear services comprises the USBD fragment and the MMT Package (MP) table. The MP table is as described above. The USBD fragment contains service identification, device capabilities information, references to other SLS information required to access the service and constituent media components, and the metadata to enable the receiver to determine the transport mode (broadcast and/or broadband) of the service components. The MP table for MPU components, referenced by the USBD, provides transport session descriptions for the MMTP sessions in which the media content components of a service are delivered and the descriptions of the Assets carried in those MMTP sessions.

The streaming content signaling component of the SLS for MPU components corresponds to the MP table defined in MMT. The MP table provides a list of MMT assets where each asset corresponds to a single service component and the description of the location information for this component.

USBD fragments may also contain references to the S-TSID and the MPD as described above, for service components delivered by the ROUTE protocol and the broadband, respectively. According to a given embodiment, in delivery through MMT, a service component delivered through the ROUTE protocol is NRT data, etc. Thus, in this case, MPD may be unnecessary. In addition, in delivery through MMT, information about an LCT session for delivering a service component, which is delivered via broadband, is unnecessary, and thus an S-TSID may be unnecessary. Here, an MMT package may be a logical collection of media data delivered using MMT. Here, an MMTP packet may refer to a formatted unit of media data delivered using MMT. An MPU may refer to a generic container of independently decodable timed/non-timed data. Here, data in the MPU is media codec agnostic.

Hereinafter, a description will be given of details of the USBD/USD illustrated in the figure.

The illustrated USBD fragment is an example of the present invention, and basic fields of the USBD fragment may be additionally provided according to an embodiment. As described in the foregoing, the illustrated USBD fragment has an extended form, and may have fields added to a basic structure.

The illustrated USBD according to an embodiment of the present invention is expressed as an XML document. According to a given embodiment, the USBD may be expressed in a binary format or as an XML document.

The illustrated USBD may have a bundleDescription root element. The bundleDescription root element may have a userServiceDescription element. The userServiceDescription element may be an instance for one service.

The userServiceDescription element may include @serviceId, @atsc:serviceId, name, serviceLanguage, atsc:capabilityCode, atsc:Channel, atsc:mpuComponent, atsc:routeComponent, atsc:broadbandComponent and/or atsc:ComponentInfo.

Here, @serviceId, @atsc:serviceId, name, serviceLanguage, and atsc:capabilityCode may be as described above. The lang field below the name field may be as described above. atsc:capabilityCode may be omitted according to a given embodiment.

The userServiceDescription element may further include an atsc:contentAdvisoryRating element according to an embodiment. This element may be an optional element. atsc:contentAdvisoryRating can specify the content advisory rating. This field is not illustrated in the figure.

atsc:Channel may have information about a channel of a service. The atsc:Channel element may include @atsc:majorChannelNo, @atsc:minorChannelNo, @atsc:serviceLang, @atsc:serviceGenre, @atsc:serviceIcon and/or atsc:ServiceDescription. @atsc:majorChannelNo, @atsc:minorChannelNo, and @atsc:serviceLang may be omitted according to a given embodiment.

@atsc:majorChannelNo is an attribute that indicates the major channel number of the service.

@atsc:minorChannelNo is an attribute that indicates the minor channel number of the service.

@atsc:serviceLang is an attribute that indicates the primary language used in the service.

@atsc:serviceGenre is an attribute that indicates primary genre of the service.

@atsc:serviceIcon is an attribute that indicates the Uniform Resource Locator (URL) for the icon used to represent this service.

atsc:ServiceDescription includes service description, possibly in multiple languages. atsc:ServiceDescription includes can include @atsc:serviceDescrText and/or @atsc:serviceDescrLang.

@atsc:serviceDescrText is an attribute that indicates description of the service.

@atsc:serviceDescrLang is an attribute that indicates the language of the serviceDescrText attribute above.

atsc:mpuComponent may have information about a content component of a service delivered in a form of an MPU. atsc:mpuComponent may include @atsc:mmtPackageId and/or @atsc:nextMmtPackageId.

@atsc:mmtPackageId can reference a MMT Package for content components of the service delivered as MPUs.

@atsc:nextMmtPackageId can reference a MMT Package to be used after the one referenced by @atsc:mmtPackageId in time for content components of the service delivered as MPUs.

atsc:routeComponent may have information about a content component of a service delivered through ROUTE. atsc:routeComponent may include @atsc:sTSIDUri, @sTSIDPlpId, @ sTSIDDestinationIpAddress, @sTSIDDestinationUdpPort, @sTSIDSourceIpAddress, @sTSIDMajorProtocolVersion and/or @sTSIDMinorProtocolVersion.

@atsc:sTSIDUri can be a reference to the S-TSID fragment which provides access related parameters to the Transport sessions carrying contents of this service. This field may be the same as a URI for referring to an S-TSID in USBD for ROUTE described above. As described in the foregoing, in service delivery by the MMTP, service components, which are delivered through NRT, etc., may be delivered by ROUTE. This field may be used to refer to the S-TSID therefor.

@sTSIDPlpId can be a string representing an integer number indicating the PLP ID of the physical layer pipe carrying the S-TSID for this service. (default: current physical layer pipe).

@sTSIDDestinationIpAddress can be a string containing the dotted-IPv4 destination address of the packets carrying S-TSID for this service. (default: current MMTP session's source IP address)

@sTSIDDestinationUdpPort can be a string containing the port number of the packets carrying S-TSID for this service.

@sTSIDSourceIpAddress can be a string containing the dotted-IPv4 source address of the packets carrying S-TSID for this service.

@sTSIDMajorProtocolVersion can indicate major version number of the protocol used to deliver the S-TSID for this service. Default value is 1.

@sTSIDMinorProtocolVersion can indicate minor version number of the protocol used to deliver the S-TSID for this service. Default value is 0.

atsc:broadbandComponent may have information about a content component of a service delivered via broadband. In other words, atsc:broadbandComponent may be a field on the assumption of hybrid delivery. atsc:broadbandComponent may further include @atsc:fullfMPDUri.

@atsc:fullfMPDUri can be a reference to an MPD fragment which contains descriptions for contents components of the service delivered over broadband.

An atsc:ComponentInfo field may have information about an available component of a service. The atsc:ComponentInfo field may have information about a type, a role, a name, etc. of each component. The number of atsc:ComponentInfo fields may correspond to the number (N) of respective components. The atsc:ComponentInfo field may include @atsc:componentType, @atsc:componentRole, @atsc:componentProtectedFlag, @atsc:componentId and/or @atsc:componentName.

@atsc:componentType is an attribute that indicates the type of this component. Value of 0 indicates an audio component. Value of 1 indicates a video component. Value of 2 indicated a closed caption component. Value of 3 indicates an application component. Values 4 to 7 are reserved. A meaning of a value of this field may be differently set depending on embodiments.

@atsc:componentRole is an attribute that indicates the role or kind of this component.

For audio (when componentType attribute above is equal to 0): values of componentRole attribute are as follows: 0=Complete main, 1=Music and Effects, 2=Dialog, 3=Commentary, 4=Visually Impaired, 5=Hearing Impaired, 6=Voice-Over, 7-254=reserved, 255=unknown.

For video (when componentType attribute above is equal to 1) values of componentRole attribute are as follows: 0=Primary video, 1=Alternative camera view, 2=Other alternative video component, 3=Sign language inset, 4=Follow subject video, 5=3D video left view, 6=3D video right view, 7=3D video depth information, 8=Part of video array <x,y> of <n,m>, 9=Follow-Subject metadata, 10-254=reserved, 255=unknown.

For Closed Caption component (when componentType attribute above is equal to 2) values of componentRole attribute are as follows: 0=Normal, 1=Easy reader, 2-254=reserved, 255=unknown.

When componentType attribute above is between 3 to 7, inclusive, the componentRole can be equal to 255. A meaning of a value of this field may be differently set depending on embodiments.

@atsc:componentProtectedFlag is an attribute that indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. A meaning of a value of this field may be differently set depending on embodiments.

@atsc:componentId is an attribute that indicates the identifier of this component. The value of this attribute can be the same as the asset_id in the MP table corresponding to this component.

@atsc:componentName is an attribute that indicates the human readable name of this component.

The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for MMT.

The Media Presentation Description is an SLS metadata fragment corresponding to a linear service of a given duration defined by the broadcaster (for example a single TV program, or the set of contiguous linear TV programs over a period of time). The contents of the MPD provide the resource identifiers for segments and the context for the identified resources within the media presentation. The data structure and semantics of the MPD can be according to the MPD defined by MPEG DASH.

In the present embodiment, an MPD delivered by an MMTP session describes Representations delivered over broadband, e.g. in the case of a hybrid service, or to support service continuity in handoff from broadcast to broadband due to broadcast signal degradation (e.g. driving under a mountain or through a tunnel).

Hereinafter, a description will be given of an MMT signaling message for MMT.

When MMTP sessions are used to carry a streaming service, MMT signaling messages defined by MMT are delivered by MMTP packets according to signaling message mode defined by MMT. The value of the packet_id field of MMTP packets carrying service layer signaling is set to '00' except for MMTP packets carrying MMT signaling messages specific to an asset, which can be set to the same packet_id value as the MMTP packets carrying the asset. Identifiers referencing the appropriate package for each service are signaled by the USBD fragment as described above. MMT Package Table (MPT) messages with matching MMT_package_id can be delivered on the MMTP session signaled in the SLT. Each MMTP session carries MMT signaling messages specific to its session or each asset delivered by the MMTP session.

In other words, it is possible to access USBD of the MMTP session by specifying an IP destination address/port number, etc. of a packet having the SLS for a particular service in the SLT. As described in the foregoing, a packet ID of an MMTP packet carrying the SLS may be designated as a particular value such as 00, etc. It is possible to access an MPT message having a matched packet ID using the above-described package IP information of USBD. As described below, the MPT message may be used to access each service component/asset.

The following MMTP messages can be delivered by the MMTP session signaled in the SLT.

MMT Package Table (MPT) message: This message carries an MP (MMT Package) table which contains the list of all Assets and their location information as defined by MMT. If an Asset is delivered by a PLP different from the current PLP delivering the MP table, the identifier of the PLP carrying the asset can be provided in the MP table using physical layer pipe identifier descriptor. The physical layer pipe identifier descriptor will be described below.

MMT ATSC3 (MA3) message mmt_atsc3_message( ): This message carries system metadata specific for services including service layer signaling as described above. mmt_atsc3_message( ) will be described below.

The following MMTP messages can be delivered by the MMTP session signaled in the SLT, if required.

Media Presentation Information (MPI) message: This message carries an MPI table which contains the whole document or a subset of a document of presentation information. An MP table associated with the MPI table also can be delivered by this message.

Clock Relation Information (CRI) message: This message carries a CRI table which contains clock related information for the mapping between the NTP timestamp and the MPEG-2 STC. According to a given embodiment, the CRI message may not be delivered through the MMTP session.

The following MMTP messages can be delivered by each MMTP session carrying streaming content.

Hypothetical Receiver Buffer Model message: This message carries information required by the receiver to manage its buffer.

Hypothetical Receiver Buffer Model Removal message: This message carries information required by the receiver to manage its MMT de-capsulation buffer.

Hereinafter, a description will be given of mmt_atsc3_message( ) corresponding to one of MMT signaling messages. An MMT Signaling message mmt_atsc3_message( ) is defined to deliver information specific to services according to the present invention described above. The signaling message may include message ID, version, and/or length fields corresponding to basic fields of the MMT signaling message. A payload of the signaling message may include service ID information, content type information, content version information, content compression information and/or URI information. The content type information may indicate a type of data included in the payload of the signaling message. The content version information may indicate a version of data included in the payload, and the content compression information may indicate a type of compression applied to the data. The URI information may have URI information related to content delivered by the message.

Hereinafter, a description will be given of the physical layer pipe identifier descriptor.

The physical layer pipe identifier descriptor is a descriptor that can be used as one of descriptors of the MP table described above. The physical layer pipe identifier descriptor provides information about the PLP carrying an asset. If an asset is delivered by a PLP different from the current PLP delivering the MP table, the physical layer pipe identifier descriptor can be used as an asset descriptor in the associated MP table to identify the PLP carrying the asset. The physical layer pipe identifier descriptor may further include BSID information in addition to PLP ID information. The BSID may be an ID of a broadcast stream that delivers an MMTP packet for an asset described by the descriptor.

Figure 8:
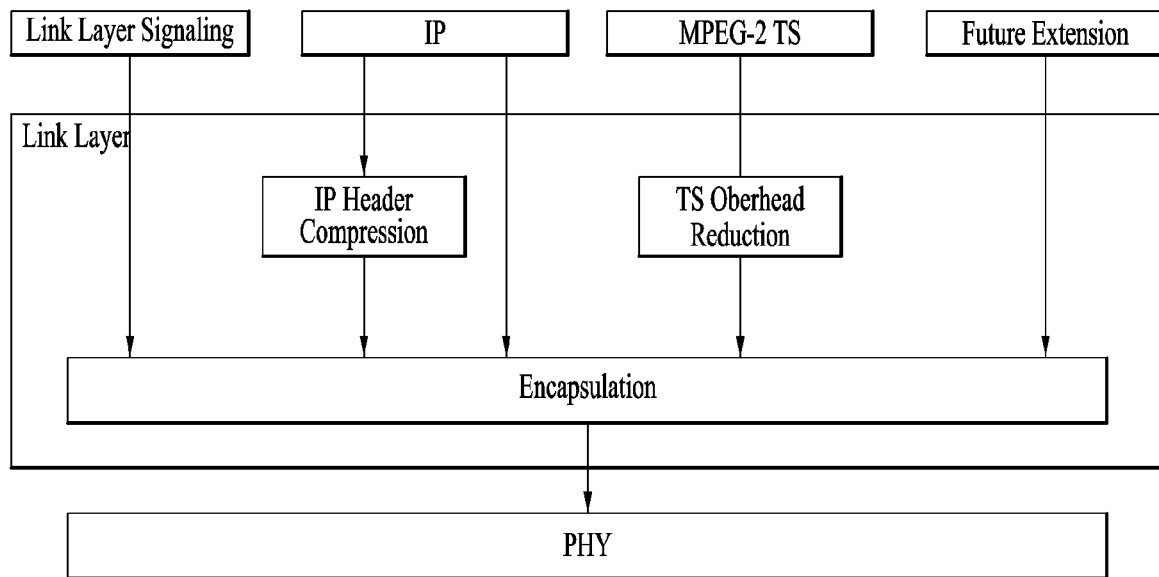
FIG. 8 illustrates a link layer protocol architecture according to an embodiment of the present invention.

FIG. 8 illustrates a link layer protocol architecture according to an embodiment of the present invention.

Hereinafter, a link layer will be described.

The link layer is the layer between the physical layer and the network layer, and transports the data from the network layer to the physical layer at the sending side and transports the data from the physical layer to the network layer at the receiving side. The purpose of the link layer includes abstracting all input packet types into a single format for processing by the physical layer, ensuring flexibility and future extensibility for as yet undefined input types. In addition, processing within the link layer ensures that the input data can be transmitted in an efficient manner, for example by providing options to compress redundant information in the headers of input packets. The operations of encapsulation, compression and so on are referred to as the link layer protocol and packets created using this protocol are called link layer packets. The link layer may perform functions such as packet encapsulation, overhead reduction and/or signaling transmission, etc.

Hereinafter, packet encapsulation will be described. Link layer protocol allows encapsulation of any type of packet, including ones such as IP packets and MPEG-2 TS. Using link layer protocol, the physical layer need only process one single packet format, independent of the network layer protocol type (here we consider MPEG-2 TS packet as a kind of network layer packet.) Each network layer packet or input packet is transformed into the payload of a generic link layer packet. Additionally, concatenation and segmentation can be performed in order to use the physical layer resources efficiently when the input packet sizes are particularly small or large.

As described in the foregoing, segmentation may be used in packet encapsulation. When the network layer packet is too large to process easily in the physical layer, the network layer packet is divided into two or more segments. The link layer packet header includes protocol fields to perform segmentation on the sending side and reassembly on the receiving side. When the network layer packet is segmented, each segment can be encapsulated to link layer packet in the same order as original position in the network layer packet. Also each link layer packet which includes a segment of network layer packet can be transported to PHY layer consequently.

As described in the foregoing, concatenation may be used in packet encapsulation. When the network layer packet is small enough for the payload of a link layer packet to include several network layer packets, the link layer packet header includes protocol fields to perform concatenation. The concatenation is combining of multiple small sized network layer packets into one payload. When the network layer packets are concatenated, each network layer packet can be concatenated to payload of link layer packet in the same order as original input order. Also each packet which constructs a payload of link layer packet can be whole packet, not a segment of packet.

Hereinafter, overhead reduction will be described. Use of the link layer protocol can result in significant reduction in overhead for transport of data on the physical layer. The link layer protocol according to the present invention may provide IP overhead reduction and/or MPEG-2 TS overhead reduction. In IP overhead reduction, IP packets have a fixed header format, however some of the information which is needed in a communication environment may be redundant in a broadcast environment. Link layer protocol provides mechanisms to reduce the broadcast overhead by compressing headers of IP packets. In MPEG-2 TS overhead reduction, link layer protocol provides sync byte removal, null packet deletion and/or common header removal (compression). First, sync byte removal provides an overhead reduction of one byte per TS packet, secondly a null packet deletion mechanism removes the 188 byte null TS packets in a manner that they can be re-inserted at the receiver and finally a common header removal mechanism.

For signaling transmission, in the link layer protocol, a particular format for the signaling packet may be provided for link layer signaling, which will be described below.

In the illustrated link layer protocol architecture according to an embodiment of the present invention, link layer protocol takes as input network layer packets such as IPv4, MPEG-2 TS and so on as input packets. Future extension indicates other packet types and protocol which is also possible to be input in link layer. Link layer protocol also specifies the format and signaling for any link layer signaling, including information about mapping to specific channel to the physical layer. Figure also shows how ALP incorporates mechanisms to improve the efficiency of transmission, via various header compression and deletion algorithms. In addition, the link layer protocol may basically encapsulate input packets.

Figure 9:
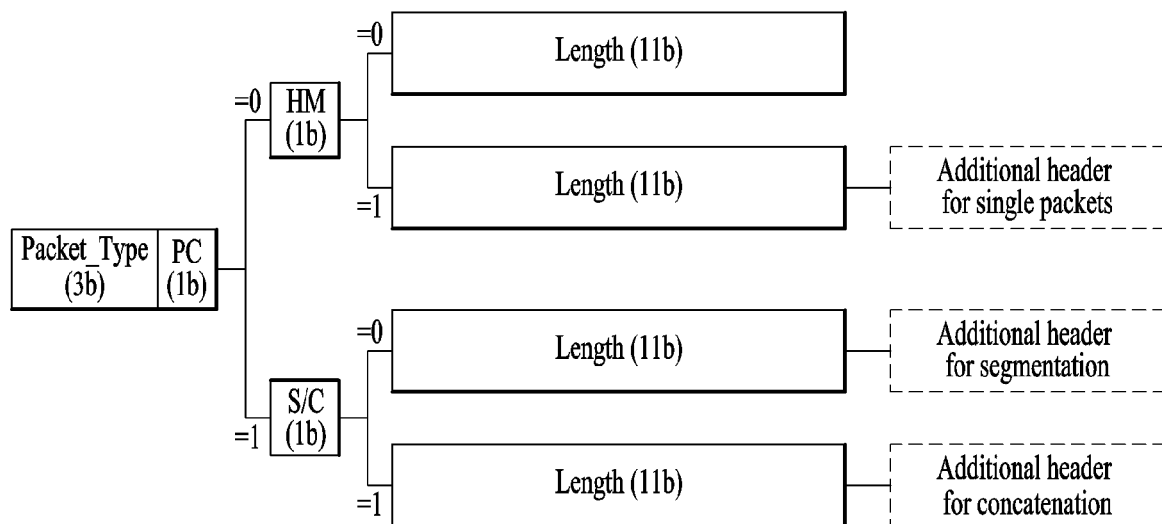
FIG. 9 illustrates a structure of a base header of a link layer packet according to an embodiment of the present invention.

FIG. 9 illustrates a structure of a base header of a link layer packet according to an embodiment of the present invention. Hereinafter, the structure of the header will be described.

A link layer packet can include a header followed by the data payload. The header of a link layer packet can include a base header, and may include an additional header depending on the control fields of the base header. The presence of an optional header is indicated from flag fields of the additional header. According to a given embodiment, a field indicating the presence of an additional header and an optional header may be positioned in the base header.

Hereinafter, the structure of the base header will be described. The base header for link layer packet encapsulation has a hierarchical structure. The base header can be two bytes in length and is the minimum length of the link layer packet header.

The illustrated base header according to the present embodiment may include a Packet_Type field, a PC field and/or a length field. According to a given embodiment, the base header may further include an HM field or an S/C field.

Packet_Type field can be a 3-bit field that indicates the original protocol or packet type of the input data before encapsulation into a link layer packet. An IPv4 packet, a compressed IP packet, a link layer signaling packet, and other types of packets may have the base header structure and may be encapsulated. However, according to a given embodiment, the MPEG-2 TS packet may have a different particular structure, and may be encapsulated. When the value of Packet_Type is "000", "001" "100" or "111", that is the original data type of an ALP packet is one of an IPv4 packet, a compressed IP packet, link layer signaling or extension packet. When the MPEG-2 TS packet is encapsulated, the value of Packet_Type can be "010". Other values of the Packet_Type field may be reserved for future use.

Payload_Configuration (PC) field can be a 1-bit field that indicates the configuration of the payload. A value of 0 can indicate that the link layer packet carries a single, whole input packet and the following field is the Header_Mode field. A value of 1 can indicate that the link layer packet carries more than one input packet (concatenation) or a part of a large input packet (segmentation) and the following field is the Segmentation_Concatenation field.

Header_Mode (HM) field can be a 1-bit field, when set to 0, that can indicate there is no additional header, and that the length of the payload of the link layer packet is less than 2048 bytes. This value may be varied depending on embodiments. A value of 1 can indicate that an additional header for single packet defined below is present following the Length field. In this case, the length of the payload is larger than 2047 bytes and/or optional features can be used (sub stream identification, header extension, etc.). This value may be varied depending on embodiments. This field can be present only when Payload_Configuration field of the link layer packet has a value of 0.

Segmentation_Concatenation (S/C) field can be a 1-bit field, when set to 0, that can indicate that the payload carries a segment of an input packet and an additional header for segmentation defined below is present following the Length field. A value of 1 can indicate that the payload carries more than one complete input packet and an additional header for concatenation defined below is present following the Length field. This field can be present only when the value of Payload_Configuration field of the ALP packet is 1.

Length field can be a 11-bit field that indicates the 11 least significant bits (LSBs) of the length in bytes of payload carried by the link layer packet. When there is a Length_MSB field in the following additional header, the length field is concatenated with the Length_MSB field, and is the LSB to provide the actual total length of the payload. The number of bits of the length field may be changed to another value rather than 11 bits.

Following types of packet configuration are thus possible: a single packet without any additional header, a single packet with an additional header, a segmented packet and a concatenated packet. According to a given embodiment, more packet configurations may be made through a combination of each additional header, an optional header, an additional header for signaling information to be described below, and an additional header for time extension.

Figure 10:
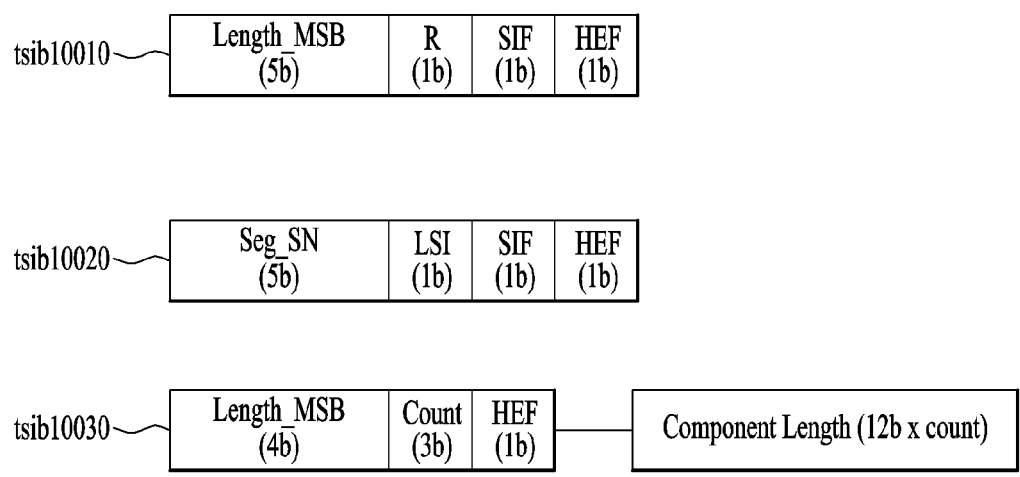
FIG. 10 illustrates a structure of an additional header of a link layer packet according to an embodiment of the present invention.

FIG. 10 illustrates a structure of an additional header of a link layer packet according to an embodiment of the present invention.

Various types of additional headers may be present. Hereinafter, a description will be given of an additional header for a single packet.

This additional header for single packet can be present when Header_Mode (HM)="1". The Header_Mode (HM) can be set to 1 when the length of the payload of the link layer packet is larger than 2047 bytes or when the optional fields are used. The additional header for single packet is shown in Figure (tsib10010).

Length_MSB field can be a 5-bit field that can indicate the most significant bits (MSBs) of the total payload length in bytes in the current link layer packet, and is concatenated with the Length field containing the 11 least significant bits (LSBs) to obtain the total payload length. The maximum length of the payload that can be signaled is therefore 65535 bytes. The number of bits of the length field may be changed to another value rather than 11 bits. In addition, the number of bits of the Length_MSB field may be changed, and thus a maximum expressible payload length may be changed. According to a given embodiment, each length field may indicate a length of a whole link layer packet rather than a payload.

SIF (Sub stream Identifier Flag) field can be a 1-bit field that can indicate whether the sub stream ID (SID) is present after the HEF field or not. When there is no SID in this link layer packet, SIF field can be set to 0. When there is a SID after HEF field in the link layer packet, SIF can be set to 1. The detail of SID is described below.

HEF (Header Extension Flag) field can be a 1-bit field that can indicate, when set to 1 additional header is present for future extension. A value of 0 can indicate that this extension header is not present.

Hereinafter, a description will be given of an additional header when segmentation is used.

This additional header (tsib10020) can be present when Segmentation_Concatenation (S/C)="0". Segment_Sequence_Number can be a 5-bit unsigned integer that can indicate the order of the corresponding segment carried by the link layer packet. For the link layer packet which carries the first segment of an input packet, the value of this field can be set to 0x0. This field can be incremented by one with each additional segment belonging to the segmented input packet.

Last_Segment_Indicator (LSI) can be a 1-bit field that can indicate, when set to 1, that the segment in this payload is the last one of input packet. A value of 0, can indicate that it is not last segment.

SIF (Sub stream Identifier Flag) can be a 1-bit field that can indicate whether the SID is present after the HEF field or not. When there is no SID in the link layer packet, SIF field can be set to 0. When there is a SID after the HEF field in the link layer packet, SIF can be set to 1.

HEF (Header Extension Flag) can be a This 1-bit field that can indicate, when set to 1, that the optional header extension is present after the additional header for future extensions of the link layer header. A value of 0 can indicate that optional header extension is not present.

According to a given embodiment, a packet ID field may be additionally provided to indicate that each segment is generated from the same input packet. This field may be unnecessary and thus be omitted when segments are transmitted in order.

Hereinafter, a description will be given of an additional header when concatenation is used.

This additional header (tsib10030) can be present when Segmentation_Concatenation (S/C)="1".

Length_MSB can be a 4-bit field that can indicate MSB bits of the payload length in bytes in this link layer packet. The maximum length of the payload is 32767 bytes for concatenation. As described in the foregoing, a specific numeric value may be changed.

Count can be a field that can indicate the number of the packets included in the link layer packet. The number of the packets included in the link layer packet, 2 can be set to this field. So, its maximum value of concatenated packets in a link layer packet is 9. A scheme in which the count field indicates the number may be varied depending on embodiments. That is, the numbers from 1 to 8 may be indicated.

HEF (Header Extension Flag) can be a 1-bit field that can indicate, when set to 1 the optional header extension is present after the additional header for future extensions of the link layer header. A value of 0, can indicate extension header is not present.

Component_Length can be a 12-bit length field that can indicate the length in byte of each packet. Component_Length fields are included in the same order as the packets present in the payload except last component packet. The number of length field can be indicated by (Count+1). According to a given embodiment, length fields, the number of which is the same as a value of the count field, may be present. When a link layer header consists of an odd number of Component_Length, four stuffing bits can follow after the last Component_Length field. These bits can be set to 0. According to a given embodiment, a Component_length field indicating a length of a last concatenated input packet may not be present. In this case, the length of the last concatenated input packet may correspond to a length obtained by subtracting a sum of values indicated by respective Component_length fields from a whole payload length.

Hereinafter, the optional header will be described.

As described in the foregoing, the optional header may be added to a rear of the additional header. The optional header field can contain SID and/or header extension. The SID is used to filter out specific packet stream in the link layer level. One example of SID is the role of service identifier in a link layer stream carrying multiple services. The mapping information between a service and the SID value corresponding to the service can be provided in the SLT, if applicable. The header extension contains extended field for future use. Receivers can ignore any header extensions which they do not understand.

SID (Sub stream Identifier) can be a 8-bit field that can indicate the sub stream identifier for the link layer packet. If there is optional header extension, SID present between additional header and optional header extension.

Header_Extension ( ) can include the fields defined below.

Extension_Type can be an 8-bit field that can indicate the type of the Header_Extension ( ).

Extension_Length can be a 8-bit field that can indicate the length of the Header Extension ( ) in bytes counting from the next byte to the last byte of the Header_Extension ( ).

Extension_Byte can be a byte representing the value of the Header_Extension ( ).

Figure 11:
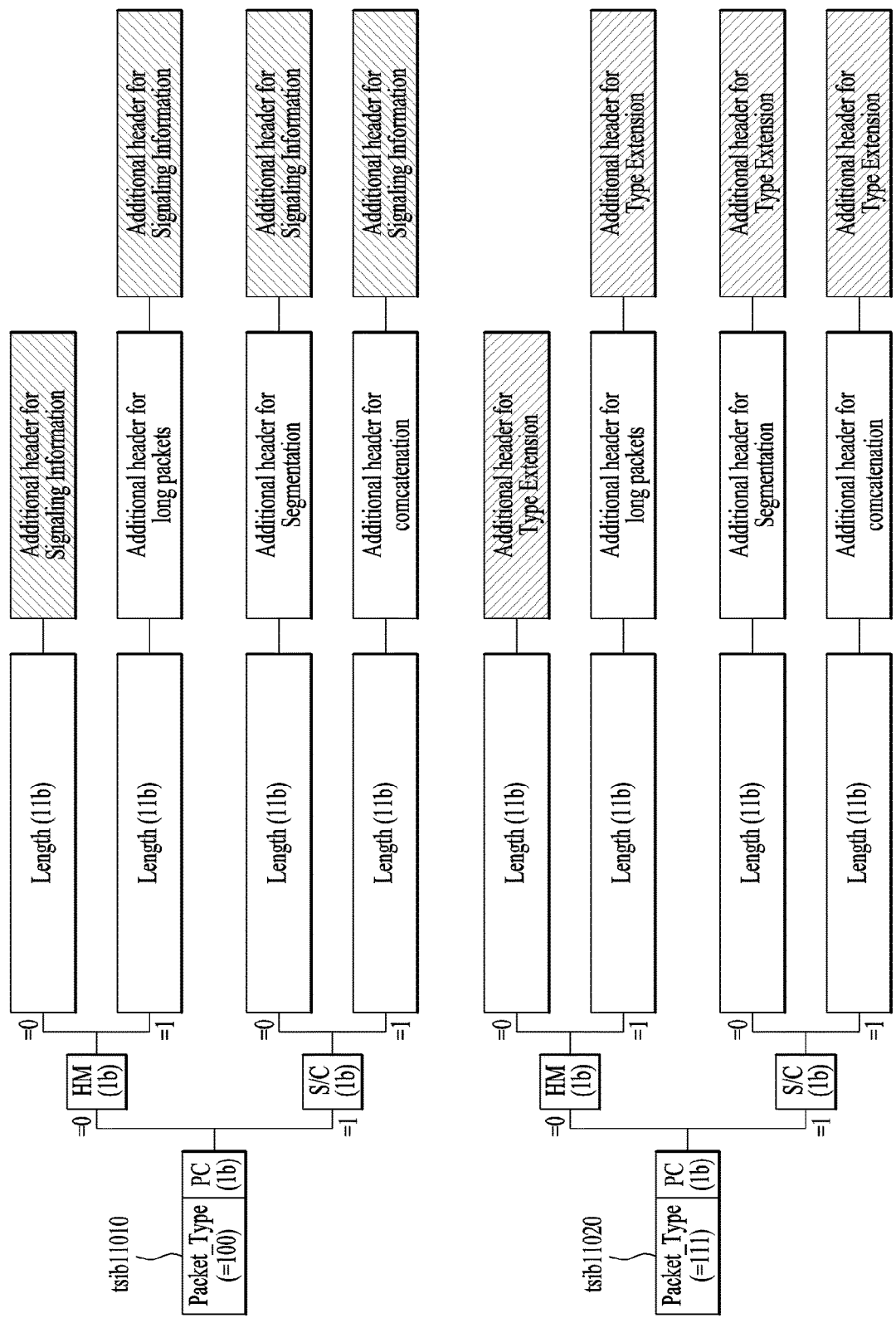
FIG. 11 illustrates a structure of an additional header of a link layer packet according to another embodiment of the present invention.

FIG. 11 illustrates a structure of an additional header of a link layer packet according to another embodiment of the present invention.

Hereinafter, a description will be given of an additional header for signaling information.

How link layer signaling is incorporated into link layer packets are as follows.

Signaling packets are identified by when the Packet_Type field of the base header is equal to 100.

Figure (tsib11010) shows the structure of the link layer packets containing additional header for signaling information. In addition to the link layer header, the link layer packet can consist of two additional parts, additional header for signaling information and the actual signaling data itself. The total length of the link layer signaling packet is shown in the link layer packet header.

The additional header for signaling information can include following fields. According to a given embodiment, some fields may be omitted.

Signaling_Type can be an 8-bit field that can indicate the type of signaling.

Signaling_Type_Extension can be a 16-bit filed that can indicate the attribute of the signaling. Detail of this field can be defined in signaling specification.

Signaling_Version can be an 8-bit field that can indicate the version of signaling.

Signaling_Format can be a 2-bit field that can indicate the data format of the signaling data. Here, a signaling format may refer to a data format such as a binary format, an XML format, etc.

Signaling_Encoding can be a 2-bit field that can specify the encoding/compression format. This field may indicate whether compression is not performed and which type of compression is performed.

Hereinafter, a description will be given of an additional header for packet type extension.

In order to provide a mechanism to allow an almost unlimited number of additional protocol and packet types to be carried by link layer in the future, the additional header is defined. Packet type extension can be used when Packet_type is 111 in the base header as described above. Figure (tsib11020) shows the structure of the link layer packets containing additional header for type extension.

The additional header for type extension can include following fields. According to a given embodiment, some fields may be omitted.

extended_type can be a 16-bit field that can indicate the protocol or packet type of the input encapsulated in the link layer packet as payload. This field cannot be used for any protocol or packet type already defined by Packet_Type field.

Figure 12:
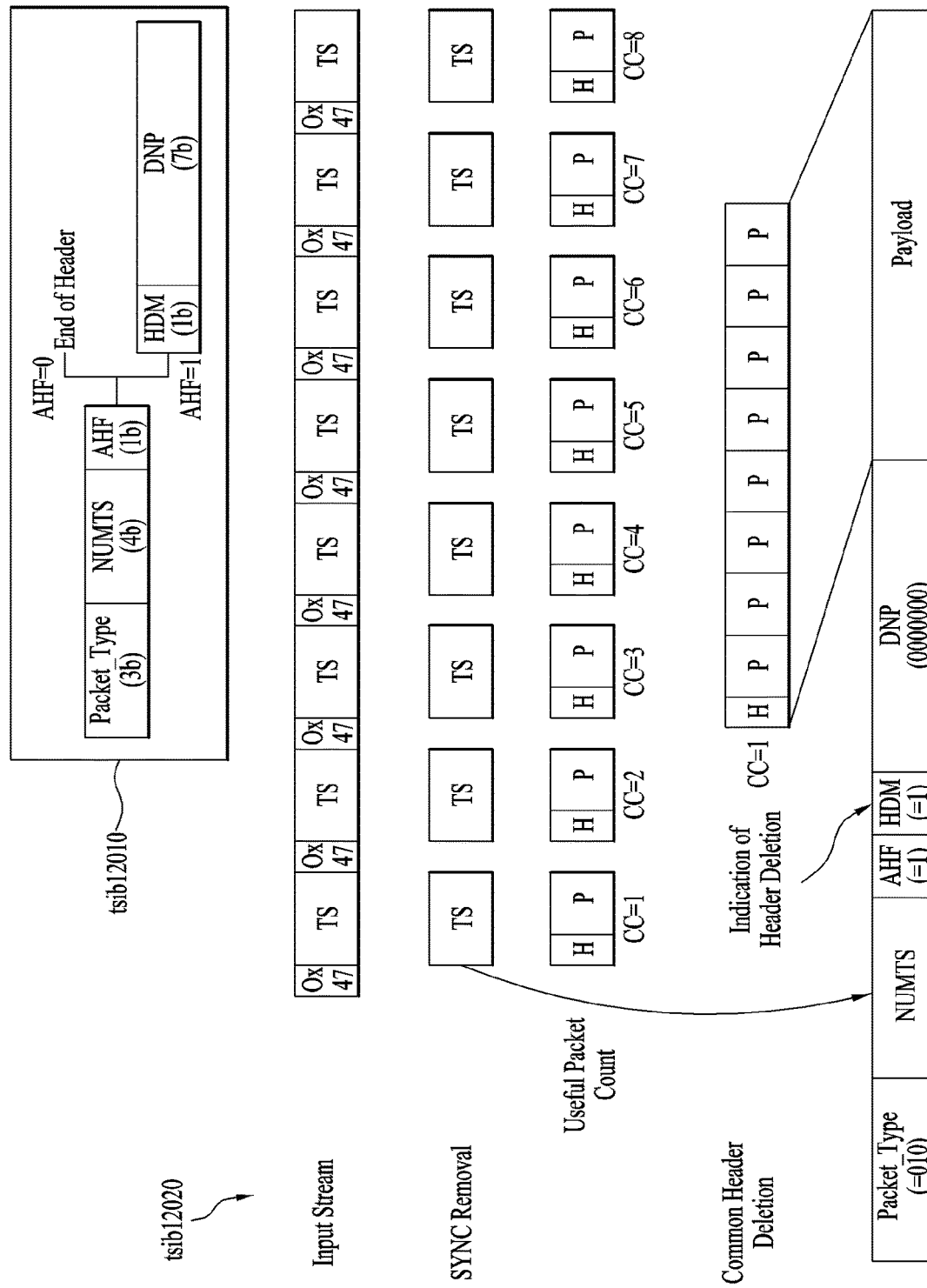
FIG. 12 illustrates a header structure of a link layer packet for an MPEG-2 TS packet and an encapsulation process thereof according to an embodiment of the present invention.

FIG. 12 illustrates a header structure of a link layer packet for an MPEG-2 TS packet and an encapsulation process thereof according to an embodiment of the present invention.

Hereinafter, a description will be given of a format of the link layer packet when the MPEG-2 TS packet is input as an input packet.

In this case, the Packet_Type field of the base header is equal to 010. Multiple TS packets can be encapsulated within each link layer packet. The number of TS packets is signaled via the NUMTS field. In this case, as described in the foregoing, a particular link layer packet header format may be used.

Link layer provides overhead reduction mechanisms for MPEG-2 TS to enhance the transmission efficiency. The sync byte (0x47) of each TS packet can be deleted. The option to delete NULL packets and similar TS headers is also provided.

In order to avoid unnecessary transmission overhead, TS null packets (PID=0x1FFF) may be removed. Deleted null packets can be recovered in receiver side using DNP field. The DNP field indicates the count of deleted null packets. Null packet deletion mechanism using DNP field is described below.

In order to achieve more transmission efficiency, similar header of MPEG-2 TS packets can be removed. When two or more successive TS packets have sequentially increased continuity counter fields and other header fields are the same, the header is sent once at the first packet and the other headers are deleted. HDM field can indicate whether the header deletion is performed or not. Detailed procedure of common TS header deletion is described below.

When all three overhead reduction mechanisms are performed, overhead reduction can be performed in sequence of sync removal, null packet deletion, and common header deletion. According to a given embodiment, a performance order of respective mechanisms may be changed. In addition, some mechanisms may be omitted according to a given embodiment.

The overall structure of the link layer packet header when using MPEG-2 TS packet encapsulation is depicted in Figure (tsib12010).

Hereinafter, a description will be given of each illustrated field. Packet_Type can be a 3-bit field that can indicate the protocol type of input packet as describe above. For MPEG-2 TS packet encapsulation, this field can always be set to 010.

NUMTS (Number of TS packets) can be a 4-bit field that can indicate the number of TS packets in the payload of this link layer packet. A maximum of 16 TS packets can be supported in one link layer packet. The value of NUMTS=0 can indicate that 16 TS packets are carried by the payload of the link layer packet. For all other values of NUMTS, the same number of TS packets are recognized, e.g. NUMTS=0001 means one TS packet is carried.

AHF (Additional Header Flag) can be a field that can indicate whether the additional header is present of not. A value of 0 indicates that there is no additional header. A value of 1 indicates that an additional header of length 1-byte is present following the base header. If null TS packets are deleted or TS header compression is applied this field can be set to 1. The additional header for TS packet encapsulation consists of the following two fields and is present only when the value of AHF in this link layer packet is set to 1.

HDM (Header Deletion Mode) can be a 1-bit field that indicates whether TS header deletion can be applied to this link layer packet. A value of 1 indicates that TS header deletion can be applied. A value of "0" indicates that the TS header deletion method is not applied to this link layer packet.

DNP (Deleted Null Packets) can be a 7-bit field that indicates the number of deleted null TS packets prior to this link layer packet. A maximum of 128 null TS packets can be deleted. When HDM=0 the value of DNP=0 can indicate that 128 null packets are deleted. When HDM=1 the value of DNP=0 can indicate that no null packets are deleted. For all other values of DNP, the same number of null packets are recognized, e.g. DNP=5 means 5 null packets are deleted.

The number of bits of each field described above may be changed. According to the changed number of bits, a minimum/maximum value of a value indicated by the field may be changed. These numbers may be changed by a designer.

Hereinafter, SYNC byte removal will be described.

When encapsulating TS packets into the payload of a link layer packet, the SYNC byte (0x47) from the start of each TS packet can be deleted. Hence the length of the MPEG2-TS packet encapsulated in the payload of the link layer packet is always of length 187 bytes (instead of 188 bytes originally).

Hereinafter, null packet deletion will be described.

Transport Stream rules require that bit rates at the output of a transmitter's multiplexer and at the input of the receiver's de-multiplexer are constant in time and the end-to-end delay is also constant. For some Transport Stream input signals, null packets may be present in order to accommodate variable bitrate services in a constant bitrate stream. In this case, in order to avoid unnecessary transmission overhead, TS null packets (that is TS packets with PID=0x1FFF) may be removed. The process is carried-out in a way that the removed null packets can be re-inserted in the receiver in the exact place where they were originally, thus guaranteeing constant bitrate and avoiding the need for PCR time stamp updating.

Before generation of a link layer packet, a counter called DNP (Deleted Null-Packets) can first be reset to zero and then incremented for each deleted null packet preceding the first non-null TS packet to be encapsulated into the payload of the current link layer packet. Then a group of consecutive useful TS packets is encapsulated into the payload of the current link layer packet and the value of each field in its header can be determined. After the generated link layer packet is injected to the physical layer, the DNP is reset to zero. When DNP reaches its maximum allowed value, if the next packet is also a null packet, this null packet is kept as a useful packet and encapsulated into the payload of the next link layer packet. Each link layer packet can contain at least one useful TS packet in its payload.

Hereinafter, TS packet header deletion will be described. TS packet header deletion may be referred to as TS packet header compression.

When two or more successive TS packets have sequentially increased continuity counter fields and other header fields are the same, the header is sent once at the first packet and the other headers are deleted. When the duplicated MPEG-2 TS packets are included in two or more successive TS packets, header deletion cannot be applied in transmitter side. HDM field can indicate whether the header deletion is performed or not. When TS header deletion is performed, HDM can be set to 1. In the receiver side, using the first packet header, the deleted packet headers are recovered, and the continuity counter is restored by increasing it in order from that of the first header.

An example tsib12020 illustrated in the figure is an example of a process in which an input stream of a TS packet is encapsulated into a link layer packet. First, a TS stream including TS packets having SYNC byte (0x47) may be input. First, sync bytes may be deleted through a sync byte deletion process. In this example, it is presumed that null packet deletion is not performed.

Here, it is presumed that packet headers of eight TS packets have the same field values except for CC, that is, a continuity counter field value. In this case, TS packet deletion/compression may be performed. Seven remaining TS packet headers are deleted except for a first TS packet header corresponding to CC=1. The processed TS packets may be encapsulated into a payload of the link layer packet.

In a completed link layer packet, a Packet_Type field corresponds to a case in which TS packets are input, and thus may have a value of 010. A NUMTS field may indicate the number of encapsulated TS packets. An AHF field may be set to 1 to indicate the presence of an additional header since packet header deletion is performed. An HDM field may be set to 1 since header deletion is performed. DNP may be set to 0 since null packet deletion is not performed.

FIG. 13 illustrates an example of adaptation modes in IP header compression according to an embodiment of the present invention (transmitting side).

Hereinafter, IP header compression will be described.

In the link layer, IP header compression/decompression scheme can be provided. IP header compression can include two parts: header compressor/decompressor and adaptation module. The header compression scheme can be based on the Robust Header Compression (RoHC). In addition, for broadcasting usage, adaptation function is added.

In the transmitter side, ROHC compressor reduces the size of header for each packet. Then, adaptation module extracts context information and builds signaling information from each packet stream. In the receiver side, adaptation module parses the signaling information associated with the received packet stream and attaches context information to the received packet stream. ROHC decompressor reconstructs the original IP packet by recovering the packet header.

The header compression scheme can be based on the RoHC as described above. In particular, in the present system, an RoHC framework can operate in a unidirectional mode (U mode) of the RoHC. In addition, in the present system, it is possible to use an RoHC UDP header compression profile which is identified by a profile identifier of 0x0002.

Hereinafter, adaptation will be described.

In case of transmission through the unidirectional link, if a receiver has no information of context, decompressor cannot recover the received packet header until receiving full context. This may cause channel change delay and turn on delay. For this reason, context information and configuration parameters between compressor and decompressor can be always sent with packet flow.

The Adaptation function provides out-of-band transmission of the configuration parameters and context information. Out-of-band transmission can be done through the link layer signaling. Therefore, the adaptation function is used to reduce the channel change delay and decompression error due to loss of context information.

Hereinafter, extraction of context information will be described.

Context information may be extracted using various schemes according to adaptation mode. In the present invention, three examples will be described below. The scope of the present invention is not restricted to the examples of the adaptation mode to be described below. Here, the adaptation mode may be referred to as a context extraction mode.

Adaptation Mode 1 (not illustrated) may be a mode in which no additional operation is applied to a basic RoHC packet stream. In other words, the adaptation module may operate as a buffer in this mode. Therefore, in this mode, context information may not be included in link layer signaling In Adaptation Mode 2 (tsib13010), the adaptation module can detect the IR packet from ROHC packet flow and extract the context information (static chain). After extracting the context information, each IR packet can be converted to an IR-DYN packet. The converted IR-DYN packet can be included and transmitted inside the ROHC packet flow in the same order as IR packet, replacing the original packet.

In Adaptation Mode 3 (tsib13020), the adaptation module can detect the IR and IR-DYN packet from ROHC packet flow and extract the context information. The static chain and dynamic chain can be extracted from IR packet and dynamic chain can be extracted from IR-DYN packet. After extracting the context information, each IR and IR-DYN packet can be converted to a compressed packet. The compressed packet format can be the same with the next packet of IR or IR-DYN packet. The converted compressed packet can be included and transmitted inside the ROHC packet flow in the same order as IR or IR-DYN packet, replacing the original packet.

Signaling (context) information can be encapsulated based on transmission structure. For example, context information can be encapsulated to the link layer signaling. In this case, the packet type value can be set to "100".

In the above-described Adaptation Modes 2 and 3, a link layer packet for context information may have a packet type field value of 100. In addition, a link layer packet for compressed IP packets may have a packet type field value of 001. The values indicate that each of the signaling information and the compressed IP packets are included in the link layer packet as described above.

Hereinafter, a description will be given of a method of transmitting the extracted context information.

The extracted context information can be transmitted separately from ROHC packet flow, with signaling data through specific physical data path. The transmission of context depends on the configuration of the physical layer path. The context information can be sent with other link layer signaling through the signaling data pipe.

In other words, the link layer packet having the context information may be transmitted through a signaling PLP together with link layer packets having other link layer signaling information (Packet_Type=100). Compressed IP packets from which context information is extracted may be transmitted through a general PLP (Packet_Type=001). Here, depending on embodiments, the signaling PLP may refer to an L1 signaling path. In addition, depending on embodiments, the signaling PLP may not be separated from the general PLP, and may refer to a particular and general PLP through which the signaling information is transmitted.

At a receiving side, prior to reception of a packet stream, a receiver may need to acquire signaling information. When receiver decodes initial PLP to acquire the signaling information, the context signaling can be also received. After the signaling acquisition is done, the PLP to receive packet stream can be selected. In other words, the receiver may acquire the signaling information including the context information by selecting the initial PLP. Here, the initial PLP may be the above-described signaling PLP. Thereafter, the receiver may select a PLP for acquiring a packet stream. In this way, the context information may be acquired prior to reception of the packet stream.

After the PLP for acquiring the packet stream is selected, the adaptation module can detect IR-DYN packet form received packet flow. Then, the adaptation module parses the static chain from the context information in the signaling data. This is similar to receiving the IR packet. For the same context identifier, IR-DYN packet can be recovered to IR packet. Recovered ROHC packet flow can be sent to ROHC decompressor. Thereafter, decompression may be started.

FIG. 14 illustrates a link mapping table (LMT) and an RoHC-U description table according to an embodiment of the present invention.

Hereinafter, link layer signaling will be described.

Generally, link layer signaling is operates under IP level. At the receiver side, link layer signaling can be obtained earlier than IP level signaling such as Service List Table (SLT) and Service Layer Signaling (SLS). Therefore, link layer signaling can be obtained before session establishment.

For link layer signaling, there can be two kinds of signaling according input path: internal link layer signaling and external link layer signaling. The internal link layer signaling is generated in link layer at transmitter side. And the link layer takes the signaling from external module or protocol. This kind of signaling information is considered as external link layer signaling. If some signaling need to be obtained prior to IP level signaling, external signaling is transmitted in format of link layer packet.

The link layer signaling can be encapsulated into link layer packet as described above. The link layer packets can carry any format of link layer signaling, including binary and XML. The same signaling information may not be transmitted in different formats for the link layer signaling.

Internal link layer signaling may include signaling information for link mapping. The Link Mapping Table (LMT) provides a list of upper layer sessions carried in a PLP. The LMT also provides addition information for processing the link layer packets carrying the upper layer sessions in the link layer.

An example of the LMT (tsib14010) according to the present invention is illustrated.

signaling_type can be an 8-bit unsigned integer field that indicates the type of signaling carried by this table. The value of signaling_type field for Link Mapping Table (LMT) can be set to 0x01.

PLP_ID can be an 8-bit field that indicates the PLP corresponding to this table.

num_session can be an 8-bit unsigned integer field that provides the number of upper layer sessions carried in the PLP identified by the above PLP_ID field. When the value of signaling_type field is 0x01, this field can indicate the number of UDP/IP sessions in the PLP.

src_IP_add can be a 32-bit unsigned integer field that contains the source IP address of an upper layer session carried in the PLP identified by the PLP_ID field.

dst_IP_add can be a 32-bit unsigned integer field that contains the destination IP address of an upper layer session carried in the PLP identified by the PLP_ID field.

src_UDP_port can be a 16-bit unsigned integer field that represents the source UDP port number of an upper layer session carried in the PLP identified by the PLP_ID field.

dst_UDP_port can be a 16-bit unsigned integer field that represents the destination UDP port number of an upper layer session carried in the PLP identified by the PLP_ID field.

SID_flag can be a 1-bit Boolean field that indicates whether the link layer packet carrying the upper layer session identified by above 4 fields, Src_IP_add, Dst_IP_add, Src_UDP_Port and Dst_UDP_Port, has an SID field in its optional header. When the value of this field is set to 0, the link layer packet carrying the upper layer session may not have an SID field in its optional header. When the value of this field is set to 1, the link layer packet carrying the upper layer session can have an SID field in its optional header and the value the SID field can be same as the following SID field in this table.

compressed_flag can be a 1-bit Boolean field that indicates whether the header compression is applied the link layer packets carrying the upper layer session identified by above 4 fields, Src_IP_add, Dst_IP_add, Src_UDP_Port and Dst_UDP_Port. When the value of this field is set to 0, the link layer packet carrying the upper layer session may have a value of 0x00 of Packet_Type field in its base header. When the value of this field is set to 1, the link layer packet carrying the upper layer session may have a value of 0x01 of Packet_Type field in its base header and the Context_ID field can be present.

SID can be an 8-bit unsigned integer field that indicates sub stream identifier for the link layer packets carrying the upper layer session identified by above 4 fields, Src_IP_add, Dst_IP_add, Src_UDP_Port and Dst_UDP_Port. This field can be present when the value of SID_flag is equal to 1.

context_id can be an 8-bit field that provides a reference for the context id (CID) provided in the ROHC-U description table. This field can be present when the value of compressed_flag is equal to 1.

An example of the RoHC-U description table (tsib14020) according to the present invention is illustrated. As described in the foregoing, the RoHC-U adaptation module may generate information related to header compression.

signaling_type can be an 8-bit field that indicates the type of signaling carried by this table. The value of signaling_type field for ROHC-U description table (RDT) can be set to "0x02".

PLP_ID can be an 8-bit field that indicates the PLP corresponding to this table.

context_id can be an 8-bit field that indicates the context id (CID) of the compressed IP stream. In this system, 8-bit CID can be used for large CID.

context_profile can be an 8-bit field that indicates the range of protocols used to compress the stream. This field can be omitted.

adaptation_mode can be a 2-bit field that indicates the mode of adaptation module in this PLP. Adaptation modes have been described above.

context_config can be a 2-bit field that indicates the combination of the context information. If there is no context information in this table, this field may be set to "0x0". If the static_chain( ) or dynamic_chain( ) byte is included in this table, this field may be set to "0x01" or "0x02" respectively. If both of the static_chain( ) and dynamic_chain( ) byte are included in this table, this field may be set to "0x03".

context_length can be an 8-bit field that indicates the length of the static chain byte sequence. This field can be omitted.

static_chain_byte ( ) can be a field that conveys the static information used to initialize the ROHC-U decompressor. The size and structure of this field depend on the context profile.

dynamic_chain_byte ( ) can be a field that conveys the dynamic information used to initialize the ROHC-U decompressor. The size and structure of this field depend on the context profile.

The static_chain_byte can be defined as sub-header information of IR packet. The dynamic_chain_byte can be defined as sub-header information of IR packet and IR-DYN packet.

Figure 15:
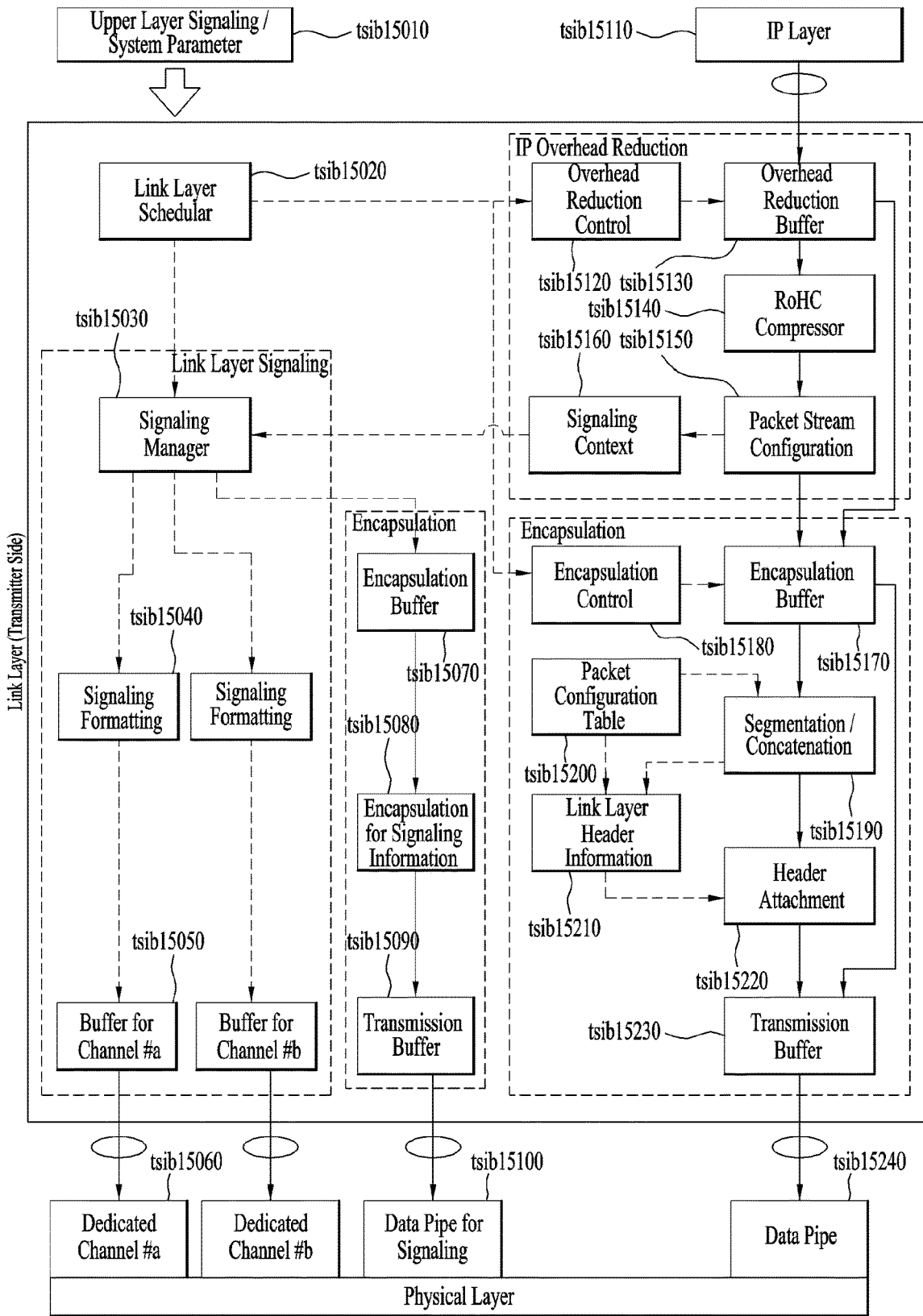
FIG. 15 illustrates a structure of a link layer on a transmitter side according to an embodiment of the present invention.

FIG. 15 illustrates a structure of a link layer on a transmitter side according to an embodiment of the present invention.

The present embodiment presumes that an IP packet is processed. From a functional point of view, the link layer on the transmitter side may broadly include a link layer signaling part in which signaling information is processed, an overhead reduction part, and/or an encapsulation part. In addition, the link layer on the transmitter side may include a scheduler for controlling and scheduling an overall operation of the link layer and/or input and output parts of the link layer.

First, signaling information of an upper layer and/or a system parameter tsib15010 may be delivered to the link layer. In addition, an IP stream including IP packets may be delivered to the link layer from an IP layer tsib15110.

As described above, the scheduler tsib15020 may determine and control operations of several modules included in the link layer. The delivered signaling information and/or system parameter tsib15010 may be filterer or used by the scheduler tsib15020. Information, which corresponds to a part of the delivered signaling information and/or system parameter tsib15010, necessary for a receiver may be delivered to the link layer signaling part. In addition, information, which corresponds to a part of the signaling information, necessary for an operation of the link layer may be delivered to an overhead reduction controller tsib15120 or an encapsulation controller tsib15180.

The link layer signaling part may collect information to be transmitted as a signal in a physical layer, and convert/configure the information in a form suitable for transmission. The link layer signaling part may include a signaling manager tsib15030, a signaling formatter tsib15040, and/or a buffer for channels tsib15050.

The signaling manager tsib15030 may receive signaling information delivered from the scheduler tsib15020 and/or signaling (and/or context) information delivered from the overhead reduction part. The signaling manager tsib15030 may determine a path for transmission of the signaling information for delivered data. The signaling information may be delivered through the path determined by the signaling manager tsib15030. As described in the foregoing, signaling information to be transmitted through a divided channel such as the FIC, the EAS, etc. may be delivered to the signaling formatter tsib15040, and other signaling information may be delivered to an encapsulation buffer tsib15070.

The signaling formatter tsib15040 may format related signaling information in a form suitable for each divided channel such that signaling information may be transmitted through a separately divided channel. As described in the foregoing, the physical layer may include separate physically/logically divided channels. The divided channels may be used to transmit FIC signaling information or EAS-related information. The FIC or EAS-related information may be sorted by the signaling manager tsib15030, and input to the signaling formatter tsib15040. The signaling formatter tsib15040 may format the information based on each separate channel. When the physical layer is designed to transmit particular signaling information through a separately divided channel other than the FIC and the EAS, a signaling formatter for the particular signaling information may be additionally provided. Through this scheme, the link layer may be compatible with various physical layers.

The buffer for channels tsib15050 may deliver the signaling information received from the signaling formatter tsib15040 to separate dedicated channels tsib15060. The number and content of the separate channels may vary depending on embodiments.

As described in the foregoing, the signaling manager tsib15030 may deliver signaling information, which is not delivered to a particular channel, to the encapsulation buffer tsib15070. The encapsulation buffer tsib15070 may function as a buffer that receives the signaling information which is not delivered to the particular channel.

An encapsulation block for signaling information tsib15080 may encapsulate the signaling information which is not delivered to the particular channel A transmission buffer tsib15090 may function as a buffer that delivers the encapsulated signaling information to a DP for signaling information tsib15100. Here, the DP for signaling information tsib15100 may refer to the above-described PLS region.

The overhead reduction part may allow efficient transmission by removing overhead of packets delivered to the link layer. It is possible to configure overhead reduction parts corresponding to the number of IP streams input to the link layer.

An overhead reduction buffer tsib15130 may receive an IP packet delivered from an upper layer. The received IP packet may be input to the overhead reduction part through the overhead reduction buffer tsib15130.

An overhead reduction controller tsib15120 may determine whether to perform overhead reduction on a packet stream input to the overhead reduction buffer tsib15130. The overhead reduction controller tsib15120 may determine whether to perform overhead reduction for each packet stream. When overhead reduction is performed on a packet stream, packets may be delivered to a robust header compression (RoHC) compressor tsib15140 to perform overhead reduction. When overhead reduction is not performed on a packet stream, packets may be delivered to the encapsulation part to perform encapsulation without overhead reduction. Whether to perform overhead reduction of packets may be determined based on the signaling information tsib15010 delivered to the link layer. The signaling information may be delivered to the encapsulation controller tsib15180 by the scheduler tsib15020.

The RoHC compressor tsib15140 may perform overhead reduction on a packet stream. The RoHC compressor tsib15140 may perform an operation of compressing a header of a packet. Various schemes may be used for overhead reduction. Overhead reduction may be performed using a scheme proposed by the present invention. The present invention presumes an IP stream, and thus an expression "RoHC compressor" is used. However, the name may be changed depending on embodiments. The operation is not restricted to compression of the IP stream, and overhead reduction of all types of packets may be performed by the RoHC compressor tsib15140.

A packet stream configuration block tsib15150 may separate information to be transmitted to a signaling region and information to be transmitted to a packet stream from IP packets having compressed headers. The information to be transmitted to the packet stream may refer to information to be transmitted to a DP region. The information to be transmitted to the signaling region may be delivered to a signaling and/or context controller tsib15160. The information to be transmitted to the packet stream may be transmitted to the encapsulation part.

The signaling and/or context controller tsib15160 may collect signaling and/or context information and deliver the signaling and/or context information to the signaling manager in order to transmit the signaling and/or context information to the signaling region.

The encapsulation part may perform an operation of encapsulating packets in a form suitable for a delivery to the physical layer. It is possible to configure encapsulation parts corresponding to the number of IP streams.

An encapsulation buffer tsib15170 may receive a packet stream for encapsulation. Packets subjected to overhead reduction may be received when overhead reduction is performed, and an input IP packet may be received without change when overhead reduction is not performed.

An encapsulation controller tsib15180 may determine whether to encapsulate an input packet stream. When encapsulation is performed, the packet stream may be delivered to a segmentation/concatenation block tsib15190. When encapsulation is not performed, the packet stream may be delivered to a transmission buffer tsib15230. Whether to encapsulate packets may be determined based on the signaling information tsib15010 delivered to the link layer. The signaling information may be delivered to the encapsulation controller tsib15180 by the scheduler tsib15020.

In the segmentation/concatenation block tsib15190, the above-described segmentation or concatenation operation may be performed on packets. In other words, when an input IP packet is longer than a link layer packet corresponding to an output of the link layer, one IP packet may be segmented into several segments to configure a plurality of link layer packet payloads. On the other hand, when an input IP packet is shorter than a link layer packet corresponding to an output of the link layer, several IP packets may be concatenated to configure one link layer packet payload.

A packet configuration table tsib15200 may have configuration information of a segmented and/or concatenated link layer packet. A transmitter and a receiver may have the same information in the packet configuration table tsib15200. The transmitter and the receiver may refer to the information of the packet configuration table tsib15200. An index value of the information of the packet configuration table tsib15200 may be included in a header of the link layer packet.

A link layer header information block tsib15210 may collect header information generated in an encapsulation process. In addition, the link layer header information block tsib15210 may collect header information included in the packet configuration table tsib15200. The link layer header information block tsib15210 may configure header information according to a header structure of the link layer packet.

A header attachment block tsib15220 may add a header to a payload of a segmented and/or concatenated link layer packet. The transmission buffer tsib15230 may function as a buffer to deliver the link layer packet to a DP tsib15240 of the physical layer.

The respective blocks, modules, or parts may be configured as one module/protocol or a plurality of modules/protocols in the link layer.

Figure 16:
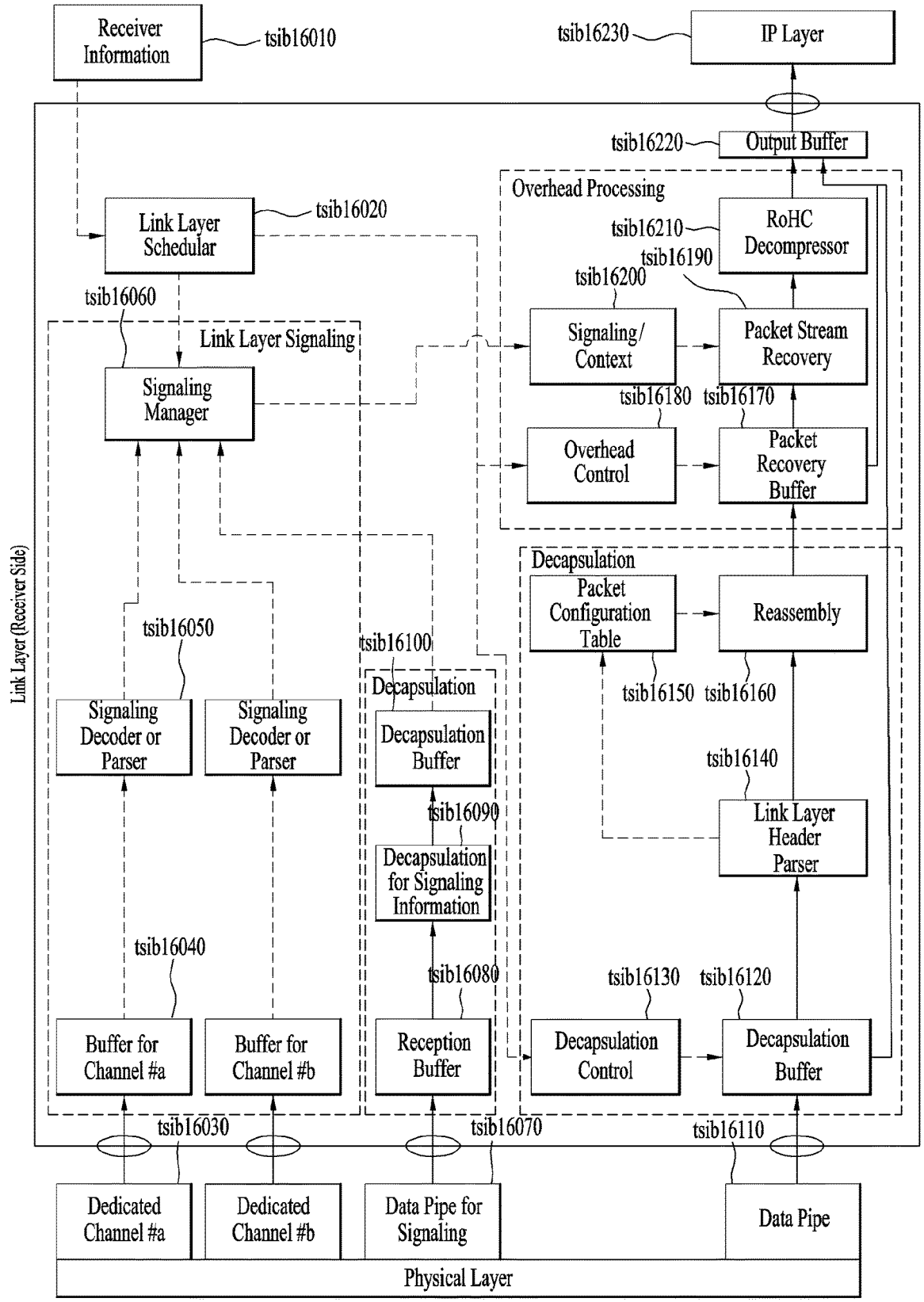
FIG. 16 illustrates a structure of a link layer on a receiver side according to an embodiment of the present invention.

FIG. 16 illustrates a structure of a link layer on a receiver side according to an embodiment of the present invention.

The present embodiment presumes that an IP packet is processed. From a functional point of view, the link layer on the receiver side may broadly include a link layer signaling part in which signaling information is processed, an overhead processing part, and/or a decapsulation part. In addition, the link layer on the receiver side may include a scheduler for controlling and scheduling overall operation of the link layer and/or input and output parts of the link layer.

First, information received through a physical layer may be delivered to the link layer. The link layer may process the information, restore an original state before being processed at a transmitter side, and then deliver the information to an upper layer. In the present embodiment, the upper layer may be an IP layer.

Information, which is separated in the physical layer and delivered through a particular channel tsib16030, may be delivered to a link layer signaling part. The link layer signaling part may determine signaling information received from the physical layer, and deliver the determined signaling information to each part of the link layer.

A buffer for channels tsib16040 may function as a buffer that receives signaling information transmitted through particular channels. As described in the foregoing, when physically/logically divided separate channels are present in the physical layer, it is possible to receive signaling information transmitted through the channels. When the information received from the separate channels is segmented, the segmented information may be stored until complete information is configured.

A signaling decoder/parser tsib16050 may verify a format of the signaling information received through the particular channel, and extract information to be used in the link layer. When the signaling information received through the particular channel is encoded, decoding may be performed. In addition, according to a given embodiment, it is possible to verify integrity, etc. of the signaling information.

A signaling manager tsib16060 may integrate signaling information received through several paths. Signaling information received through a DP for signaling tsib16070 to be described below may be integrated in the signaling manager tsib16060. The signaling manager tsib16060 may deliver signaling information necessary for each part in the link layer. For example, the signaling manager tsib16060 may deliver context information, etc. for recovery of a packet to the overhead processing part. In addition, the signaling manager tsib16060 may deliver signaling information for control to a scheduler tsib16020.

General signaling information, which is not received through a separate particular channel, may be received through the DP for signaling tsib16070. Here, the DP for signaling may refer to PLS, L1, etc. Here, the DP may be referred to as a PLP. A reception buffer tsib16080 may function as a buffer that receives signaling information delivered from the DP for signaling. In a decapsulation block for signaling information tsib16090, the received signaling information may be decapsulated. The decapsulated signaling information may be delivered to the signaling manager tsib16060 through a decapsulation buffer tsib16100. As described in the foregoing, the signaling manager tsib16060 may collate signaling information, and deliver the collated signaling information to a necessary part in the link layer.

The scheduler tsib16020 may determine and control operations of several modules included in the link layer. The scheduler tsib16020 may control each part of the link layer using receiver information tsib16010 and/or information delivered from the signaling manager tsib16060. In addition, the scheduler tsib16020 may determine an operation mode, etc. of each part. Here, the receiver information tsib16010 may refer to information previously stored in the receiver. The scheduler tsib16020 may use information changed by a user such as channel switching, etc. to perform a control operation.

The decapsulation part may filter a packet received from a DP tsib16110 of the physical layer, and separate a packet according to a type of the packet. It is possible to configure decapsulation parts corresponding to the number of DPs that can be simultaneously decoded in the physical layer.

The decapsulation buffer tsib16100 may function as a buffer that receives a packet stream from the physical layer to perform decapsulation. A decapsulation controller tsib16130 may determine whether to decapsulate an input packet stream. When decapsulation is performed, the packet stream may be delivered to a link layer header parser tsib16140. When decapsulation is not performed, the packet stream may be delivered to an output buffer tsib16220. The signaling information received from the scheduler tsib16020 may be used to determine whether to perform decapsulation.

The link layer header parser tsib16140 may identify a header of the delivered link layer packet. It is possible to identify a configuration of an IP packet included in a payload of the link layer packet by identifying the header. For example, the IP packet may be segmented or concatenated.

A packet configuration table tsib16150 may include payload information of segmented and/or concatenated link layer packets. The transmitter and the receiver may have the same information in the packet configuration table tsib16150. The transmitter and the receiver may refer to the information of the packet configuration table tsib16150. It is possible to find a value necessary for reassembly based on index information included in the link layer packet.

A reassembly block tsib16160 may configure payloads of the segmented and/or concatenated link layer packets as packets of an original IP stream. Segments may be collected and reconfigured as one IP packet, or concatenated packets may be separated and reconfigured as a plurality of IP packet streams. Recombined IP packets may be delivered to the overhead processing part.

The overhead processing part may perform an operation of restoring a packet subjected to overhead reduction to an original packet as a reverse operation of overhead reduction performed in the transmitter. This operation may be referred to as overhead processing. It is possible to configure overhead processing parts corresponding to the number of DPs that can be simultaneously decoded in the physical layer.

A packet recovery buffer tsib16170 may function as a buffer that receives a decapsulated RoHC packet or IP packet to perform overhead processing.

An overhead controller tsib16180 may determine whether to recover and/or decompress the decapsulated packet. When recovery and/or decompression are performed, the packet may be delivered to a packet stream recovery block tsib16190. When recovery and/or decompression are not performed, the packet may be delivered to the output buffer tsib16220. Whether to perform recovery and/or decompression may be determined based on the signaling information delivered by the scheduler tsib16020.

The packet stream recovery block tsib16190 may perform an operation of integrating a packet stream separated from the transmitter with context information of the packet stream. This operation may be a process of restoring a packet stream such that an RoHC decompressor tsib16210 can perform processing. In this process, it is possible to receive signaling information and/or context information from a signaling and/or context controller tsib16200. The signaling and/or context controller tsib16200 may determine signaling information delivered from the transmitter, and deliver the signaling information to the packet stream recovery block tsib16190 such that the signaling information may be mapped to a stream corresponding to a context ID.

The RoHC decompressor tsib16210 may restore headers of packets of the packet stream. The packets of the packet stream may be restored to forms of original IP packets through restoration of the headers. In other words, the RoHC decompressor tsib16210 may perform overhead processing.

The output buffer tsib16220 may function as a buffer before an output stream is delivered to an IP layer tsib16230.

The link layers of the transmitter and the receiver proposed in the present invention may include the blocks or modules described above. In this way, the link layer may independently operate irrespective of an upper layer and a lower layer, overhead reduction may be efficiently performed, and a supportable function according to an upper/lower layer may be easily defined/added/deleted.

Figure 17:
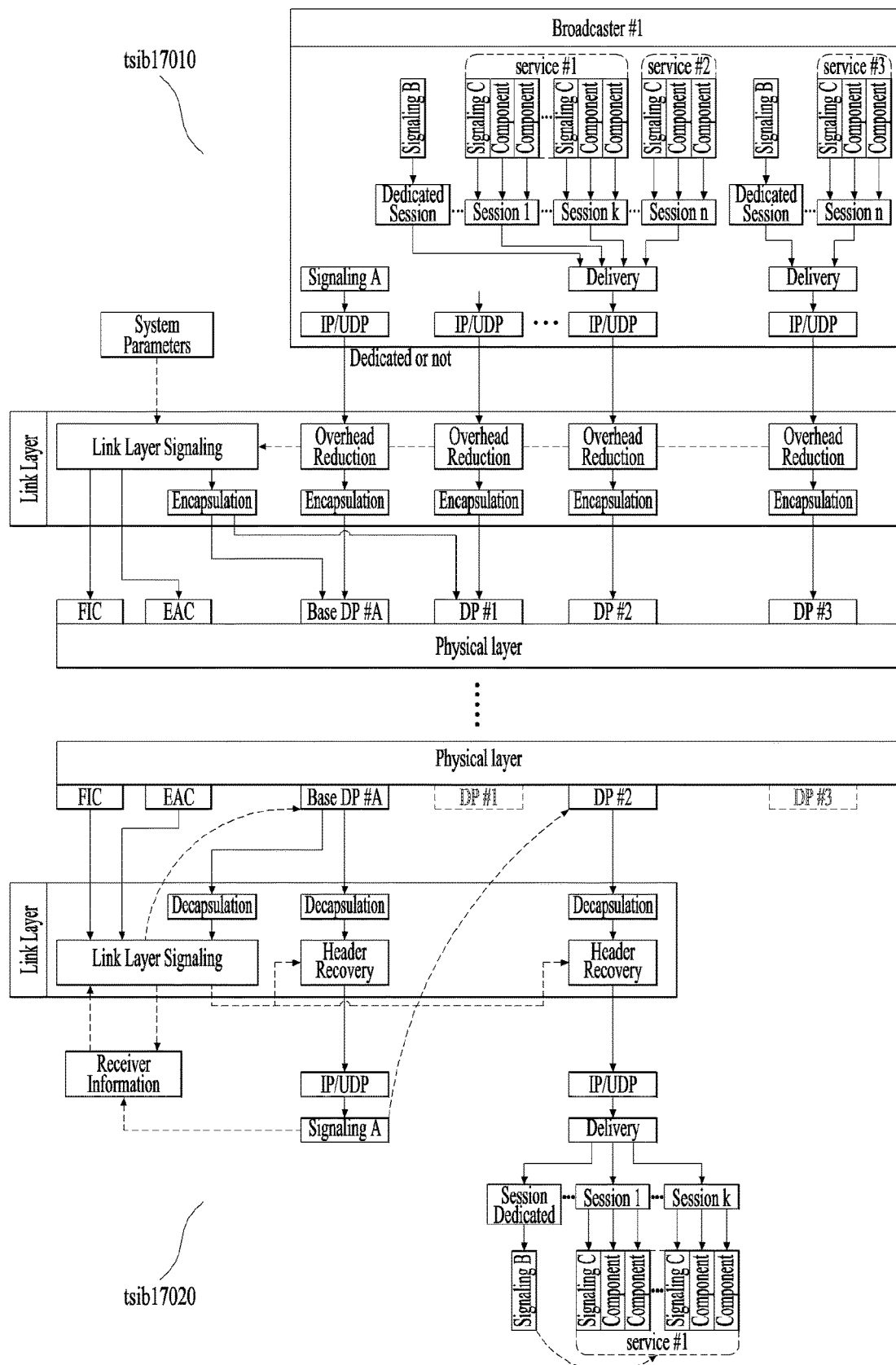
FIG. 17 illustrates a configuration of signaling transmission through a link layer according to an embodiment of the present invention (transmitting/receiving sides)

FIG. 17 illustrates a configuration of signaling transmission through a link layer according to an embodiment of the present invention (transmitting/receiving sides).

In the present invention, a plurality of service providers (broadcasters) may provide services within one frequency band. In addition, a service provider may provide a plurality of services, and one service may include one or more components. It can be considered that the user receives content using a service as a unit.

The present invention presumes that a transmission protocol based on a plurality of sessions is used to support an IP hybrid broadcast. Signaling information delivered through a signaling path may be determined based on a transmission configuration of each protocol. Various names may be applied to respective protocols according to a given embodiment.

In the illustrated data configuration tsib17010 on the transmitting side, service providers (broadcasters) may provide a plurality of services (Service #1, #2, . . . ). In general, a signal for a service may be transmitted through a general transmission session (signaling C). However, the signal may be transmitted through a particular session (dedicated session) according to a given embodiment (signaling B).

Service data and service signaling information may be encapsulated according to a transmission protocol. According to a given embodiment, an IP/UDP layer may be used. According to a given embodiment, a signal in the IP/UDP layer (signaling A) may be additionally provided. This signaling may be omitted.

Data processed using the IP/UDP may be input to the link layer. As described in the foregoing, overhead reduction and/or encapsulation may be performed in the link layer. Here, link layer signaling may be additionally provided. Link layer signaling may include a system parameter, etc. Link layer signaling has been described above.

The service data and the signaling information subjected to the above process may be processed through PLPs in a physical layer. Here, a PLP may be referred to as a DP. The example illustrated in the figure presumes a case in which a base DP/PLP is used. However, depending on embodiments, transmission may be performed using only a general DP/PLP without the base DP/PLP.

In the example illustrated in the figure, a particular channel (dedicated channel) such as an FIC, an EAC, etc. is used. A signal delivered through the FIC may be referred to as a fast information table (FIT), and a signal delivered through the EAC may be referred to as an emergency alert table (EAT). The FIT may be identical to the above-described SLT. The particular channels may not be used depending on embodiments. When the particular channel (dedicated channel) is not configured, the FIT and the EAT may be transmitted using a general link layer signaling transmission scheme, or transmitted using a PLP via the IP/UDP as other service data.

According to a given embodiment, system parameters may include a transmitter-related parameter, a service provider-related parameter, etc. Link layer signaling may include IP header compression-related context information and/or identification information of data to which the context is applied. Signaling of an upper layer may include an IP address, a UDP number, service/component information, emergency alert-related information, an IP/UDP address for service signaling, a session ID, etc. Detailed examples thereof have been described above.

In the illustrated data configuration tsib17020 on the receiving side, the receiver may decode only a PLP for a corresponding service using signaling information without having to decode all PLPs.

First, when the user selects or changes a service desired to be received, the receiver may be tuned to a corresponding frequency and may read receiver information related to a corresponding channel stored in a DB, etc. The information stored in the DB, etc. of the receiver may be configured by reading an SLT at the time of initial channel scan.

After receiving the SLT and the information about the corresponding channel, information previously stored in the DB is updated, and information about a transmission path of the service selected by the user and information about a path, through which component information is acquired or a signal necessary to acquire the information is transmitted, are acquired. When the information is not determined to be changed using version information of the SLT, decoding or parsing may be omitted.

The receiver may verify whether SLT information is included in a PLP by parsing physical signaling of the PLP in a corresponding broadcast stream (not illustrated), which may be indicated through a particular field of physical signaling. It is possible to access a position at which a service layer signal of a particular service is transmitted by accessing the SLT information. The service layer signal may be encapsulated into the IP/UDP and delivered through a transmission session. It is possible to acquire information about a component included in the service using this service layer signaling. A specific SLT-SLS configuration is as described above.

In other words, it is possible to acquire transmission path information, for receiving upper layer signaling information (service signaling information) necessary to receive the service, corresponding to one of several packet streams and PLPs currently transmitted on a channel using the SLT. The transmission path information may include an IP address, a UDP port number, a session ID, a PLP ID, etc. Here, depending on embodiments, a value previously designated by the IANA or a system may be used as an IP/UDP address. The information may be acquired using a scheme of accessing a DB or a shared memory, etc.

When the link layer signal and service data are transmitted through the same PLP, or only one PLP is operated, service data delivered through the PLP may be temporarily stored in a device such as a buffer, etc. while the link layer signal is decoded.

It is possible to acquire information about a path through which the service is actually transmitted using service signaling information of a service to be received. In addition, a received packet stream may be subjected to decapsulation and header recovery using information such as overhead reduction for a PLP to be received, etc.

In the illustrated example (tsib17020), the FIC and the EAC are used, and a concept of the base DP/PLP is presumed. As described in the foregoing, concepts of the FIC, the EAC, and the base DP/PLP may not be used.

While MISO or MIMO uses two antennas in the following for convenience of description, the present invention is applicable to systems using two or more antennas. The present invention proposes a physical profile (or system) optimized to minimize receiver complexity while attaining the performance required for a particular use case. Physical (PHY) profiles (base, handheld and advanced profiles) according to an embodiment of the present invention are subsets of all configurations that a corresponding receiver should implement. The PHY profiles share most of the functional blocks but differ slightly in specific blocks and/or parameters. For the system evolution, future profiles may also be multiplexed with existing profiles in a single radio frequency (RF) channel through a future extension frame (FEF). The base profile and the handheld profile according to the embodiment of the present invention refer to profiles to which MIMO is not applied, and the advanced profile refers to a profile to which MIMO is applied. The base profile may be used as a profile for both the terrestrial broadcast service and the mobile broadcast service. That is, the base profile may be used to define a concept of a profile which includes the mobile profile. In addition, the advanced profile may be divided into an advanced profile for a base profile with MIMO and an advanced profile for a handheld profile with MIMO. Moreover, the profiles may be changed according to intention of the designer.

The following terms and definitions may be applied to the present invention. The following terms and definitions may be changed according to design.

Auxiliary stream: sequence of cells carrying data of as yet undefined modulation and coding, which may be used for future extensions or as required by broadcasters or network operators Base data pipe: data pipe that carries service signaling data Baseband frame (or BBFRAME): set of Kbch bits which form the input to one FEC encoding process (BCH and LDPC encoding)

Cell: modulation value that is carried by one carrier of orthogonal frequency division multiplexing (OFDM) transmission Coded block: LDPC-encoded block of PLS1 data or one of the LDPC-encoded blocks of PLS2 data Data pipe: logical channel in the physical layer that carries service data or related metadata, which may carry one or a plurality of service(s) or service component(s).

Data pipe unit (DPU): a basic unit for allocating data cells to a DP in a frame.

Data symbol: OFDM symbol in a frame which is not a preamble symbol (the data symbol encompasses the frame signaling symbol and frame edge symbol)

DP_ID: this 8-bit field identifies uniquely a DP within the system identified by the SYSTEM_ID Dummy cell: cell carrying a pseudo-random value used to fill the remaining capacity not used for PLS signaling, DPs or auxiliary streams Emergency alert channel (EAC): part of a frame that carries EAS information data Frame: physical layer time slot that starts with a preamble and ends with a frame edge symbol Frame repetition unit: a set of frames belonging to the same or different physical layer profiles including an FEF, which is repeated eight times in a superframe Fast information channel (FIC): a logical channel in a frame that carries mapping information between a service and the corresponding base DP FECBLOCK: set of LDPC-encoded bits of DP data FFT size: nominal FFT size used for a particular mode, equal to the active symbol period Ts expressed in cycles of an elementary period T Frame signaling symbol: OFDM symbol with higher pilot density used at the start of a frame in certain combinations of FFT size, guard interval and scattered pilot pattern, which carries a part of the PLS data Frame edge symbol: OFDM symbol with higher pilot density used at the end of a frame in certain combinations of FFT size, guard interval and scattered pilot pattern Frame group: the set of all frames having the same PHY profile type in a superframe Future extension frame: physical layer time slot within the superframe that may be used for future extension, which starts with a preamble Futurecast UTB system: proposed physical layer broadcast system, the input of which is one or more MPEG2-TS, IP or general stream(s) and the output of which is an RF signal Input stream: a stream of data for an ensemble of services delivered to the end users by the system Normal data symbol: data symbol excluding the frame signaling symbol and the frame edge symbol PHY profile: subset of all configurations that a corresponding receiver should implement PLS: physical layer signaling data including PLS1 and PLS2

PLS1: a first set of PLS data carried in a frame signaling symbol (FSS) having a fixed size, coding and modulation, which carries basic information about a system as well as parameters needed to decode PLS2

NOTE: PLS1 data remains constant for the duration of a frame group

PLS2: a second set of PLS data transmitted in the FSS, which carries more detailed PLS data about the system and the DPs PLS2 dynamic data: PLS2 data that dynamically changes frame-by-frame PLS2 static data: PLS2 data that remains static for the duration of a frame group Preamble signaling data: signaling data carried by the preamble symbol and used to identify the basic mode of the system Preamble symbol: fixed-length pilot symbol that carries basic PLS data and is located at the beginning of a frame The preamble symbol is mainly used for fast initial band scan to detect the system signal, timing thereof, frequency offset, and FFT size.

Reserved for future use: not defined by the present document but may be defined in future Superframe: set of eight frame repetition units Time interleaving block (TI block): set of cells within which time interleaving is carried out, corresponding to one use of a time interleaver memory TI group: unit over which dynamic capacity allocation for a particular DP is carried out, made up of an integer, dynamically varying number of XFECBLOCKs NOTE: The TI group may be mapped directly to one frame or may be mapped to a plurality of frames. The TI group may contain one or more TI blocks.

Figure 18:
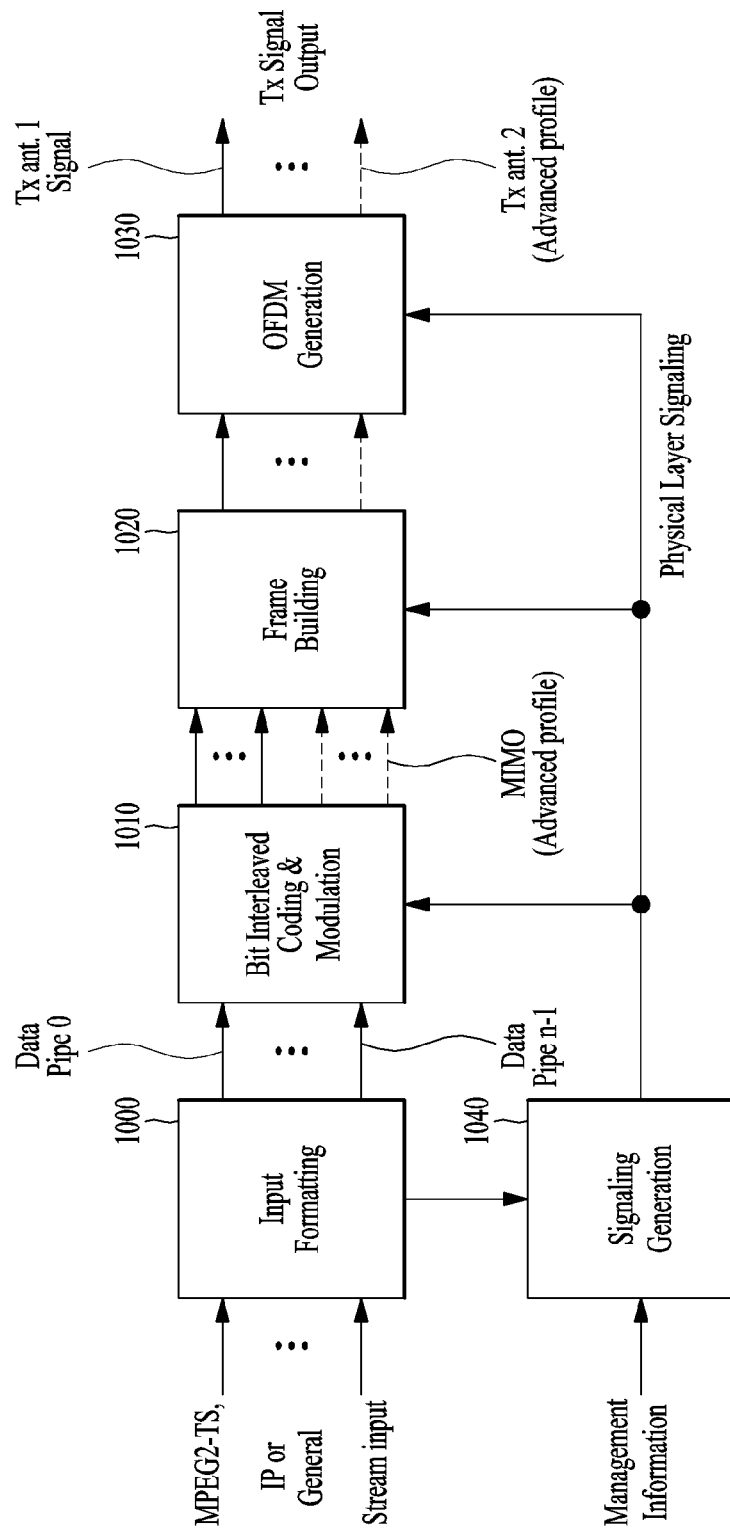
FIG. 18 is a block diagram illustrating a configuration of a broadcast signal transmission apparatus for future broadcast services according to an embodiment of the present invention.

Type 1 DP: DP of a frame where all DPs are mapped to the frame in time division multiplexing (TDM) scheme Type 2 DP: DP of a frame where all DPs are mapped to the frame in frequency division multiplexing (FDM) scheme XFECBLOCK: set of $N_{cells}$ cells carrying all the bits of one LDPC FECBLOCK FIG. 18 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams. In addition to these data inputs, management information is input to control scheduling and allocation of the corresponding bandwidth for each input stream. In addition, the present invention allows simultaneous input of one or a plurality of TS streams, IP stream(s) and/or a general stream(s).

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

In addition, a DPU is a basic unit for allocating data cells to a DP in one frame.

An input to the physical layer may include one or a plurality of data streams. Each of the data streams is delivered by one DP. The input formatting block 1000 may covert a data stream input through one or more physical paths (or DPs) into a baseband frame (BBF). In this case, the input formatting block 1000 may perform null packet deletion or header compression on input data (a TS or IP input stream) in order to enhance transmission efficiency. A receiver may have a priori information for a particular part of a header, and thus this known information may be deleted from a transmitter. A null packet deletion block 3030 may be used only for a TS input stream.

In the BICM block 1010, parity data is added for error correction and encoded bit streams are mapped to complex-value constellation symbols. The symbols are interleaved across a specific interleaving depth that is used for the corresponding DP. For the advanced profile, MIMO encoding is performed in the BICM block 1010 and an additional data path is added at the output for MIMO transmission.

The frame building block 1020 may map the data cells of the input DPs into the OFDM symbols within a frame, and perform frequency interleaving for frequency-domain diversity, especially to combat frequency-selective fading channels. The frame building block 1020 may include a delay compensation block, a cell mapper and a frequency interleaver.

The delay compensation block may adjust timing between DPs and corresponding PLS data to ensure that the DPs and the corresponding PLS data are co-timed at a transmitter side. The PLS data is delayed by the same amount as the data pipes by addressing the delays of data pipes caused by the input formatting block and BICM block. The delay of the BICM block is mainly due to the time interleaver. In-band signaling data carries information of the next TI group so that the information is carried one frame ahead of the DPs to be signaled. The delay compensation block delays in-band signaling data accordingly.

The cell mapper may map PLS, DPs, auxiliary streams, dummy cells, etc. to active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. A basic function of the cell mapper is to map a data cell generated by time interleaving for each DP and PLS cell to an array of active OFDM cells (if present) corresponding to respective OFDM symbols in one frame. Service signaling data (such as program specific information (PSI)/SI) may be separately gathered and sent by a DP. The cell mapper operates according to dynamic information produced by a scheduler and the configuration of a frame structure. The frequency interleaver may randomly interleave data cells received from the cell mapper to provide frequency diversity. In addition, the frequency interleaver may operate on an OFDM symbol pair including two sequential OFDM symbols using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

Specifically, after inserting a preamble at the beginning of each frame, the OFDM generation block 1030 may apply conventional OFDM modulation having a cyclic prefix as a guard interval. For antenna space diversity, a distributed MISO scheme is applied across transmitters. In addition, a PAPR scheme is performed in the time domain. For flexible network planning, the present invention provides a set of various FFT sizes, guard interval lengths and corresponding pilot patterns.

In addition, the present invention may multiplex signals of a plurality of broadcast transmission/reception systems in the time domain such that data of two or more different broadcast transmission/reception systems providing broadcast services may be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

The signaling generation block 1040 may create physical layer signaling information used for an operation of each functional block. This signaling information is also transmitted so that services of interest are properly recovered at a receiver side. Signaling information according to an embodiment of the present invention may include PLS data. PLS provides the receiver with a means to access physical layer DPs. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group.

The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame. Details of the PLS data will be described later.

The above-described blocks may be omitted or replaced by blocks having similar or identical functions.

Figure 19:
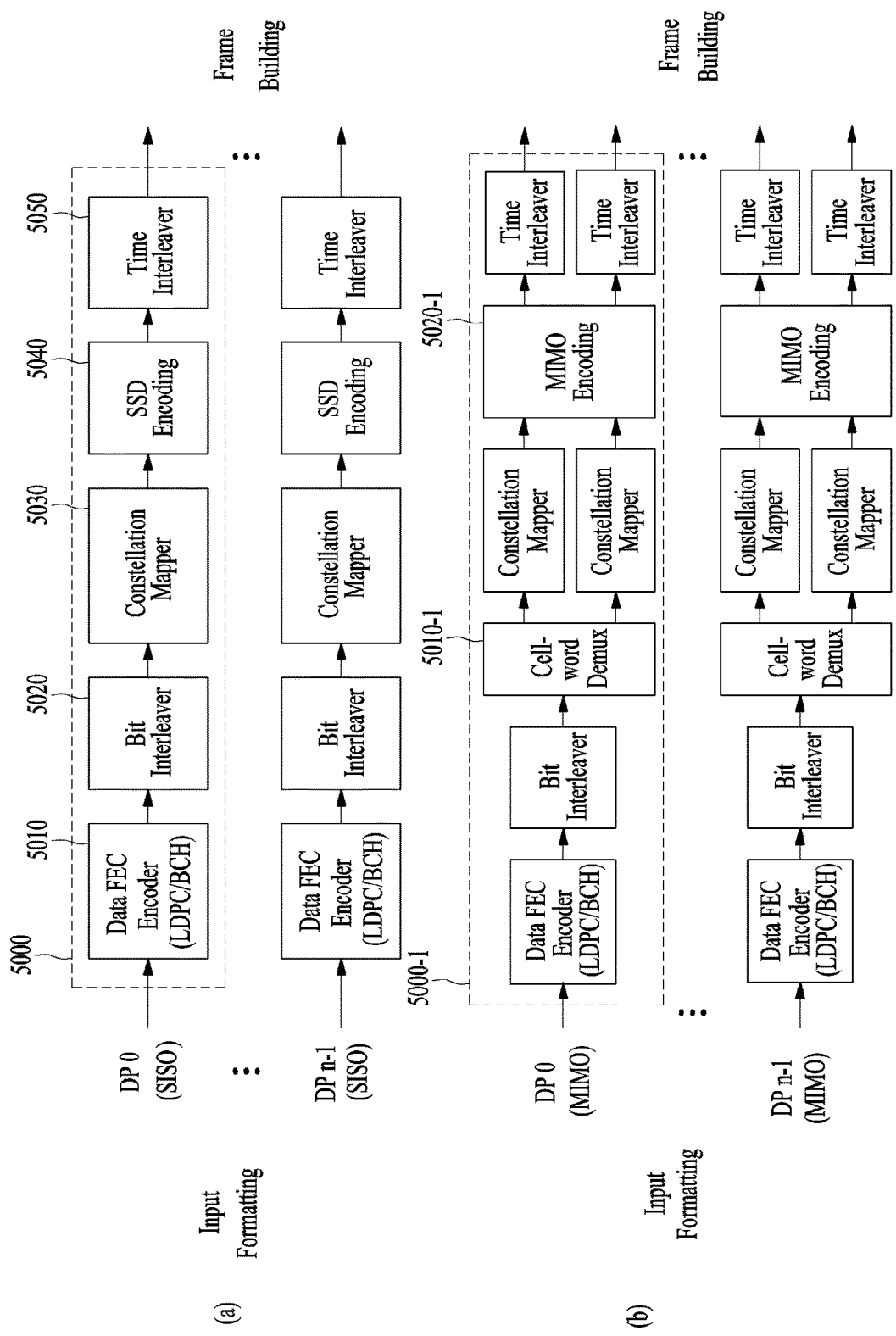
FIG. 19 is a block diagram illustrating a bit interleaved coding & modulation (BICM) block according to an embodiment of the present invention.

FIG. 19 illustrates a BICM block according to an embodiment of the present invention.

The BICM block illustrated in FIG. 19 corresponds to an embodiment of the BICM block 1010 described with reference to FIG. 18.

As described above, the broadcast signal transmission apparatus for future broadcast services according to the embodiment of the present invention may provide a terrestrial broadcast service, mobile broadcast service, UHDTV service, etc.

Since QoS depends on characteristics of a service provided by the broadcast signal transmission apparatus for future broadcast services according to the embodiment of the present invention, data corresponding to respective services needs to be processed using different schemes. Accordingly, the BICM block according to the embodiment of the present invention may independently process respective DPs by independently applying SISO, MISO and MIMO schemes to data pipes respectively corresponding to data paths. Consequently, the broadcast signal transmission apparatus for future broadcast services according to the embodiment of the present invention may control QoS for each service or service component transmitted through each DP.

(a) shows a BICM block applied to a profile (or system) to which MIMO is not applied, and (b) shows a BICM block of a profile (or system) to which MIMO is applied.

The BICM block to which MIMO is not applied and the BICM block to which MIMO is applied may include a plurality of processing blocks for processing each DP.

Description will be given of each processing block of the BICM block to which MIMO is not applied and the BICM block to which MIMO is applied.

A processing block 5000 of the BICM block to which MIMO is not applied may include a data FEC encoder 5010, a bit interleaver 5020, a constellation mapper 5030, a signal space diversity (SSD) encoding block 5040 and a time interleaver 5050.

The data FEC encoder 5010 performs FEC encoding on an input BBF to generate FECBLOCK procedure using outer coding (BCH) and inner coding (LDPC). The outer coding (BCH) is optional coding method. A detailed operation of the data FEC encoder 5010 will be described later.

The bit interleaver 5020 may interleave outputs of the data FEC encoder 5010 to achieve optimized performance with a combination of LDPC codes and a modulation scheme while providing an efficiently implementable structure. A detailed operation of the bit interleaver 5020 will be described later.

The constellation mapper 5030 may modulate each cell word from the bit interleaver 5020 in the base and the handheld profiles, or each cell word from the cell-word demultiplexer 5010-1 in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point, $e_1$. This constellation mapping is applied only for DPs. It is observed that QAM-16 and NUQs are square shaped, while NUCs have arbitrary shapes. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in the PLS2 data.

The time interleaver 5050 may operates at a DP level. Parameters of time interleaving (TI) may be set differently for each DP. A detailed operation of the time interleaver 5050 will be described later.

A processing block 5000-1 of the BICM block to which MIMO is applied may include the data FEC encoder, the bit interleaver, the constellation mapper, and the time interleaver.

However, the processing block 5000-1 is distinguished from the processing block 5000 of the BICM block to which MIMO is not applied in that the processing block 5000-1 further includes a cell-word demultiplexer 5010-1 and a MIMO encoding block 5020-1.

In addition, operations of the data FEC encoder, the bit interleaver, the constellation mapper, and the time interleaver in the processing block 5000-1 correspond to those of the data FEC encoder 5010, the bit interleaver 5020, the constellation mapper 5030, and the time interleaver 5050 described above, and thus description thereof is omitted.

The cell-word demultiplexer 5010-1 is used for a DP of the advanced profile to divide a single cell-word stream into dual cell-word streams for MIMO processing.

The MIMO encoding block 5020-1 may process an output of the cell-word demultiplexer 5010-1 using a MIMO encoding scheme. The MIMO encoding scheme is optimized for broadcast signal transmission. MIMO technology is a promising way to obtain a capacity increase but depends on channel characteristics. Especially for broadcasting, a strong LOS component of a channel or a difference in received signal power between two antennas caused by different signal propagation characteristics makes it difficult to obtain capacity gain from MIMO. The proposed MIMO encoding scheme overcomes this problem using rotation-based precoding and phase randomization of one of MIMO output signals.

MIMO encoding is intended for a 2x2 MIMO system requiring at least two antennas at both the transmitter and the receiver. A MIMO encoding mode of the present invention may be defined as full-rate spatial multiplexing (FR-SM). FR-SM encoding may provide capacity increase with relatively small complexity increase at the receiver side. In addition, the MIMO encoding scheme of the present invention has no restriction on an antenna polarity configuration.

MIMO processing is applied at the DP level. NUQ ($e_{1,i}$ and $e_{2,i}$) corresponding to a pair of constellation mapper outputs is fed to an input of a MIMO encoder. Paired MIMO encoder output (g1,$i$ and g2,$i$) is transmitted by the same carrier k and OFDM symbol 1 of respective TX antennas thereof.

The above-described blocks may be omitted or replaced by blocks having similar or identical functions.

Figure 20:
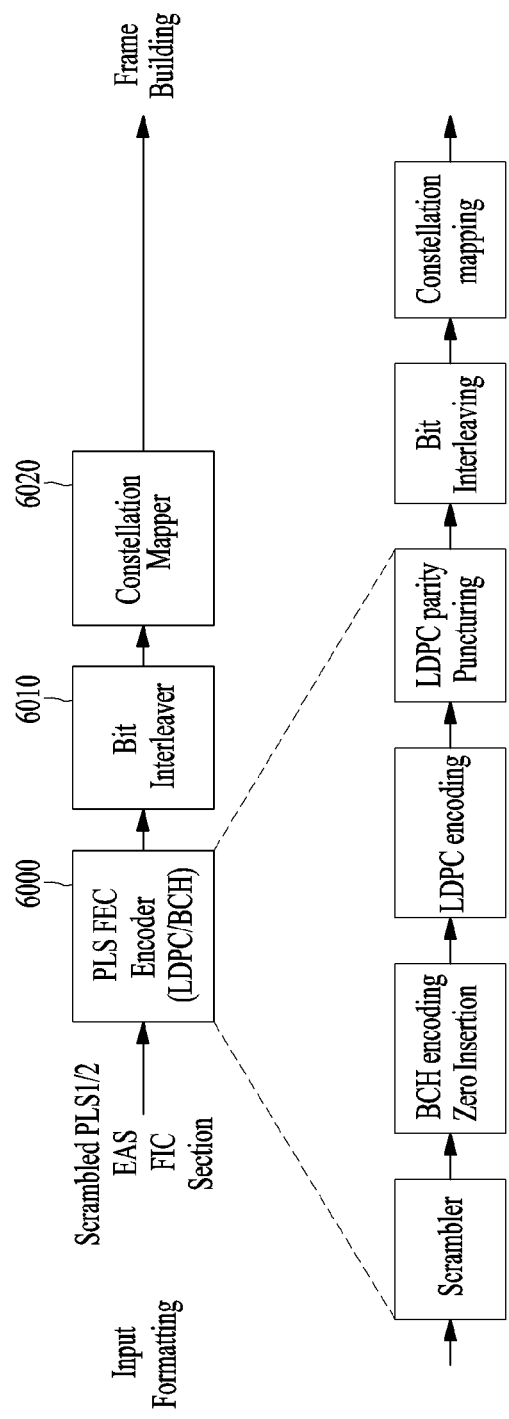
FIG. 20 is a block diagram illustrating a BICM block according to another embodiment of the present invention.

FIG. 20 illustrates a BICM block according to another embodiment of the present invention.

The BICM block illustrated in FIG. 20 corresponds to another embodiment of the BICM block 1010 described with reference to FIG. 18.

FIG. 20 illustrates a BICM block for protection of physical layer signaling (PLS), an emergency alert channel (EAC) and a fast information channel (FIC). The EAC is a part of a frame that carries EAS information data, and the FIC is a logical channel in a frame that carries mapping information between a service and a corresponding base DP. Details of the EAC and FIC will be described later.

Referring to FIG. 20, the BICM block for protection of the PLS, the EAC and the FIC may include a PLS FEC encoder 6000, a bit interleaver 6010 and a constellation mapper 6020.

In addition, the PLS FEC encoder 6000 may include a scrambler, a BCH encoding/zero insertion block, an LDPC encoding block and an LDPC parity puncturing block. Description will be given of each block of the BICM block.

The PLS FEC encoder 6000 may encode scrambled PLS ½ data, EAC and FIC sections.

The scrambler may scramble PLS1 data and PLS2 data before BCH encoding and shortened and punctured LDPC encoding.

The BCH encoding/zero insertion block may perform outer encoding on the scrambled PLS ½ data using a shortened BCH code for PLS protection, and insert zero bits after BCH encoding. For PLS1 data only, output bits of zero insertion may be permutted before LDPC encoding.

The LDPC encoding block may encode an output of the BCH encoding/zero insertion block using an LDPC code. To generate a complete coded block, $C_{ldpc}$ and parity bits $P_{ldpc}$ are encoded systematically from each zero-inserted PLS information block $I_{ldpc}$ and appended thereto.

$$C_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Equation 1]

The LDPC parity puncturing block may perform puncturing on the PLS1 data and the PLS2 data.

When shortening is applied to PLS1 data protection, some LDPC parity bits are punctured after LDPC encoding. In addition, for PLS2 data protection, LDPC parity bits of PLS2 are punctured after LDPC encoding. These punctured bits are not transmitted.

The bit interleaver 6010 may interleave each of shortened and punctured PLS1 data and PLS2 data.

The constellation mapper 6020 may map the bit-interleaved PLS1 data and PLS2 data to constellations.

The above-described blocks may be omitted or replaced by blocks having similar or identical functions.

Figure 21:
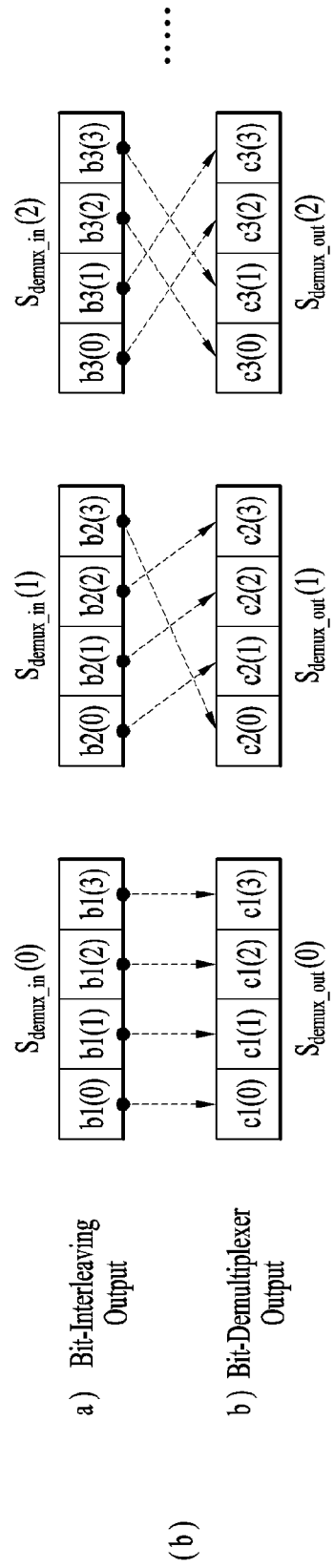
FIG. 21 illustrates a bit interleaving process of physical layer signaling (PLS) according to an embodiment of the present invention.

FIG. 21 illustrates a bit interleaving process of PLS according to an embodiment of the present invention.

Figure 22:
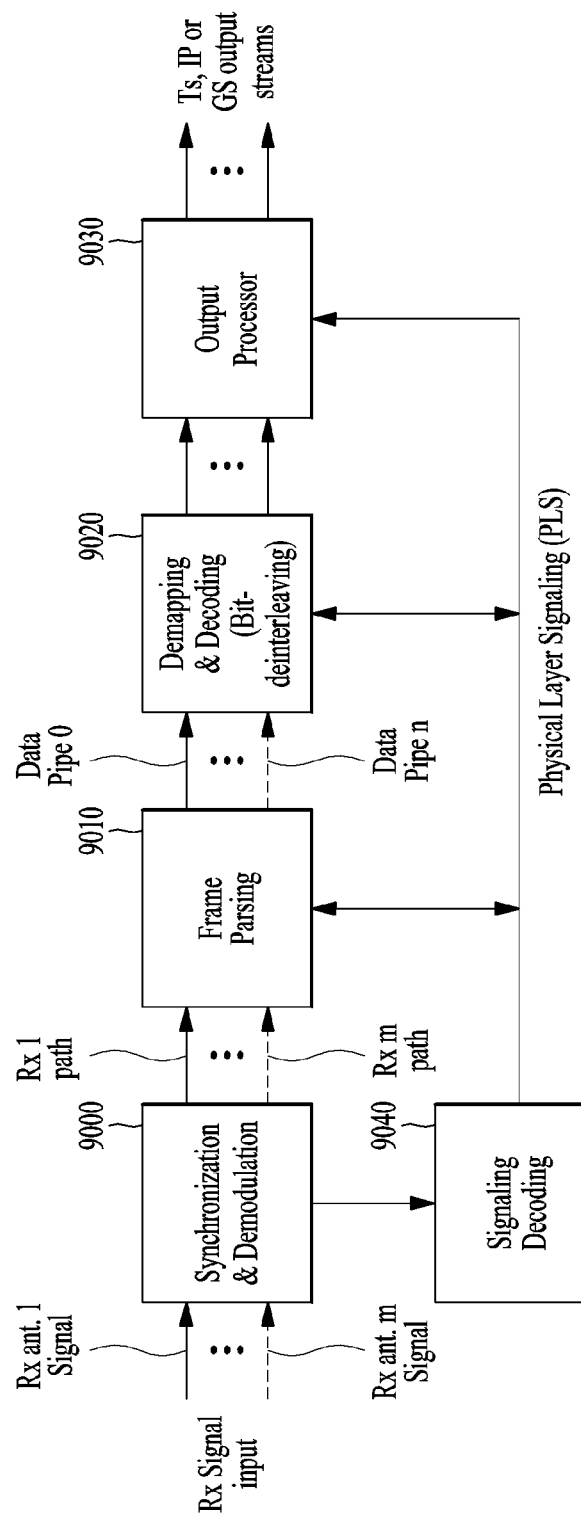
FIG. 22 is a block diagram illustrating a configuration of a broadcast signal reception apparatus for future broadcast services according to an embodiment of the present invention.

Each shortened and punctured PLS1 and PLS2 coded block is interleaved bit-by-bit as described in FIG. 22. Each block of additional parity bits is interleaved with the same block interleaving structure but separately.

In the case of BPSK, there are two branches for bit interleaving to duplicate FEC coded bits in the real and imaginary parts. Each coded block is written to the upper branch first. The bits are mapped to the lower branch by applying modulo $N_{FEC}$ addition with cyclic shifting value floor($N_{FEC}/2$), where $N_{FEC}$ is the length of each LDPC coded block after shortening and puncturing.

In other modulation cases, such as QSPK, QAM-16 and NUQ-64, FEC coded bits are written serially into the interleaver column-wise, where the number of columns is the same as the modulation order.

In the read operation, the bits for one constellation symbol are read out sequentially row-wise and fed into the bit demultiplexer block. These operations are continued until the end of the column Each bit interleaved group is demultiplexed bit-by-bit in a group before constellation mapping. Depending on modulation order, there are two mapping rules. In the case of BPSK and QPSK, the reliability of bits in a symbol is equal. Therefore, the bit group read out from the bit interleaving block is mapped to a QAM symbol without any operation.

In the cases of QAM-16 and NUQ-64 mapped to a QAM symbol, the rule of operation is described in FIG. 23(a). As shown in FIG. 23(a), i is bit group index corresponding to column index in bit interleaving.

FIG. 21 shows the bit demultiplexing rule for QAM-16. This operation continues until all bit groups are read from the bit interleaving block.

FIG. 22 illustrates a configuration of a broadcast signal reception apparatus for future broadcast services according to an embodiment of the present invention.

The broadcast signal reception apparatus for future broadcast services according to the embodiment of the present invention may correspond to the broadcast signal transmission apparatus for future broadcast services described with reference to FIG. 18.

The broadcast signal reception apparatus for future broadcast services according to the embodiment of the present invention may include a synchronization & demodulation module 9000, a frame parsing module 9010, a demapping & decoding module 9020, an output processor 9030 and a signaling decoding module 9040. A description will be given of operation of each module of the broadcast signal reception apparatus.

The synchronization & demodulation module 9000 may receive input signals through m Rx antennas, perform signal detection and synchronization with respect to a system corresponding to the broadcast signal reception apparatus, and carry out demodulation corresponding to a reverse procedure of a procedure performed by the broadcast signal transmission apparatus.

The frame parsing module 9010 may parse input signal frames and extract data through which a service selected by a user is transmitted. If the broadcast signal transmission apparatus performs interleaving, the frame parsing module 9010 may carry out deinterleaving corresponding to a reverse procedure of interleaving. In this case, positions of a signal and data that need to be extracted may be obtained by decoding data output from the signaling decoding module 9040 to restore scheduling information generated by the broadcast signal transmission apparatus.

The demapping & decoding module 9020 may convert input signals into bit domain data and then deinterleave the same as necessary. The demapping & decoding module 9020 may perform demapping of mapping applied for transmission efficiency and correct an error generated on a transmission channel through decoding. In this case, the demapping & decoding module 9020 may obtain transmission parameters necessary for demapping and decoding by decoding data output from the signaling decoding module 9040.

The output processor 9030 may perform reverse procedures of various compression/signal processing procedures which are applied by the broadcast signal transmission apparatus to improve transmission efficiency. In this case, the output processor 9030 may acquire necessary control information from data output from the signaling decoding module 9040. An output of the output processor 9030 corresponds to a signal input to the broadcast signal transmission apparatus and may be MPEG-TSs, IP streams (v4 or v6) and generic streams.

The signaling decoding module 9040 may obtain PLS information from a signal demodulated by the synchronization & demodulation module 9000. As described above, the frame parsing module 9010, the demapping & decoding module 9020 and the output processor 9030 may execute functions thereof using data output from the signaling decoding module 9040.

A frame according to an embodiment of the present invention is further divided into a number of OFDM symbols and a preamble. As shown in (d), the frame includes a preamble, one or more frame signaling symbols (FSSs), normal data symbols and a frame edge symbol (FES).

The preamble is a special symbol that enables fast futurecast UTB system signal detection and provides a set of basic transmission parameters for efficient transmission and reception of a signal. Details of the preamble will be described later.

A main purpose of the FSS is to carry PLS data. For fast synchronization and channel estimation, and hence fast decoding of PLS data, the FSS has a dense pilot pattern than a normal data symbol. The FES has exactly the same pilots as the FSS, which enables frequency-only interpolation within the FES and temporal interpolation, without extrapolation, for symbols immediately preceding the FES.

Figure 23:
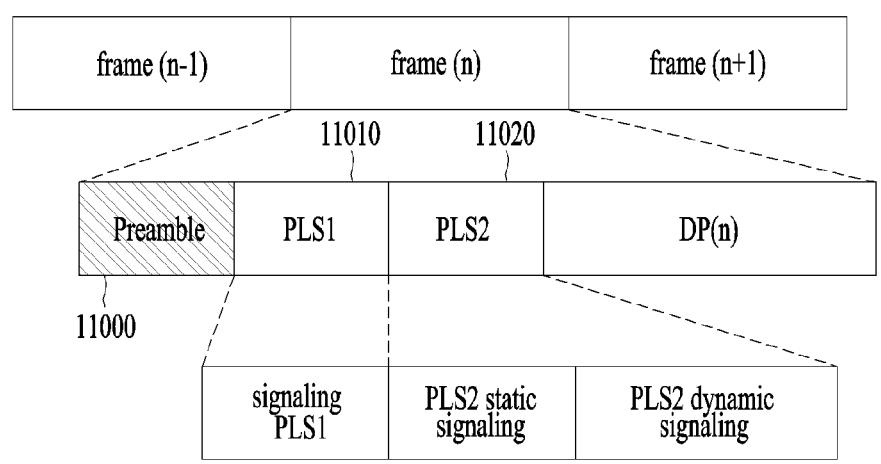
FIG. 23 illustrates a signaling hierarchy structure of a frame according to an embodiment of the present invention.

FIG. 23 illustrates a signaling hierarchy structure of a frame according to an embodiment of the present invention.

FIG. 23 illustrates the signaling hierarchy structure, which is split into three main parts corresponding to preamble signaling data 11000, PLS1 data 11010 and PLS2 data 11020. A purpose of a preamble, which is carried by a preamble symbol in every frame, is to indicate a transmission type and basic transmission parameters of the frame. PLS1 enables the receiver to access and decode the PLS2 data, which contains the parameters to access a DP of interest. PLS2 is carried in every frame and split into two main parts corresponding to PLS2-STAT data and PLS2-DYN data. Static and dynamic portions of PLS2 data are followed by padding, if necessary.

Preamble signaling data according to an embodiment of the present invention carries 21 bits of information that are needed to enable the receiver to access PLS data and trace DPs within the frame structure. Details of the preamble signaling data are as follows.

FFT_SIZE: This 2-bit field indicates an FFT size of a current frame within a frame group as described in the following Table 1.

TABLE 1

| Value | FFT size |
|---|---|
| 00 | 8K FFT |
| 01 | 16K FFT |

TABLE 1-continued

| Value | FFT size |
|-------|----------|
| 10    | 32K FFT  |
| 11    | Reserved |

GI_FRACTION: This 3-bit field indicates a guard interval fraction value in a current superframe as described in the following Table 2.

TABLE 2

| Value      | GI_FRACTION |
|------------|-------------|
| 000        | 1/5         |
| 001        | 1/10        |
| 010        | 1/20        |
| 011        | 1/40        |
| 100        | 1/80        |
| 101        | 1/160       |
| 110 to 111 | Reserved    |

EAC_FLAG: This 1-bit field indicates whether the EAC is provided in a current frame. If this field is set to '1', an emergency alert service (EAS) is provided in the current frame. If this field set to '0', the EAS is not carried in the current frame. This field may be switched dynamically within a superframe.

PILOT_MODE: This 1-bit field indicates whether a pilot mode is a mobile mode or a fixed mode for a current frame in a current frame group. If this field is set to '0', the mobile pilot mode is used. If the field is set to '1', the fixed pilot mode is used.

PAPR_FLAG: This 1-bit field indicates whether PAPR reduction is used for a current frame in a current frame group. If this field is set to a value of '1', tone reservation is used for PAPR reduction. If this field is set to a value of '0', PAPR reduction is not used.

RESERVED: This 7-bit field is reserved for future use.

FIG. 24 illustrates PLS1 data according to an embodiment of the present invention.

PLS1 data provides basic transmission parameters including parameters required to enable reception and decoding of PLS2. As mentioned above, the PLS1 data remain unchanged for the entire duration of one frame group. A detailed definition of the signaling fields of the PLS1 data is as follows.

PREAMBLE_DATA: This 20-bit field is a copy of preamble signaling data excluding EAC_FLAG.

NUM_FRAME_FRU: This 2-bit field indicates the number of the frames per FRU.

PAYLOAD_TYPE: This 3-bit field indicates a format of payload data carried in a frame group. PAYLOAD_TYPE is signaled as shown in Table 3.

TABLE 3

| Value | Payload type          |
|-------|-----------------------|
| 1XX   | TS is transmitted.    |
| X1X   | IP stream is transmitted. |
| XX1   | GS is transmitted.    |

NUM_FSS: This 2-bit field indicates the number of FSSs in a current frame.

SYSTEM_VERSION: This 8-bit field indicates a version of a transmitted signal format. SYSTEM_VERSION is divided into two 4-bit fields: a major version and a minor version.

Major version: The MSB corresponding to four bits of the SYSTEM_VERSION field indicate major version information. A change in the major version field indicates a non-backward-compatible change. A default value is '0000'. For a version described in this standard, a value is set to '0000'.

Minor version: The LSB corresponding to four bits of SYSTEM_VERSION field indicate minor version information. A change in the minor version field is backwards compatible.

CELL_ID: This is a 16-bit field which uniquely identifies a geographic cell in an ATSC network. An ATSC cell coverage area may include one or more frequencies depending on the number of frequencies used per futurecast UTB system. If a value of CELL_ID is not known or unspecified, this field is set to '0'.

NETWORK_ID: This is a 16-bit field which uniquely identifies a current ATSC network.

SYSTEM_ID: This 16-bit field uniquely identifies the futurecast UTB system within the ATSC network. The futurecast UTB system is a terrestrial broadcast system whose input is one or more input streams (TS, IP, GS) and whose output is an RF signal. The futurecast UTB system carries one or more PHY profiles and FEF, if any. The same futurecast UTB system may carry different input streams and use different RFs in different geographical areas, allowing local service insertion. The frame structure and scheduling are controlled in one place and are identical for all transmissions within the futurecast UTB system. One or more futurecast UTB systems may have the same SYSTEM_ID meaning that they all have the same physical layer structure and configuration.

The following loop includes FRU_PHY_PROFILE, FRU_FRAME_LENGTH, FRU_GI_FRACTION, and RESERVED which are used to indicate an FRU configuration and a length of each frame type. A loop size is fixed so that four PHY profiles (including an FEF) are signaled within the FRU. If NUM_FRAME_FRU is less than 4, unused fields are filled with zeros.

FRU_PHY_PROFILE: This 3-bit field indicates a PHY profile type of an $(i+1)^{th}$ (i is a loop index) frame of an associated FRU. This field uses the same signaling format as shown in Table 8.

FRU_FRAME_LENGTH: This 2-bit field indicates a length of an $(i+1)^{th}$ frame of an associated FRU. Using FRU_FRAME_LENGTH together with FRU_GI_FRACTION, an exact value of a frame duration may be obtained.

FRU_GI_FRACTION: This 3-bit field indicates a guard interval fraction value of an $(i+1)^{th}$ frame of an associated FRU. FRU_GI_FRACTION is signaled according to Table 7.

RESERVED: This 4-bit field is reserved for future use.

The following fields provide parameters for decoding the PLS2 data.

PLS2_FEC_TYPE: This 2-bit field indicates an FEC type used by PLS2 protection. The FEC type is signaled according to Table 4. Details of LDPC codes will be described later.

TABLE 4

| Content  | PLS2 FEC type               |
|----------|------------------------------|
| 00       | 4K-1/4 and 7K-3/10 LDPC codes |
| 01 to 11 | Reserved                     |

PLS2_MOD: This 3-bit field indicates a modulation type used by PLS2. The modulation type is signaled according to Table 5.

TABLE 5

| Value | PLS2_MODE |
|---|---|
| 000 | BPSK |
| 001 | QPSK |
| 010 | QAM-16 |
| 011 | NUQ-64 |
| 100 to 111 | Reserved |

PLS2_SIZE_CELL: This 15-bit field indicates $C_{total\_partial\_block}$, a size (specified as the number of QAM cells) of the collection of full coded blocks for PLS2 that is carried in a current frame group. This value is constant during the entire duration of the current frame group.

PLS2_STAT_SIZE_BIT: This 14-bit field indicates a size, in bits, of PLS2-STAT for a current frame group. This value is constant during the entire duration of the current frame group.

PLS2_DYN_SIZE_BIT: This 14-bit field indicates a size, in bits, of PLS2-DYN for a current frame group. This value is constant during the entire duration of the current frame group.

PLS2_REP_FLAG: This 1-bit flag indicates whether a PLS2 repetition mode is used in a current frame group. When this field is set to a value of '1', the PLS2 repetition mode is activated. When this field is set to a value of '0', the PLS2 repetition mode is deactivated.

PLS2_REP_SIZE_CELL: This 15-bit field indicates $C_{total\_partial\_block}$, a size (specified as the number of QAM cells) of the collection of partial coded blocks for PLS2 carried in every frame of a current frame group, when PLS2 repetition is used. If repetition is not used, a value of this field is equal to 0. This value is constant during the entire duration of the current frame group.

PLS2_NEXT_FEC_TYPE: This 2-bit field indicates an FEC type used for PLS2 that is carried in every frame of a next frame group. The FEC type is signaled according to Table 10.

PLS2_NEXT_MOD: This 3-bit field indicates a modulation type used for PLS2 that is carried in every frame of a next frame group. The modulation type is signaled according to Table 11.

PLS2_NEXT_REP_FLAG: This 1-bit flag indicates whether the PLS2 repetition mode is used in a next frame group. When this field is set to a value of '1', the PLS2 repetition mode is activated. When this field is set to a value of '0', the PLS2 repetition mode is deactivated.

PLS2_NEXT_REP_SIZE_CELL: This 15-bit field indicates $C_{total\_full\_block}$, a size (specified as the number of QAM cells) of the collection of full coded blocks for PLS2 that is carried in every frame of a next frame group, when PLS2 repetition is used. If repetition is not used in the next frame group, a value of this field is equal to 0. This value is constant during the entire duration of a current frame group.

PLS2_NEXT_REP_STAT_SIZE_BIT: This 14-bit field indicates a size, in bits, of PLS2-STAT for a next frame group. This value is constant in a current frame group.

PLS2_NEXT_REP_DYN_SIZE_BIT: This 14-bit field indicates the size, in bits, of the PLS2-DYN for a next frame group. This value is constant in a current frame group.

PLS2_AP_MODE: This 2-bit field indicates whether additional parity is provided for PLS2 in a current frame group. This value is constant during the entire duration of the current frame group. Table 6 below provides values of this field. When this field is set to a value of '00', additional parity is not used for the PLS2 in the current frame group.

TABLE 6

| Value | PLS2-AP mode |
|---|---|
| 00 | AP is not provided |
| 01 | AP1 mode |
| 10 to 11 | Reserved |

PLS2_AP_SIZE_CELL: This 15-bit field indicates a size (specified as the number of QAM cells) of additional parity bits of PLS2. This value is constant during the entire duration of a current frame group.

PLS2_NEXT_AP_MODE: This 2-bit field indicates whether additional parity is provided for PLS2 signaling in every frame of a next frame group. This value is constant during the entire duration of a current frame group. Table 12 defines values of this field.

PLS2_NEXT_AP_SIZE_CELL: This 15-bit field indicates a size (specified as the number of QAM cells) of additional parity bits of PLS2 in every frame of a next frame group. This value is constant during the entire duration of a current frame group.

RESERVED: This 32-bit field is reserved for future use.

CRC_32: A 32-bit error detection code, which is applied to all PLS1 signaling.

FIG. 25 illustrates PLS2 data according to an embodiment of the present invention.

FIG. 25 illustrates PLS2-STAT data of the PLS2 data. The PLS2-STAT data is the same within a frame group, while PLS2-DYN data provides information that is specific for a current frame.

Details of fields of the PLS2-STAT data are described below.

FIC_FLAG: This 1-bit field indicates whether the FIC is used in a current frame group. If this field is set to '1', the FIC is provided in the current frame. If this field set to '0', the FIC is not carried in the current frame. This value is constant during the entire duration of a current frame group.

AUX_FLAG: This 1-bit field indicates whether an auxiliary stream is used in a current frame group. If this field is set to '1', the auxiliary stream is provided in a current frame. If this field set to '0', the auxiliary stream is not carried in the current frame. This value is constant during the entire duration of current frame group.

NUM_DP: This 6-bit field indicates the number of DPs carried within a current frame. A value of this field ranges from 1 to 64, and the number of DPs is NUM_DP+1.

DP_ID: This 6-bit field identifies uniquely a DP within a PHY profile.

DP_TYPE: This 3-bit field indicates a type of a DP. This is signaled according to the following Table 7.

TABLE 7

| Value | DP Type |
|---|---|
| 000 | DP Type 1 |
| 001 | DP Type 2 |
| 010 to 111 | Reserved |

DP_GROUP_ID: This 8-bit field identifies a DP group with which a current DP is associated. This may be used by the receiver to access DPs of service components associated with a particular service having the same DP_GROUP_ID.

BASE_DP_ID: This 6-bit field indicates a DP carrying service signaling data (such as PSI/SI) used in a management layer. The DP indicated by BASE_DP_ID may be either a normal DP carrying the service signaling data along with service data or a dedicated DP carrying only the service signaling data.

DP_FEC_TYPE: This 2-bit field indicates an FEC type used by an associated DP. The FEC type is signaled according to the following Table 8.

TABLE 8

| Value | FEC_TYPE |
|---|---|
| 00 | 16K LDPC |
| 01 | 64K LDPC |
| 10 to 11 | Reserved |

DP_COD: This 4-bit field indicates a code rate used by an associated DP. The code rate is signaled according to the following Table 9.

TABLE 9

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001 to 1111 | Reserved |

DP_MOD: This 4-bit field indicates modulation used by an associated DP. The modulation is signaled according to the following Table 10.

TABLE 10

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001 to 1111 | Reserved |

DP_SSD_FLAG: This 1-bit field indicates whether an SSD mode is used in an associated DP. If this field is set to a value of '1', SSD is used. If this field is set to a value of '0', SSD is not used.

The following field appears only if PHY_PROFILE is equal to '010', which indicates the advanced profile:

DP_MIMO: This 3-bit field indicates which type of MIMO encoding process is applied to an associated DP. A type of MIMO encoding process is signaled according to the following Table 11.

TABLE 11

| Value | MIMO encoding |
|---|---|
| 000 | FR-SM |
| 001 | FRFD-SM |
| 010 to 111 | Reserved |

DP_TI_TYPE: This 1-bit field indicates a type of time interleaving. A value of '0' indicates that one TI group corresponds to one frame and contains one or more TI blocks. A value of '1' indicates that one TI group is carried in more than one frame and contains only one TI block.

DP_TI_LENGTH: The use of this 2-bit field (allowed values are only 1, 2, 4, and 8) is determined by values set within the DP_TI_TYPE field as follows.

If DP_TI_TYPE is set to a value of '1', this field indicates $P_I$, the number of frames to which each TI group is mapped, and one TI block is present per TI group ($N_{TI}=1$). Allowed values of $P_I$ with the 2-bit field are defined in Table 12 below.

If DP_TI_TYPE is set to a value of '0', this field indicates the number of TI blocks $N_{TI}$ per TI group, and one TI group is present per frame ($P_I=1$). Allowed values of $P_I$ with the 2-bit field are defined in the following Table 12.

TABLE 12

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates a frame interval ($I_{JUMP}$) within a frame group for an associated DP and allowed values are 1, 2, 4, and 8 (the corresponding 2-bit field is '00', '01', '10', or '11', respectively). For DPs that do not appear every frame of the frame group, a value of this field is equal to an interval between successive frames. For example, if a DP appears on frames 1, 5, 9, 13, etc., this field is set to a value of '4'. For DPs that appear in every frame, this field is set to a value of '1'.

DP_TI_BYPASS: This 1-bit field determines availability of the time interleaver 5050. If time interleaving is not used for a DP, a value of this field is set to '1'. If time interleaving is used, the value is set to '0'.

DP_FIRST_FRAME_IDX: This 5-bit field indicates an index of a first frame of a superframe in which a current DP occurs. A value of DP_FIRST_FRAME_IDX ranges from 0 to 31.

DP_NUM_BLOCK_MAX: This 10-bit field indicates a maximum value of DP_NUM_BLOCKS for this DP. A value of this field has the same range as DP_NUM_BLOCKS.

DP_PAYLOAD_TYPE: This 2-bit field indicates a type of payload data carried by a given DP. DP_PAYLOAD_TYPE is signaled according to the following Table 13.

TABLE 13

| Value | Payload type |
|---|---|
| 00 | TS |
| 01 | IP |
| 10 | GS |
| 11 | Reserved |

DP_INBAND_MODE: This 2-bit field indicates whether a current DP carries in-band signaling information. An in-band signaling type is signaled according to the following Table 14.

TABLE 14

| Value | In-band mode |
|---|---|
| 00 | In-band signaling is not carried. |
| 01 | INBAND-PLS is carried |
| 10 | INBAND-ISSY is carried |
| 11 | INBAND-PLS and INBAND-ISSY are carried |

DP_PROTOCOL_TYPE: This 2-bit field indicates a protocol type of a payload carried by a given DP. The protocol type is signaled according to Table 15 below when input payload types are selected.

TABLE 15

| Value | If DP_PAY-LOAD_TYPE is TS | If DP_PAY-LOAD_TYPE is IP | If DP_PAY-LOAD_TYPE is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in an input formatting block. A CRC mode is signaled according to the following Table 16.

TABLE 16

| Value | CRC mode |
|---|---|
| 00 | Not used |
| 01 | CRC-8 |
| 10 | CRC-16 |
| 11 | CRC-32 |

DNP_MODE: This 2-bit field indicates a null-packet deletion mode used by an associated DP when DP_PAYLOAD_TYPE is set to TS ('00'). DNP_MODE is signaled according to Table 17 below. If DP_PAYLOAD_TYPE is not TS ('00'), DNP_MODE is set to a value of '00'.

TABLE 17

| Value | Null-packet deletion mode |
|---|---|
| 00 | Not used |
| 01 | DNP-NORMAL |
| 10 | DNP-OFFSET |
| 11 | Reserved |

ISSY_MODE: This 2-bit field indicates an ISSY mode used by an associated DP when DP_PAYLOAD_TYPE is set to TS ('00'). ISSY_MODE is signaled according to Table 18 below. If DP_PAYLOAD_TYPE is not TS ('00'), ISSY_MODE is set to the value of '00'.

TABLE 18

| Value | ISSY mode |
|---|---|
| 00 | Not used |
| 01 | ISSY-UP |
| 10 | ISSY-BBF |
| 11 | Reserved |

HC_MODE_TS: This 2-bit field indicates a TS header compression mode used by an associated DP when DP_PAYLOAD_TYPE is set to TS ('00'). HC_MODE_TS is signaled according to the following Table 19.

TABLE 19

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates an IP header compression mode when DP_PAYLOAD_TYPE is set to IP ('01'). HC_MODE_IP is signaled according to the following Table 20.

TABLE 20

| Value | Header compression mode |
|---|---|
| 00 | No compression |
| 01 | HC_MODE_IP 1 |
| 10 to 11 | Reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following fields appear only if FIC_FLAG is equal to '1'.

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following fields appear only if AUX_FLAG is equal to '1'.

NUM_AUX: This 4-bit field indicates the number of auxiliary streams. Zero means no auxiliary stream is used.

AUX_CONFIG_RFU: This 8-bit field is reserved for future use.

AUX_STREAM_TYPE: This 4-bit is reserved for future use for indicating a type of a current auxiliary stream.

AUX_PRIVATE_CONFIG: This 28-bit field is reserved for future use for signaling auxiliary streams.

Figures 26, 27:
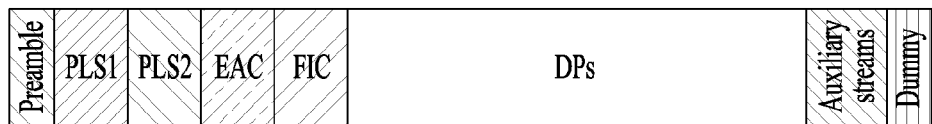
FIG. 26 is a table illustrating PLS2 data according to another embodiment of the present invention.
FIG. 27 illustrates a logical structure of a frame according to an embodiment of the present invention.

FIG. 26 illustrates PLS2 data according to another embodiment of the present invention.

FIG. 26 illustrates PLS2-DYN data of the PLS2 data. Values of the PLS2-DYN data may change during the duration of one frame group while sizes of fields remain constant.

Details of fields of the PLS2-DYN data are as below.

FRAME_INDEX: This 5-bit field indicates a frame index of a current frame within a superframe. An index of a first frame of the superframe is set to '0'.

PLS_CHANGE_COUNTER: This 4-bit field indicates the number of superframes before a configuration changes. A next superframe with changes in the configuration is indicated by a value signaled within this field. If this field is set to a value of '0000', it means that no scheduled change is foreseen. For example, a value of '1' indicates that there is a change in the next superframe.

FIC_CHANGE_COUNTER: This 4-bit field indicates the number of superframes before a configuration (i.e., content of the FIC) changes. A next superframe with changes in the configuration is indicated by a value signaled within this field. If this field is set to a value of '0000', it means that no scheduled change is foreseen. For example, a value of '0001' indicates that there is a change in the next superframe.

RESERVED: This 16-bit field is reserved for future use.

The following fields appear in a loop over NUM_DP, which describe parameters associated with a DP carried in a current frame.

DP_ID: This 6-bit field uniquely indicates a DP within a PHY profile.

DP_START: This 15-bit (or 13-bit) field indicates a start position of the first of the DPs using a DPU addressing scheme. The DP_START field has differing length according to the PHY profile and FFT size as shown in the following Table 21.

TABLE 21

| PHY profile | DP_START field size | |
|---|---|---|
| | 64K | 16K |
| Base | 13 bits | 15 bits |
| Handheld | — | 13 bits |
| Advanced | 13 bits | 15 its |

DP_NUM_BLOCK: This 10-bit field indicates the number of FEC blocks in a current TI group for a current DP. A value of DP_NUM_BLOCK ranges from 0 to 1023.

RESERVED: This 8-bit field is reserved for future use.

The following fields indicate FIC parameters associated with the EAC.

EAC_FLAG: This 1-bit field indicates the presence of the EAC in a current frame. This bit is the same value as EAC_FLAG in a preamble.

EAS_WAKE_UP_VERSION_NUM: This 8-bit field indicates a version number of a wake-up indication.

If the EAC_FLAG field is equal to '1', the following 12 bits are allocated to EAC_LENGTH_BYTE. If the EAC_FLAG field is equal to '0', the following 12 bits are allocated to EAC_COUNTER.

EAC_LENGTH_BYTE: This 12-bit field indicates a length, in bytes, of the EAC.

EAC_COUNTER: This 12-bit field indicates the number of frames before a frame where the EAC arrives.

The following fields appear only if the AUX_FLAG field is equal to '1'.

AUX_PRIVATE_DYN: This 48-bit field is reserved for future use for signaling auxiliary streams. A meaning of this field depends on a value of AUX_STREAM_TYPE in a configurable PLS2-STAT.

CRC_32: A 32-bit error detection code, which is applied to the entire PLS2.

FIG. 27 illustrates a logical structure of a frame according to an embodiment of the present invention.

As above mentioned, the PLS, EAC, FIC, DPs, auxiliary streams and dummy cells are mapped to the active carriers of OFDM symbols in a frame. PLS1 and PLS2 are first mapped to one or more FSSs. Thereafter, EAC cells, if any, are mapped to an immediately following PLS field, followed next by FIC cells, if any. The DPs are mapped next after the PLS or after the EAC or the FIC, if any. Type 1 DPs are mapped first and Type 2 DPs are mapped next. Details of types of the DPs will be described later. In some cases, DPs may carry some special data for EAS or service signaling data. The auxiliary streams or streams, if any, follow the DPs, which in turn are followed by dummy cells. When the PLS, EAC, FIC, DPs, auxiliary streams and dummy data cells are mapped all together in the above mentioned order, i.e. the PLS, EAC, FIC, DPs, auxiliary streams and dummy data cells, cell capacity in the frame is exactly filled.

Figure 28:
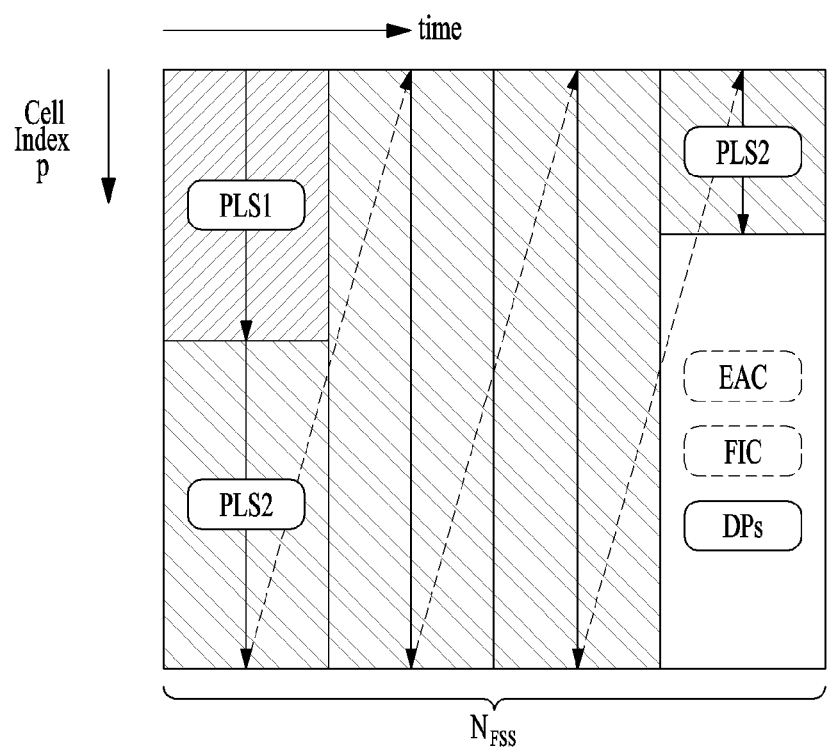
FIG. 28 illustrates PLS mapping according to an embodiment of the present invention.

FIG. 28 illustrates PLS mapping according to an embodiment of the present invention.

PLS cells are mapped to active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) have higher pilot density, allowing fast synchronization and frequency-only interpolation within the FSS.

PLS cells are mapped to active carriers of the FSS(s) in a top-down manner as shown in the figure. PLS1 cells are mapped first from a first cell of a first FSS in increasing order of cell index. PLS2 cells follow immediately after a last cell of PLS1 and mapping continues downward until a last cell index of the first FSS. If the total number of required PLS cells exceeds the number of active carriers of one FSS, mapping proceeds to a next FSS and continues in exactly the same manner as the first FSS.

After PLS mapping is completed, DPs are carried next. If an EAC, an FIC or both are present in a current frame, the EAC and the FIC are placed between the PLS and "normal" DPs.

Hereinafter, description will be given of encoding an FEC structure according to an embodiment of the present invention. As above mentioned, the data FEC encoder may perform FEC encoding on an input BBF to generate an FECBLOCK procedure using outer coding (BCH), and inner coding (LDPC). The illustrated FEC structure corresponds to the FECBLOCK. In addition, the FECBLOCK and the FEC structure have same value corresponding to a length of an LDPC codeword.

As described above, BCH encoding is applied to each BBF ($K_{bch}$ bits), and then LDPC encoding is applied to BCH-encoded BBF ($K_{ldpc}$ bits=$N_{bch}$ bits).

A value of $N_{ldpc}$ is either 64,800 bits (long FECBLOCK) or 16,200 bits (short FECBLOCK).

Table 22 and Table 23 below show FEC encoding parameters for the long FECBLOCK and the short FECBLOCK, respectively.

TABLE 22

| LDPC rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 23

| LDPC rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |

TABLE 23-continued

| LDPC rate | $N_{ldpc}$ | $K_{ldpc}$ | $K_{bch}$ | BCH error correction capability | $N_{bch} - K_{bch}$ |
|---|---|---|---|---|---|
| 11/15 | | 11880 | 11712 | | |
| 12/15 | | 12960 | 12792 | | |
| 13/15 | | 14040 | 13872 | | |

Detailed operations of BCH encoding and LDPC encoding are as below.

A 12-error correcting BCH code is used for outer encoding of the BBF. A BCH generator polynomial for the short FECBLOCK and the long FECBLOCK are obtained by multiplying all polynomials together.

LDPC code is used to encode an output of outer BCH encoding. To generate a completed $B_{ldpc}$ (FECBLOCK), $P_{ldpc}$ (parity bits) is encoded systematically from each $I_{ldpc}$ (BCH—encoded BBF), and appended to $I_{ldpc}$. The completed $B_{ldpc}$ (FECBLOCK) is expressed by the following Equation.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Equation 2]

Parameters for the long FECBLOCK and the short FECBLOCK are given in the above Tables 22 and 23, respectively.

A detailed procedure to calculate $N_{ldpc}-K_{ldpc}$ parity bits for the long FECBLOCK, is as follows.

1) Initialize the parity bits $$p_0=p_1=p_2=\ldots=p_{N_{ldpc}-K_{ldpc}-1}=0$$ [Equation 3]

2) Accumulate a first information bit—$i_0$, at a parity bit address specified in a first row of addresses of a parity check matrix. Details of the addresses of the parity check matrix will be described later. For example, for the rate of 13/15, $$p_{983}=p_{983}\oplus i_0 \; p_{2815}=p_{2815}\oplus i_0$$

$$p_{4837}=p_{4837}\oplus i_0 \; p_{4989}=p_{4989}\oplus i_0$$

$$p_{6138}=p_{6138}\oplus i_0 \; p_{6458}=p_{6458}\oplus i_0$$

$$p_{6921}=p_{6921}\oplus i_0 \; p_{6974}=p_{6974}\oplus i_0$$

$$p_{7572}=p_{7572}\oplus i_0 \; p_{8260}=p_{8260}\oplus i_0$$

$$p_{8496}=p_{8496}\oplus i_0$$ [Equation 4]

3) For the next 359 information bits, $i_s$, s=1, 2, . . . , 359, accumulate $i_s$ at parity bit addresses using following Equation.

$$\{x+(s \bmod 360)\times Q_{ldpc}\} \bmod (N_{ldpc}-K_{ldpc})$$ [Equation 5]

Here, x denotes an address of a parity bit accumulator corresponding to a first bit $i_0$, and $Q_{ldpc}$ is a code rate dependent constant specified in the addresses of the parity check matrix. Continuing with the example, $Q_{ldpc}=24$ for the rate of 13/15, so for an information bit $i_1$, the following operations are performed.

$$p_{1007}=p_{1007}\oplus i_1 \; p_{2389}=p_{2839}\oplus i_1$$

$$p_{4861}=p_{4861}\oplus i_1 \; p_{5013}=p_{5013}\oplus i_1$$

$$p_{6162}=p_{6162}\oplus i_1 \; p_{6482}=p_{6482}\oplus i_1$$

$$p_{6945}=p_{6945}\oplus i_1 \; p_{6998}=p_{6998}\oplus i_1$$

$$p_{7596}=p_{7596}\oplus i_1 \; p_{8284}=p_{8284}\oplus i_1$$

$$p_{8520}=p_{8520}\oplus i_1$$ [Equation 6]

4) For a 361th information bit $i_{360}$, an address of the parity bit accumulator is given in a second row of the addresses of the parity check matrix. In a similar manner, addresses of the parity bit accumulator for the following 359 information bits $i_s$, s=361, 362, . . . , 719 are obtained using Equation 6, where x denotes an address of the parity bit accumulator corresponding to the information bit $i_{360}$, i.e., an entry in the second row of the addresses of the parity check matrix.

5) In a similar manner, for every group of 360 new information bits, a new row from the addresses of the parity check matrix is used to find the address of the parity bit accumulator.

After all of the information bits are exhausted, a final parity bit is obtained as below.

6) Sequentially perform the following operations starting with i=1.

$$p_i=p_i\oplus p_{i-1}, i=1,2,\ldots,N_{ldpc}-K_{ldpc}-1$$ [Equation 7]

Here, final content of $p_i$ (i=0, 1, . . . , $N_{ldpc}-K_{ldpc}-1$) is equal to a parity bit $p_i$.

TABLE 24

| Code rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for the short FECBLOCK is in accordance with t LDPC encoding procedure for the long FECBLOCK, except that Table 24 is replaced with Table 25, and the addresses of the parity check matrix for the long FECBLOCK are replaced with the addresses of the parity check matrix for the short FECBLOCK.

TABLE 25

| Code rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 29 illustrates time interleaving according to an embodiment of the present invention.

(a) to (c) show examples of a TI mode.

A time interleaver operates at the DP level. Parameters of time interleaving (TI) may be set differently for each DP.

The following parameters, which appear in part of the PLS2-STAT data, configure the TI.

DP_TI_TYPE (allowed values: 0 or 1): This parameter represents the TI mode. The value of '0' indicates a mode with multiple TI blocks (more than one TI block) per TI group. In this case, one TI group is directly mapped to one frame (no inter-frame interleaving). The value of '1' indicates a mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames $P_I$ spread from one TI group.

DP_NUM_BLOCK_MAX (allowed values: 0 to 1023): This parameter represents the maximum number of XFEC-BLOCKs per TI group.

DP_FRAME_INTERVAL (allowed values: 1, 2, 4, and 8): This parameter represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. This parameter is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the delay compensation block for the dynamic configuration information from the scheduler may still be required. In each DP, the XFECBLOCKs received from SSD/MIMO encoding are grouped into TI groups. That is, each TI group is a set of an integer number of XFEC-BLOCKs and contains a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from a minimum value of 0 to a maximum value of $N_{xBLOCK\_Group\_MAX}$ (corresponding to DP_NUM_BLOCK_MAX), the largest value of which is 1023.

Each TI group is either mapped directly to one frame or spread over $P_I$ frames. Each TI group is also divided into more than one TI block ($N_{TI}$), where each TI block corresponds to one usage of a time interleaver memory. The TI blocks within the TI group may contain slightly different numbers of XFECBLOCKs. If the TI group is divided into multiple TI blocks, the TI group is directly mapped to only one frame. There are three options for time interleaving (except an extra option of skipping time interleaving) as shown in the following Table 26.

TABLE 26

| Modes | Descriptions |
|---|---|
| Option 1 | Each TI group contains one TI block and is mapped directly to one frame as shown in (a). This option is signaled in PLS2-STAT by DP_TI_TYPE = '0' and DP_TI_LENGTH = '1' ($N_{TI}$ = 1). |

TABLE 26-continued

| Modes | Descriptions |
|---|---|
| Option 2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in PLS2-STAT by DP_TI_TYPE = '1'. |
| Option 3 | Each TI group is divided into multiple TI blocks and is mapped directly to one frame as shown in (c). Each TI block may use a full TI memory so as to provide a maximum bit-rate for a DP. This option is signaled in PLS2-STAT by DP_TI_TYPE = '0' and DP_TI_LENGTH = $N_{TI}$, while $P_I$ = 1. |

Typically, the time interleaver may also function as a buffer for DP data prior to a process of frame building. This is achieved by means of two memory banks for each DP. A first TI block is written to a first bank. A second TI block is written to a second bank while the first bank is being read from and so on.

The TI is a twisted row-column block interleaver. For an $s^{th}$ TI block of an $n^{th}$ TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n,s)$.

Figure 30:
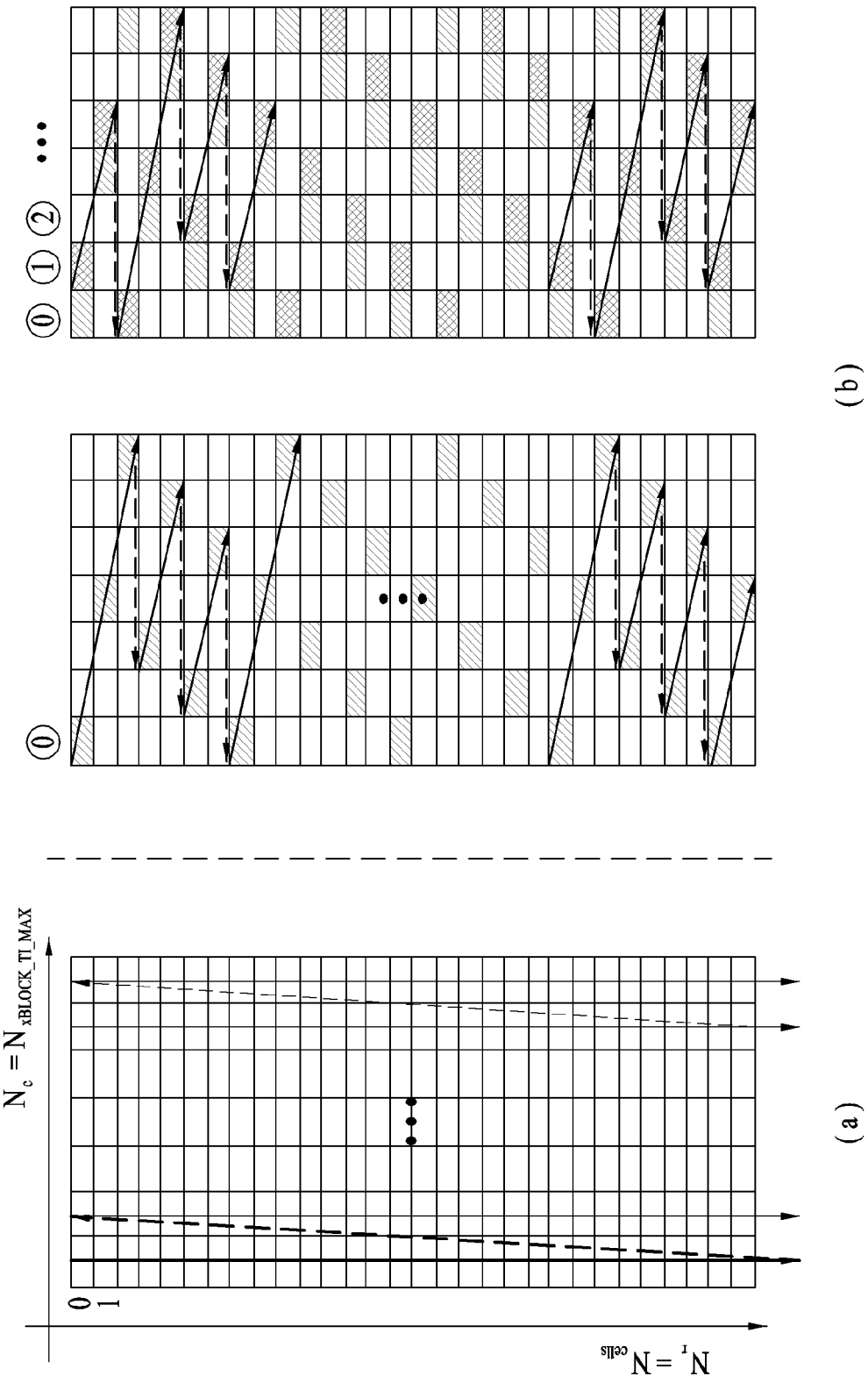
FIG. 30 illustrates a basic operation of a twisted row-column block interleaver according to an embodiment of the present invention.

FIG. 30 illustrates a basic operation of a twisted row-column block interleaver according to an embodiment of the present invention.

FIG. 30(a) shows a write operation in the time interleaver and FIG. 30(b) shows a read operation in the time interleaver. A first XFECBLOCK is written column-wise into a first column of a TI memory, and a second XFECBLOCK is written into a next column, and so on as shown in (a). Then, in an interleaving array, cells are read diagonal-wise. During diagonal-wise reading from a first row (rightwards along a row beginning with a left-most column) to a last row, $N_r$ cells are read out as shown in (b). In detail, assuming $z_{n,s,i}$ (i=0, . . . , $N_r N_c$) as a TI memory cell position to be read sequentially, a reading process in such an interleaving array is performed by calculating a row index $R_{n,s,i}$, a column index $C_{n,s,i}$, and an associated twisting parameter $T_{n,s,i}$ as in the following Equation.

$$\text{GENERATE}(R_{n,s,i}, C_{n,s,i}) = \begin{cases} \\ R_{n,s,i} = \mod(i, N_r), \\ T_{n,s,i} = \mod(S_{shift} \times R_{n,s,i}, N_c), \\ C_{n,s,i} = \mod\left(T_{n,s,i} + \left\lfloor \frac{i}{N_r} \right\rfloor, N_c\right) \\ \end{cases} \quad \text{[Equation 8]}$$

Here, $S_{shift}$ is a common shift value for a diagonal-wise reading process regardless of $N_{xBLOCK\_TI}(n,s)$, and the shift value is determined by $N_{xBLOCK\_TI\_MAX}$ given in PLS2-STAT as in the following Equation.

$$\text{for} \begin{cases} N'_{xBLOCK\_TI\_MAX} = N_{xBLOCK\_TI\_MAX} + 1, & \text{if } N_{xBLOCK\_TI\_MAX} \mod 2 = 0 \\ N'_{xBLOCK\_TI\_MAX} = N_{xBLOCK\_TI\_MAX}, & \text{if } N_{xBLOCK\_TI\_MAX} \mod 2 = 1 \end{cases} \quad \text{[Equation 9]}$$

$$S_{shift} = \frac{N'_{xBLOCK\_TI\_MAX} - 1}{2}$$

As a result, cell positions to be read are calculated by coordinates $z_{n,s,i}=N_r C_{n,s,i}+R_{n,s,i}$.

Figure 31:
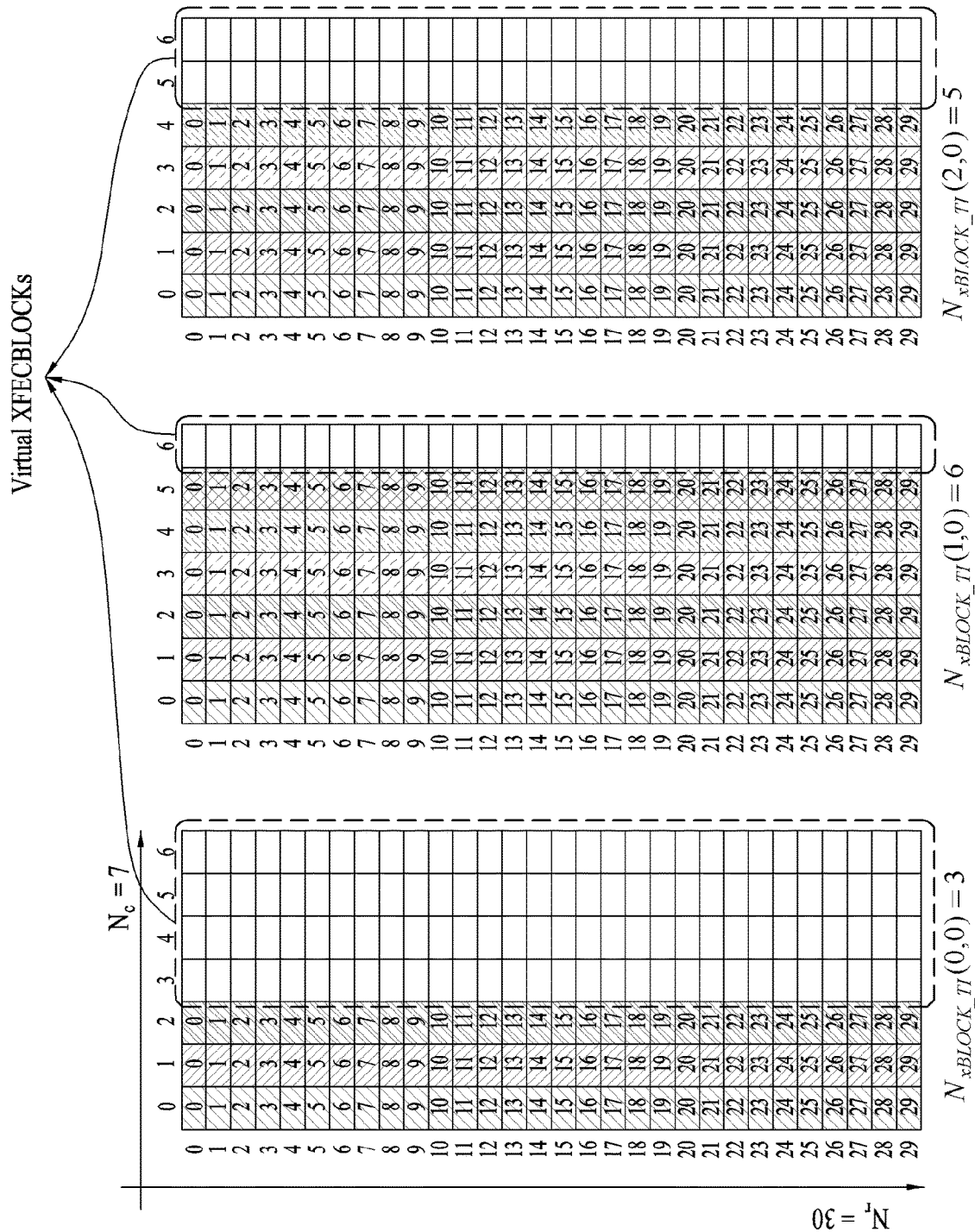
FIG. 31 illustrates an operation of a twisted row-column block interleaver according to another embodiment of the present invention.

FIG. 31 illustrates an operation of a twisted row-column block interleaver according to another embodiment of the present invention.

More specifically, FIG. 31 illustrates an interleaving array in a TI memory for each TI group, including virtual XFEC-BLOCKs when $N_{xBLOCK\_TI}(0,0)=3$, $N_{xBLOCK\_TI}(1,0)=6$, and $N_{xBLOCK\_TI}(2,0)=5$.

A variable number $N_{xBLOCK\_TI}(n,s)=N_r$ may be less than or equal to $N_{xBLOCK\_TI\_MAX}$. Thus, in order to achieve single-memory deinterleaving at a receiver side regardless of $N_{xBLOCK\_TI}(n,s)$, the interleaving array for use in the twisted row-column block interleaver is set to a size of $N_r \times N_c = N_{cells} \times N'_{xBLOCK\_TI\_MAX}$ by inserting the virtual XFECBLOCKs into the TI memory and a reading process is accomplished as in the following Equation.

[Equation 10]
```
p = 0;
for i = 0; i < N_cells N_xBLOCK_TI_MAX; i = i + 1
{GENERATE (R_{n,s,i}, C_{n,s,i});
V_i = N_r C_{n,s,i} + R_{n,s,i}
  if V_i < N_cells N_xBLOCK_TI(n,s)
  {
    Z_{n,s,p} = V_i; p = p + 1;
  }
}
```

The number of TI groups is set to 3. An option of the time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. A maximum number of XFECBLOCKs is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX} = 6$.

The purpose of the Frequency Interleaver, which operates on data corresponding to a single OFDM symbol, is to provide frequency diversity by randomly interleaving data cells received from the frame builder. In order to get maximum interleaving gain in a single frame, a different interleaving-sequence is used for every OFDM symbol pair comprised of two sequential OFDM symbols.

Therefore, the frequency interleaver according to the present embodiment may include an interleaving address generator for generating an interleaving address for applying corresponding data to a symbol pair.

Figure 32:
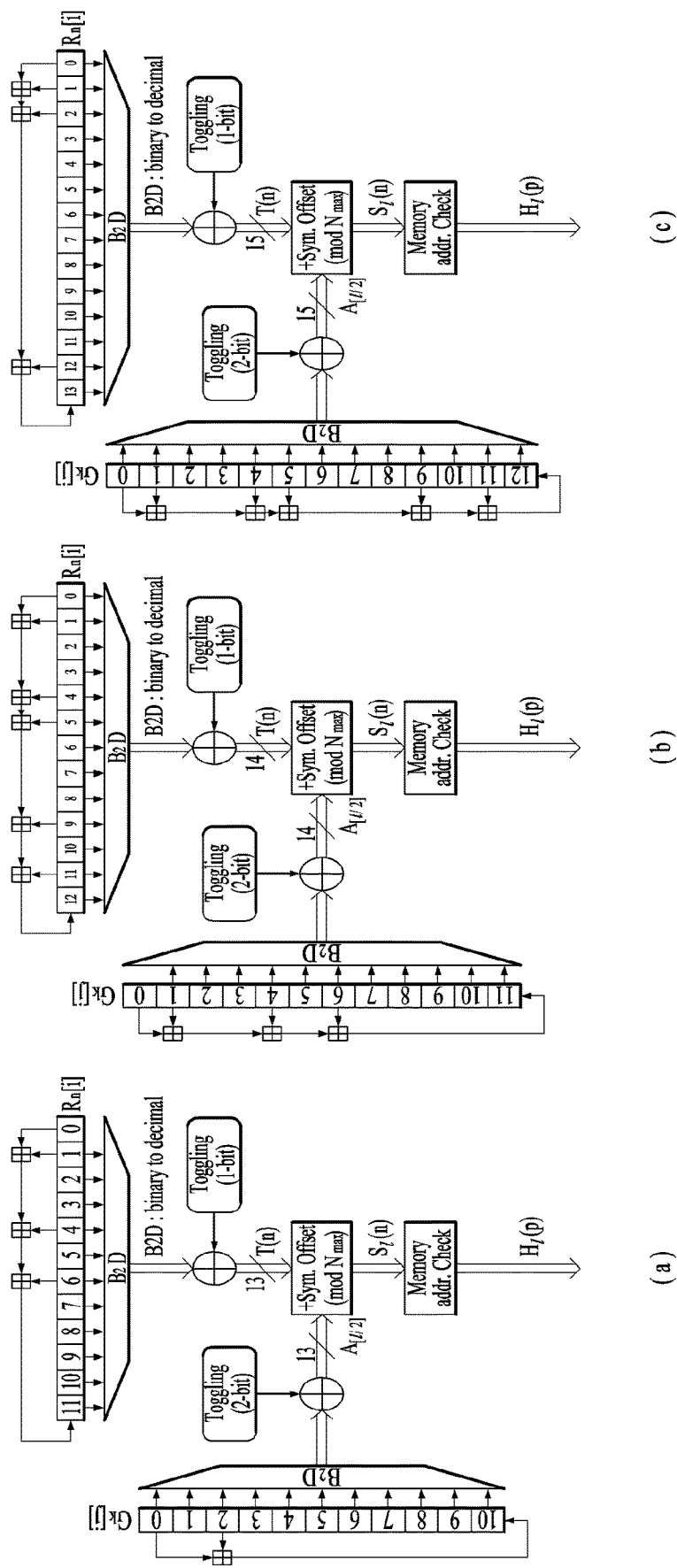
FIG. 32 is a block diagram illustrating an interleaving address generator including a main pseudo-random binary sequence (PRBS) generator and a sub-PRBS generator according to each FFT mode according to an embodiment of the present invention.

FIG. 32 illustrates an interleaving address generator including a main pseudo-random binary sequence (PRBS) generator and a sub-PRBS generator according to each FFT mode according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l}=[x_{m,l,0}, \ldots, x_{m,l,p}, \ldots, x_{m,l,N_{data}-1}]$ for $l=0, \ldots, N_{sym}-1$, where $x_{m,l,p}$ is the $p^{th}$ call of the $l^{th}$ OFDM symbol in the $m^{th}$ frame and $N_{data}$ is the number of data cells: $N_{data}=C_{FSS}$ for the frame signaling symbol(s), $N_{data}=C_{data}$ for the normal data, and $N_{data}=C_{FES}$ for the frame edge symbol. In addition, the interleaved data cells are defined as $P_{m,l}=[v_{m,l,0}, \ldots, v_{m,l,N_{data}-1}]$ for $l=0, \ldots, N_{sym}-1$.

For the OFDM symbol pair, the interleaved OFDM symbol pair is given by $v_{m,l,H_i(p)}=x_{m,l,p}$, $p=0, \ldots, N_{data}-1$, for the first OFDM symbol of each pair $v_{m,l,p}=x_{m,l,H_i(p)}$, $p=0, \ldots, N_{data}-1$, for the second OFDM symbol of each pair, where $H_l(p)$ is the interleaving address generated by a PRBS generator.

FIG. 33 illustrates a main PRBS used for all FFT modes according to an embodiment of the present invention.

(a) illustrates the main PRBS, and (b) illustrates a parameter Nmax for each FFT mode.

FIG. 34 illustrates a sub-PRBS used for FFT modes and an interleaving address for frequency interleaving according to an embodiment of the present invention.

(a) illustrates a sub-PRBS generator, and (b) illustrates an interleaving address for frequency interleaving. A cyclic shift value according to an embodiment of the present invention may be referred to as a symbol offset.

Figure 35:
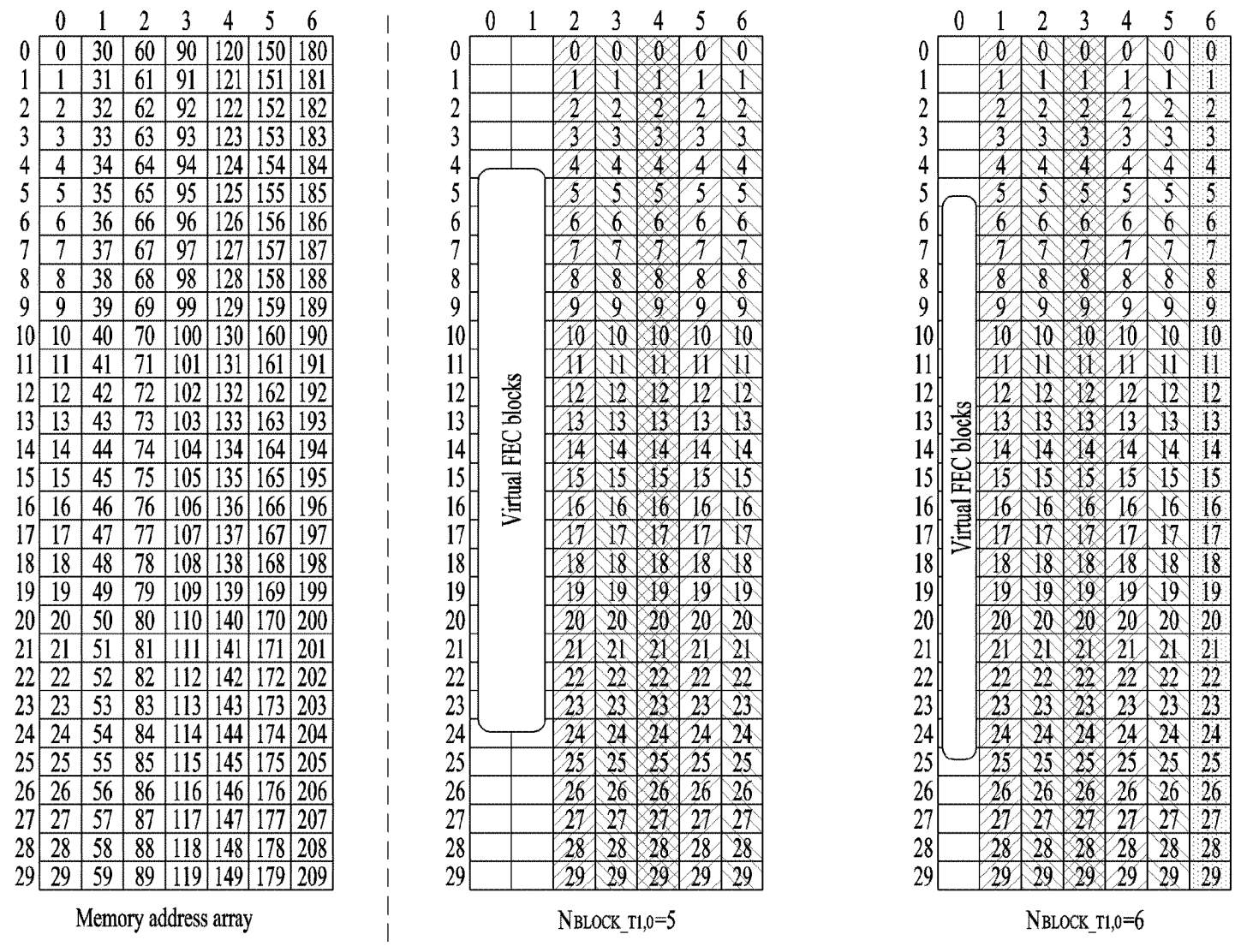

FIG. 35 illustrates a write operation of a time interleaver according to an embodiment of the present invention.

FIG. 35 illustrates a write operation for two TI groups.

A left block in the figure illustrates a TI memory address array, and right blocks in the figure illustrate a write operation when two virtual FEC blocks and one virtual FEC block are inserted into heads of two contiguous TI groups, respectively.

Hereinafter, description will be given of a configuration of a time interleaver and a time interleaving method using both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer.

A PLP mode according to an embodiment of the present invention may include a single PLP mode or a multi-PLP mode according to the number of PLPs processed by a broadcast signal transmitter or a broadcast signal transmission apparatus. The single PLP mode corresponds to a case in which one PLP is processed by the broadcast signal transmission apparatus. The single PLP mode may be referred to as a single PLP.

The multi-PLP mode corresponds to a case in which one or more PLPs are processed by the broadcast signal transmission apparatus. The multi-PLP mode may be referred to as multiple PLPs.

In the present invention, time interleaving in which different time interleaving schemes are applied according to PLP modes may be referred to as hybrid time interleaving. Hybrid time interleaving according to an embodiment of the present invention is applied for each PLP (or at each PLP level) in the multi-PLP mode.

FIG. 36 illustrates an interleaving type applied according to the number of PLPs in a table.

In a time interleaving according to an embodiment of the present invention, an interleaving type may be determined based on a value of PLP_NUM. PLP_NUM is a signaling field indicating a PLP mode. When PLP_NUM has a value of 1, the PLP mode corresponds to a single PLP. The single PLP according to the present embodiment may be applied only to a CI.

When PLP_NUM has a value greater than 1, the PLP mode corresponds to multiple PLPs. The multiple PLPs according to the present embodiment may be applied to the CI and a BI. In this case, the CI may perform inter-frame interleaving, and the BI may perform intra-frame interleaving.

FIG. 37 is a block diagram including a first example of a structure of a hybrid time interleaver described above.

The hybrid time interleaver according to the first example may include a BI and a CI. The time interleaver of the present invention may be positioned between a BICM chain block and a frame builder.

The BICM chain block illustrated in FIGS. 37 and 38 may include the blocks in the processing block 5000 of the BICM block illustrated in FIG. 19 except for the time interleaver 5050. The frame builder illustrated in FIGS. 37 and 38 may perform the same function as that of the frame building block 1020 of FIG. 18.

As described in the foregoing, it is possible to determine whether to apply the BI according to the first example of the structure of the hybrid time interleaver depending on values of PLP_NUM. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be the same as or similar to a structure and an operation of the CI applied when PLP_NUM=1.

FIG. 38 is a block diagram including a second example of the structure of the hybrid time interleaver described above.

An operation of each block included in the second example of the structure of the hybrid time interleaver is the same as the above description in FIG. 20. It is possible to determine whether to apply a BI according to the second example of the structure of the hybrid time interleaver depending on values of PLP_NUM. Each block of the hybrid time interleaver according to the second example may perform operations according to embodiments of the present invention. In this instance, an applied structure and operation of a CI may be different between a case of PLP_NUM=1 and a case of PLP_NUM>1.

Figure 39:
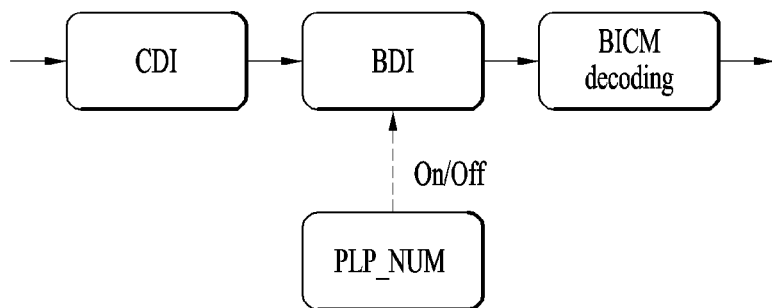
FIG. 39 is a block diagram including a first example of a structure of a hybrid time deinterleaver.

FIG. 39 is a block diagram including a first example of a structure of a hybrid time deinterleaver.

The hybrid time deinterleaver according to the first example may perform an operation corresponding to a reverse operation of the hybrid time interleaver according to the first example described above. Therefore, the hybrid time deinterleaver according to the first example of FIG. 39 may include a convolutional deinterleaver (CDI) and a block deinterleaver (BDI).

A structure and an operation of the CDI applied when PLP_NUM>1 may be the same as or similar to a structure and an operation of the CDI applied when PLP_NUM=1.

It is possible to determine whether to apply the BDI according to the first example of the structure of the hybrid time deinterleaver depending on values of PLP_NUM. That is, when PLP_NUM=1, the BDI is not applied (BDI is turned OFF) and only the CDI is applied.

The CDI of the hybrid time deinterleaver may perform inter-frame deinterleaving, and the BDEI may perform intra-frame deinterleaving. Details of inter-frame deinterleaving and intra-frame deinterleaving are the same as the above description.

Figure 40:
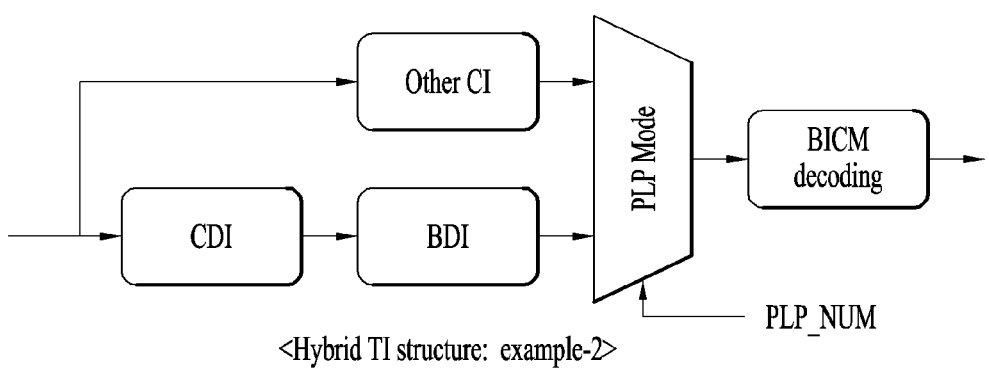
FIG. 40 is a block diagram including a second example of the structure of the hybrid time deinterleaver.

A BICM decoding block illustrated in FIGS. 39 and 40 may perform a reverse operation of the BICM chain block of FIGS. 37 and 38.

FIG. 40 is a block diagram including a second example of the structure of the hybrid time deinterleaver.

The hybrid time deinterleaver according to the second example may perform an operation corresponding to a reverse operation of the hybrid time interleaver according to the second example described above. An operation of each block included in the second example of the structure of the hybrid time deinterleaver may be the same as the above description in FIG. 39.

It is possible to determine whether to apply a BDI according to the second example of the structure of the hybrid time deinterleaver depending on values of PLP_NUM. Each block of the hybrid time deinterleaver according to the second example may perform operations according to embodiments of the present invention. In this instance, an applied structure and operation of a CDI may be different between a case of PLP_NUM=1 and a case of PLP_NUM>1.

Figure 41:
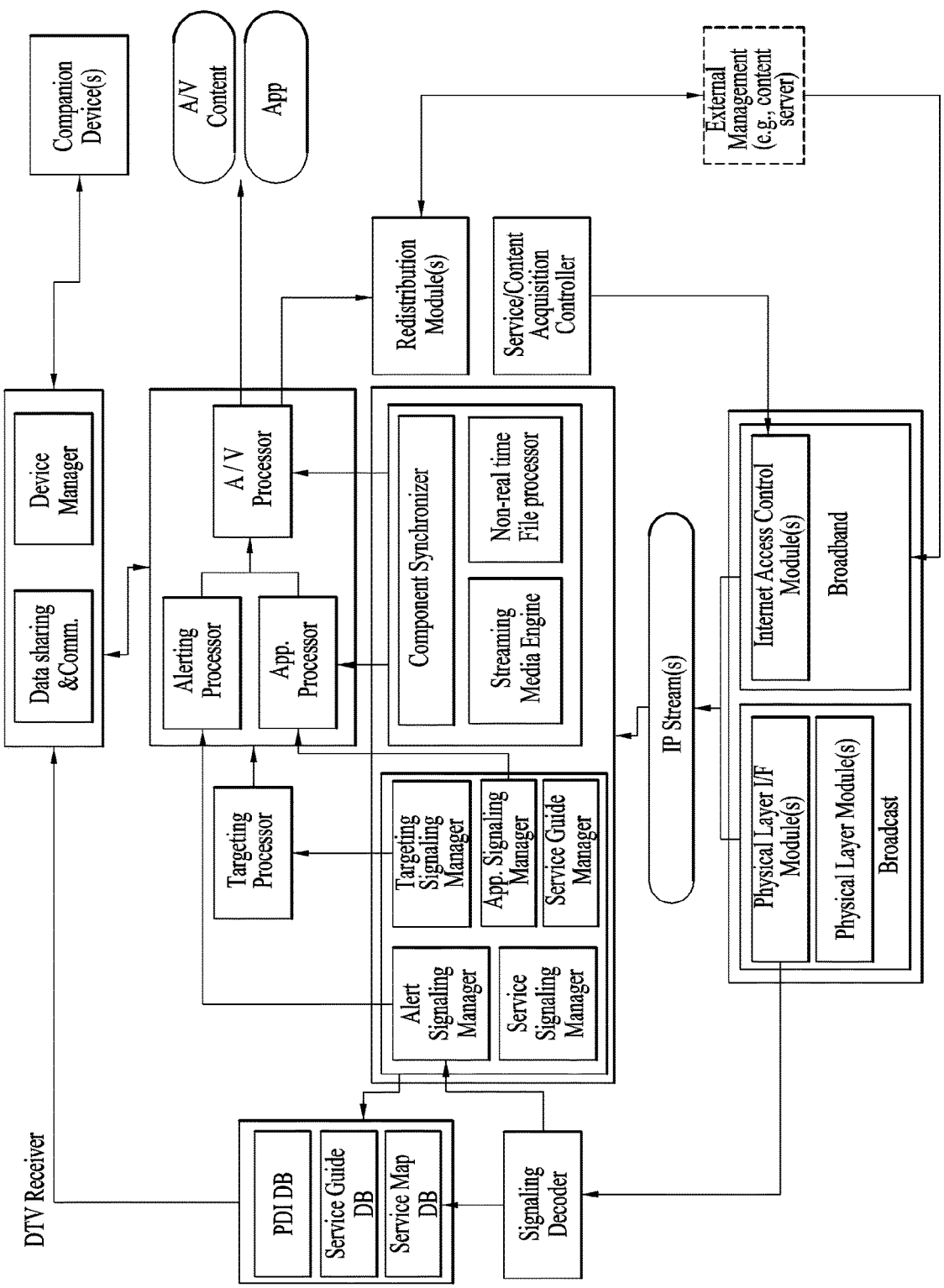
FIG. 41 is a block diagram illustrating a hybrid broadcast reception apparatus according to an embodiment of the present invention.

FIG. 41 is a block diagram illustrating a hybrid broadcast reception apparatus according to an embodiment of the present invention. A hybrid broadcast system can transmit broadcast signals in connection with terrestrial broadcast networks and the Internet. The hybrid broadcast reception apparatus can receive broadcast signals through terrestrial broadcast networks (broadcast networks) and the Internet (broadband). The hybrid broadcast reception apparatus may include physical layer module(s), physical layer I/F module(s), service/content acquisition controller, Internet access control module(s), a signaling decoder, a service signaling manager, a service guide manager, an application signaling manager, an alert signal manager, an alert signaling parser, a targeting signaling parser, a streaming media engine, a non-real time file processor, a component synchronizer, a targeting processor, an application processor, an A/V processor, a device manager, a data sharing and communication unit, redistribution module(s), companion device(s) and/or an external management module.

The physical layer module(s) can receive a broadcast related signal through a terrestrial broadcast channel, process the received signal, convert the processed signal into an appropriate format and deliver the signal to the physical layer I/F module(s).

The physical layer I/F module(s) can acquire an IP datagram from information obtained from the physical layer module. In addition, the physical layer I/F module can convert the acquired IP datagram into a specific frame (e.g., RS frame, GSE, etc.).

The service/content acquisition controller can perform control operation for acquisition of services, content and signaling data related thereto through broadcast channels and/or broadband channels.

The Internet access control module(s) can control receiver operations for acquiring service, content, etc. through broadband channels.

The signaling decoder can decode signaling information acquired through broadcast channels.

The service signaling manager can extract signaling information related to service scan and/or content from the IP datagram, parse the extracted signaling information and manage the signaling information.

The service guide manager can extract announcement information from the IP datagram, manage a service guide (SG) database and provide a service guide.

The application signaling manager can extract signaling information related to application acquisition from the IP datagram, parse the signaling information and manage the signaling information.

The alert signaling parser can extract signaling information related to alerting from the IP datagram, parse the extracted signaling information and manage the signaling information.

The targeting signaling parser can extract signaling information related to service/content personalization or targeting from the IP datagram, parse the extracted signaling information and manage the signaling information. In addition, the targeting signaling parser can deliver the parsed signaling information to the targeting processor.

The streaming media engine can extract audio/video data for A/V streaming from the IP datagram and decode the audio/video data.

The non-real time file processor can extract NRT data and file type data such as applications, decode and manage the extracted data.

The component synchronizer can synchronize content and services such as streaming audio/video data and NRT data.

The targeting processor can process operations related to service/content personalization on the basis of the targeting signaling data received from the targeting signaling parser.

The application processor can process application related information and downloaded application state and represent parameters.

The A/V processor can perform audio/video rendering related operations on the basis of decoded audio/video data and application data.

The device manager can perform connection and data exchange with external devices. In addition, the device manager can perform operations of managing external devices connectable thereto, such as addition/deletion/update of the external devices.

The data sharing and communication unit can process information related to data transmission and exchange between a hybrid broadcast receiver and external devices. Here, data that can be transmitted and exchanged between the hybrid broadcast receiver and external devices may be signaling data, A/V data and the like.

The redistribution module(s) can acquire information related to future broadcast services and content when the broadcast receiver cannot directly receive terrestrial broadcast signals. In addition, the redistribution module can support acquisition of future broadcast services and content by future broadcast systems when the broadcast receiver cannot directly receive terrestrial broadcast signals.

The companion device(s) can share audio, video or signaling data by being connected to the broadcast receiver according to the present invention. The companion device may be an external device connected to the broadcast receiver.

The external management module can refer to a module for broadcast services/content provision. For example, the external management module can be a future broadcast services/content server. The external management module may be an external device connected to the broadcast receiver.

Figure 42:
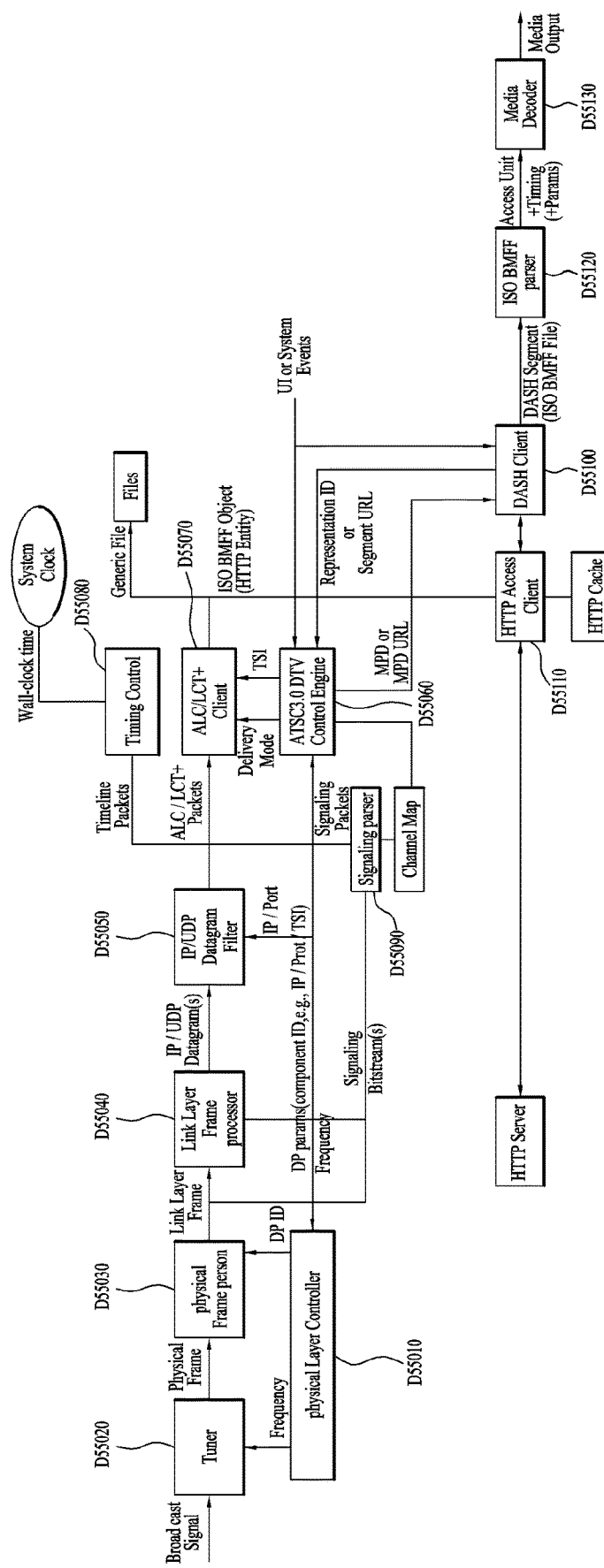
FIG. 42 is a block diagram illustrating a hybrid broadcast receiver according to an embodiment of the present invention.

FIG. 42 is a block diagram illustrating a hybrid broadcast receiver according to an embodiment of the present invention.

The hybrid broadcast receiver can receive hybrid broadcast services through interworking of terrestrial broadcasting and a broadband network in DTV services of a future broadcast system. The hybrid broadcast receiver can receive broadcast audio/video (A/V) content transmitted through terrestrial broadcasting and receive enhancement data related thereto or part of broadcast A/V content through the broadband network in real time. In the specification, the broadcast A/V content can be referred to as media content.

The hybrid broadcast receiver may include a physical layer controller D55010, a tuner D55020, a physical frame parser D55030, a link layer frame parser D55040, an IP/UDP datagram filter D55050, an ATSC 3.0 digital TV (DTV) control engine D55060, an ALC/LCT+ client D55070, a timing controller D55080, a signaling parser D55090, a dynamic adaptive streaming over HTTP (DASH) client D55100, an HTTP access client D55110, an ISO base media file format (BMFF) parser D55120 and/or a media decoder D55130.

The physical layer controller D55010 can control operations of the tuner D55020 and the physical frame parser D55030 using radio frequency (RF) information of a terrestrial broadcast channel that the hybrid broadcast receiver intends to receive.

The tuner D55020 can receive a broadcast related signal through a terrestrial broadcast channel, process the received signal and convert the signal into an appropriate format. For example, the tuner D55020 can convert a received terrestrial broadcast signal into physical frames.

The physical frame parser D55030 can parse a received physical frame and acquire a link layer frame through processing related thereto.

The link layer parser D55040 can execute related operations for acquisition of link layer signaling or an IP/UDP datagram from the link layer frame. The link layer parser D55040 can output at least one IP/UDP datagram.

The IP/UDP datagram filter D55050 can filter a specific IP/UDP datagram from the received at least one IP/UDP datagram. That is, the IP/UDP datagram filter D55050 can selectively filter an IP/UDP datagram, which is selected by the ATSC 3.0 DTV control engine, from the at least one IP/UDP datagram output from the link layer parser D55040. The IP/UDP datagram filter D55050 can output an application layer transport protocol packet such as ALC/LCT+.

The ATSC 3.0 DTV control engine D55060 can serve as an interface between modules included in the hybrid broadcast receiver. In addition, the ATSC 3.0 DTV control engine D55060 can deliver parameters necessary for each module to each module and control operation of each module through the parameters. In the present invention, the ATSC 3.0 DTV control engine D55060 can transfer media presentation description (MPD) and/or an MPD URL to the DASH client D55100. In addition, the ATSC 3.0 DTV control engine D55060 can transfer a delivery mode and/or a transport session identifier (TSI) to the ALC/LCT+ client D55070. Here, the TSI indicates an identifier of a session in which a transport packet including a signaling message such as MPD or MPD URL related signaling is transmitted, for example, ALC/LCT+ session corresponding to application layer transport protocol or FLUTE session. In addition, the TSI can correspond to an asset ID of an MMT.

The ALC/LCT+ client D55070 can generate one or more ISO base media file format (ISO MMFF) objects by processing an application layer transport protocol packet such as ALC/LCT+ and collecting and processing a plurality of packets. The application layer transport protocol packet may include an ALC/LCT packet, an ALC/LCT+ packet, a ROUTE packet and/or an MMTP packet.

The timing controller D55080 can process a packet including system time information and control a system clock according thereto.

The signaling parser D55090 can acquire and parse DTV broadcast service related signaling, and generate and manage a channel map on the basis of the parsed signaling. In the present invention, the signaling parser can parse MPD or MPD related information extended from signaling information.

The DASH client D55100 can execute operations related to real-time streaming or adaptive streaming. The DASH client D55100 can receive DASH content from an HTTP server through the HTTP access client D55110. The DASH client D55100 can process a received DASH segment and output an ISO BMFF object. In the present invention, the DASH client D55100 can deliver a fully qualified representation ID or a segment URL to the ATSC 3.0 DTV control engine D55060. Here, the fully qualified representation ID can refer to an ID corresponding to a combination of an MPD URL, period@id and representation@id, for example. In addition, the DASH client D55100 can receive the MPD or MPD URL from the ATSC 3.0 DTV control engine D55060. The DASH client D55100 can receive a desired media stream or DASH segment from the HTTP server using the received MPD or MPD URL. In the specification, the DASH client D55100 may be referred to as a processor.

The HTTP access client D55110 can request that the HTTP server provide specific information, receive a response to the request from the HTTP server and process the response. Here, the HTTP server can process the request received from the HTTP access client and provide a response to the request.

The ISO BMFF parser D55120 can extract audio/video data from the ISO BMFF object.

The media decoder D55130 can decode the received audio/video data and perform processing for presentation of the decoded audio/video data.

To provide hybrid broadcast services through interworking of a terrestrial broadcast network and a broadband network according to the hybrid broadcast receiver of the present invention, MPD needs to be extended or modified. The aforementioned terrestrial broadcast system can transmit extended or modified MPD and the hybrid broadcast receiver can receive content through broadcasting or a broadband network using the extended or modified MPD. That is, the hybrid broadcast receiver can receive the extended or modified MPD through terrestrial broadcasting and receive content through terrestrial broadcasting or a broadband network on the basis of the MPD. A description will be given of elements or attributes that need to be additionally included in the extended or modified MPD, compared to the conventional MPD. In the following, the extended or modified MPD is referred to as MPD.

The MPD can be extended or modified to represent ATSC 3.0 service. The extended or modified MPD can additionally include MPD @ anchorPresentationTime, Common@ presentable, Common.Targeting, Common.TargetDevice and/or Common@associatedTo.

MPD@anchorPresentationTime can indicate presentation time anchor of segments included in the MPD, that is, base time. In the following, MPD@anchorPresentationTime can be used as effective time of the MPD. MPD@ anchorPresentationTime can indicate the earliest playback time from among segments included in the MPD.

The MPD may further include common attributes and elements. The common attributes and elements can be applied to AdaptionSet and Representation in the MPD. Common@presentable can indicate that media described by the MPD is a presentable component.

Common.Targeting can indicate targeting properties and/or personalization properties of the media described by the MPD.

Common.TargetDevice can indicate a target device or target devices of the media described by the MPD.

Common@ associatedTo can indicate adaptationSet and/or representation related to the media described by the MPD.

In addition, MPD@id, Period@id and AdaptationSet@id included in the MPD may be necessary to specify media content described by the MPD. That is, the DASH client can specify content to be received on the basis of the MPD using MPD@id, Period@id and AdaptationSet@id and signal the content to the ATSC 3.0 DTV control engine. The ATSC 3.0 DTV control engine can receive the corresponding content and deliver the content to the DASH client.

Figure 43:
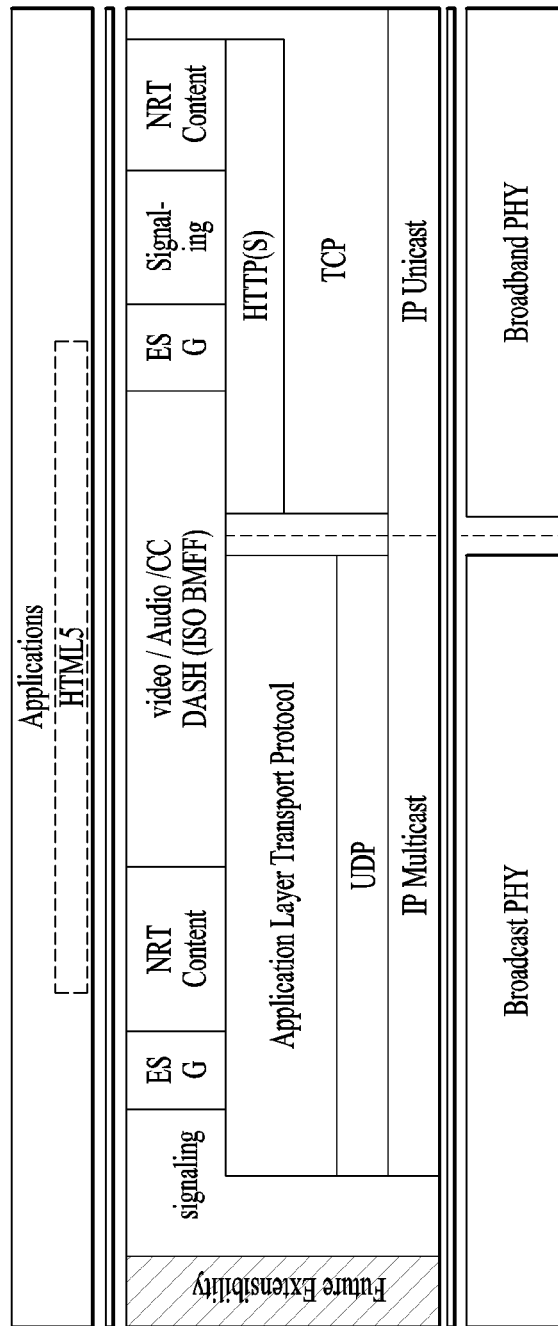
FIG. 43 illustrates a protocol stack of a future hybrid broadcast system according to an embodiment of the present invention.

FIG. 43 illustrates a protocol stack of a future hybrid broadcast system according to an embodiment of the present invention. As shown in the figure, a future broadcast transmission system supporting IP based hybrid broadcasting can encapsulate audio or video data of broadcast services in the ISO base media file format (BMFF). Here, a DASH segment or a media processing unit (MPU) of an MMT can be used for encapsulation. In addition, the future broadcast system can equally transmit the encapsulated data through a broadcast network and the Internet or differently transmit the encapsulated data through the broadcast network and the Internet according to attributes of the respective networks. Furthermore, the future broadcast system can equally transmit the encapsulated data using at least one of broadcast or broadband. In the case of a broadcast network using broadcast, the broadcast system can transmit data encapsulated in the ISO BMFF through an application layer transport protocol packet which supports real-time object transmission. For example, the broadcast system can encapsulate data in a real-time object delivery over unidirectional transport (ROUTE) or MMTP transport packet. The broadcast system can process the encapsulated data into an IP/UDP datagram, load the IP/UDP datagram in a broadcast signal and transmit the broadcast signal. When broadband is used, the broadcast system can deliver the encapsulated data to a receiving side through streaming such as DASH.

In addition, the broadcast system can transmit broadcast service signaling information as follows. In the case of a broadcast network using broadcast, the broadcast system can transmit signaling information through physical layers of the future broadcast transmission system and the broadcast network according to signaling attributes. Here, the broadcast system can transmit the signaling information through a specific data pipe (DP) of a transport frame included in a broadcast signal. Signaling information transmitted through broadcast may have a form of being encapsulated in a bitstream or IP/UDP datagram. When broadband is used, the broadcast system can return and deliver signaling data to a receiver in response to a request of the receiver.

In addition, the broadcast system can transmit broadcast service ESG or NRT content through the following method. In the case of a broadcast network using broadcast, the broadcast system can encapsulate the ESG or NRT content in an application layer transport protocol packet, for example, real-time object delivery over unidirectional transport (ROUTE) or MMTP transport packet. The broadcast system can generate an IP/UDP datagram with the encapsulated ESG or NRT content, load the IP/UDP datagram in a broadcast signal and transmit the broadcast signal. When broadband is used, the broadcast system can return and deliver the ESG or NRT content to a receiver in response to a request of the receiver.

Figure 44:
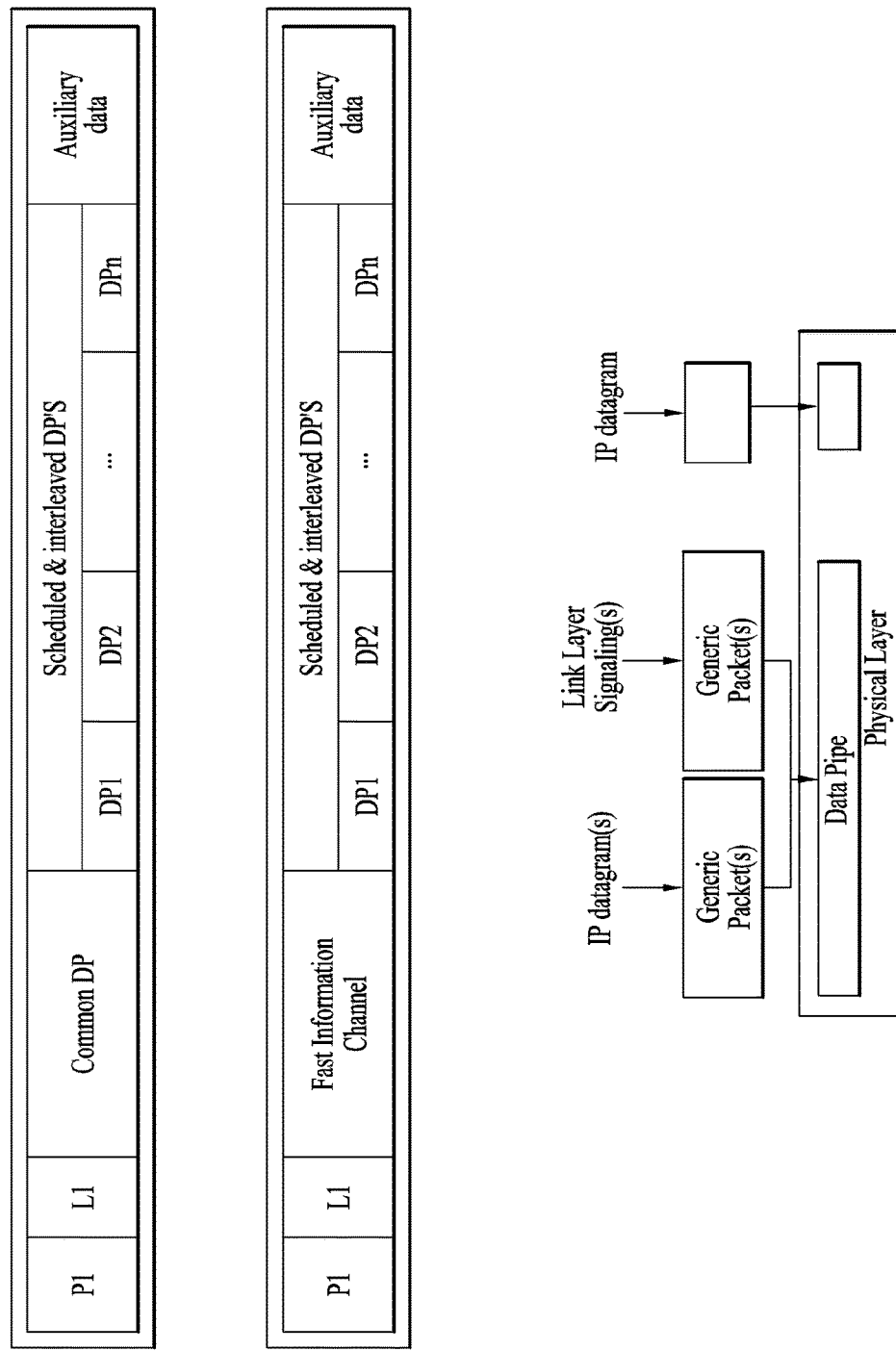
FIG. 44 illustrates a structure of a transport frame delivered to a physical layer of a future broadcast transmission system according to an embodiment of the present invention.

FIG. 44 illustrates a structure of a transport frame delivered to a physical layer of the future broadcast transmission system according to an embodiment of the present invention. The future broadcast system can transmit a transport frame using broadcast. In the figure, P1 located at the front of the transport frame can refer to a symbol including information for transport signal detection. P1 can include tuning information and a receiver can decode a part L1 following P1 on the basis of a parameter included in the symbol P1. The broadcast system can include, in the part L1, information about transport frame configuration and characteristics of data pipes. That is, the receiver can obtain the information about the transport frame configuration and characteristics of data pipes by decoding the part L1. In addition, the receiver can acquire information that needs to be shared between DPs through a common DP. According to an embodiment, the transport frame may not include the common DP.

Components such as audio, video and data in the transport frame are included in an interleaved DP region composed of DP1 to DPn and transmitted. Here, DPs through which components constituting each service (channel) are transmitted can be signaled through L1 or a common PLP.

In addition, the future broadcast system can transmit information for rapidly acquiring information about services included in a transport frame. That is, the future broadcast system enables a future broadcast receiver to rapidly acquire broadcast services and content related information included in a transport frame. When services/content generated by one or more broadcasting stations are present in the corresponding frame, the future broadcast system can enable the receiver to efficiently recognize the services/content according to the broadcasting stations. That is, the future broadcast system can include, in a transport stream, service list information about services included in the transport stream, and transmit the transport stream including the service list information.

When an additional channel, for example, a fast information channel (FIC) is present, the broadcast system can transmit broadcast service related information through the additional channel such that the receiver can rapidly scan broadcast services and content in a corresponding frequency. As shown in FIG. 44, the broadcast system can include, in the transport stream, information for broadcast service scan and acquisition and transmit the same. Here, the region including the information for broadcast service scan and acquisition may be referred to as an FIC. The receiver can acquire information about broadcast services generated and transmitted by one or more broadcasting stations and easily and rapidly scan broadcast services available therein using the information.

In addition, a specific DP included in the transport stream can serve as a base DP capable of rapidly and robustly delivering signaling about broadcast services and content transmitted in the corresponding transport frame. Data transmitted through each DP of the transport frame of the physical layer is as shown in the lower part of FIG. 44. That is, link layer signaling or an IP datagram can be encapsulated in a generic packet in a specific format and then transmitted through a DP. Here, the IP datagram can include signaling data. Link (low) layer signaling can include signaling related to fast service scan/acquisition, context information of IP header compression and emergency alert.

Figure 45:
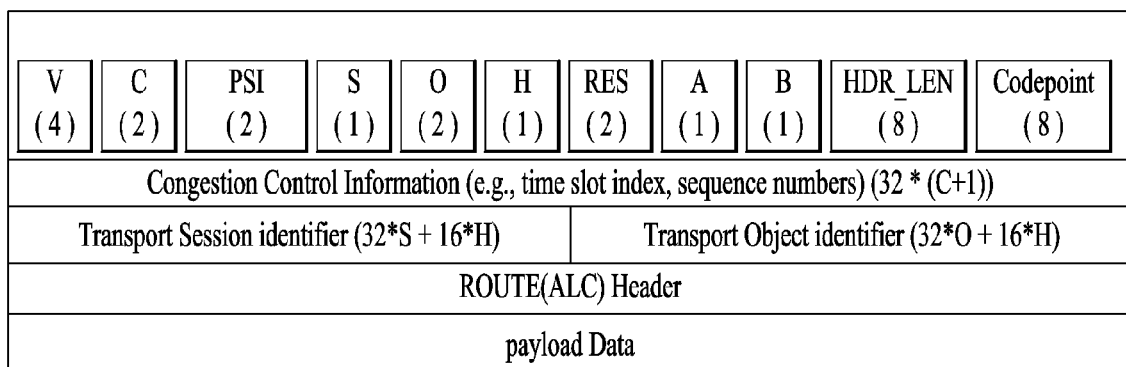
FIG. 45 illustrates a transport packet of an application layer transport protocol according to an embodiment of the present invention.

FIG. 45 illustrates a transport packet of an application layer transport protocol according to an embodiment of the present invention. An application layer transport session can be composed of a combination of an IP address and a port number. When the application layer transport protocol corresponds to ROUTE, a ROUTE session can be composed of one or more layered coding transport (LCT) sessions. For example, when a single media component (e.g., DASH representation) is delivered through a single LCT transport session, one or more media components can be multiplexed and delivered through a single application transport session. Furthermore, one or more transport objects can be delivered through a single LCT transport session, and each transport object can be a DASH segment associated with DASH representation delivered through the transport session.

For example, when the application layer transport protocol is an LCT based protocol, a transport packet can be configured as follows. The transport packet can include an LCT header, a ROUTE header and payload data. A plurality of fields included in the transport packet is as follows.

The LCT header can include the following fields. A version field V can indicate version information of the corresponding transport protocol packet. A field C can include a flag related to the length of a congestion control information field which will be described below. A field PSI can indicate protocol-specific information, that is, information specific to the corresponding protocol. A field S can indicate a flag associated with the length of a transport session identifier (TSI) field. A field O can indicate a flag associated with the length of a transport object identifier (TOI) field. A field H can indicate whether a half-word (16 bits) is added to the lengths of the TSI field and the TOI field. A field A (close session flag) can indicate that a session is closed or closure of the session is imminent. A field B (close object flag) can indicate that an object being transmitted is closed or closure of the object is imminent. A code point field can indicate information related to encoding or decoding of a payload of the corresponding packet. For example, payload type can correspond to the information. A congestion control information field can indicate information related to congestion control. For example, the information related to congestion control can be a current time slot index (CTSI), a channel number or a packet sequence number in the corresponding channel A transport session identifier field can indicate a transport field identifier. A transport object identifier field can indicate an identifier of an object transmitted through the corresponding transport session.

A ROUTE (ALC) header can include additional information of the preceding LCT header, such as a payload identifier related to a forward error correction scheme.

Payload data can indicate a data part of the payload of the corresponding packet.

FIG. 46 illustrates a method for transmitting signaling data by the future broadcast system according to an embodiment of the present invention. Signaling data of the future broadcast system can be transmitted as shown in the figure. To enable the receiver to support fast service/content scan and acquisition, the future broadcast transmission system can transmit signaling data with respect to a broadcast service delivered through a corresponding physical layer frame, via a fast information channel (FIC). In the specification, the FIC can refer to information about a service list. Unless an additional FIC is present, the signaling data may be delivered through a path through which link layer signaling is delivered. That is, signaling information including information about services and components (audio and video) thereof can be encapsulated in an IP/UDP datagram and transmitted through one or more DPs in the physical layer frame. According to an embodiment, signaling information about services and service components can be encapsulated in an application layer transport packet (e.g. a ROUTE packet or an MMTP packet) and transmitted.

The upper part of FIG. 46 illustrates an example of delivering the aforementioned signaling data through an FIC or one or more DPs. That is, signaling data for supporting fast service scan/acquisition can be delivered through the FIC and signaling data including detailed information about services can be encapsulated in an IP datagram and transmitted through a specific DP. In the specification, the signaling data including detailed information about services may be referred to as service layer signaling.

The middle part of FIG. 46 illustrates an example of delivering the aforementioned signaling data through an FIC and one or more DPs. That is, signaling data for supporting fast service scan/acquisition can be delivered through the FIC and signaling data including detailed information about services can be encapsulated in an IP datagram and transmitted through a specific DP. In addition, part of signaling data including information about a specific component included in a service may be delivered through one or more transport sessions in the application layer transport protocol. For example, part of the signaling data can be delivered through one or more transport sessions in a ROUTE session.

The lower part of FIG. 46 illustrates an example of delivering the aforementioned signaling data through an FIC and one or more DPs. That is, signaling data for supporting fast service scan/acquisition can be delivered through the FIC and signaling data including detailed information about services can be delivered through one or more sessions in a ROUTE session.

FIG. 47 is a table showing signaling data transmitted, by the future broadcast system according to an embodiment of the present invention, for fast broadcast service scan of a receiver. The specification proposes signaling information for allowing a future broadcast reception apparatus to scan and acquire broadcast services. In the future broadcast system, broadcast services and content generated by one or more broadcasting stations can be transmitted within a specific frequency. The receiver can use the aforementioned signaling information to rapidly and easily scan broadcasting stations and services/contents thereof, included in the corresponding frequency. The signaling information can be represented by the illustrated syntax and expressed in other formats such as XML.

The signaling information for fast service scan and acquisition can be delivered to a fast information channel (FIC) corresponding to an additional channel in a physical layer transport frame. Furthermore, the aforementioned signaling information may be delivered through a common DP capable of carrying information that can be shared between data pipes of the physical layer. The signaling information may be delivered through a path through which link layer signaling is transmitted. The signaling information may be encapsulated in an IP datagram and delivered through a specific DP. Furthermore, the signaling information may be delivered via a service signaling channel through which service signaling is transmitted or a transport session of an application layer.

The signaling information (FIC information) for fast service scan and acquisition can include at least one of the following fields. In the specification, the FIC information can be referred to as service acquisition information. An FIC_portocol_version field can indicate the version of the structure of the signaling information. A TSID field can indicate an identifier of the overall broadcast stream. An FIC_data_version field can indicate the data version of the FIC information. The value of the FIC_data_version field can increase when the FIC is changed. A num_partitions field can indicate the number of partitions of a broadcast stream. To use the num_partitions field, it is assumed that each broadcast stream can be segmented into one or more partitions and transmitted. Each partition can include a plurality of DPs of a single broadcaster. Each partition can indicate a part of a broadcast stream used by a single broadcaster. A partition_protocol_version field can indicate the version of the aforementioned partition structure. A base_DP_ID field can indicate the identifier of a base DP of the corresponding partition. The base DP can include a service signaling table. The service signaling table can include a list of all services in the corresponding partition. That is, the service signaling table can list transmitted services. In addition, the service signaling table can define basic attributes of each service. The base DP may be a robust DP in the corresponding partition and may include another signaling table with respect to the corresponding partition. A base_DP_version field can indicate version information representing change of data transmitted through the base DP. For example, when serving signaling information is delivered through the base DP, the base_DP_version field can increase by 1 if the serving signaling information is changed. A num_services field can indicate the number of one or more components belonging to the corresponding partition. A service_id field can indicate a service identifier. A channel_number field can indicate a channel number associated with the corresponding service. A service_category field can indicate the category of the corresponding service. For example, the service_category field can indicate A/V, audio, ESG, CoD, etc. A short_service_name_length field can indicate the length of the name of the corresponding service. A short_Service_name field can indicate the name of the corresponding service. A service_status field can indicate the status of the corresponding service. The service_status field can indicate an "active", "suspended", "hidden" or "shown" attribute. A service_distribution field can have an attribute similar to "multi-ensemble" flag of the ATSC M/H document. For example, the service_distribution field can indicate information about whether the corresponding service is included in the corresponding partition, the service is presentable only with the corresponding partition although the service is partially included in the partition, another partition is necessary for presentation, or other broadcast streams are necessary for presentation. An sp_indicator field is a service protection flag and can indicate whether one or more components necessary for presentation are protected.

FIG. 48 is a table showing signaling data transmitted, by the future broadcast system according to an embodiment of the present invention, for fast broadcast service scan of a receiver. The FIC information (service acquisition information) for supporting fast broadcast service scan and service/component acquisition can include information about an application layer transport session for delivering service and component data. As illustrated, the FIC information can be represented in a binary format. However, the FIC information may be represented in other formats such as XML according to embodiments. The FIC information can include the following fields. An FIC_portocol_version field can indicate the version of the structure of the signaling information. A TSID field can indicate an identifier of the overall broadcast stream. An FIC_data_version field can indicate the data version of the FIC information. The value of the FIC_data_version field can increase when the FIC is changed. A num_partitions field can indicate the number of partitions of a broadcast stream. To use the num_partitions field, it is assumed that each broadcast stream can be segmented into one or more partitions and transmitted. Each partition can include a plurality of DPs of a single broadcaster. Each partition can indicate a part of a broadcast stream used by a single broadcaster. A partition_id field can indicate the identifier of the corresponding partition. A partition_protocol_version field can indicate the version of the aforementioned partition structure. A num_services field can indicate the number of one or more components belonging to the corresponding partition. A service_id field can indicate a service identifier. A service_data_version field can indicate a change of service loop data in the FIC or a change of serving signaling data related to the corresponding service. The value of the service_data_version field can increase by 1 whenever included service data is changed. The receiver can detect data change in a service loop of the FIC or change of signaling related to the corresponding service using the service_data_version field. A channel_number field can indicate a channel number associated with the corresponding service. A service_category field can indicate the category of the corresponding service. For example, the service_category field can indicate A/V, audio, ESG, CoD, etc. A short_service_name_length field can indicate the length of the name of the corresponding service. A short_Service_name field can indicate the name of the corresponding service. A service_status field can indicate the status of the corresponding service. The service_status field can indicate an attribute "active", "suspended", "hidden" or "shown". A service_distribution field can have an attribute similar to the "multi-ensemble" flag of the ATSC M/H document. For example, the service_distribution field can indicate information about whether the corresponding service is included in the corresponding partition, the service is presentable only with the corresponding partition although the service is partially included in the partition, another partition is necessary for presentation, or other broadcast streams are necessary for presentation. An sp_indicator field is a service protection flag and can indicate whether one or more components necessary for presentation are protected. An IP_version_flag field can indicate the following IP address format. The IP_version_flag field can indicate that IPv4 is used when the value thereof is 0 and indicate that IPv6 is used when the value thereof is 1. A source_IP_address_flag field can indicate whether the FIC information includes source_IP_addr. The source_IP_address_flag field can indicate presence of source_IP_addr when the value thereof is 1. A num_transport_session field can indicate the number of transport sessions (e.g. ROUTE or MMTP sessions) in which component data of the corresponding service is transmitted in a broadcast stream. A source_IP_addr field can indicate the source IP address of an IP datagram including the component data of the corresponding service when the source_IP_address_flag is 1. A dest_IP_addr field can indicate the destination IP address of the IP datagram including the component data of the corresponding service. A dest_UDP_port field can indicate the UDP port number of the IP datagram including the component data of the corresponding service. An LSID_DP field can indicate the identifier of a data pipe of a physical layer, which delivers signaling including detailed information about a transport session. In the case of ROUTE, for example, the signaling including the detailed information about the transport session can be an LCT session instance description including information about an LCT transport session of a ROUTE session. A service_signaling_flag field can indicate whether service signaling is transmitted through the corresponding transport session. The service_signaling_flag field can indicate that data transmitted through the corresponding transport session (e.g. ROUTE or MMTP session) includes the service signaling when the value thereof is 1. A transport session descriptors field can include transport session level descriptors. Each descriptor can be extended and include a num_descriptors field. Each descriptor can include as many descriptor loops as a number corresponding to a value indicated by the num_descriptors field. The transport session descriptors field can include transport session level descriptors. A service descriptors field can include service level descriptors. A partition descriptors field can include a partition level descriptor, and one partition can indicate part of broadcast streams used by a single broadcaster. An FIC session descriptors field can include FIC level descriptors. According to an embodiment, the fields included in the FIC may be included in a table other than the FIC and transmitted along with a broadcast signal.

Figure 49:
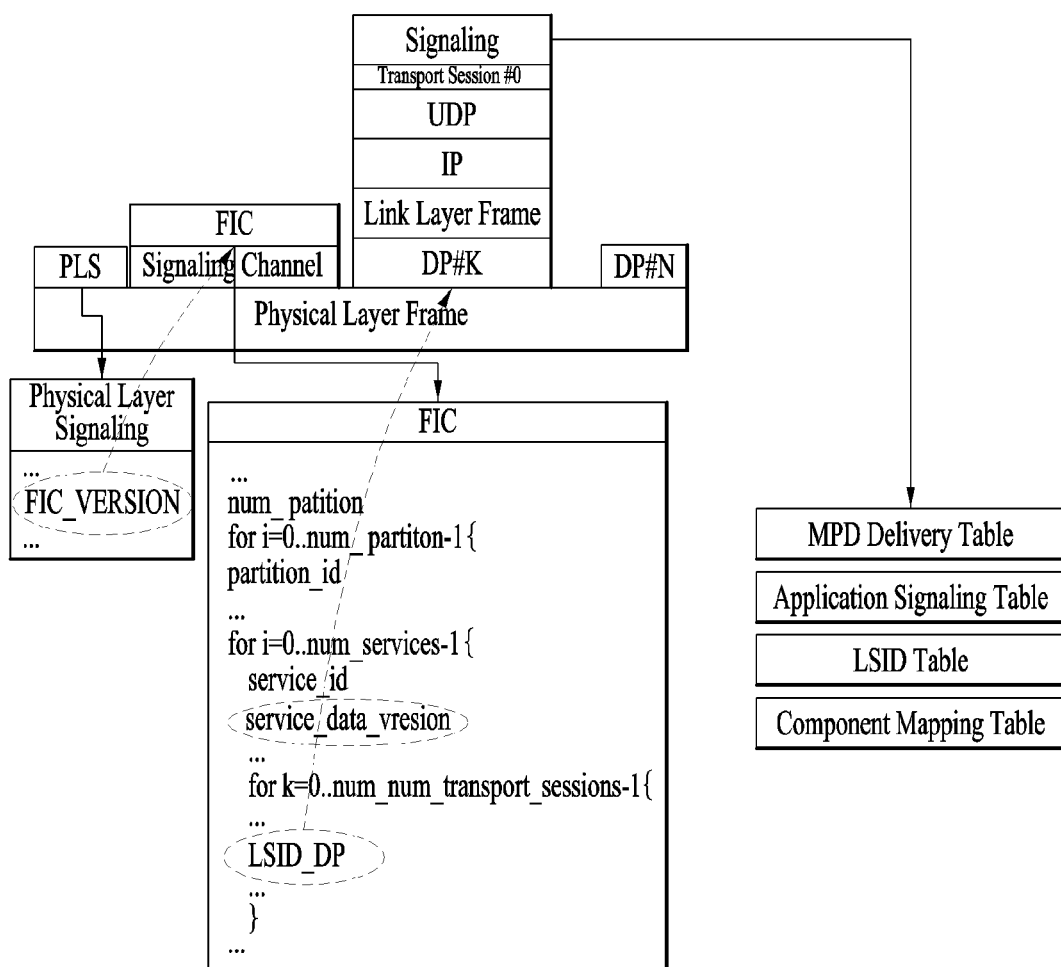
FIG. 49 illustrates a method for transmitting FIC based signaling according to an embodiment of the present invention.

FIG. 49 illustrates a method for transmitting FIC based signaling according to an embodiment of the present invention. The aforementioned example of delivering FIC based signaling is shown in the figure. In the specification, FIC based signaling can be referred to as service acquisition information or service acquisition signaling. As shown in the figure, physical layer signaling can include a field with respect to the service acquisition information. The field with respect to the service acquisition information can indicate whether the service acquisition information FIC is parsed to the receiver. The receiver can check whether service signaling data has been changed through service_data_version information by parsing the service acquisition information. When the service signaling data has been changed, the broadcast signal receiver can confirm a data pipe identifier of the physical layer which delivers signaling including detailed information about the corresponding transport session, using an LSID_DP field. The broadcast receiver can confirm detailed information about the transport session by parsing a DP indicated by the DP identifier. That is, the signaling method of the future broadcast system can include a sequence of confirming detailed information about the transport session by signaling whether the service acquisition information is parsed through the physical layer signaling and signaling the position of the detailed information about the transmission session through the service acquisition information. Here, the detailed information about the transport session can include an MPD transport table, an application signaling table, a transport session descriptor (LSID) and/or a component mapping table (CMT).

FIG. 50 illustrates signaling data transmitted, by the future broadcast system according to an embodiment, for fast broadcast service scan of a receiver. The FIC information (service acquisition information) for supporting fast broadcast service scan and service/component acquisition can include information about an application layer transport session for delivering service and component data. As illustrated, the FIC information can be represented in a binary format. However, the FIC information may be represented in other formats such as XML according to embodiments. The FIC information can include the following fields. An FIC_portocol_version field can indicate the version of the structure of the signaling information. A TSID field can indicate an identifier of the overall broadcast stream. An FIC_data_version field can indicate the data version of the FIC information. The value of the FIC_data_version field can increase when the FIC is changed. A num_partitions field can indicate the number of partitions of a broadcast stream. To use the num_partitions field, it is assumed that each broadcast stream can be segmented into one or more partitions and transmitted. Each partition can include a plurality of DPs of a single broadcaster. Each partition can indicate a part of a broadcast stream used by a single broadcaster. A partition_id field can indicate the identifier of the corresponding partition. A partition_protocol_version field can indicate the version of the aforementioned partition structure. A num_services field can indicate the number of one or more components belonging to the corresponding partition. A service_id field can indicate a service identifier. A service_data_version field can indicate a change of service loop data in the FIC or a change of serving signaling data related to the corresponding service. The value of the service_data_version field can increase by 1 whenever included service data is changed. The receiver can detect data change in a service loop of the FIC or change of signaling related to the corresponding service using the service_data_version field. A channel_number field can indicate a channel number associated with the corresponding service. A service_category field can indicate the category of the corresponding service. For example, the service_category field can indicate A/V, audio, ESG, CoD, etc. A short_service_name_length field can indicate the length of the name of the corresponding service. A short_Service_ name field can indicate the name of the corresponding service. A service_status field can indicate the status of the corresponding service. The service_status field can indicate an "active", "suspended", "hidden" or "shown" attribute. A service_distribution field can have an attribute similar to "multi-ensemble" flag of the ATSC M/H document. For example, the service_distribution field can indicate information about whether the corresponding service is included in the corresponding partition, whether the service is presentable only with the corresponding partition although the service is partially included in the partition, whether another partition is necessary for presentation, or whether other broadcast streams are necessary for presentation. An sp_indicator field is a service protection flag and can indicate whether one or more components necessary for presentation are protected. An IP_version_flag field can indicate the following IP address format. The IP_version_flag field can indicate that IPv4 is used when the value thereof is 0 and indicate that IPv6 is used when the value thereof is 1. A source_IP_address_flag field can indicate whether the FIC information includes source_IP_addr. The source_IP_address_flag field can indicate presence of source_IP_addr when the value thereof is 1. A num_transport_session field can indicate the number of transport sessions (e.g. ROUTE or MMTP sessions) in which component data of the corresponding service is transmitted in a broadcast stream. A source_IP_addr field can indicate the source IP address of an IP datagram including the component data of the corresponding service when the source_IP_address_flag is 1. A dest_IP_addr field can indicate the destination IP address of the IP datagram including the component data of the corresponding service. A dest_UDP_port field can indicate the UDP port number of the IP datagram including the component data of the corresponding service. An LSID_DP field can indicate the identifier of a data pipe of a physical layer, which delivers signaling including detailed information about a transport session. In the case of ROUTE, for example, the signaling including the detailed information about the transport session can be LCT session instance description including information about an LCT transport session of a ROUTE session. A service_signaling_flag field can indicate whether service signaling is transmitted through the corresponding transport session. The service_signaling_ flag field can indicate presence of a DP including service signaling when the value thereof is 1. A signaling_data_version field can indicate a change of related service signaling data. The value of the signaling_data_version field can increase by 1 whenever the service signaling data is changed. The receiver can detect a change of signaling related to the corresponding service using the signaling_data_version field. A signaling_DP field can indicate the identifier of a data pipe of the physical layer, which delivers service signaling. A transport session descriptors field can include transport session level descriptors. Each descriptor can be extended and include a num_descriptors field. Each descriptor can include as many descriptor loops as a number corresponding to a value indicated by the num_descriptors field. The transport session descriptors field can include transport session level descriptors. A service descriptors field can include service level descriptors. A partition descriptors field can include a partition level descriptor, and one partition can indicate part of broadcast streams used by a single broadcaster. An FIC session descriptors field can include FIC level descriptors. According to an embodiment, the fields included in the FIC may be included in a table other than the FIC and transmitted along with a broadcast signal.

Figure 51:
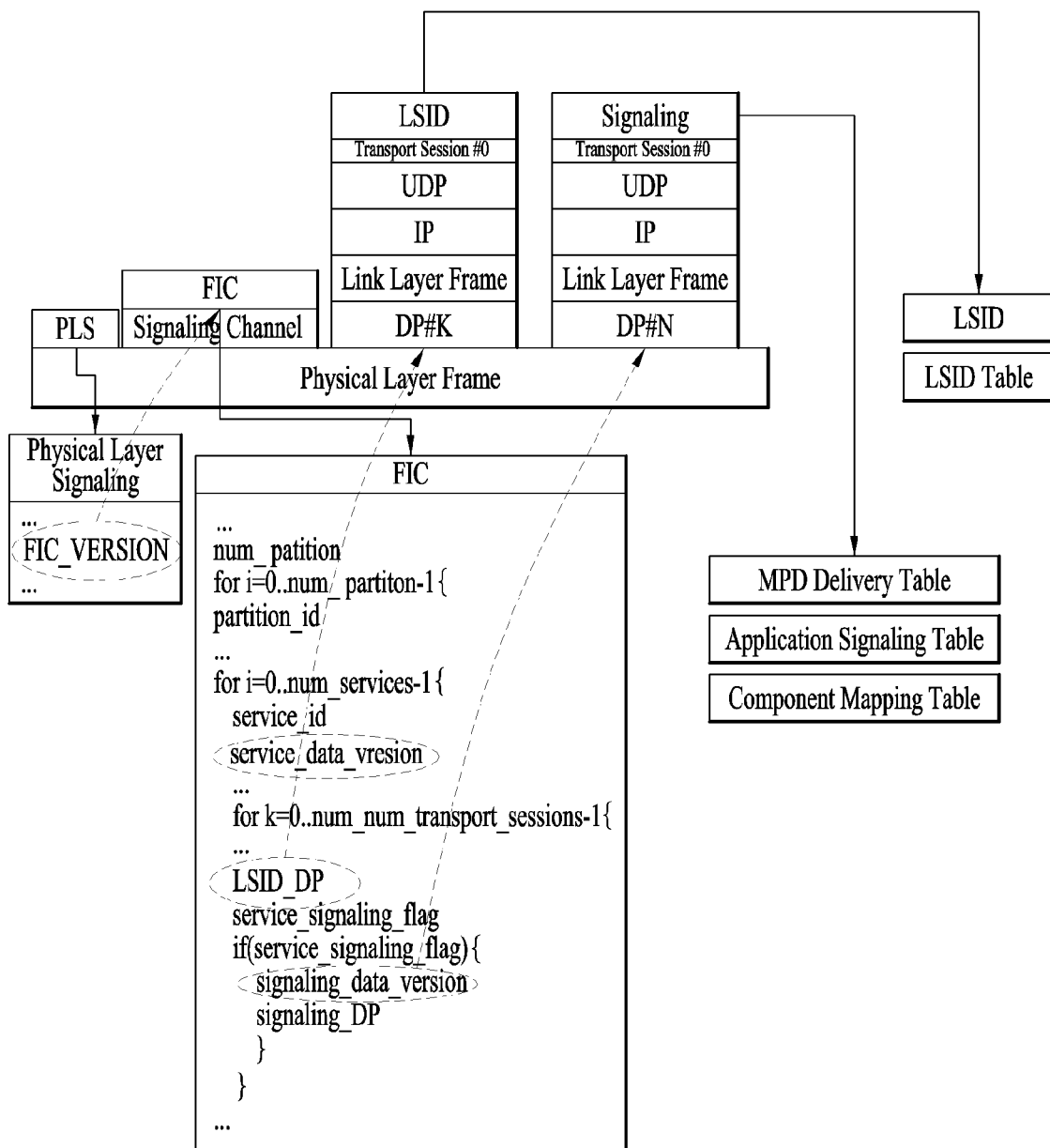
FIG. 51 illustrates a method for transmitting FIC based signaling according to another embodiment of the present invention.

FIG. 51 illustrates a method for transmitting FIC based signaling according to another embodiment of the present invention. The aforementioned example of delivering FIC based signaling is as shown in the figure. In the specification, FIC based signaling can be referred to as service acquisition information or service acquisition signaling. As shown in the figure, physical layer signaling can include a field with respect to the service acquisition information. The field with respect to the service acquisition information can indicate whether the service acquisition information FIC is parsed to the receiver. The receiver can check whether service signaling data has been changed through service_data_version information by parsing the service acquisition information. When the service signaling data has been changed, the broadcast signal receiver can acquire LSID or an LSID table, which includes detailed information about the corresponding transport session, using an LSID_DP field through a DP identified from the LSID_DP field. In addition, the receiver can recognize a change of signaling data using information such as the service_signaling_flag, signaling_data_version and signaling_DP and acquire the signaling data through an identified DP.

That is, the signaling method of the future broadcast system can include a sequence of confirming detailed information about the transport session by signaling whether the service acquisition information is parsed through the physical layer signaling and signaling the position of the detailed information about the transmission session through the service acquisition information. Here, the detailed information about the transport session can include an MPD transport table, an application signaling table, a transport session descriptor (LSID) and/or a component mapping table (CMT), and detailed information of transmission sessions can be delivered according to different examples.

FIG. 52 illustrates a service signaling message format of the future broadcast system according to an embodiment of the present invention. In the specification, a service signaling message can be referred to as signaling data or service layer signaling including detailed information about services. The service signaling message may include a signaling message header and a signaling message. The signaling message can be represented in a binary or XML format. The signaling message can be included in an IP datagram or a payload of an application layer transport packet (e.g. ROUTE or MMTP packet) and transmitted. The signaling message header may have the following syntax and can be represented in a format such as XML. The signaling message header can include the following fields. A signaling_id field can indicate a signaling message identifier. For example, when the signaling message is represented in the form of a section, the signaling_id field can indicate the ID of a signaling table section. A signaling_length field can indicate the length of the signaling message. A signaling_id_extension field can indicate extension information about the identifier of the signaling message. The signaling_id_extension field can be used as signaling identification information along with the signaling_id field. For example, the signaling_id_extension field can include the protocol version of the signaling message. A version_number field can indicate version information of the signaling message. The version_number field can be changed when the contents of the signaling message are changed. A current_next_indicator field can indicate whether the signaling message is currently available. The current_next_indicator field can indicate that the signaling message is currently available when the value thereof is 1. The current_next_indicator field can indicate that the signaling message is not currently available and a signaling message including the same signaling_id, signaling_id_extension or fragment_number may be available in the future when the value thereof is 0. A fragmentation_indicator field can indicate whether the signaling message has been fragmented. The fragmentation_indicator field indicates that the corresponding signaling message has been fragmented when the value thereof is 1. In this case, inclusion of part of signaling data can be indicated through signaling_message_data( ). When the value of the fragmentation_indicator field is 0, inclusion of the entire signaling data can be indicated through signaling_message_data( ). A payload_format_indicator field can indicate whether the current signaling message header includes a payload_format value. A payload_format_indicator field value of 1 can indicate that the signaling message header includes a payload_format value. An expiration_indicator field can indicate whether the current signaling message header includes an expiration value. An expiration_indicator field value of 1 can indicate that the signaling message header includes an expiration value. A fragment_number field can indicate a fragment number of the current signaling message when a single signaling message is divided into multiple fragments and transmitted. A last_fragment_number field can indicate the number of a fragment including the last data of the corresponding signaling message when a single signaling message is divided into multiple fragments and transmitted. A payload_format field can indicate the format of signaling message data included in a payload. In an embodiment, the payload_format field can be represented in a binary or XML format. An expiration field can indicate effective time of the signaling message included in the payload.

FIG. 53 shows service signaling tables used in the future broadcast system according to an embodiment of the present invention. Service signaling tables/messages according to the present invention are as described below and can include the following information and be signaled. Information included in tables/messages can be individually transmitted per table and is not limited to the illustrated embodiments. According to an embodiment, signaling information belonging to different tables may be merged into one table and transmitted. A service mapping table can include service attributes and service related information. For example, attribute information of services can include information such as IDs, names and categories of the services, and information related to services can include information about paths through which the services can be acquired. An MPD delivery table can include DASH MPD related to services/content or information on paths through which DASH MPD can be acquired. A component mapping table can include component information in services and component related information. The component information can include related DASH representation information, and the component related information can include information on paths through which components can be acquired. An LSID table can include information about transport sessions for delivering services/components and transport packet configurations. An initialization segment delivery table can include initialization segment information about DASH representation related to components in services or information about paths through which the initialization segment information can be acquired. An application parameter table can include detailed information about applications relate to broadcast services and information about paths through which the detailed information can be obtained. When such signaling messages/tables are transmitted through a broadcast network, the signaling messages/tables can be transmitted through a fast information channel (FIC), a service signaling channel (SSC), an application layer transport session (e.g., ROUTE or MMTP session) or the like. Furthermore, the signaling messages/tables can be transmitted over the Internet (broadband).

FIG. 54 shows a service mapping table used in the future broadcast system according to an embodiment of the present invention. The following description may be transmitted by being included in a service signaling message part following a signaling message header.

The service mapping table can include information about service mapping signaling and can be represented in XML or binary format. The service mapping table corresponding to service signaling information can include service identifier information, service type information, service name information, channel number information, ROUTE session related information, MPD related information and component signaling position information. The service identifier can indicate information identifying a service and can be represented as an id attribute. The service type information can indicate the type of the service and can be represented as a serviceType attribute. The service name information can indicate the name of the service and can be represented as a serviceName attribute. The channel number information can indicate a channel number related to the service and can be represented as a channelNumber attribute.

The ROUTE session related information can include sourceIP, destinationIP and destinationPort attributes. The sourceIP attribute can indicate a source address of IP datagrams carrying associated data. The destinationIP attribute can indicate a destination address of the IP datagrams carrying associated data. The destinationPort attribute can indicate a destination port number of the IP datagrams carrying associated data.

In addition, the ROUTE session related information can include detailed information (LSID) about transport sessions. For example, the ROUTE session related information can include LSID location information and delivery mode information of LSID location information. Furthermore, the detailed information LSID about transport sessions can include bootstrap information. The bootstrap information included in LSID can include LSID bootstrap information according to delivery mode. Attributes included in the bootstrap information will be described in detail below.

The MPD related information can include information about MPD or MPD signaling location. The information about MPD can include a version attribute and indicate the version of MPD. The MPD signaling location information can indicate a location where signaling related to MPD or MPD URL can be acquired. Delivery mode information included in MPD signaling location can indicate a delivery mode of the MPD location signaling. Bootstrap information included in the MPD signaling location can include bootstrap information of MPD or MPD URL according to the delivery mode.

The component signaling location related information can include a delivery mode attribute. The delivery mode attribute can indicate a delivery mode of corresponding component signaling location information. The bootstrap information included in the MPD signaling location can include bootstrap information of corresponding component location signaling according to the delivery mode.

The bootstrap information can include at least one of the following attributes according to delivery mode.

A sourceIP attribute can indicate a source address of IP datagrams carrying associated data. A destinationIP attribute can indicate a destination address of the IP datagrams carrying associated data. A destinationPort attribute can indicate a destination port number of the IP datagrams carrying associated data. A tsi attribute can include the identifier of a transport session delivering transport packets carrying associated data. A URL attribute can indicate a URL where associated data can be acquired. A packetid attribute can indicate the identifier of transport packets carrying associated data.

FIG. 55 shows a service signaling table of the future broadcast system according to an embodiment of the present invention. The future broadcast system can provide broadcast service signaling such that the receiver can receive broadcast services and content. This allows the receiver to acquire related signaling when signaling data is transmitted through the same transport session identifier TSI. The service signaling table can be represented in a binary format as illustrated and may be represented in other formats such as XML according to embodiments. In addition, the service signaling table can encapsulated in the aforementioned signaling message format. The service signaling table can include the following fields. An SST_portocol_version field can indicate the version of the service signaling table. A partition_id field can indicate the identifier of a corresponding partition. An SST_data_version field can indicate the data version of the corresponding service signaling table. A num_services field can indicate the number of one or more services included in the corresponding partition. A service_id field can indicate the identifier of the corresponding service. A service_name field can indicate the name of the corresponding service. An MPD_availability field can indicate whether MPD can be acquired through broadcast, a cellular network and/or Wi-Fi/Ethernet. A CMT_availability field can indicate whether a component mapping table (CMT) can be used through broadcast, a cellular network and/or Wi-Fi/Ethernet. An ASL_availability field can indicate whether an application signaling table (AST) can be used through broadcast, a cellular network and/or Wi-Fi/Ethernet. A DP_ID field can indicate the identifier of a DP carrying the MPD, CMT and/or ASL through broadcast. An LCT_IP_address field can indicate the IP address of an LCT channel delivering the MPD, CMT and/or ASL. An LCT_UDP_port field can indicate a UDP port of the LCT channel delivering the MPD, CMT and/or ASL. An LCT_TSI field can indicate a transport session identifier (TSI) of the LCT channel delivering the MPD, CMT and/or ASL. An MPD_TOI field can indicate the transport object identifier of the MPD when the MPD is delivered through broadcast. A CMT TOI field can indicate the transport object identifier of the CMT when the CMT is delivered through broadcast. An AST_TOI field can indicate the transport object identifier of the AST when the AST is delivered through broadcast. An MPD_URL field can indicate a URL where the MPD can be acquired through broadband. A CMT_URL field can indicate a URL where the CMT can be acquired through broadband. An AST_URL field can indicate a URL where the AST can be acquired through broadband.

Figure 56:
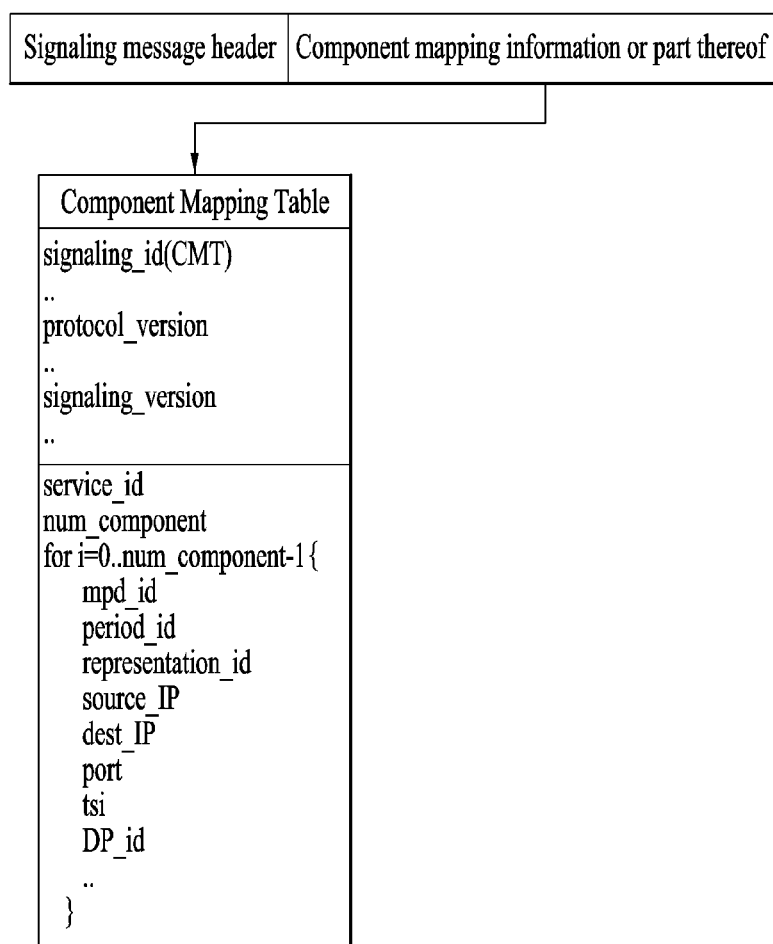
FIG. 56 shows a component mapping table used in the future broadcast system according to an embodiment of the present invention.

FIG. 56 shows a component mapping table used in the future broadcast system according to an embodiment of the present invention. The following description may be transmitted by being included in a service signaling message part following a signaling message header. The component mapping table can include information about component mapping signaling and can be represented in XML or binary format. The component mapping table corresponding to service signaling information can include the following fields. A Signaling_id field can include an identifier indicating that the corresponding table is the component mapping table. A protocol_version field can indicate a protocol version of the component mapping table, such as a component mapping table syntax. A Signaling_version field can indicate a change of signaling data of the component mapping table. A Service_id field can indicate the identifier of a service associated with corresponding components. A Num_component field can indicate the number of components included in the corresponding service. An Mpd_id field can indicate a DASH MPD identifier associated a component. A Period_id field can indicate a DASH period identifier associated with the component. A representation_id field can indicate a DASH representation identifier associated with the component. A Source_IP field can indicate a source IP address of IP/UDP datagrams carrying corresponding component data. A Dest_IP field can indicate a destination IP address of the IP/UDP datagrams carrying the corresponding component data. A port field can indicate a port number of the IP/UDP datagrams carrying the corresponding component data. A tsi field can indicate the identifier of an application layer transport session carrying the corresponding component data. A DP_id field can indicate the identifier of a physical layer data pipe carrying the corresponding component data. The CMT can define components associated with each service and signal, to the receiver, locations or paths where the corresponding components can be received through the aforementioned information.

FIG. 57 illustrates component mapping table description according to an embodiment of the present invention. Component mapping description can signal information about transport paths of components included in broadcast services in the future broadcast system. Component mapping table description may be represented in XML format or as a binary bitstream. Component mapping table description can include the following elements and attributes. A service_id attribute can indicate the identifier of a service associated with a component. BroadcastComp can indicate one or more components transmitted through the same broadcast stream. BroadcastComp can include mpdID, perID, reptnID, baseURL and/or datapipeID attributes. The mpdID attribute can indicate a DASH MPD identifier associated with BroadcastComp. The perID attribute can indicate an associated period identifier in corresponding MPD. The reptnID attribute can indicate a DASH representation identifier associated with the corresponding component. The baseURL attribute can indicate a base URL of a DASH segment associated with the corresponding component. The datapipeID attribute can indicate the identifier of a data pipe carrying corresponding component data in a broadcast stream.

BBComp can indicate one or more components transmitted through a broadband network. BBComp can include mpdID, perID, reptnID and/or baseURL attributes. The mpdID attribute can indicate a DASH MPD identifier associated with BBComp. The perID attribute can indicate an associated period identifier in corresponding MPD. The reptnID attribute can indicate a DASH representation identifier associated with the corresponding component. The baseURL attribute can indicate a base URL of a DASH segment associated with the corresponding component.

ForeignComp can indicate one or more components transmitted through other broadcast streams. ForeignComp can include mpdID, perID, reptnID, baseURL, transportStreamID, sourceIPAddr, destIPAddr, destUDPPort and/or datapipeID attributes. The mpdID attribute can indicate a DASH MPD identifier associated with ForeignComp. The perID attribute can indicate an associated period identifier in corresponding MPD. The reptnID attribute can indicate a DASH representation identifier associated with the corresponding component. The baseURL attribute can indicate a base URL of a DASH segment associated with the corresponding component. The transportStreamID attribute can indicate the identifier of a broadcast stream including corresponding component data. The sourceIPAddr attribute can indicate a source IP address of IP datagrams carrying the corresponding component data. The destIPAddr attribute can indicate a destination IP address of the IP datagrams carrying the corresponding component data. The destUDPPort attribute can indicate a destination UDP port number of the IP datagrams carrying the corresponding component data. The datapipeID attribute can indicate the identifier of a data pipe through which the corresponding component data is transmitted in the corresponding broadcast stream. The aforementioned component mapping description can be transmitted by being encapsulated in an XML file or the above-described signaling message format. As shown in the lower part of FIG. 57, a signaling message header can have the aforementioned format and component mapping description or part thereof can be included in the service message part. The CMT can define components associated with each service and signal, to the receiver, locations or paths where the corresponding components can be received through the aforementioned information.

FIG. 58 illustrates a syntax of the component mapping table of the future broadcast system according to an embodiment of the present invention. The future broadcast system can signal the component mapping table such that the receiver can acquire components of broadcast services. The component mapping table can be represented in binary, XML or other formats and can be encapsulated in the aforementioned signaling message format. The component mapping table can include the following fields. A CMT_portocol_version field can indicate the version of the structure of the component mapping table (CMT). A service_id field can indicate the identifier of a service related to a component position provided by the corresponding CMT. A CMT_data_version field can indicate the data version of the CMT. A num_broadcast_streams field can indicate the number of broadcast streams including at least one component related to the corresponding service. A TSID field can indicate a transport session identifier of a corresponding broadcast stream. A num_partitions field can indicate the number of partitions of a broadcast stream including at least one component related to the corresponding service. The CMT can include a plurality of partitions. A partition_id field can indicate the identifier of a corresponding partition. A num_data_pipes field can indicate the number of data pipes in a partition including at least one component related to the corresponding service. A DP_ID field can indicate the identifier of each data pipe. A num_ROUTE_sessions field can indicate the number of transport sessions (e.g. ROUTE sessions) included in each data pipe. Each data pipe can include at least one component associated with the corresponding service. An IP_address field can indicate the IP address of each transport session. A UDP_port field can indicate a UDP port of each transport session. A num_LCT_channels field can indicate the number of LCT channels in a transport session including a component associated with the corresponding service. An LCT_TSI field can indicate a transport session identifier (TSI). A Representation_ID field can indicate the identifier of representation carried by a corresponding LCT channel. An Internet_availability field can be an identifier indicating whether corresponding representation can be received through the Internet or broadband. A num_internet_only_reptns field can indicate the number of representations which can be received only through the Internet or broadband. A Representation_ID field can indicate the identifier of representation which can be received only through the Internet or broadband in a loop of num_internet_only_reptns. The CMT can define components associated with each service and signal, to the receiver, locations or paths where the corresponding components can be received through the aforementioned information.

FIG. 59 illustrates a method for delivering signaling related each service through a broadband network in the future broadcast system according to an embodiment of the present invention. The future broadcast system can transmit signaling related to a service to the receiver through a broadband network. The future broadcast system can transmit signaling to the receiver through the broadband network using URL signaling table description. The URL signaling table description can be represented in XML or binary format. The URL signaling table description can include the following attributes. A service_id attribute can indicate the identifier of a service associated with signaling. An mpdURL attribute can indicate the URL of broadband MPD. A cstURL attribute can indicate the URL of a broadband CMT. The CMT can include information about a path through which component data in a broadcast service is acquired. An astURL attribute can indicate the URL of a broadband AST. The AST can include information about an application related to a broadcast service. The receiver can receive the description and receive the corresponding signaling on the basis of the URL of each signaling. The aforementioned URL signaling table description can be encapsulated in a single XML file or the aforementioned signaling message format and transmitted. As shown in the lower part of the figure, a signaling message header can take the aforementioned format and the URL signaling table description or part thereof can follow the signaling message header.

FIG. 60 illustrates a method for signaling MPD in the future broadcast system according to an embodiment of the present invention. As shown in the upper part of the figure, a signaling message about MPD of a broadcast service available in a future broadcast network can be composed of a signaling message header and the signaling message. The signaling message header can take the aforementioned format and MPD delivery table information can include the following information. Signaling_id information can indicate that the corresponding signaling message is a signaling message including MPD or information about a path through which the MPD can be acquired. protocol_version information can indicate a protocol version of an MPD delivery table, such as the syntax of the signaling message. Signaling_version information can indicate a change of signaling data of the MPD delivery table. Service_id information can indicate the identifier of a service associated with the corresponding signaling information. Mpd_id information can indicate the identifier of DASH MPD associated with the signaling message. MPD_version information is version information indicating a change of the corresponding MPD. Delivery_mode information can indicate whether the signaling message includes the corresponding MPD or is delivered through a different path. MPD_data( ) information can include MPD data when the signaling message includes the MPD. MPD_path information can include information about a path through which the MPD can be acquired. For example, the path can indicate a URL.

MPD delivery table description can include the following information. A service_id attribute can indicate the identifier of a service associated with signaling. An MPD id attribute can indicate the identifier of the MPD. MPD_version is version information indicating a change of the MPD. An MPD_URL attribute can include information about a URL through which the MPD can be acquired. An MPD element can include MPD information. The MPD delivery table description can be encapsulated in a single XML file or the aforementioned signaling message format and transmitted. That is, the signaling message header can take the aforementioned format and the MPD delivery table description or part thereof can follow the signaling message header.

FIG. 61 illustrates a syntax of an MPD delivery table of the future broadcast system according to an embodiment of the present invention. Information of the MPD delivery table or part thereof can follow a signaling message header. The information of the MPD delivery table can include the following fields. A service_id field can indicate the identifier of an associated broadcast service. An MPD_id_length field can indicate the length of the following MPD_id_bytes( ). An MPD_id_bytes field can indicate the identifier of an MPD filed included in a signaling message. An MPD_version field can indicate version information such as a change of data of the corresponding MPD. An MPD_URL_availability field can indicate presence or absence of URL information of the MPD in the corresponding signaling table/message. An MPD_data_availability field can indicate whether the corresponding signaling table/message includes the MPD. The MPD_data_availability field can indicate that the signaling table/message includes the MPD when the value thereof is 1. An MPD_URL_length field can indicate the length of the following MPD_URL_bytes( ). An MPD_URL_bytes field can indicate an MPD URL included in the signaling message. An MPD_coding field can indicate an encoding scheme of an MPD field included in the signaling message. As shown in the lower part of the figure, an MPD file can be encoded according to different encoding schemes according to values of the MPD_coding field. For example, an MPD_coding field value of "0x00" can indicate that the signaling table/message includes a plain MPD field represented in XML. An MPD_coding field value of "0x01" can indicate that the signaling table/message includes an MPD field compressed by gzip. If an MPD field compressed by gzip is segmented and respectively transmitted through a plurality of messages/tables, corresponding multiple MPD_bytes( ) can be concatenated and then ungzipped. An MPD_byte_length field can indicate the length of the following MPD_bytes( ). An MPD_bytes field can include data of the MPD field included in the signaling message according to the encoding scheme indicated by the MPD_coding field. The future broadcast system enables the receiver to receive or acquire service related MPD through the MPD delivery table including the aforementioned fields.

FIG. 62 illustrates transport session instance description of the future broadcast system according to an embodiment of the present invention. When an application layer transmission method corresponds to real-time object delivery over unidirectional transport (ROUTE), a ROUTE session can be composed of one or more layered coding transport (LCT) sessions. Detailed information about one or more transport sessions can be signaled through transport session instance description. In the case of ROUTE, the transport session instance description may be referred to as LCT session instance description (LSID). Particularly, the transport session instance description can define what is delivered through each LCT transport session constituting the ROUTE session. Each transport session can be uniquely identified by a transport session identifier (TSI). The TSI can be included in an LCT header. The transport session instance description can describe all transport sessions carried by the corresponding session. For example, LSID can describe all LCT sessions carried by a ROUTE. The transport session instance description may be delivered through the same ROUTE session as transport sessions or through a different ROUTE session or unicast.

When delivered through the same ROUTE session, the transport session instance description can be delivered through a transport session having a TSI of 0. While an object referred to in the transport session instance description may be delivered through the transport session with TSI=0, the object can have a TOI value different from that of the transport session instance description. Otherwise, the object may be delivered through a separate transport session with TSI≠0. The transport session instance description can be updated using at least one of the version number, validity information and expiration information. The transport session instance description can be represented in a bitstream in addition to the illustrated format.

The transport session instance description can include version, validFrom and expiration attributes and include a TSI attribute and SourceFlow and RepairFlow information with respect to each transport session. The version attribute can indicate the version information of the transport session instance description, and the version information can increase whenever contents thereof are updated. Transport session instance description having a highest version number is the currently valid version. The validFrom attribute can indicate the data and time from which the corresponding transport session instance description is valid. The validFrom attribute may not be included in the transport session instance description according to embodiment. In this case, the receiver can assume that the corresponding transport session instance description is valid immediately. The expiration attribute can indicate the date and time when the corresponding transport session instance description expires. The expiration attribute may not be included in the transport session instance description. In this case, the receiver can assume that the corresponding transport session instance description is valid for all time. If transport session instance description having an expiration attribute is received, the transport session instance description can conform to the corresponding expiration attribute. The TSI attribute can indicate a transport session identifier. A SourceFlow element provides information of a source flow transmitted with the corresponding TSI. The SourceFlow element will be described in detail below. A RepairFlow element can provide information of a repair flow transmitted with the corresponding TSI.

FIG. 63 illustrates shows a SourceFlow element of the future broadcast system according to an embodiment of the present invention. The Sourceflow element can include an EFDT element, an idRef attribute, a realtime attribute, a minBufferSize attribute, an Application Identifier element and a PayloadFormat element. The EFDT element can specify detailed information of file delivery data. The EFDT element indicates an extended file delivery table (FDT) instance and will be described in detail below. The idRef attribute can indicate an EFDT identifier and can be represented as a URI by the corresponding transport session. The realtime attribute can indicate that corresponding LCT packets include extension headers. The extended headers can include timestamps indicating presentation time of an included delivery object. The minBufferSize attribute can define the maximum amount of data that needs to be stored in the receiver. The Application Identifier element can provide additional information that can be mapped to the application carried in the corresponding transport session. For example, representation ID of DASH content or Application Set parameters of a DASH representation can be provided as additional information in order to select a transport session for rendering. The PayloadFormat element can define payload formats of ROUTE packets carrying objects of the source flow. The PayloadFormat element can include a codePoint attribute, a deliveryObjectFormat attribute, a fragmentation attribute, a deliveryOrder attribute, a sourceFecPayloadID attribute and/or an FECParameters element. The codePoint attribute can define a code point used in the corresponding payload. This can indicate the value of the CP field in the LCT header. The deliveryObjectFormat attribute can indicate the payload format of the corresponding delivery object. The fragmentation attribute can define the type of fragmentation. The deliveryOrder attribute can indicate the order of delivery of objects. The sourceFecPayloadID attribute can define the format of a source FEC payload identifier. The FECParameters element can define FEC parameters. This includes an FEC encoding id, an instance id, etc.

FIG. 64 shows an EFDT of the future broadcast system according to an embodiment of the present invention. The EFDT can include detailed information of file delivery data. The EFDT can include an idRef attribute, a version attribute, a maxExpiresDelta attribute, a maxTransportSize attribute and a FileTemplate element. The idRef attribute can indicate the identifier of the EFDT. The version attribute can indicate the version of an EFDT instance descriptor. This attribute can be increased by 1 when the EFDT is updated. A received EFDT with the highest version number can be the currently valid version. The maxExpiresDelta attribute can indicate a maximum expiry time for an object after sending a first packet associated to the object. The maxTransportSize attribute can indicate a maximum transport size of an object described by the corresponding EFDT. The FileTemplate element can specify the file URL or file template in the body.

The aforementioned transport session instance descriptor (LSID) element can be transmitted according to a transport session instance descriptor (LSID) table shown in the lower part of the figure. The LSID table can be delivered through the aforementioned signaling message which is divided into a signaling message header and a signaling message data part. The signaling message data part can include the transport session instance descriptor (LSID) or part thereof. Signaling message data can include the LSID table and the following fields. A Signaling_id field is identifier information indicating that the corresponding table is a signaling table including the LSID. A protocol_version field can indicate the protocol version of signaling, such as a signaling syntax including the LSID. A Signaling_version field can indicate a change of signaling data including the LSID. In addition, the LSID table may further include the contents of the aforementioned transport session instance descriptor (LSID) element.

Figure 65:
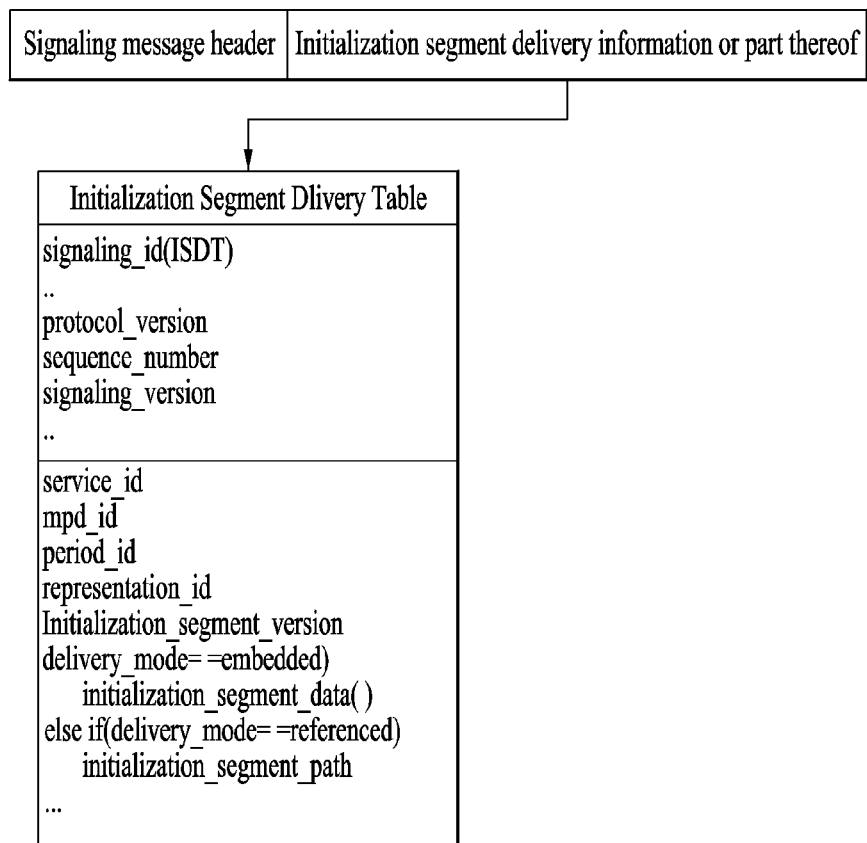
FIG. 65 illustrates a method for transmitting an ISDT used by the future broadcast system according to an embodiment of the present invention.

FIG. 65 illustrates a method for transmitting an initialization segment delivery table (ISDT) used in the future broadcast system according to an embodiment of the present invention. The future broadcast system can deliver signaling information about an initialization segment of DASH representation associated with a component in a broadcast service by transmitting an ISDT. The signaling information about the initialization segment of DASH representation associated with the component in the broadcast service may include a header and data. The signaling message header can have the aforementioned format and the signaling message data can include initialization segment delivery information or part thereof. The initialization segment delivery information can include the following information. Signaling_id information can identify a signaling message including the initialization segment or information on the path thereof. protocol_version information can indicate the protocol version of the ISDT, such as the syntax of the corresponding signaling message. Sequence_number information can indicate the instance identifier of the ISDT. Signaling_version information can indicate a change of signaling data of the ISDT. Service_id information can identify a service associated with the corresponding component. Mpd_id information can indicate a DASH MPD identifier associated with the corresponding component. period_id information can indicate a DASH Period identifier associated with the corresponding component. representation_id information can indicate a DASH representation identifier associated with the corresponding component. Initialization_segment_version information can be version information indicating a change of the corresponding MPD. Delivery_mode information can indicate whether the ISDT includes the initialization segment or is delivered through a different path. Initialization_segment_data( ) information can include the initialization segment data itself. Initialization segment path information can include information about a path through which the initialization segment can be acquired, such as the URL of the initialization segment. The receiver can receive information about the initialization segment of DASH representation associated with the corresponding component through the ISDT.

Figure 66:
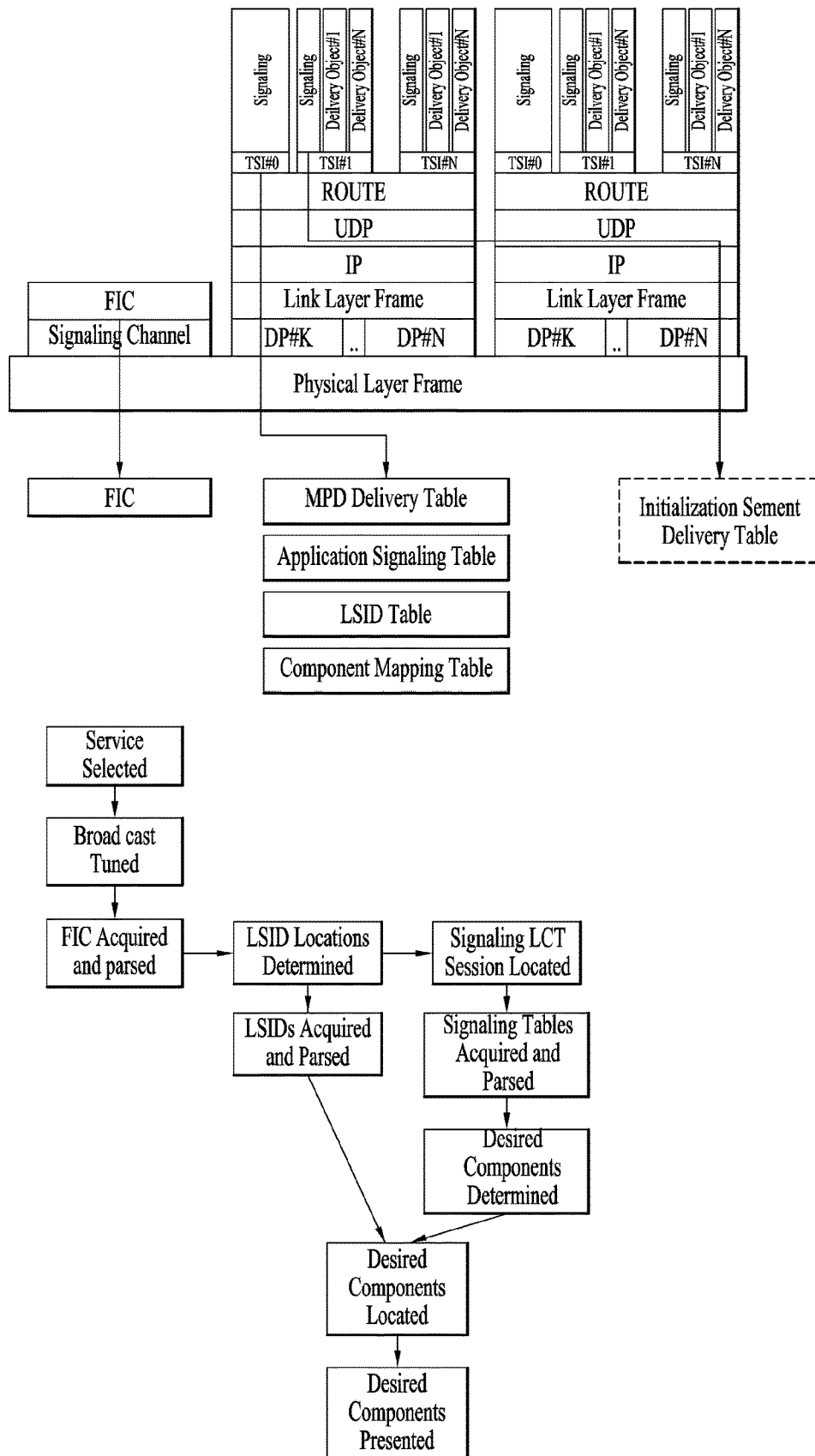
FIG. 66 illustrates a signaling message delivery structure of the future broadcast system according to an embodiment of the present invention.

FIG. 66 illustrates a delivery structure of a signaling message of the future broadcast system according to an embodiment of the present invention. The aforementioned signaling data can be delivered as illustrated when transmitted based on application layer transport, for example, ROUTE. That is, some signaling can be transmitted through a fast information channel in order to support fast service scan. Some signaling can be transmitted through a specific transport session and delivered along with component data.

Signaling information for supporting fast service scan and acquisition can be received through a separate channel from a transport session. Here, the separate channel can refer to a separate data pipe (DP). Detailed information about a service can be received through a separate designated transport session. Here, the transport session can have a value of TSI=0. Information delivered through the designated transport session can include an MPD delivery table, an application signaling table, a transport session instance description table and/or a component mapping table. Some signaling information can be delivered through a transport session along with component data. For example, the initialization segment delivery table can be delivered along with component data.

The lower part of the figure illustrates an example of acquiring broadcast services in the future broadcast network. When a service is selected, the receiver can tune to broadcast, acquire information for fast service scan and acquisition and parse the information. Upon determination of the location of service layer signaling or transport session instance description (TSID or LSID) from the information for fast service scan and acquisition, the receiver can acquire and parse the corresponding description. In addition, the receiver can check the transport session including the signaling, acquire a signaling table from the transport session, parse the signaling table and determine a desired component. Through this process, the receiver can present the desired component. That is, broadcast services can be provided to a user by acquiring information about a transport session from information for fast service scan and acquisition, confirming the location of a desired component from the information about the transport session and reproducing the component.

FIG. 67 shows signaling data transmitted, by the future broadcast system according to an embodiment of the present invention, for fast broadcast service scan. FIC information (service acquisition information) for supporting fast broadcast service scan and service/component acquisition can include information about an application layer transport session delivering service and component data. As illustrated, the FIC information can be represented in a binary format. However, the FIC information may be represented in other formats such as XML according to embodiments. The FIC information can include the following fields. An FIC_portocol_version field can indicate the version of the structure of signaling information. A TSID field can indicate the identifier of a broadcast stream. An FIC_data_version field can indicate the data version of the corresponding FIC information. An FIC_data_version field can be increased when the contents of the FIC are changed. A num_partitions field can indicate the number of partitions of a broadcast stream. It is assumed that each broadcast stream can be divided into one or more partitions and transmitted in order to use the num_partitions field. Each partition can include a plurality of DPs by a single broadcaster. Each partition can indicate a part of a broadcast steam, used by a single broadcaster. A partition_id field can indicate the identifier of the corresponding partition. A partition_protocol_version field can indicate the version of the aforementioned partition structure. A num_services field can indicate the number of one or more components included in the corresponding partition. A service_id field can indicate a service identifier. A service_data_version field can indicate a change of service loop data in the FIC or a change of service signaling data associated with the corresponding service. A service_data_version field can be increased by 1 whenever included service data is changed. The receiver can detect a service loop data change of the FIC or a change of signaling associated with the corresponding service using the service_data_version field. A channel_number field can indicate the channel number associated with the corresponding service. A service_category field can indicate the category of the corresponding service. For example, the service_category field can indicate A/V, audio, ESG, CoD, etc. A short_service_name_length field can indicate the length of the name of the corresponding service. A short_service_name field can indicate the name of the corresponding service. A service_status field can indicate the status of the corresponding service and represent an active or suspended attribute and a hidden or shown attribute according to the value thereof. A service_distribution field can have an attribute similar to "multi-ensemble" flag of ATSC M/H. For example, the service_distribution field can indicate information about whether the corresponding service is included in the corresponding partition, the service is presentable only with the corresponding partition although the service is partially included in the partition, another partition is necessary for presentation, or other broadcast streams are necessary for presentation. An sp_indicator field is a service protection flag and can indicate whether one or more components necessary for presentation are protected. An IP_version_flag field can indicate the following IP address format. The IP_version_flag field can indicate that IPv4 is used when the value thereof is 0 and indicate that IPv6 is used when the value thereof is 1. A source_IP_address_flag field can indicate whether the FIC information includes source_IP_addr. The source_IP_address_flag field can indicate presence of source_IP_addr when the value thereof is 1. A num_transport_session field can indicate the number of transport sessions (e.g. ROUTE or MMTP sessions) in which component data of the corresponding service is transmitted in a broadcast stream. A source_IP_addr field can indicate the source IP address of an IP datagram including the component data of the corresponding service when the source_IP_address_flag is 1. A dest_IP_addr field can indicate the destination IP address of the IP datagram including the component data of the corresponding service. A dest_UDP_port field can indicate the UDP port number of the IP datagram including the component data of the corresponding service. An LSID_DP field can indicate the identifier of a data pipe of a physical layer, which delivers signaling including detailed information about a transport session. In the case of ROUTE, for example, the signaling including the detailed information about the transport session can be LCT session instance description including information about an LCT transport session of a ROUTE session. An LSID_tsi field can indicate the identifier of a transport session through which transport session instance description that is signaling including detailed information about transport sessions is transmitted. Here, the transport session instance description can be LSID in the case of an LCT transmission session. In addition, signaling associated with the corresponding service can be delivered through the transport session in which the transport session instance description is transmitted. A service_signaling_flag field can indicate whether service signaling is transmitted through the corresponding transport session. The service_signaling_flag field can indicate presence of a DP including service signaling when the value thereof is 1. A signaling_data_version field can indicate a change of related service signaling data. The value of the signaling_data_version field can increase by 1 whenever the service signaling data is changed. The receiver can detect a change of signaling related to the corresponding service using the signaling_data_version field. A signaling_DP field can indicate the identifier of a data pipe of the physical layer, which delivers service signaling. A signaling_tsi field can indicate the identifier of a transport session delivering service signaling. A transport session descriptors field can include transport session level descriptors. Each descriptor can be extended and include a num_descriptors field. Each descriptor can include as many descriptor loops as the number indicated by the num_descriptors field. The transport session descriptors field can include transport session level descriptors. A service descriptors field can include service level descriptors. A partition descriptors field can include a partition level descriptor, and one partition can indicate part of broadcast streams used by a single broadcaster. An FIC session descriptors field can include FIC level descriptors. According to an embodiment, the fields included in the FIC may be included in a table other than the FIC and transmitted along with a broadcast signal.

FIG. 68 shows signaling data transmitted, by the future broadcast system according to an embodiment of the present invention, for fast broadcast service scan. FIC information (service acquisition information) for supporting fast broadcast service scan and service/component acquisition can include information about an application layer transport session delivering service and component data. As illustrated, the FIC information can be represented in a binary format. However, the FIC information may be represented in other formats such as XML according to embodiments. The FIC information can include the following fields. An FIC_portocol_version field can indicate the version of the structure of signaling information. A num_partitions field can indicate the number of partitions of a broadcast stream. It is assumed that each broadcast stream can be divided into one or more partitions and transmitted in order to use the num_partitions field. Each partition can include a plurality of DPs by a single broadcaster. Each partition can indicate a part of a broadcast steam, used by a single broadcaster. A partition_id field can indicate the identifier of the corresponding partition. A partition_protocol_version field can indicate the version of the aforementioned partition structure. A num_services field can indicate the number of one or more services included in the corresponding partition. Each service can include a plurality of signaling tables. For example, each service can include DASH MPD containing components and information about segments thereof, a CMT containing identifiers of components included in broadband and other broadcast streams, an application signaling table (AST) and a URL signaling table (UST) including at least one of the URLs of the MPD, CMT and AST. These signaling tables can be included in a signaling channel of the corresponding service. A service_id field can indicate a service identifier. A service_data_version field can indicate a change of service loop data in the FIC or a change of service signaling data associated with the corresponding service. A service_data_version field can be increased by 1 whenever included service data is changed. For example, a service_data_version field can be increased by 1 when the FIC, MPD, CMT, AST or UST is changed. The receiver can detect a service loop data change of the FIC or a change of signaling associated with the corresponding service using the service_data_version field. A service_channel_number field can indicate the channel number associated with the corresponding service. A service_category field can indicate the category of the corresponding service. For example, the service_category field can indicate A/V, audio, ESG, CoD, etc. A short_service_name_length field can indicate the length of the name of the corresponding service. A short_service_name field can indicate the name of the corresponding service. A service_status field can indicate the status of the corresponding service and represent an active or suspended attribute and a hidden or shown attribute according to the value thereof. A service_distribution field can have an attribute similar to the "multi-ensemble" flag of ATSC M/H. For example, the service_distribution field can indicate information about whether the corresponding service is included in the corresponding partition, the service is presentable only with the corresponding partition although the service is partially included in the partition, another partition is necessary for presentation, or other broadcast streams are necessary for presentation. An sp_indicator field is a service protection flag and can indicate whether one or more components necessary for presentation are protected. An IP_version_flag field can indicate the following IP address format. The IP_version_flag field can indicate that IPv4 is used when the value thereof is 0 and indicate that IPv6 is used when the value thereof is 1. A num_ROUTE_sessions field can indicate the number of transport sessions delivering component data of the corresponding service in a broadcast stream. For example, transport session can be ROUTE sessions. The following information can be set per ROUTE session. A source_IP_addr field can indicate the source IP address of an IP datagram including the component data of the corresponding service. A dest_IP_addr field can indicate the destination IP address of the IP datagram including the component data of the corresponding service. A dest_UDP_port field can indicate the UDP port number of the IP datagram including the component data of the corresponding service. An LSID_DP field can indicate the identifier of a data pipe of a physical layer, which delivers signaling including detailed information about a transport session. In the case of ROUTE, for example, the signaling including the detailed information about the transport session can be LCT session instance description including information about an LCT transport session of a ROUTE session. An LSID_tsi field can indicate the identifier of a transport session through which transport session instance description that is signaling including detailed information about transport sessions is transmitted. Here, the transport session instance description can be LSID in the case of an LCT transmission session. In addition, signaling associated with the corresponding service can be delivered through the transport session in which the transport session instance description is transmitted. A component_signaling_flag field can indicate whether service signaling of the corresponding service is transmitted through the corresponding transport session. When the component_signaling_flag is 1, this can indicate that data transmitted through the corresponding transport session includes service signaling (e.g. MPD (DASH Media Presentation Description), CMT or the like). Here, the CMT is a component mapping table and can include identifiers of components delivered through broadband and also include information about components included in other broadcast streams. Each service can include service signaling channels. The service signaling channels can include an MPD, a CMT, an AST and/or a UST. A service signaling channel may be a signaling channel from among a plurality of route sessions for services, and presence or absence thereof can be indicated through the component signaling flag. When signaling and service components are transmitted through a plurality of transport sessions (ROUTE or MMTP sessions), the aforementioned service signaling tables can be preferably delivered by a single transport session.

A ROUTE session descriptors field can include transport session level descriptors. Each descriptor can be extended and include a num_descriptors field. Each descriptor can include as many descriptor loops as the number indicated by the num_descriptors field. A transport session descriptors field can include transport session level descriptors. A service descriptors field can include service level descriptors. A partition descriptors field can include a partition level descriptor, and one partition can indicate part of broadcast streams used by a single broadcaster. An FIC session descriptors field can include FIC level descriptors.

According to an embodiment, the fields included in the FIC may be included in a table other than the FIC and transmitted along with a broadcast signal.

FIG. 69 illustrates component mapping table description according to an embodiment of the present invention. Component mapping description can signal information about transport paths of components included in broadcast services in the future broadcast system. Component mapping table description may be represented in XML format or a binary bitstream. Component mapping table description can include the following elements and attributes. A service_id attribute can indicate the identifier of a service associated with a component. BroadcastComp can indicate one or more components transmitted through the same broadcast stream. BroadcastComp can include mpdID, perID, reptnID, baseURL and/or datapipeID attributes. The mpdID attribute can indicate a DASH MPD identifier associated with BroadcastComp. The perID attribute can indicate an associated period identifier in corresponding MPD. The reptnID attribute can indicate a DASH representation identifier associated with the corresponding component. The baseURL attribute can indicate a base URL of segments constituting DASH representation associated with the corresponding component. The datapipeID attribute can indicate the identifier of a data pipe carrying corresponding component data in a broadcast stream.

BBComp can indicate one or more components transmitted through a broadband network. BBComp can include mpdID, perID, reptnID and/or baseURL attributes. The mpdID attribute can indicate a DASH MPD identifier associated with BBComp. The perID attribute can indicate an associated period identifier in corresponding MPD. The reptnID attribute can indicate a DASH representation identifier associated with the corresponding component. The baseURL attribute can indicate a base URL of segments constituting DASH representation associated with the corresponding component.

ForeignComp can indicate one or more components transmitted through other broadcast streams. ForeignComp can include mpdID, perID, reptnID, baseURL, transportStreamID, sourceIPAddr, destIPAddr, destUDPPort and/or datapipeID attributes. The mpdID attribute can indicate a DASH MPD identifier associated with ForeignComp. The perID attribute can indicate an associated period identifier in corresponding MPD. The reptnID attribute can indicate a DASH representation identifier associated with the corresponding component. The baseURL attribute can indicate a base URL of segments constituting DASH representation associated with the corresponding component. The transportStreamID attribute can indicate the identifier of a broadcast stream including corresponding component data. The sourceIPAddr attribute can indicate a source IP address of IP datagrams carrying the corresponding component data. The destIPAddr attribute can indicate a destination IP address of the IP datagrams carrying the corresponding component data. The destUDPPort attribute can indicate a destination UDP port number of the IP datagrams carrying the corresponding component data. The datapipeID attribute can indicate the identifier of a data pipe through which the corresponding component data is transmitted in the corresponding broadcast stream. The sourceIPAddr, destIPAddr, destUDPPort and datapipeID attributes can be optional according to embodiments and selectively included in the CMT. The aforementioned component mapping description can be transmitted by being encapsulated in an XML file or the above-described signaling message format. As shown in the lower part of the figure, a signaling message header can have the aforementioned format and component mapping description or part thereof can be included in the service message part. The CMT can define components associated with each service and signal, to the receiver, locations or paths where the corresponding components can be received through the aforementioned information.

FIG. 70 illustrates component mapping table description according to an embodiment of the present invention. Component mapping description can signal information about transport paths of components included in broadcast services in the future broadcast system. Component mapping table description may be represented in XML format or a binary bitstream. Component mapping table description can include the following elements and attributes. A service_id attribute can indicate the identifier of a service associated with a component. BroadcastComp can indicate one or more components transmitted through the same broadcast stream. BroadcastComp can include mpdID, perID, reptnID, baseURL, tsi and/or datapipeID attributes. The mpdID attribute can indicate a DASH MPD identifier associated with BroadcastComp. The perID attribute can indicate an associated period identifier in corresponding MPD. The reptnID attribute can indicate a DASH representation identifier associated with the corresponding component. The baseURL attribute can indicate a base URL of segments constituting DASH representation associated with the corresponding component. The tsi attribute can indicate the identifier of a transport session through which corresponding component data is transmitted in a broadcast stream. The datapipeID attribute can indicate the identifier of a data pipe carrying the corresponding component data in the broadcast stream.

BBComp can indicate one or more components transmitted through a broadband network. BBComp can include mpdID, perID, reptnID and/or baseURL attributes. The mpdID attribute can indicate a DASH MPD identifier associated with BBComp. The perID attribute can indicate an associated period identifier in corresponding MPD. The reptnID attribute can indicate a DASH representation identifier associated with the corresponding component. The baseURL attribute can indicate a base URL of segments constituting DASH representation associated with the corresponding component.

ForeignComp can indicate one or more components transmitted through other broadcast streams. ForeignComp can include mpdID, perID, reptnID, baseURL, transportStreamID, sourceIPAddr, destIPAddr, destUDPPort, tsi and/or datapipeID attributes. The mpdID attribute can indicate a DASH MPD identifier associated with ForeignComp. The perID attribute can indicate an associated period identifier in corresponding MPD. The reptnID attribute can indicate a DASH representation identifier associated with the corresponding component. The baseURL attribute can indicate a base URL of segments constituting DASH representation associated with the corresponding component. The transportStreamID attribute can indicate the identifier of a broadcast stream including corresponding component data. The sourceIPAddr attribute can indicate a source IP address of IP datagrams carrying the corresponding component data. The destIPAddr attribute can indicate a destination IP address of the IP datagrams carrying the corresponding component data. The destUDPPort attribute can indicate a destination UDP port number of the IP datagrams carrying the corresponding component data. The tsi attribute can indicate the identifier of a transport session through which the corresponding component data is transmitted in the corresponding broadcast stream. The datapipeID attribute can indicate the identifier of a data pipe through which the corresponding component data is transmitted in the corresponding broadcast stream. The sourceIPAddr, destIPAddr, destUDPPort and datapipeID attributes can be optional according to embodiments and selectively included in the CMT. The aforementioned component mapping description can be transmitted by being encapsulated in an XML file or the above-described signaling message format. As shown in the lower part of the figure, a signaling message header can have the aforementioned format and component mapping description or part thereof can be included in the service message part. The CMT can define components associated with each service and signal, to the receiver, locations or paths where the corresponding components can be received through the aforementioned information.

FIGS. 71 and 72 illustrate component mapping table description according to an embodiment of the present invention. Component mapping description can signal information about transport paths of components included in broadcast services in the future broadcast system. Component mapping table description may be represented in XML format or as a binary bitstream. Component mapping table description can include a delivery parameter element and a payload format element along with the DASH associated identifiers.

Component mapping table description can include the following elements and attributes. A service_id attribute can indicate the identifier of a service associated with a component. A component element can indicate components in the corresponding broadcast service. The component element can include an mpdID attribute, a perID attribute, a reptnID attribute, a baseURL attribute, the delivery parameter element and/or the payload format element. The mpdID attribute can indicate a DASH MPD identifier associated with a component. The perID attribute can indicate an associated period identifier in corresponding MPD. The reptnID attribute can indicate a DASH representation identifier associated with the corresponding component. The baseURL attribute can indicate a base URL of segments constituting DASH representation associated with the corresponding component.

The delivery parameter element can include detailed information about a path through which the corresponding component is transmitted. The delivery parameter element can include transportStreamID, sourceIPAddr, destIPAddr, destUDPPort, tsi, datapipeID and/or URL attributes. The transportStreamID attribute can indicate the identifier of a broadcast stream including corresponding component data. The sourceIPAddr attribute can indicate a source IP address of IP datagrams carrying the corresponding component data. The destIPAddr attribute can indicate a destination IP address of the IP datagrams carrying the corresponding component data. The destUDPPort attribute can indicate a destination UDP port number of the IP datagrams carrying the corresponding component data. The tsi attribute can indicate the identifier of a transport session through which the corresponding component data is transmitted in the corresponding broadcast stream. The datapipeID attribute can indicate the identifier of a physical layer data pipe through which the corresponding component data is transmitted in the corresponding broadcast stream. The URL attribute can indicate URL information by which the corresponding component data can be acquired through the Internet. The sourceIPAddr, destIPAddr, destUDPPort, datapipeID and/or URL attributes can be optional according to embodiments and selectively included in the delivery parameter element.

The payload format element can include a codePoint attribute, a deliveryObjectFormat attribute, a fragmentation attribute, a deliveryOrder attribute, a sourceFecPayloadID attribute and/or an FECParameters element. The codePoint attribute can define a code point used in the corresponding payload. This can indicate the value of the CP field of the LCT header. The deliveryObjectFormat attribute can indicate the payload format of the corresponding delivery object. The fragmentation attribute can define the type of fragmentation. The deliveryOrder attribute can indicate the order of delivery of objects. The sourceFecPayloadID attribute can define the format of a source FEC payload identifier. The FECParameters element can define FEC parameters and include an FEC encoding id, an instance id, etc.

FIG. 73 illustrates component mapping table description according to an embodiment of the present invention. Component mapping description can signal information about transport paths of components included in broadcast services in the future broadcast system. Component mapping table description may be represented in XML format or as a binary bitstream. Component mapping table can include a service_id attribute, an mpd_id attribute, a per_id attribute, a BroadcastComp element, a BBComp element and a ForeignComp element. Component mapping table description can include the following elements and attributes. The service_id attribute can indicate the identifier of a service associated with a component. The CMT description can include mpdID and perID attributes at the same level as the service_id attribute. That is, the mpdID and perID attributes commonly applied to the BroadcastComp, BBComp and ForeignComp elements can be described at the same level as the service_id attribute instead of being redundantly described. The mpdID attribute can indicate a DASH MPD identifier associated with the corresponding service. The perID attribute can indicate an associated period identifier in corresponding MPD.

BroadcastComp can indicate one or more components transmitted through the same broadcast stream. BroadcastComp can include reptnID, baseURL, tsi and/or datapipeID attributes. The reptnID attribute can indicate a DASH representation identifier associated with the corresponding component. The baseURL attribute can indicate a base URL of segments constituting DASH representation associated with the corresponding component. The tsi attribute can indicate the identifier of a transport session through which the corresponding component data is transmitted in the corresponding broadcast stream. The datapipeID attribute can indicate the identifier of a data pipe through which the corresponding component data is transmitted in the corresponding broadcast stream.

BBComp can indicate one or more components transmitted through a broadband network. BBComp can include reptnID and/or baseURL attributes. The reptnID attribute can indicate a DASH representation identifier associated with the corresponding component. The baseURL attribute can indicate a base URL of segments constituting DASH representation associated with the corresponding component.

ForeignComp can indicate one or more components transmitted through other broadcast streams. ForeignComp can include reptnID, baseURL, transportStreamID, sourceIPAddr, destIPAddr, destUDPPort, tsi and/or datapipeID attributes. The reptnID attribute can indicate a DASH representation identifier associated with the corresponding component. The baseURL attribute can indicate a base URL of segments constituting DASH representation associated with the corresponding component. The transportStreamID attribute can indicate the identifier of a broadcast stream including corresponding component data. The sourceIPAddr attribute can indicate a source IP address of IP datagrams carrying the corresponding component data. The destIPAddr attribute can indicate a destination IP address of the IP datagrams carrying the corresponding component data. The destUDPPort attribute can indicate a destination UDP port number of the IP datagrams carrying the corresponding component data. The tsi attribute can indicate the identifier of a transport session through which the corresponding component data is transmitted in the corresponding broadcast stream. The datapipeID attribute can indicate the identifier of a data pipe through which the corresponding component data is transmitted in the corresponding broadcast stream. The sourceIP Addr, destIPAddr, destUDPPort and datapipeID attributes can be optional according to embodiments and selectively included in the CMT. The aforementioned component mapping description can be transmitted by being encapsulated in an XML file or the above-described signaling message format. The CMT can define components associated with each service and inform the receiver of locations or paths where the corresponding components can be received through the aforementioned information.

FIG. 74 shows common attributes and elements of MPD according to an embodiment of the present invention. The future broadcast system may provide DASH based hybrid broadcast services. In the future broadcast system, segments associated with representation in DASH MPD are delivered through different distribution paths. The common attributes and elements of the MPD can be commonly present in adaptation set, representation and sub-representation elements and include location information of associated representation as illustrated. The future broadcast system can enable a DASH client to recognize the associated representation or locations of segments using the location information of the associated representation, included in the common attributes and elements of the MPD. The common attributes and elements of the MPD can include the following attributes and elements. @profiles attribute can indicate profiles of the associated representation. @width attribute can indicate the horizontal visual presentation size of a video media type to be represented. @height attribute can indicate the vertical visual presentation size of the video media type to be represented. @sar attribute can indicate the sample aspect ratio of video media component type. @frameRate attribute can indicate the output frame rate of the video media type in the representation. @audioSamplingRate attribute can indicate the sampling rate of an audio media component type. @mimeType attribute can indicate the MIME type of concatenation of the initialization segment. @segmentProfiles attribute can indicate profiles of segments that are essential to process the representation. @codecs attribute can indicate the codec used in the representation. @maximumSAPPeriod attribute can indicate the maximum stream access point (SAP) interval of contained media streams. @startWithSAP attribute can indicate the number of media segments that start with an SAP. @maxPlayoutRate attribute can indicate the maximum playout rate. @codingDependency attribute can indicate presence or absence of at least one access unit that depends on one or more other access units for decoding. @scanType attribute can indicate the scan type of the source material of the video media component type. A FramePacking element can specify frame-packing information of the video media component type. An AudioChannelConfiguration element can specify the audio channel configuration of the audio media component type. A ContentProtection element can specify information about content protection schemes used for the associated representation. An EssentialProperty element can indicate information about an element that is essentially considered in processing. A SupplementalProperty element can specify supplemental information used to optimize processing. An InbandEventStream element can specify presence or absence of an inband event stream in the associated representation. A Location element can specify information on a location at which the associated representation can be acquired. The Location element can include information about a broadcast stream or physical channel data pipes carrying the associated representation. The DASH client or the future broadcast reception apparatus can obtain the associated representation using the Location element. That is, the reception apparatus of the future broadcast system can obtain information about the location of the associated representation using location information included in the common attributes and elements of the MPD without using the aforementioned CMT and acquire the associated representation on the basis of the obtained information. The aforementioned representation can be described as a component according to an embodiment.

In another embodiment, the future broadcast system can allocate information about a transport path, such as the associated representation, to a @servicelocation attribute of the base URL element in the DASH MPD. The future broadcast system can enable the DASH client to be aware of information about paths through which segments associated with the corresponding representation are delivered using @servicelocation attribute.

FIG. 75 illustrates transport session instance description according to an embodiment of the present invention. When an application layer transmission method corresponds to real-time object delivery over unidirectional transport (ROUTE), a ROUTE session can be composed of one or more layered coding transport (LCT) sessions. Detailed information about one or more transport sessions can be signaled through transport session instance description. In the case of ROUTE, the transport session instance description may be referred to as LCT session instance description (LSID). Particularly, the transport session instance description can define what is delivered through each LCT transport session constituting the ROUTE session. Each transport session can be uniquely identified by a transport session identifier (TSI). The TSI can be included in an LCT header. The transport session instance description can describe all transport sessions carried by the corresponding session. For example, LSID can describe all LCT sessions carried by ROUTE. The transport session instance description may be delivered through the same ROUTE session as transport sessions or through a different ROUTE session or unicast.

When delivered through the same ROUTE session, the transport session instance description can be delivered through a transport session having a TSI of 0. While an object referred to in the transport session instance description may be delivered through the transport session with TSI=0, the object can have a TOI value different from that of the transport session instance description. Otherwise, the object may be delivered through a separate transport session with TSI≠0. The transport session instance description can be updated using at least one of the version number, validity information and expiration information. The transport session instance description can be represented in a bitstream in addition to the illustrated format.

The transport session instance description can include version, validFrom and expiration attributes. For each transport session, the transport session instance description can include a TSI attribute, a SourceFlow element, a RepairFlow element and a TransportSessionProperty element. The version attribute can indicate the version information of the transport session instance description, and the version information can increase whenever contents thereof are updated. Transport session instance description having a highest version number is the currently valid version. The validFrom attribute can indicate the data and time from which the corresponding transport session instance description is valid. The validFrom attribute may not be included in the transport session instance description according to embodiment. In this case, the receiver can assume that the corresponding transport session instance description is valid immediately. The expiration attribute can indicate the date and time when the corresponding transport session instance description expires. The expiration attribute may not be included in the transport session instance description. In this case, the receiver can assume that the corresponding transport session instance description is valid for all time. If transport session instance description having an expiration attribute is received, the transport session instance description can conform to the corresponding expiration attribute. The TSI attribute can indicate a transport session identifier. The SourceFlow element provides information of a source flow transmitted with the corresponding TSI. The SourceFlow element will be described in detail below. The RepairFlow element can provide information of a repair flow transmitted with the corresponding TSI. The TransportSessionProperty element can provide additional property information about the corresponding transport session. The transport session instance description can include additional property information about a transport session in the TransportSessionProperty element. For example, the additional information can include service signaling information about the transport session.

FIG. 76 illustrates shows a SourceFlow element of the future broadcast system according to an embodiment of the present invention. The Sourceflow element can include an EFDT element, an idRef attribute, a realtime attribute, a minBufferSize attribute, an Application Identifier element, a PayloadFormat element and/or a SourceFlowProperty element. The EFDT element can specify detailed information of file delivery data. The EFDT element indicates an extended file delivery table (FDT) instance and will be described in detail below. The idRef attribute can indicate an EFDT identifier and can be represented as a URI by the corresponding transport session. The realtime attribute can indicate that corresponding LCT packets include extension headers. The extended headers can include timestamps indicating presentation time of an included delivery object. The minBufferSize attribute can define the maximum amount of data that needs to be stored in the receiver. The Application Identifier element can provide additional information that can be mapped to the application carried in the corresponding transport session. For example, representation ID of DASH content or Application Set parameters of a DASH representation can be provided as additional information in order to select a transport session for rendering. The PayloadFormat element can define payload formats of ROUTE packets carrying objects of the source flow. The PayloadFormat element can include a codePoint attribute, a deliveryObjectFormat attribute, a fragmentation attribute, a deliveryOrder attribute, a sourceFecPayloadID attribute and/or an FECParameters element. The codePoint attribute can define a code point used in the corresponding payload. This can indicate the value of the CP field in the LCT header. The deliveryObjectFormat attribute can indicate the payload format of the corresponding delivery object. The fragmentation attribute can define the type of fragmentation. The deliveryOrder attribute can indicate the order of delivery of objects. The sourceFecPayloadID attribute can define the format of a source FEC payload identifier. The FECParameters element can define FEC parameters. This includes an FEC encoding id, an instance id, etc. The SourceFlowProperty element can provide property information about the corresponding source flow. For example, the property information can include location information of a broadcast stream carrying the corresponding source flow data. Here, the location information of the broadcast stream may include information about a data pipe or physical layer pipe (PLP) in the broadcast stream.

FIG. 77 shows signaling data transmitted, by the future broadcast system according to another embodiment of the present invention, for fast broadcast service scan. Illustrated service acquisition information may further include information about link layer signaling in addition to the aforementioned service acquisition information. The information about link layer signaling can include flag information indicating presence of link layer signaling, version information of the link layer signaling data and information about a data pipe or a PLP through which link layer signaling is delivered. FIC information (service acquisition information) for supporting fast broadcast service scan and service/component acquisition can include information about an application layer transport session delivering service and component data. As illustrated, the service acquisition information can be represented in a binary format. However, the FIC information may be represented in other formats such as XML according to embodiments.

The service acquisition information can include the following fields. An FIC_portocol_version field can indicate the version of the structure of signaling information. A TSID field can indicate the identifier of a broadcast stream. An FIC_data_version field can indicate the data version of the corresponding FIC information. An FIC_data_version field can be increased when the contents of the FIC are changed. A num_partitions field can indicate the number of partitions of a broadcast stream. It is assumed that each broadcast stream can be divided into one or more partitions and transmitted in order to use the num_partitions field. Each partition can include a plurality of DPs by a single broadcaster. Each partition can indicate a part of a broadcast steam, used by a single broadcaster. A partition_id field can indicate the identifier of the corresponding partition. A partition_protocol_version field can indicate the version of the aforementioned partition structure. A num_services field can indicate the number of one or more components included in the corresponding partition. A service_id field can indicate a service identifier. A service_data_version field can indicate a change of service loop data in the FIC or a change of service signaling data associated with the corresponding service. A service_data_version field can be increased by 1 whenever included service data is changed. The receiver can detect a service loop data change of the FIC or a change of signaling associated with the corresponding service using the service_data_version field. A channel_number field can indicate the channel number associated with the corresponding service. A service_category field can indicate the category of the corresponding service. For example, the service_category field can indicate A/V, audio, ESG, CoD, etc. A short_service_name_length field can indicate the length of the name of the corresponding service. A short_service_name field can indicate the name of the corresponding service. A service_status field can indicate the status of the corresponding service and represent an active or suspended attribute and a hidden or shown attribute according to the value thereof. A service_distribution field can have an attribute similar to "multi-ensemble" flag of ATSC M/H. For example, the service_distribution field can indicate information about whether the corresponding service is included in the corresponding partition, the service is presentable only with the corresponding partition although the service is partially included in the partition, another partition is necessary for presentation, or other broadcast streams are necessary for presentation. An sp_indicator field is a service protection flag and can indicate whether one or more components necessary for presentation are protected. An IP_version_flag field can indicate the following IP address format. The IP_version_flag field can indicate that IPv4 is used when the value thereof is 0 and can indicate that IPv6 is used when the value thereof is 1. A source_IP_address_flag field can indicate whether the FIC information includes source_IP_addr. The source_IP_address_flag field can indicate presence of source_IP_addr when the value thereof is 1. A num_transport_session field can indicate the number of transport sessions (e.g. ROUTE or MMTP sessions) in which component data of the corresponding service is transmitted in a broadcast stream. A source_IP_addr field can indicate the source IP address of an IP datagram including the component data of the corresponding service when the source_IP_address_flag is 1. A dest_IP_addr field can indicate the destination IP address of the IP datagram including the component data of the corresponding service. A dest_UDP_port field can indicate the UDP port number of the IP datagram including the component data of the corresponding service. An LSID_DP field can indicate the identifier of a data pipe of a physical layer, which delivers signaling including detailed information about a transport session. In the case of ROUTE, for example, the signaling including the detailed information about the transport session can be LCT session instance description including information about an LCT transport session of a ROUTE session. An LSID_tsi field can indicate the identifier of a transport session through which transport session instance description, which is signaling including detailed information about transport sessions, is transmitted. Here, the transport session instance description can be LSID in the case of an LCT transmission session. In addition, signaling associated with the corresponding service can be delivered through the transport session in which the transport session instance description is transmitted. A service_signaling_flag field can indicate whether service signaling is transmitted through the corresponding transport session. The service_signaling_flag field can indicate presence of a DP including service signaling when the value thereof is 1. A signaling_data_version field can indicate a change of related service signaling data. The value of the signaling_data_version field can increase by 1 whenever the service signaling data is changed. The receiver can detect a change of signaling related to the corresponding service using the signaling_data_version field. A signaling_DP field can indicate the identifier of a data pipe of the physical layer, which delivers service signaling. A signaling_tsi field can indicate the identifier of a transport session delivering service signaling. A link_layer_signaling_flag field can indicate whether the service acquisition information carries link layer (or low layer) signaling. A link_layer_signaling_data_version field can indicate a change of associated link layer (or low layer) signaling data. This field can be increased by 1 whenever the link layer signaling data is changed. The receiver can detect variation in link layer (or low layer) signaling using the link_layer_signaling_data_version field. A link_layer_signaling_DP field can indicate the identifier of a physical layer data pipe carrying link layer (or low layer) signaling that can be used in the L2 layer. A transport session descriptors field can include transport session level descriptors. Each descriptor can be extended and include a num_descriptors field. Each descriptor can include as many descriptor loops as the number indicated by the num_descriptors field. The transport session descriptors field can include transport session level descriptors. A service descriptors field can include service level descriptors. A partition descriptors field can include a partition level descriptor, and one partition can indicate part of broadcast streams used by a single broadcaster. An FIC session descriptors field can include FIC level descriptors. According to an embodiment, the fields included in the FIC may be included in a table other than the FIC and transmitted along with a broadcast signal.

FIG. 78 shows signaling data transmitted by the future broadcast system according to another embodiment of the present invention for fast broadcast service scan. FIC information (service acquisition information) for supporting fast broadcast service scan and service/component acquisition can include information about an application layer transport session delivering service and component data. The service acquisition information may further include information about link layer signaling. As illustrated, the service acquisition information can be represented in a binary format. However, the FIC information may be represented in other formats such as XML according to embodiments.

The service acquisition information can include the following fields. An FIC_portocol_version field can indicate the version of the structure of signaling information. A num_partitions field can indicate the number of partitions of a broadcast stream. It is assumed that each broadcast stream can be divided into one or more partitions and transmitted in order to use the num_partitions field. Each partition can include a plurality of DPs corresponding to a single broadcaster. Each partition can indicate a part of a broadcast steam, used by a single broadcaster. A partition_id field can indicate the identifier of the corresponding partition. A partition_protocol_version field can indicate the version of the aforementioned partition structure. A num_services field can indicate the number of one or more services included in the corresponding partition. Each service can include a plurality of signaling tables. For example, each service can include DASH MPD including components and information about segments thereof, a CMT including identifiers of components included in broadband and other broadcast streams, an application signaling table (AST) and a URL signaling table (UST) including at least one of the URLs of the MPD, CMT and AST. These signaling tables can be included in a signaling channel of the corresponding service. A service_id field can indicate a service identifier. A service_data_version field can indicate a change of service loop data in the FIC or a change of service signaling data associated with the corresponding service. A service_data_version field can be increased by 1 whenever included service data is changed. For example, service_data_version field can be increased by 1 when the FIC, MPD, CMT, AST or UST is changed. The receiver can detect a service loop data change of the FIC or a change of signaling associated with the corresponding service using the service_data_version field. A service_channel_number field can indicate the channel number associated with the corresponding service. A service_category field can indicate the category of the corresponding service. For example, the service_category field can indicate A/V, audio, ESG, CoD, etc. A short_service_name_length field can indicate the length of the name of the corresponding service. A short_service_name field can indicate the name of the corresponding service. A service_status field can indicate the status of the corresponding service and represent an active or suspended attribute and a hidden or shown attribute according to the value thereof. A service_distribution field can have an attribute similar to "multi-ensemble" flag of ATSC M/H. For example, the service_distribution field can indicate information about whether the corresponding service is included in the corresponding partition, the service is presentable only with the corresponding partition although the service is partially included in the partition, another partition is necessary for presentation, or other broadcast streams are necessary for presentation. An sp_indicator field is a service protection flag and can indicate whether one or more components necessary for presentation are protected. An IP_version_flag field can indicate the following IP address format. The IP_version_flag field can indicate that IPv4 is used when the value thereof is 0 and indicate that IPv6 is used when the value thereof is 1. A num_ROUTE_sessions field can indicate the number of transport sessions delivering component data of the corresponding service in a broadcast stream. For example, transport session can be ROUTE sessions. The following information can be set per ROUTE session. A source_IP_addr field can indicate the source IP address of an IP datagram including the component data of the corresponding service. A dest_IP_addr field can indicate the destination IP address of the IP datagram including the component data of the corresponding service. A dest_UDP_port field can indicate the UDP port number of the IP datagram including the component data of the corresponding service. An LSID_DP field can indicate the identifier of a data pipe of a physical layer, which delivers signaling including detailed information about a transport session. In the case of ROUTE, for example, the signaling including the detailed information about the transport session can be LCT session instance description including information about an LCT transport session of a ROUTE session. An LSID_tsi field can indicate the identifier of a transport session through which transport session instance description that is signaling including detailed information about transport sessions is transmitted. Here, the transport session instance description can be LSID in the case of an LCT transmission session. In addition, signaling associated with the corresponding service can be delivered through the transport session in which the transport session instance description is transmitted. A component_signaling_flag field can indicate whether service signaling of the corresponding service is transmitted through the corresponding transport session. When the component_signaling_flag is 1, this can indicate that data transmitted through the corresponding transport session includes service signaling (e.g. MPD (DASH Media Presentation Description), CMT or the like). Here, the CMT is a component mapping table and can include identifiers of components delivered through broadband and can also include information about components included in other broadcast streams. Each service can include service signaling channels. The service signaling channels can include an MPD, a CMT, an AST and/or a UST. A service signaling channel may be a signaling channel from among a plurality of route sessions for services, and presence or absence thereof can be indicated through the component signaling flag. When signaling and service components are transmitted through a plurality of transport sessions (ROUTE or MMTP sessions), the aforementioned service signaling tables can be preferably delivered by a single transport session. A link_layer_signaling_flag field can indicate whether the service acquisition information carries link layer (or low layer) signaling. A link_layer_signaling_data_version field can indicate a change of associated link layer (or low layer) signaling data. This field can be increased by 1 whenever the link layer signaling data is changed. The receiver can detect a variation in link layer (or low layer) signaling using the link_layer_signaling_data_version field. A link_layer_signaling_DP field can indicate the identifier of a physical layer data pipe carrying link layer (or low layer) signaling that can be used in the L2 layer.

A ROUTE session descriptors field can include transport session level descriptors. Each descriptor can be extended and include a num_descriptors field. Each descriptor can include as many descriptor loops as a number corresponding to a value indicated by the num_descriptors field. A transport session descriptors field can include transport session level descriptors. A service descriptors field can include service level descriptors. A partition descriptors field can include a partition level descriptor, and one partition can indicate part of broadcast streams used by a single broadcaster. An FIC session descriptors field can include FIC level descriptors.

According to an embodiment, the fields included in the FIC may be included in a table other than the FIC and transmitted along with a broadcast signal.

Figure 79:
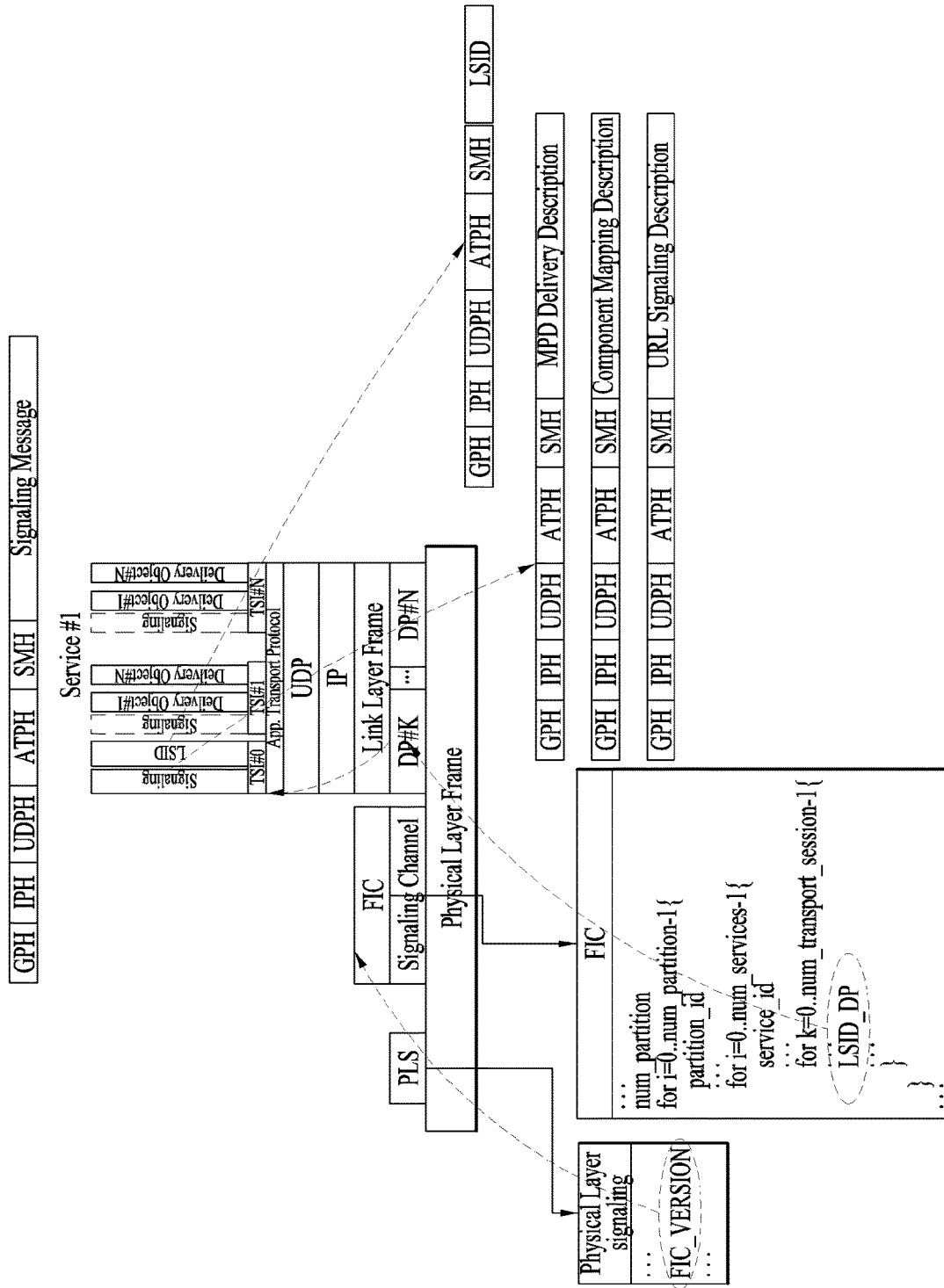
FIG. 79 illustrates a method for acquiring service layer signaling in the future broadcast system according to an embodiment of the present invention.

FIG. 79 illustrates a method for acquiring service layer signaling in the future broadcast system according to an embodiment of the present invention. The upper part of the figure shows a service layer signaling format used in the future broadcast system according to the present invention. Service layer signaling can be encapsulated in the illustrated format. For example, encapsulated service layer signaling can include a Generic packet header (GPH), an IP packet header (IPH), a UDP datagram header (UDPH), an application transport protocol (e.g. ROUTE or MMTP) header (ATPH), a signaling message header (SMH) and a signaling message. When the future broadcast system uses the aforementioned service signaling, the future broadcast system can deliver the service signaling as shown in the lower part of the figure. A broadcast signal of the future broadcast system can be transmitted through physical layer frames. Broadcast signal frames can include physical layer signaling. Physical layer signaling information can include a field with respect to fast service acquisition information. This field can include version information of the fast service acquisition information. In other words, the field can indicate whether a physical layer frame includes the fast service acquisition information or whether the fast service acquisition information needs to be parsed. The receiver can acquire the fast service acquisition information using the field of physical layer signaling. A broadcast signal of the future broadcast system can include the fast service acquisition information in a physical layer frame. The fast service acquisition information may include a service identifier and information about a data pipe or a PLP through which at least one of service layer signaling information and a transport session instance descriptor is delivered. That is, the receiver can identify the PLP through which at least one of the service layer signaling information and transport session instance descriptor is delivered using data pipe or PLP identifier information included in the fast service acquisition information and acquire the service layer signaling information or transport session instance descriptor included therein. As illustrated, the service layer signaling information or the transport session instance descriptor can be delivered by a 0-th transport session in the corresponding PLP. That is, the service layer signaling information can be delivered by the transport session corresponding to tsi=0 in the PLP indicated by the PLP identifier included in the service acquisition information. In other words, the identifier of the transport session through which service layer signaling is delivered can be fixed to 0.

As illustrated, the service layer signaling can be encapsulated as described above. That is, the service layer signaling format can include a generic packet header (GPH), an IP packet header (IPH), a UDP datagram header (UDPH), an application transport protocol (e.g. ROUTE or MMTP) header (ATPH), a signaling message header (SMH) and a signaling message. Here, the signaling message may include MPD delivery description, component mapping description or URL signaling description according to type of a message delivered by the service layer signaling.

In addition, the transport session instance descriptor can have the aforementioned encapsulation format, as illustrated. That is, the transport session instance descriptor can include a generic packet header (GPH), an IP packet header (IPH), a UDP datagram header (UDPH), an application transport protocol (e.g. ROUTE or MMTP) header (ATPH), a signaling message header (SMH) and a signaling message. Here, the signaling message can include the transport session instance descriptor. In the present invention, the transport session instance descriptor may be included in service layer signaling and delivered.

Figure 80:
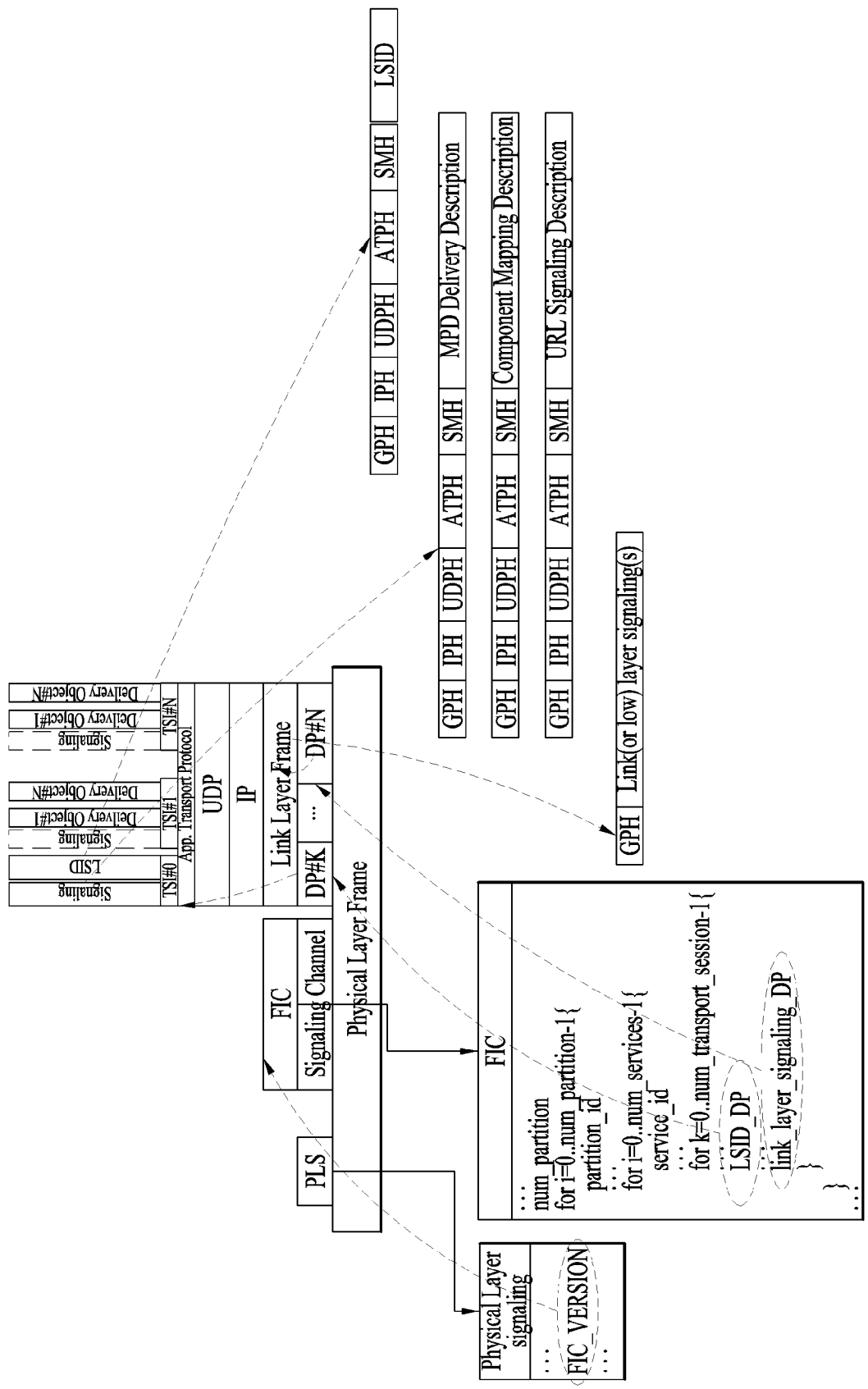
FIG. 80 illustrates a method for acquiring service layer signaling and link layer signaling in the future broadcast system according to an embodiment of the present invention.

FIG. 80 illustrates a method for acquiring service layer signaling and link layer signaling in the future broadcast system according to an embodiment of the present invention. When the future broadcast system uses the aforementioned service layer signaling, the future broadcast system can deliver the service layer signaling as shown in the figure. A broadcast signal of the future broadcast system can be transmitted through physical layer frames. Broadcast signal frames can include physical layer signaling. Physical layer signaling information can include a field with respect to fast service acquisition information. This field can include version information of the fast service acquisition information. In other words, the field can indicate whether a physical layer frame includes the fast service acquisition information or whether the fast service acquisition information needs to be parsed. The receiver can acquire the fast service acquisition information using the field of physical layer signaling. A broadcast signal of the future broadcast system can include the fast service acquisition information in a physical layer frame. The fast service acquisition information may include a service identifier and information about a data pipe or a PLP through which at least one of service layer signaling information and a transport session instance descriptor is delivered. That is, the receiver can identify the PLP through which at least one of the service layer signaling information and transport session instance descriptor is delivered using data pipe or PLP identifier information included in the fast service acquisition information and acquire the service layer signaling information or transport session instance descriptor included therein. As illustrated, the service layer signaling information or the transport session instance descriptor can be delivered by a 0-th transport session in the corresponding PLP. That is, the service layer signaling information can be delivered by the transport session corresponding to tsi=0 in the PLP indicated by the PLP identifier included in the service acquisition information. In other words, the identifier of the transport session through which service layer signaling is delivered can be fixed to 0.

As illustrated, the service layer signaling can be encapsulated as described above. That is, the service layer signaling format can include a generic packet header (GPH), an IP packet header (IPH), a UDP datagram header (UDPH), an application transport protocol (e.g. ROUTE or MMTP) header (ATPH), a signaling message header (SMH) and a signaling message. Here, the signaling message may include MPD delivery description, component mapping description or URL signaling description according to type of a message delivered by the service layer signaling.

In addition, the transport session instance descriptor can have the aforementioned encapsulation format, as illustrated. That is, the transport session instance descriptor can include a generic packet header (GPH), an IP packet header (IPH), a UDP datagram header (UDPH), an application transport protocol (e.g. ROUTE or MMTP) header (ATPH), a signaling message header (SMH) and a signaling message. Here, the signaling message can include the transport session instance descriptor. In the present invention, the transport session instance descriptor may be included in service layer signaling and delivered.

In addition, the fast service acquisition information may include information about a data pipe or a PLP through which link layer signaling is delivered. That is, the receiver can identify the PLP through which the link layer signaling is delivered using data pipe or PLP identifier information included in the fast service acquisition information and acquire the link layer signaling included therein. As illustrated, a transport link layer signaling format can include a Generic packet header (GPH) and a signaling message. The signaling message can include information about link layer signaling. The receiver can acquire link layer signaling (or low layer signaling) through a data pipe and obtain service/component signaling such as a component mapping table through the application transport protocol.

Figure 81:
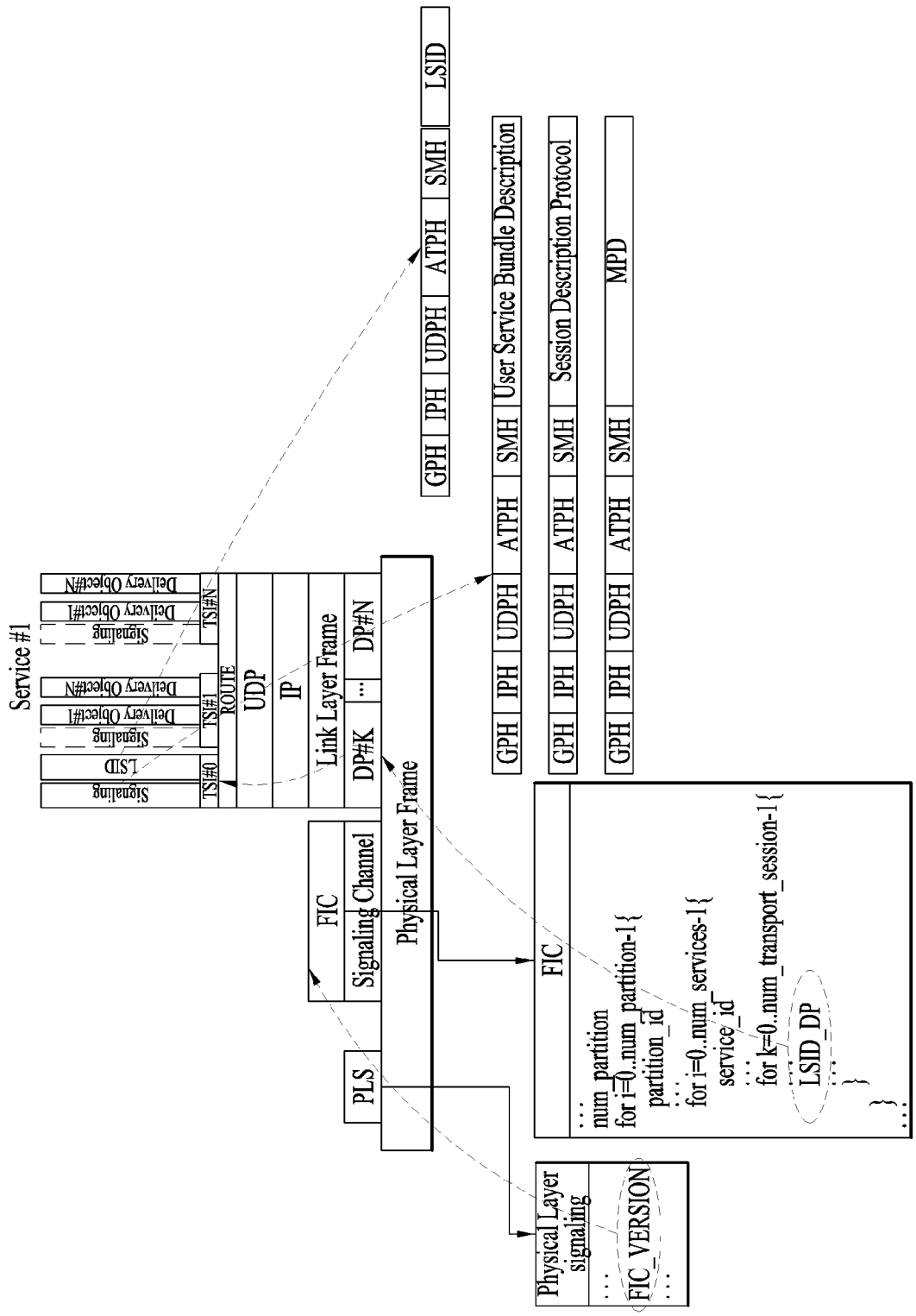
FIG. 81 illustrates a method for acquiring service layer signaling in the future broadcast system according to an embodiment of the present invention.

FIG. 81 illustrates a method for acquiring service layer signaling in the future broadcast system according to an embodiment of the present invention. When the future broadcast system uses 3GPP eMBMS signaling for service/component signaling, the future broadcast system can deliver the signaling as shown in the figure. Here, service layer signaling can include User Service Bundle Description (USBD), MPD, Session Description Protocol and may further include transport session instance description. A broadcast signal of the future broadcast system can be transmitted through physical layer frames. Broadcast signal frames can include physical layer signaling. Physical layer signaling information can include a field with respect to fast service acquisition information. This field can include version information of the fast service acquisition information. In other words, the field can indicate whether a physical layer frame includes the fast service acquisition information or whether the fast service acquisition information needs to be parsed. The receiver can acquire the fast service acquisition information using the field of physical layer signaling. A broadcast signal of the future broadcast system can include the fast service acquisition information in a physical layer frame. The fast service acquisition information may include a service identifier and information about a data pipe or a PLP through which at least one of service layer signaling information and a transport session instance descriptor is delivered. That is, the receiver can identify the PLP through which at least one of the service layer signaling information and transport session instance descriptor is delivered using data pipe or PLP identifier information included in the fast service acquisition information and acquire the service layer signaling information or transport session instance descriptor included therein. As illustrated, the service layer signaling information or the transport session instance descriptor can be delivered by a 0-th transport session in the corresponding PLP. That is, the service layer signaling information can be delivered by the transport session corresponding to tsi=0 in the PLP indicated by the PLP identifier included in the service acquisition information. In other words, the identifier of the transport session through which service layer signaling is delivered can be fixed to 0.

As illustrated, the service layer signaling can be encapsulated as described above. That is, the service layer signaling format can include a generic packet header (GPH), an IP packet header (IPH), a UDP datagram header (UDPH), an application transport protocol (e.g. ROUTE or MMTP) header (ATPH), a signaling message header (SMH) and a signaling message. Here, the signaling message may include MPD delivery description, component mapping description or URL signaling description according to type of a message delivered by the service layer signaling.

In addition, the transport session instance descriptor can have the aforementioned encapsulation format, as illustrated. That is, the transport session instance descriptor can include a generic packet header (GPH), an IP packet header (IPH), a UDP datagram header (UDPH), an application transport protocol (e.g. ROUTE or MMTP) header (ATPH), a signaling message header (SMH) and a signaling message. Here, the signaling message can include the transport session instance descriptor. In the present invention, the transport session instance descriptor may be included in service layer signaling and delivered.

Figure 82:
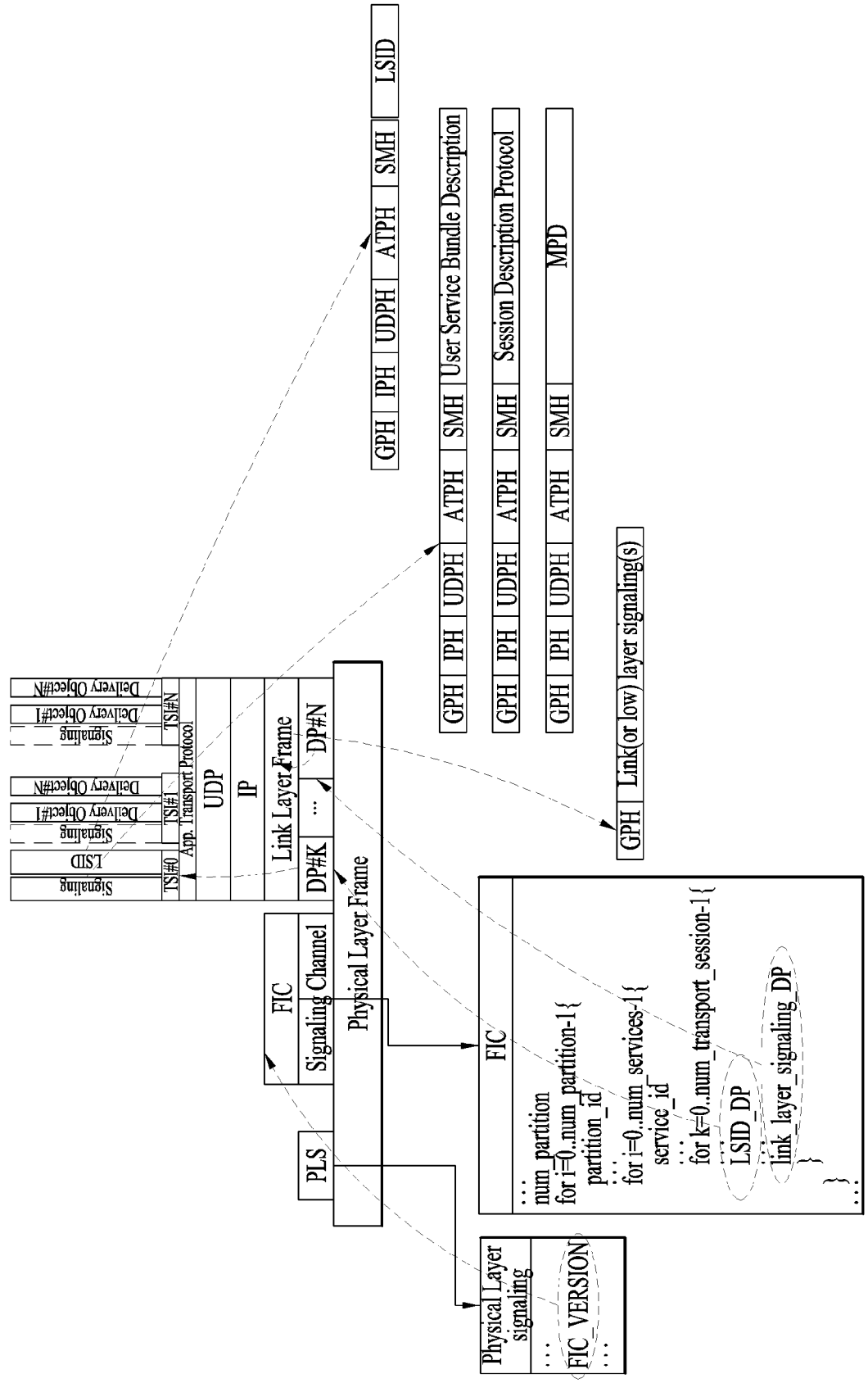
FIG. 82 illustrates a method for acquiring service layer signaling and link layer signaling in the future broadcast system according to an embodiment of the present invention.

FIG. 82 illustrates a method for acquiring service layer signaling and link layer signaling in the future broadcast system according to an embodiment of the present invention. When the future broadcast system uses 3GPP eMBMS signaling, the future broadcast system can deliver the signaling as shown in the figure. A broadcast signal of the future broadcast system can be transmitted through physical layer frames. Broadcast signal frames can include physical layer signaling. Physical layer signaling information can include a field with respect to fast service acquisition information. This field can include version information of the fast service acquisition information. In other words, the field can indicate whether a physical layer frame includes the fast service acquisition information or whether the fast service acquisition information needs to be parsed. The receiver can acquire the fast service acquisition information using the corresponding field of physical layer signaling. A broadcast signal of the future broadcast system can include the fast service acquisition information in a physical layer frame. The fast service acquisition information may include a service identifier and information about a data pipe or a PLP through which at least one of service layer signaling information and a transport session instance descriptor is delivered. That is, the receiver can identify the PLP through which at least one of the service layer signaling information and transport session instance descriptor is delivered using data pipe or PLP identifier information included in the fast service acquisition information and acquire the service layer signaling information or transport session instance descriptor included therein. As illustrated, the service layer signaling information or the transport session instance descriptor can be delivered by a 0-th transport session in the corresponding PLP. That is, the service layer signaling information can be delivered by the transport session corresponding to tsi=0 in the PLP indicated by the PLP identifier included in the service acquisition information. In other words, the identifier of the transport session through which service layer signaling is delivered can be fixed to 0.

As illustrated, the service layer signaling can be encapsulated as described above. That is, the service layer signaling format can include a generic packet header (GPH), an IP packet header (IPH), a UDP datagram header (UDPH), an application transport protocol (e.g. ROUTE or MMTP) header (ATPH), a signaling message header (SMH) and a signaling message. Here, the signaling message may include MPD delivery description, component mapping description or URL signaling description according to type of a message delivered by the service layer signaling.

In addition, the transport session instance descriptor can have the aforementioned encapsulation format, as illustrated. That is, the transport session instance descriptor can include a generic packet header (GPH), an IP packet header (IPH), a UDP datagram header (UDPH), an application transport protocol (e.g. ROUTE or MMTP) header (ATPH), a signaling message header (SMH) and a signaling message. Here, the signaling message can include the transport session instance descriptor. In the present invention, the transport session instance descriptor may be included in service layer signaling and delivered.

In addition, the fast service acquisition information may include information about a data pipe or a PLP through which link layer signaling is delivered. That is, the receiver can identify the PLP through which the link layer signaling is delivered using data pipe or PLP identifier information included in the fast service acquisition information and acquire the link layer signaling included therein. As illustrated, a transport link layer signaling format can include a generic packet header (GPH) and a signaling message. The signaling message can include information about link layer signaling. The receiver can acquire link layer signaling (or low layer signaling) through a data pipe and obtain service/component signaling such as a component mapping table through the application transport protocol. That is, the future broadcast system can include, in physical layer frames, signaling information about a data pipe or a PLP including link layer signaling.

Figure 83:
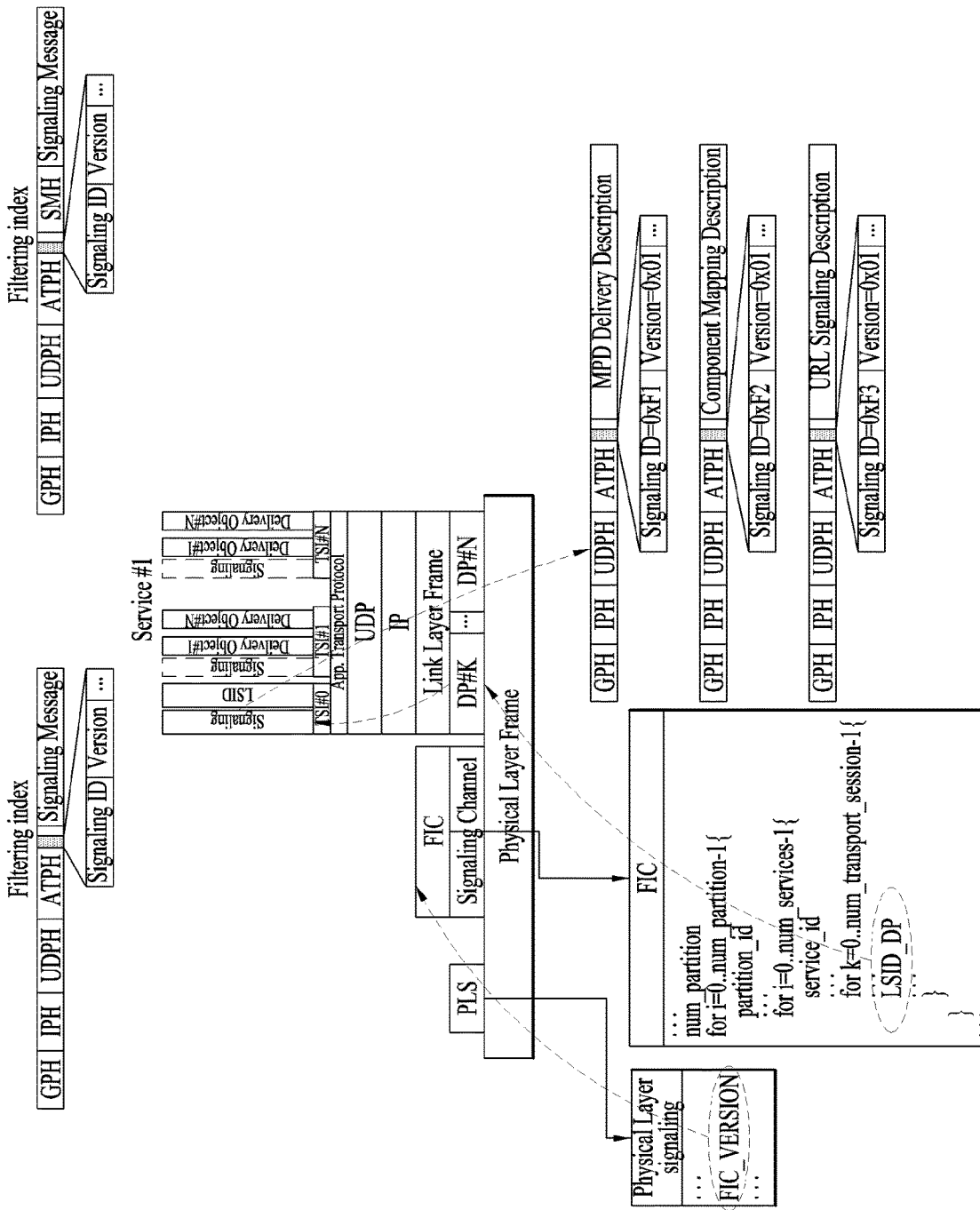
FIG. 83 illustrates a method for delivering service layer signaling in the future broadcast system according to an embodiment of the present invention.

FIG. 83 illustrates a method for delivering service layer signaling in the future broadcast system according to an embodiment of the present invention. The upper part of the figure shows a service layer signaling format used in the future broadcast system of the present invention. Service layer signaling can be encapsulated in the illustrated format. For example, encapsulated service layer signaling can be composed of a combination of a generic packet header (GPH), an IP packet header (IPH), a UDP datagram header (UDPH), an application transport protocol (e.g. ROUTE or MMTP) header (ATPH) and a signaling message, as shown in the left upper part of the figure. Alternatively, encapsulated service layer signaling can be composed of a combination of a generic packet header (GPH), an IP packet header (IPH), a UDP datagram header (UDPH), an application transport protocol (e.g. ROUTE or MMTP) header (ATPH), a signaling message header (SMH) and a signaling message, as shown in the right upper part of the figure. The ATPH may include a filtering index with respect to the service layer signaling. Here, the filtering index can include a signaling id, a version, etc. The signaling id can include identifier information about service layer signaling and the version can indicate the version of information included in the service layer signaling.

When the future broadcast system uses the aforementioned service signaling, the future broadcast system can deliver the service signaling as shown in the lower part of the figure. A broadcast signal of the future broadcast system can be transmitted through physical layer frames. Broadcast signal frames can include physical layer signaling. Physical layer signaling information can include a field with respect to fast service acquisition information. This field can include version information of the fast service acquisition information. In other words, the field can indicate whether a physical layer frame includes the fast service acquisition information or whether the fast service acquisition information needs to be parsed. The receiver can acquire the fast service acquisition information using the corresponding field of physical layer signaling. A broadcast signal of the future broadcast system can include the fast service acquisition information in a physical layer frame. The fast service acquisition information may include a service identifier and information about a data pipe or a PLP through which at least one of service layer signaling information and a transport session instance descriptor is delivered. That is, the receiver can identify the PLP through which at least one of the service layer signaling information and transport session instance descriptor is delivered using data pipe or PLP identifier information included in the fast service acquisition information and acquire the service layer signaling information or transport session instance descriptor included therein. As illustrated, the service layer signaling information or the transport session instance descriptor can be delivered by a 0-th transport session in the corresponding PLP. That is, the service layer signaling information can be delivered by the transport session corresponding to tsi=0 in the PLP indicated by the PLP identifier included in the service acquisition information. In other words, the identifier of the transport session through which service layer signaling is delivered can be fixed to 0.

As illustrated, the service layer signaling can be encapsulated as described above. That is, the service layer signaling format can include a generic packet header (GPH), an IP packet header (IPH), a UDP datagram header (UDPH), an application transport protocol (e.g. ROUTE or MMTP) header (ATPH), a signaling message header (SMH) and a signaling message. Here, the signaling message may include MPD delivery description, component mapping description or URL signaling description according to type of a message delivered by the service layer signaling. As described above, the ATPH can include the filtering index with respect to the service layer signaling. Here, the filtering index can include a signaling id, a version, etc. The signaling id can include identifier information about service layer signaling and the version can indicate the version of information included in the service layer signaling. For example, service layer signaling including MPD delivery description can have a value of 0xF1 as the signaling id thereof and a value of 0x01 as the version information thereof. The version information can be changed when the contents of the MPD delivery description corresponding to the signaling message of the corresponding service layer signaling is changed. Service layer signaling including component mapping description can have a value of 0xF2 as the signaling id thereof and a value of 0x01 as the version information thereof. The version information can be changed when the contents of the component mapping description corresponding to the signaling message of the corresponding service layer signaling is changed. Service layer signaling including URL signaling description can have a value of 0xF3 as the signaling id thereof and a value of 0x01 as the version information thereof. The version information can be changed when the contents of the URL signaling description corresponding to the signaling message of the corresponding service layer signaling are changed. Accordingly, the receiver can filter desired service layer signaling using signaling id and version information corresponding to filtering information included in the application transport protocol header of the service layer signaling. For example, when the receiver intends to receive the MPD delivery description, the receiver can receive the service layer signaling having a signaling id of 0xF1. In addition, the receiver can check the version information and, only when the MPD delivery description has been updated from the previously received MPD delivery description, parse the corresponding service layer signaling. Accordingly, the receiver can reduce unnecessary parsing operation with respect to service layer signaling and decrease processing overhead. As described above, the future broadcast system can support the receiver such that the receiver can filter desired information by including, in the transport protocol header of service layer signaling, signaling ID and version information.

Figure 84:
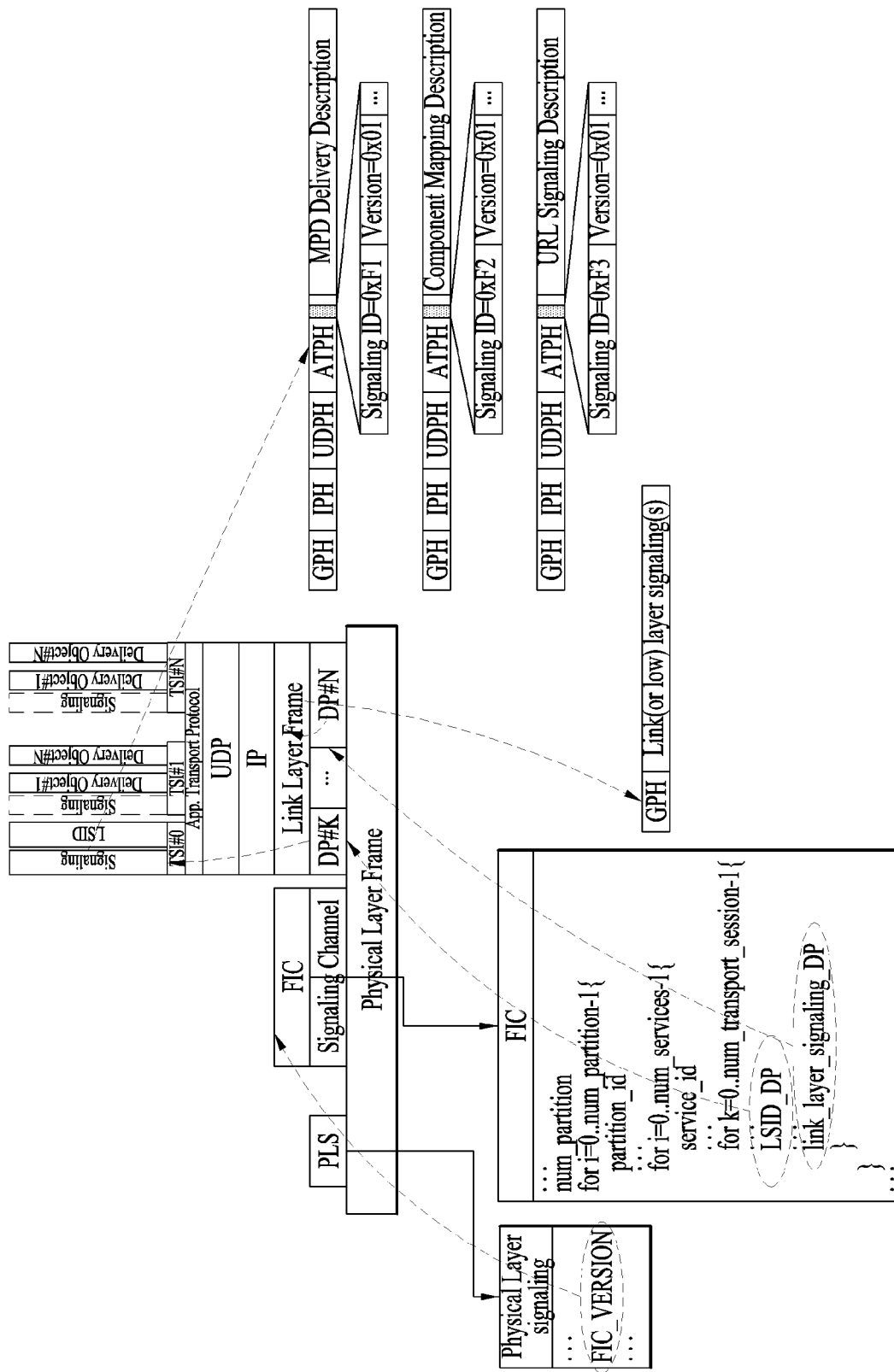
FIG. 84 illustrates a method for delivering service layer signaling and link layer signaling in the future broadcast system according to an embodiment of the present invention.

FIG. 84 illustrates a method for transmitting service layer signaling and link layer signaling in the future broadcast system according to an embodiment of the present invention. Service layer signaling used in the future broadcast system of the present invention can be encapsulated. For example, encapsulated service layer signaling can be composed of a combination of a generic packet header (GPH), an IP packet header (IPH), a UDP datagram header (UDPH), an application transport protocol (e.g. ROUTE or MMTP) header (ATPH) and a signaling message. Otherwise, encapsulated service layer signaling can be composed of a combination of a generic packet header (GPH), an IP packet header (IPH), a UDP datagram header (UDPH), an application transport protocol (e.g. ROUTE or MMTP) header (ATPH), a signaling message header (SMH) and a signaling message. The ATPH can include a filtering index with respect to the service layer signaling. Here, the filtering index can include a signaling id and a version. The signaling id is identifier information about the service layer signaling and the version indicates the version of information included in the service layer signaling.

When the future broadcast system uses the aforementioned service signaling, the future broadcast system can deliver the service signaling as illustrated in the figure. A broadcast signal of the future broadcast system can be transmitted through physical layer frames. Broadcast signal frames can include physical layer signaling. Physical layer signaling information can include a field with respect to fast service acquisition information. This field can include version information of the fast service acquisition information. In other words, the field can indicate whether a physical layer frame includes the fast service acquisition information or whether the fast service acquisition information needs to be parsed. The receiver can acquire the fast service acquisition information using the field of physical layer signaling. A broadcast signal of the future broadcast system can include the fast service acquisition information in a physical layer frame. The fast service acquisition information may include a service identifier and information about a data pipe or a PLP through which at least one of service layer signaling information and a transport session instance descriptor is delivered. That is, the receiver can identify the PLP through which at least one of the service layer signaling information and transport session instance descriptor is delivered using data pipe or PLP identifier information included in the fast service acquisition information and acquire the service layer signaling information or transport session instance descriptor included therein. As illustrated, the service layer signaling information or the transport session instance descriptor can be delivered by a 0-th transport session in the corresponding PLP. That is, the service layer signaling information can be delivered by the transport session corresponding to tsi=0 in the PLP indicated by the PLP identifier included in the service acquisition information. In other words, the identifier of the transport session through which service layer signaling is delivered can be fixed to 0.

As illustrated, the service layer signaling can be encapsulated as described above. That is, the service layer signaling format can include a generic packet header (GPH), an IP packet header (IPH), a UDP datagram header (UDPH), an application transport protocol (e.g. ROUTE or MMTP) header (ATPH), a signaling message header (SMH) and a signaling message. Here, the signaling message may include MPD delivery description, component mapping description or URL signaling description according to type of a message delivered by the service layer signaling. As described above, the ATPH can include the filtering index with respect to the service layer signaling. Here, the filtering index can include a signaling id, a version, etc. The signaling id can include identifier information about service layer signaling and the version can indicate the version of information included in the service layer signaling. For example, service layer signaling including MPD delivery description can have a value of 0xF1 as the signaling id thereof and a value of 0x01 as the version information thereof. The version information can be changed when the contents of the MPD delivery description corresponding to the signaling message of the corresponding service layer signaling are changed. Service layer signaling including component mapping description can have a value of 0xF2 as the signaling id thereof and a value of 0x01 as the version information thereof. The version information can be changed when the contents of the component mapping description corresponding to the signaling message of the corresponding service layer signaling are changed. Service layer signaling including URL signaling description can have a value of 0xF3 as the signaling id thereof and has a value of 0x01 as the version information thereof. The version information can be changed when the contents of the URL signaling description corresponding to the signaling message of the corresponding service layer signaling is changed. Accordingly, the receiver can filter desired service layer signaling using signaling id and version information corresponding to filtering information included in the application transport protocol header of the service layer signaling. For example, when the receiver intends to receive the MPD delivery description, the receiver can receive the service layer signaling having a signaling id of 0xF1. In addition, the receiver can check the version information and, only when the MPD delivery description has been updated from the previously received MPD delivery description, parse the corresponding service layer signaling. Accordingly, the receiver can reduce unnecessary parsing operation with respect to service layer signaling and decrease processing overhead. As described above, the future broadcast system can support the receiver such that the receiver can filter desired information by including, in the transport protocol header of service layer signaling, signaling ID and version information.

In addition, the fast service acquisition information may include information about a data pipe or a PLP through which link layer signaling is delivered. That is, the receiver can identify the PLP through which the link layer signaling is delivered using data pipe or PLP identifier information included in the fast service acquisition information and acquire the link layer signaling included therein. As illustrated, a transport link layer signaling format can include a generic packet header (GPH) and a signaling message. The signaling message can include information about link layer signaling. The receiver can acquire link layer signaling (or low layer signaling) through a data pipe and obtain service/component signaling such as a component mapping table through the application transport protocol. That is, the future broadcast system can include, in physical layer frames, signaling information about a data pipe or a PLP including link layer signaling.

Figure 85:
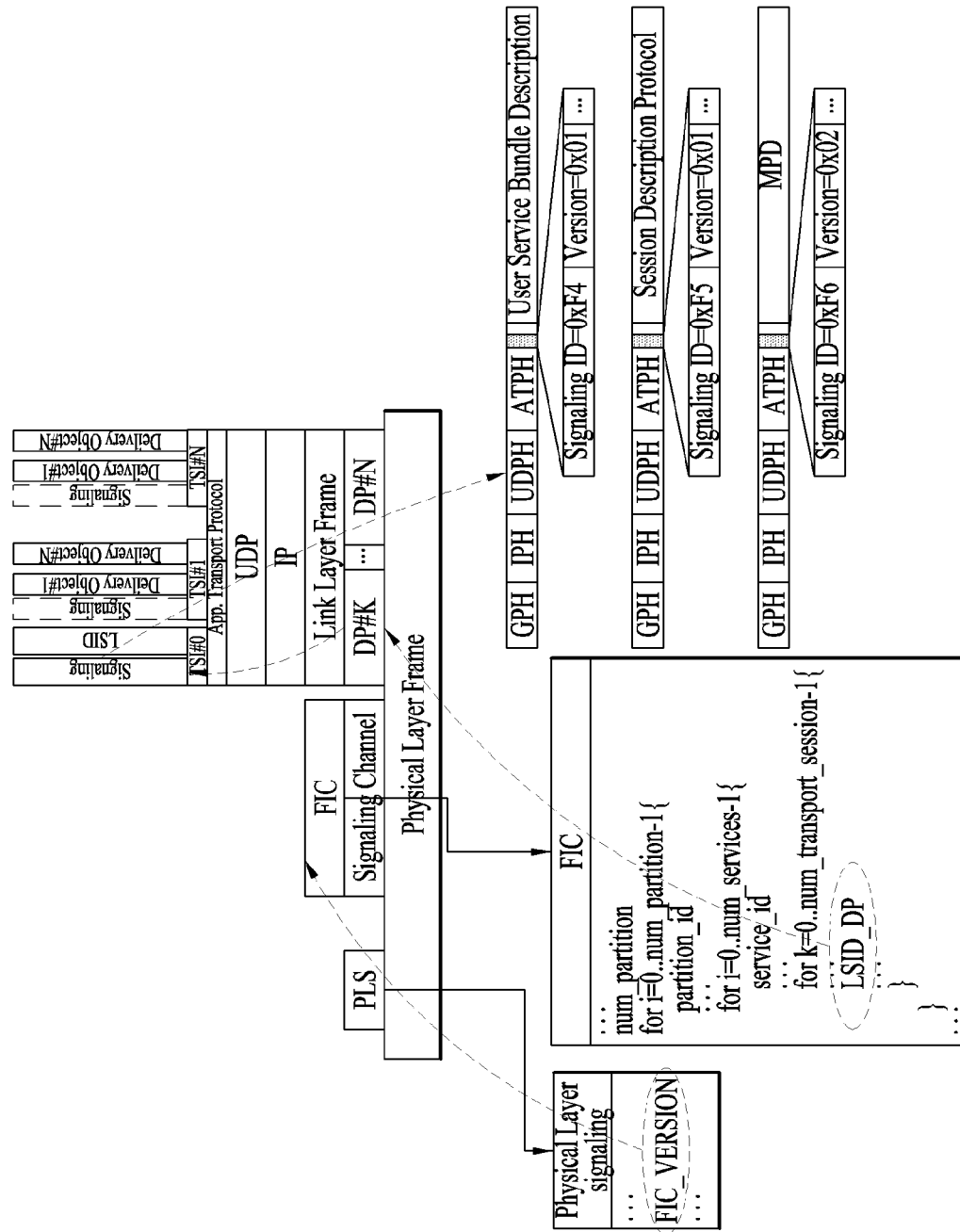
FIG. 85 illustrates a method for delivering service layer signaling in the future broadcast system according to an embodiment of the present invention.

FIG. 85 illustrates a method for delivering service layer signaling in the future broadcast system according to an embodiment of the present invention. Service layer signaling used in the future broadcast system of the present invention can be encapsulated. For example, encapsulated service layer signaling can be composed of a combination of a generic packet header (GPH), an IP packet header (IPH), a UDP datagram header (UDPH), an application transport protocol (e.g. ROUTE or MMTP) header (ATPH) and a signaling message. Otherwise, encapsulated service layer signaling can be composed of a combination of a generic packet header (GPH), an IP packet header (IPH), a UDP datagram header (UDPH), an application transport protocol (e.g. ROUTE or MMTP) header (ATPH), a signaling message header (SMH) and a signaling message. The ATPH can include a filtering index with respect to the service layer signaling. Here, the filtering index can include a signaling id and a version. The signaling id is identifier information about the service layer signaling and the version indicates the version of information included in the service layer signaling.

When the future broadcast system uses 3GPP eMBMS signaling, the signaling can be delivered as illustrated. When the future broadcast system uses the aforementioned service signaling, the service signaling can be delivered as shown in the lower part of the figure. A broadcast signal of the future broadcast system can be transmitted through physical layer frames. Broadcast signal frames can include physical layer signaling. Physical layer signaling information can include a field with respect to fast service acquisition information. This field can include version information of the fast service acquisition information. In other words, the field can indicate whether a physical layer frame includes the fast service acquisition information or whether the fast service acquisition information needs to be parsed. The receiver can acquire the fast service acquisition information using the field of physical layer signaling. A broadcast signal of the future broadcast system can include the fast service acquisition information in a physical layer frame. The fast service acquisition information may include a service identifier and information about a data pipe or a PLP through which at least one of service layer signaling information and a transport session instance descriptor is delivered. That is, the receiver can identify the PLP through which at least one of the service layer signaling information and transport session instance descriptor is delivered using data pipe or PLP identifier information included in the fast service acquisition information and acquire the service layer signaling information or transport session instance descriptor included therein. As illustrated, the service layer signaling information or the transport session instance descriptor can be delivered by a 0-th transport session in the corresponding PLP. That is, the service layer signaling information can be delivered by the transport session corresponding to tsi=0 in the PLP indicated by the PLP identifier included in the service acquisition information. In other words, the identifier of the transport session through which service layer signaling is delivered can be fixed to 0.

As illustrated, the service layer signaling can be encapsulated as described above. That is, the service layer signaling format can include a generic packet header (GPH), an IP packet header (IPH), a UDP datagram header (UDPH), an application transport protocol (e.g. ROUTE or MMTP) header (ATPH), a signaling message header (SMH) and a signaling message. Here, the signaling message may include User Service Bundle Description (USBD), MPD and Session Description Protocol according to type of a message delivered by the service layer signaling. As described above, the ATPH can include the filtering index with respect to the service layer signaling. Here, the filtering index can include a signaling id, a version, etc. The signaling id can include identifier information about service layer signaling and the version can indicate the version of information included in the service layer signaling. For example, service layer signaling including the User Service Bundle Description can have a value of 0xF4 as the signaling id thereof and a value of 0x01 as the version information thereof. The version information can be changed when the contents of the User Service Bundle Description corresponding to the signaling message of the corresponding service layer signaling are changed. Service layer signaling including the Session Description Protocol can have a value of 0xF5 as the signaling id thereof and a value of 0x01 as the version information thereof. The version information can be changed when the contents of the Session Description Protocol corresponding to the signaling message of the corresponding service layer signaling are changed. Service layer signaling including the MPD can have a value of 0xF6 as the signaling id thereof and a value of 0x02 as the version information thereof. The version information can be changed when the contents of the MPD corresponding to the signaling message of the corresponding service layer signaling are changed. Accordingly, the receiver can filter desired service layer signaling using signaling id and version information corresponding to filtering information included in the application transport protocol header of the service layer signaling. For example, when the receiver intends to receive the User Service Bundle Description, the receiver can receive the service layer signaling having a signaling id of 0xF4. In addition, the receiver can check the version information and, only when the User Service Bundle Description has been updated from the previously received User Service Bundle Description, parse the corresponding service layer signaling. Accordingly, the receiver can reduce unnecessary parsing operation with respect to service layer signaling and decrease processing overhead. As described above, the future broadcast system can support the receiver such that the receiver can filter desired information by including, in the transport protocol header of service layer signaling, signaling ID and version information.

Figure 86:
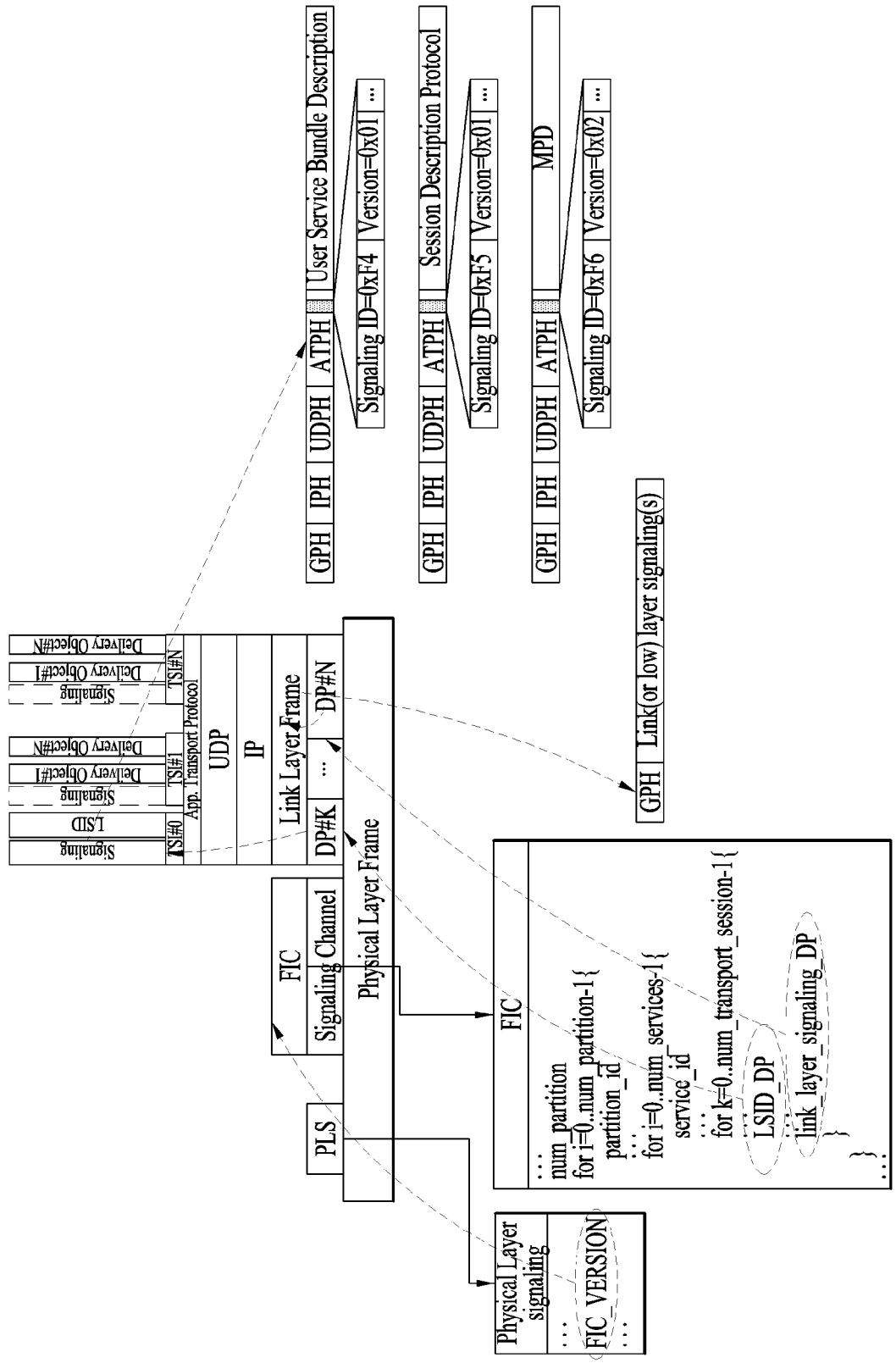
FIG. 86 illustrates a method for delivering service layer signaling and link layer signaling in the future broadcast system according to an embodiment of the present invention.

FIG. 86 illustrates a method for transmitting service layer signaling and link layer signaling in the future broadcast system according to an embodiment of the present invention. Service layer signaling used in the future broadcast system of the present invention can be encapsulated. For example, encapsulated service layer signaling can be composed of a combination of a generic packet header (GPH), an IP packet header (IPH), a UDP datagram header (UDPH), an application transport protocol (e.g. ROUTE or MMTP) header (ATPH) and a signaling message. Otherwise, encapsulated service layer signaling can be composed of a combination of a generic packet header (GPH), an IP packet header (IPH), a UDP datagram header (UDPH), an application transport protocol (e.g. ROUTE or MMTP) header (ATPH), a signaling message header (SMH) and a signaling message. The ATPH can include a filtering index with respect to the service layer signaling. Here, the filtering index can include a signaling id and a version. The signaling id is identifier information about the service layer signaling and the version indicates the version of information included in the service layer signaling.

When the future broadcast system uses 3GPP eMBMS signaling, the signaling can be delivered as illustrated in the figure. A broadcast signal of the future broadcast system can be transmitted through physical layer frames. Broadcast signal frames can include physical layer signaling. Physical layer signaling information can include a field with respect to fast service acquisition information. This field can include version information of the fast service acquisition information. In other words, the field can indicate whether a physical layer frame includes the fast service acquisition information or whether the fast service acquisition information needs to be parsed. The receiver can acquire the fast service acquisition information using the corresponding field of physical layer signaling. A broadcast signal of the future broadcast system can include the fast service acquisition information in a physical layer frame. The fast service acquisition information may include a service identifier and information about a data pipe or a PLP through which at least one of service layer signaling information and a transport session instance descriptor is delivered. That is, the receiver can identify the PLP through which at least one of the service layer signaling information and transport session instance descriptor is delivered using data pipe or PLP identifier information included in the fast service acquisition information and acquire the service layer signaling information or transport session instance descriptor included therein. As illustrated, the service layer signaling information or the transport session instance descriptor can be delivered by a 0-th transport session in the corresponding PLP. That is, the service layer signaling information can be delivered by the transport session corresponding to tsi=0 in the PLP indicated by the PLP identifier included in the service acquisition information. In other words, the identifier of the transport session through which service layer signaling is delivered can be fixed to 0.

As illustrated, the service layer signaling can be encapsulated as described above. That is, the service layer signaling format can include a generic packet header (GPH), an IP packet header (IPH), a UDP datagram header (UDPH), an application transport protocol (e.g. ROUTE or MMTP) header (ATPH), a signaling message header (SMH) and a signaling message. Here, the signaling message may include User Service Bundle Description (USBD), MPD and Session Description Protocol according to type of a message delivered by the service layer signaling. As described above, the ATPH can include the filtering index with respect to the service layer signaling. Here, the filtering index can include a signaling id, a version, etc. The signaling id can include identifier information about service layer signaling and the version can indicate the version of information included in the service layer signaling. For example, service layer signaling including the User Service Bundle Description can have a value of 0xF4 as the signaling id thereof and a value of 0x01 as the version information thereof. The version information can be changed when the contents of the User Service Bundle Description corresponding to the signaling message of the corresponding service layer signaling are changed. Service layer signaling including the Session Description Protocol can have a value of 0xF5 as the signaling id thereof and a value of 0x01 as the version information thereof. The version information can be changed when the contents of the Session Description Protocol corresponding to the signaling message of the corresponding service layer signaling are changed. Service layer signaling including the MPD can have a value of 0xF6 as the signaling id thereof and a value of 0x02 as the version information thereof. The version information can be changed when the contents of the MPD corresponding to the signaling message of the corresponding service layer signaling are changed. Accordingly, the receiver can filter desired service layer signaling using signaling id and version information corresponding to filtering information included in the application transport protocol header of the service layer signaling. For example, when the receiver intends to receive the User Service Bundle Description, the receiver can receive the service layer signaling having a signaling id of 0xF4. In addition, the receiver can check the version information and, only when the User Service Bundle Description has been updated from the previously received User Service Bundle Description, parse the corresponding service layer signaling. Accordingly, the receiver can reduce unnecessary parsing operation with respect to service layer signaling and decrease processing overhead. As described above, the future broadcast system can support the receiver such that the receiver can filter desired information by including, in the transport protocol header of service layer signaling, signaling ID and version information.

In addition, the fast service acquisition information may include information about a data pipe or a PLP through which link layer signaling is delivered. That is, the receiver can identify the PLP through which the link layer signaling is delivered using data pipe or PLP identifier information included in the fast service acquisition information and acquire the link layer signaling included therein. As illustrated, a transport link layer signaling format can include a generic packet header (GPH) and a signaling message. The signaling message can include information about link layer signaling. The receiver can acquire link layer signaling (or low layer signaling) through a data pipe and obtain service/component signaling such as a component mapping table through the application transport protocol. That is, the future broadcast system can include, in physical layer frames, signaling information about a data pipe or a PLP including link layer signaling.

Figure 87:
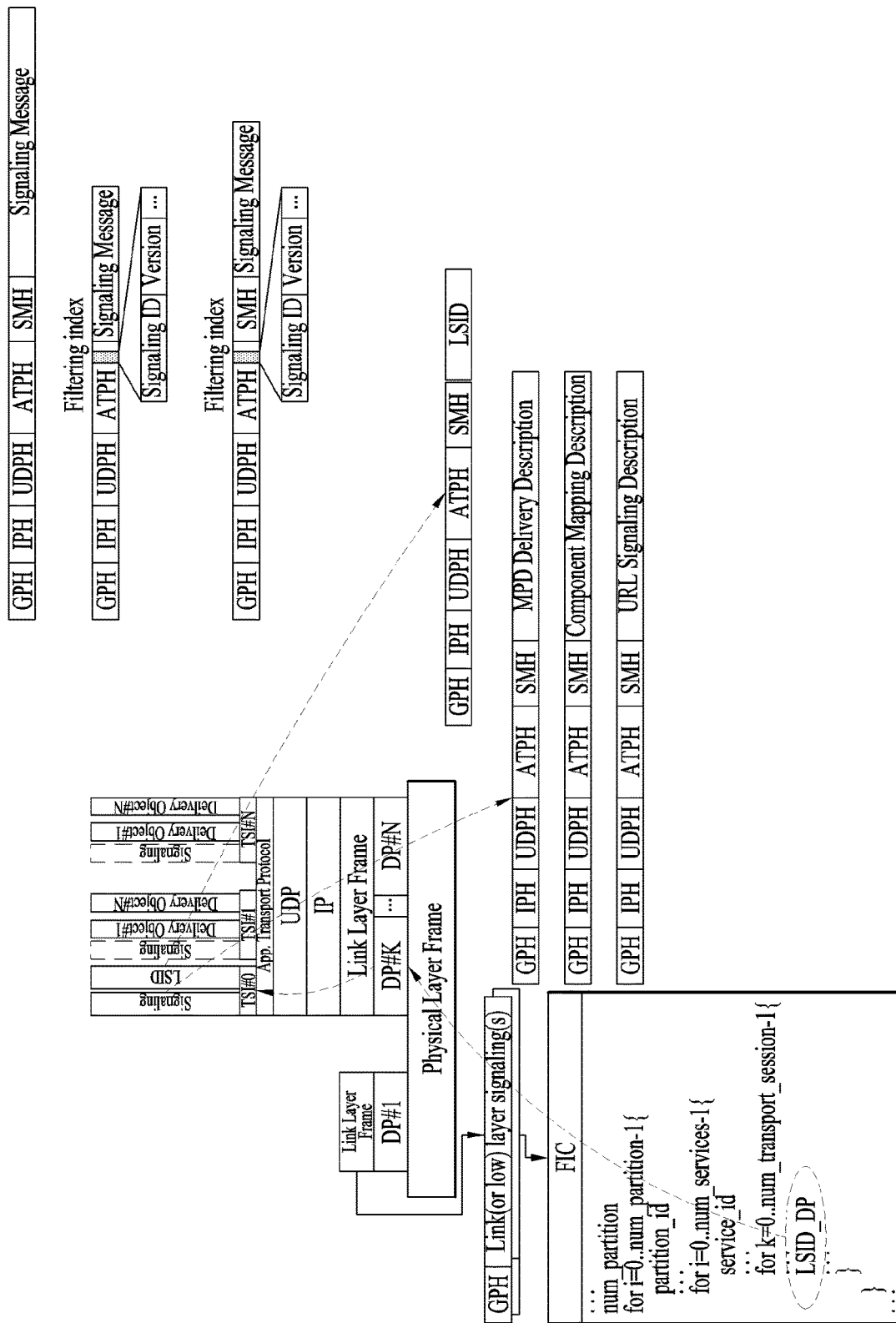
FIG. 87 illustrates a method for transmitting service layer signaling in the future broadcast system according to an embodiment of the present invention.

FIG. 87 illustrates a method for transmitting service layer signaling of the future broadcast system according to an embodiment of the present invention. Service layer signaling may include the aforementioned signaling or 3GPP eMBMS signaling. When a fast information channel is not present in a broadcast signal of the future broadcast system, signaling data for supporting fast service scan and acquisition can be transmitted through a common data pipe, a data pipe or a PLP in a physical frame as illustrated. In this case, the signaling data associated with fast service scan and acquisition can be encapsulated in the form of link (or low) layer signaling and transmitted along with other link (or low) layer signaling. That is, the PLP in the frame can carry the signaling data including service acquisition information. Furthermore, the signaling data may be transmitted through the same data pipe or PLP as that used to transmit service/component signaling or component data or a separate data pipe or PLP. As the service/component signaling, the aforementioned signaling or 3GPP eMBMS signaling may be transmitted. The corresponding signaling can include a generic packet header (GPH), an IP packet header (IPH), a UDP datagram header (UDPH), an application transport protocol (e.g. ROUTE or MMTP) header (ATPH), a signaling message header (SMH) and a signaling message, as described above. Here, the SMH may not be included in the signaling format according to an embodiment. The ATPH can include a filtering index with respect to service layer signaling. Here, the filtering index can include a signaling id and a version. The signaling id is identifier information about the service layer signaling and the version indicates the version of information included in the service layer signaling.

The lower part of the figure shows a method for acquiring service layer signaling using service acquisition information included in link layer signaling. A PLP of a broadcast signal frame can include link layer signaling. The link layer signaling can include the aforementioned fast service scan and acquisition information. The fast service scan and acquisition information can include a service identifier and PLP identifier information including service layer signaling with respect to the corresponding service. The PLP indicated by the corresponding PLP identifier can include service layer signaling. The service layer can include a generic packet header (GPH), an IP packet header (IPH), a UDP datagram header (UDPH), an application transport protocol (e.g. ROUTE or MMTP) header (ATPH), a signaling message header (SMH) and a signaling message. The signaling message of the service layer signaling can include transport session instance description, MPD delivery description, component mapping description or URL signaling description. The future broadcast signal receiver can acquire a desired service by parsing the service layer signaling.

Figure 88:
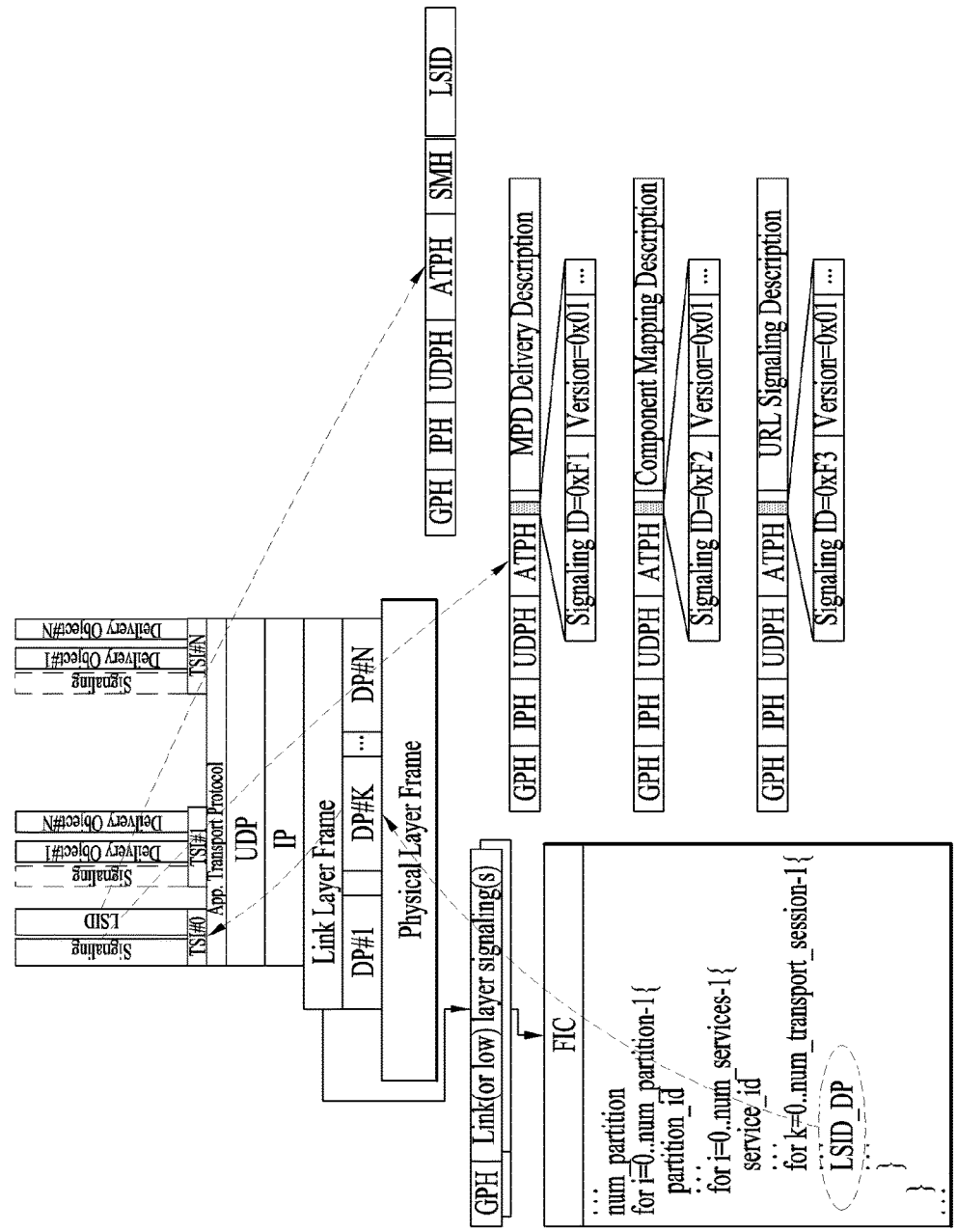
FIG. 88 illustrates a method for delivering service layer signaling in the future broadcast system according to an embodiment of the present invention.

FIG. 88 illustrates a method for delivering service layer signaling of the future broadcast system according to an embodiment of the present invention. Service layer signaling may include the aforementioned signaling or 3GPP eMBMS signaling. A PLP of a broadcast signal frame can include link layer signaling. The link layer signaling can include the aforementioned fast service scan and acquisition information. The fast service scan and acquisition information can include a service identifier and PLP identifier information including service layer signaling with respect to the corresponding service. The PLP indicated by the corresponding PLP identifier can include service layer signaling. The service layer can include a generic packet header (GPH), an IP packet header (IPH), a UDP datagram header (UDPH), an application transport protocol (e.g. ROUTE or MMTP) header (ATPH) and a signaling message. The signaling message of the service layer signaling can include transport session instance description, MPD delivery description, component mapping description or URL signaling description. The future broadcast signal receiver can acquire a desired service by parsing the service layer signaling. Here, the ATPH can include a filtering index with respect to service layer signaling. Here, the filtering index can include a signaling id and a version. The signaling id is identifier information about the service layer signaling and the version indicates the version of information included in the service layer signaling. The method for filtering the service layer signaling using the filtering index has been described above.

FIG. 89 illustrates a syntax of a header of a signaling message according to another embodiment of the present invention.

The signaling message according to another embodiment of the present invention can be represented in XML. Here, signaling information included in the signaling message in XML may correspond to the signaling information as described above or below.

The header of the signaling message according to another embodiment of the present invention can include signaling_id, signaling_length, signaling_id_extension, version_number, current_next_indicator, indicator_flags, fragmentation_indicator, payload_format_indicator, expiration_indicator, validfrom_indicator, fragment_number, last_fragment_number, payload_format, validfrom and/or expiration information.

For description of signaling information having names identical or similar to those of the signaling information included in the aforementioned signaling message header, from among the signaling information included in the signaling message header according to the present embodiment, refer to the above description.

The validfrom_indicator information indicates whether the signaling message header part includes a value of validfrom information. For example, a validfrom_indicator information value of 1 can indicate that the signaling message header part includes the validfrom information.

The validfrom information can indicate the time from which the signaling message included in a payload is available. The receiver can recognize the time from which the signaling message included in the payload is available using the validfrom information and use the data included in the payload as signaling information from the corresponding time.

Here, the payload refers to a region in a broadcast signal including data of broadcast services or broadcast content data (broadcast service data). That is, signaling information is generally transmitted through a region, which is physically or logically separated from broadcast service data, in a broadcast signal. According to the present invention, however, the signaling information can be transmitted through a payload region in a broadcast signal when the payload has a spare region or signaling information, which exceeds a region allocated for signaling information transmission, needs to be transmitted.

Figure 90:
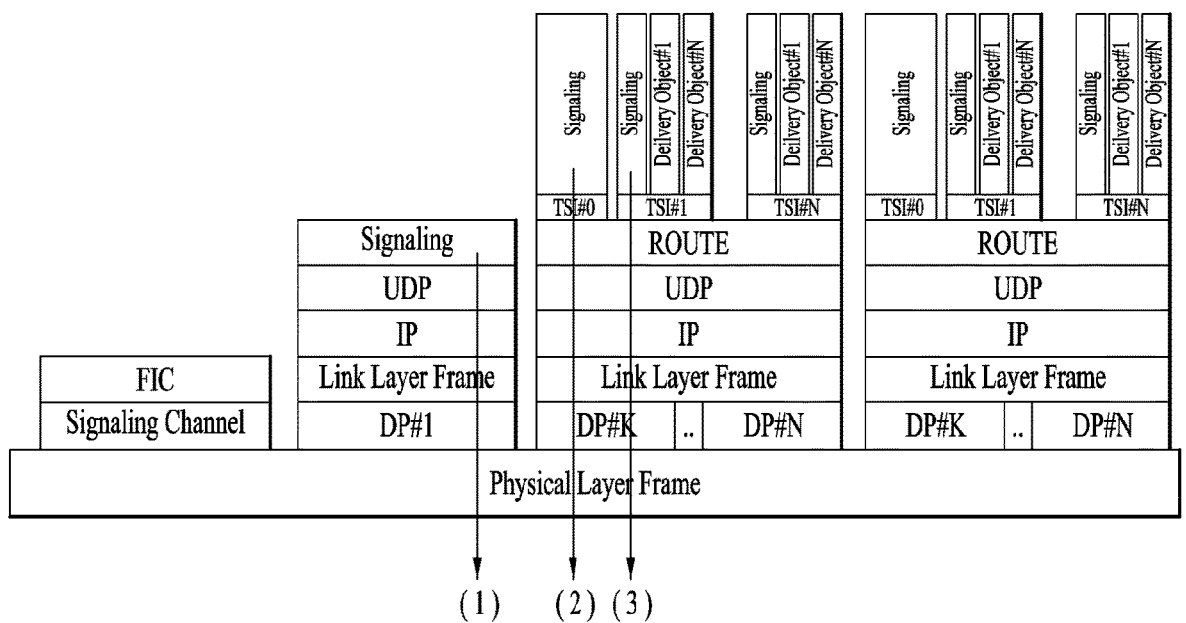
FIG. 90 illustrates a protocol stack which processes a DASH initialization segment according to an embodiment of the present invention.

FIG. 90 illustrates a protocol stack for processing a DASH initialization segment according to an embodiment of the present invention.

The DASH initialization segment can be transmitted in the same format as the aforementioned initialization segment delivery table or in XML.

The DASH initialization segment includes metadata (signaling information) necessary to represent media streams (broadcast signals) encapsulated into a plurality of segments. Here, a segment is a data unit associated with HTTP-URL. A segment includes data for broadcast services or broadcast content. Representation is a data unit including one or more media streams in a transport format. The representation can include one or more segments.

The DASH initialization segment can be processed according to the illustrated protocol stack in the transmitter or the receiver. The DASH initialization segment can be transmitted through one or more paths on the protocol stack.

In the protocol stack, signaling information or broadcast service data can be processed according to protocols of multiple layers. In the figure, a signaling channel and data pipes may correspond to the first layer, an FIC and link layer frames may correspond to the second layer, Internet protocol (IP) may correspond to the third layer, a user datagram protocol (UDP) may correspond to the fourth layer and ROUTE may correspond to the fifth layer. A link layer frame may include a link layer packet described in the specification.

In the protocol stack processing the DASH initialization segment, when signaling data such as the initialization segment is directly loaded in IP/IUDP and transmitted through the illustrated path (1), the initialization segment may be transmitted as information in the format of the aforementioned initialization segment delivery table or the initialization segment itself may be transmitted in the form of an IP datagram through processing of the protocol stack. The aforementioned information for service signaling and/or component signaling may also be transmitted through the path (1).

According to an embodiment of the present invention, the DASH initialization segment can be transmitted along with media data through a specific session for transmitting signaling data, such as a path (2), or through a session for transmitting component data, such as a path (3). For example, the application transport protocol can use real-time object delivery over unidirectional transport (ROUTE). A ROUTE session may include a session for transmitting signaling information and/or a session for transmitting broadcast media data. The broadcast system fixes the TSI of a session for transmitting signaling information to a specific value such that the receiver can recognize that data transmitted through the session corresponding to the TSI is signaling information.

When the signaling information (data) such as the initialization segment is transmitted through the illustrated path (2) and/or path (3), information indicating locations of data in the aforementioned signaling message format and the initialization segment in a transport stream or a transport object and/or information for identifying the data in the signaling message format or the initialization segment from among data transmitted along therewith can be provided in the form of fields in a transport protocol packet or separate signaling information.

FIG. 91 shows part of layered coding transport (LCT) session instance description (LSID) according to an embodiment of the present invention.

The LCT session instance descriptor can provide information indicating locations of data in the aforementioned signaling message format and the initialization segment in a broadcast signal and/or information for identifying the data in the signaling message format or the initialization segment from among data transmitted along therewith can be provided in the form of fields in a transport protocol packet or separate signaling information.

The LCT session instance descriptor can include a PayloadFormat element. The PayloadFormat element can include @codePoint, @deliveryObjectFormat, @fragmentation, @deliveryOrder and/or @sourceFecPayloadID information.

Each element can be used to provide information as illustrated in the figure.

According to an embodiment of the present invention, a broadcast receiver or a broadcast transmitter can use @deliveryObjectFormat information (or field) of the PayloadFormat element in the SourceFlow element of the LSID in order to identify a ROUTE packet including the initialization segment.

In one embodiment, @deliveryObjectFormat information can indicate that the corresponding ROUTE packet includes a signaling message format when the value thereof is 0. When the @deliveryObjectFormat information has a value of 0, the @deliveryObjectFormat information can indicate that a ROUTE packet having the same code point (CP) in an LCT packet header as the value of @codePoint information allocated to the PayloadFormat element carries data in the aforementioned signaling message format. The initialization segment can be included in the signaling message format and transmitted. Transmission of other signaling data such as service signaling data and component signaling data in the signaling message format through ROUTE packets using the same method as the one above can be recognized through the @deliveryObjectFormat information.

When the @deliveryObjectFormat information has a value of 4, the @deliveryObjectFormat field can indicate that the corresponding ROUTE packet includes metadata (signaling information) containing the initialization segment. When the @deliveryObjectFormat field has a value of 4, the @deliveryObjectFormat information can indicate transmission of a metadata format including the initialization segment through a ROUTE packet or direct transmission of the initialization segment through the ROUTE packet.

According to an embodiment of the present invention, the broadcast system (broadcast receiver and/or broadcast transmitter) can signal direct transmission of other signaling data such as service signaling (service level signaling information) and/or component signaling (component level signaling information) through ROUTE packets by allocating a new value (e.g. a value equal to or greater than 5) to the @deliveryObjectFormat information.

According to another embodiment of the present invention, the broadcast system may identify a ROUTE packet carrying signaling data such as the initialization segment through other fields or new additional fields in the LSID in addition to the method of using the @deliveryObjectFormat information described in the present embodiment.

FIG. 92 shows signaling object description (SOD) providing information for filtering a service signaling message according to an embodiment of the present invention.

The signaling object description according to an embodiment of the present invention can include @protocolVersion, @dataVersion, @validFrom, @expiration, Signaling Object element, @toi, @type, @version, @instance Id, @validFrom, @expiration and/or @payloadFormat.

The @protocolVersion information indicates the version of the signaling object description.

The @dataVersion information indicates the version of instances of the signaling object description. The @dataVersion information can be changed when the contents of the signaling object description are varied.

The @validfrom information indicates the time from when the instances of the signaling object description start are available. The receiver can recognize the time from which the signaling object description is available using the @validfrom information and use information included in the signaling object description from the corresponding time.

The @expiration information indicates the time at which availability of the instance of the signaling object description expires. The receiver can recognize the time at which availability of the signaling object description expires and manage information of the signaling object description using the @validfrom information.

The Signaling Object element indicates an object including signaling information. The signaling object description can include signaling information about one or more signaling objects.

The @toi information indicates a transmission object identifier (TOI) allocated to a signaling object. The @toi information can be used to identify a packet associated with the signaling object. The receiver can identify the following information including the type and/or version of a signaling message transmitted through each object by mapping the @toi information to a TOI of an LCT packet.

The @type information identifies the type of a signaling message included in an object. For example, the @type information can indicate transmission of LSID (LCT Session Instance Description) as a signaling message in the corresponding object when the value thereof is 0, transmission of CMD (Component Mapping Description) as a signaling message in the corresponding object when the value thereof is 1, transmission of ASD (Application Signaling Description) as a signaling message in the corresponding object when the value thereof is 2, transmission of MPD (Media Presentation Description) as a signaling message in the corresponding object when the value thereof is 3, transmission of USD (URL Signaling Description) as a signaling message in the corresponding object when the value thereof is 4, and transmission of the IS (Initialization Segment) as a signaling message in the corresponding object when the value there of is 5.

The @version information indicates the version of a signaling message. The receiver can recognize change of the signaling message through variation of the value of this field.

The @instance Id information identifies an instance of a signaling message. This information can be used for the receiver to identify instances of signaling messages, which can be present in one service, such as initialization segments.

The @validFrom information indicates the time from which a signaling message included in an object is available. The receiver can recognize the time from which the signaling message included in the corresponding object is available using this information and use the signaling message included in the object from the corresponding time.

The @expiration information indicates the time for which the signaling message included in the object is valid. The receiver can recognize the time at which availability of the signaling message included in the object expires and manage the signaling message using this information.

The @payloadFormat information indicates the format of signaling message data included in the corresponding object. For example, a signaling message can be provided in a binary format or XML and the @payloadFormat information indicates this format.

When signaling messages are transmitted with an LCT based protocol such as ROUTE, each signaling message can be set as an object and processed. Since an object can be identified by the unique TOI thereof in the aforementioned protocol, signaling messages can be filtered by mapping signaling message related information such as version and type to each TOI. The aforementioned SOD (Signaling Object Description) provides filtering information of signaling objects corresponding to a single transport session. The signaling object description can be transmitted through internal or external means of a signaling transport session. When the signaling object description is transmitted through the internal means, the receiver can identify the signaling object description with a unique TOI value (e.g. 0 or 0xFFFF) and interpret the signaling object description prior to other signaling messages transmitted along therewith. When the signaling object description is transmitted through the external means, the signaling object description is transmitted through a fast information channel (FIC), a service list table (SLT), a separate IP datagram or a different ROUTE session prior to other objects delivered in the corresponding session such that the receiver can previously acquire information of the corresponding signaling message.

FIG. 93 illustrates an object including a signaling message according to an embodiment of the present invention.

When signaling messages are transmitted using an LCT based protocol such as ROUTE, each signaling message can be set as an object and processed. An object can be identified by the unique TOI thereof in the aforementioned protocol. The receiver can filter signaling messages by mapping signaling message related information such as version and type to each TOI. Objects containing different content may be assigned different TOIs. In this case, the broadcast system can process signaling messages through a method compatible with a conventional object processing method since all objects can be uniquely identified.

FIG. 93 illustrates an embodiment in which part of a TOI field is used for description of fixed-length signaling message related information. In the present embodiment, a 32-bit TOI field is used, and the type and version of signaling data transmitted through the corresponding object can be identified through a 16-bit type field and a 16-bit version field. In the same manner, additional information of the aforementioned sequence number information, valid-from information, expiration information and/or payload format information may be delivered by allocating part of the TOI field to fixed-length fields.

The object according to an embodiment of the present invention can include V, C, PSI, S, O, H, A, B, HDR_LEN, Codepoint, Congestion Control Information, Transport Session Identifier (TSI), Transport Object Identifier (TOI), Header Extensions, FEC payload ID and/or Encoding Symbols elements. Here, an element may be referred to as information or a field.

The PSI element can include an X element and/or a Y element.

The TOI element can include a Type element and/or a Version element.

The V element indicates the version number of a packet. The V element can indicate the version of ALC/LCT. The V element can indicate that packets conforming to ALC/LCT+ are transmitted through the corresponding object.

The C element corresponds to a congestion control flag. The C element indicates the length of a congestion control information (CCI) element. For example, the C element can indicate a CCI length of 32 bits when the value thereof is 0, a CCI length of 64 bits when the value thereof is 1, a CCI length of 96 bits when the value thereof is 2, and a CCI length of 128 bits when the value thereof is 3.

The PSI element may correspond to protocol-specific indication (PSI). The PSI element can be used as an indicator of a specific purpose for an upper protocol of ALC/LCT+. The PSI element can indicate whether the current packet corresponds to a source packet or an FEC repair packet.

The X element may correspond to information indicating a source packet. When different FEC payload ID formats are respectively used for source data and repair data, the X element indicates the FEC payload ID format for the source data when the value thereof is 1 and indicates the FEC payload ID format for the repair data when the value thereof is 0. When the X element is set to 0 in the transmitter, the receiver may ignore this element or packet and may not process the same.

The S element may correspond to a transport session identifier flag. The S element indicates the length of the transport session identifier element The O element may correspond to a transport object identifier flag. The O element indicates the length of the transport object identifier element. An object refers to one field and the aforementioned TOI is identification information of each object. A file corresponding to a TOI of 0 can include signaling information associated therewith.

The H element may correspond to a half-word flag. The H element indicates whether to add a half-word (16 bits) to the TSI and TOI fields.

The A element may correspond to a close session flag. The A element indicates that a session is closed or closure of the session is imminent.

The B element may correspond to a close object flag. The B element indicates that an object is closed or closure of the object is imminent.

The HDR_LEN element indicates the length of a header of a packet.

The Codepoint element indicates the type of a payload transmitted by the packet. An additional payload header can be inserted into a prefix of payload data according to payload type.

The congestion control information (CCI) element may include congestion control information such as layer numbers, logical channel numbers and sequence numbers. The CCI element may include necessary congestion control related information.

The transport session identifier (TSI) element is a unique identifier of a session. The TSI element indicates one of all sessions from a specific sender. The TSI element identifies a transport session. The value of the TSI element can be used for one track.

The transport object identifier (TOI) element is a unique identifier of an object. The TOI element indicates an object to which the corresponding packet belongs in a session. The value of the TOI element can be used for one piece of ISO BMFF object data. The TOI element can include the ID of an ISO BMFF file and the ID of a chunk. The TOI element can have a combination of the ISO BMFF file ID and the chunk ID as a value thereof.

The Type element identifies the type of data transmitted through the corresponding object. For example, the Type element can indicate that the data transmitted through the corresponding object is a signaling message.

The Version element identifies the version of the data transmitted through the corresponding object. For example, the Version element can include information indicating whether the structure and/or contents of the data identified through the Type object have been changed.

The Header Extensions element may include additional header information.

The FEC payload ID element is an FEC payload identifier. The FEC payload ID element includes identification information of a transmission block or an encoding symbol. The FEC Payload ID indicates an identifier when the file has been FEC-encoded. For example, when the FLUTE protocol file has been FEC encoded, the FEC Payload ID can be allocated by a broadcaster or a broadcast server to identify the same.

The Encoding Symbols element may include data of the transmission block or encoding symbol.

FIG. 94 illustrates TOI configuration description (TCD) according to an embodiment of the present invention.

As described above, part of the TOI field can be used for description of variable-length signaling message related information. For description of signaling message related information in the variable-length TOI field, TOI field configuration information may be separately transmitted. In an embodiment, the TOI configuration description as shown in the table can be transmitted and/or received to provide TOI field configuration information. In the present embodiment, the TCD provides TOI field configuration information of transport packets corresponding to one transport session. The TCD can be transmitted through internal means and/or external means of a signaling transport session. When the TCD is transmitted through the internal means, the TCD can be identified with a unique TOI value, e.g. 0 or 0xFFFF and interpreted prior to other signaling messages transmitted along therewith. When the TCD is transmitted through the external means, the TCD is transmitted through an FIC, separate IP datagram or a different ROUTE session prior to objects delivered in the corresponding session such that the receiver can previously recognize TOI field configuration information included in each packet. @typeBits and following fields respectively indicate the lengths of fields in TOI and represent that field information corresponding to the respective lengths is described in the order of bits from the TOI start bit.

The TCD according to an embodiment of the present invention can include @protocolVersion, @dataVersion, @validFrom, @expiration, @typeBits, @versionBits, @instanceIdBits, @validFromBits, @expirationBits and/or @payloadFormatBits information.

The @protocolVersion identifies the version of the TCD. The @protocolVersion information indicates a variation in the protocol or structure of the TCD if the variation is present.

The @dataVersion information identifies the version of an instance of the TCD. The @dataVersion indicates variation in the contents of the TCD if the contents of the TCD are changed.

The @validFrom information indicates the time from which instances of the TCD are available. The receiver can recognize the time from which the TCD is available using the @validFrom information and use information of the TCD from the corresponding time.

The @expiration information indicates the time at which availability of the instances of the TCD expires. The receiver can recognize the time at which availability of the TCD expires and terminate use of information of the TCD using the @expiration information. The receiver can manage TCD information using the @expiration information.

The @typeBits information indicates the length of the type field in the TOI field. The @typeBits information can represent the length of the type field in bits.

The @versionBits information indicates the length of the version field in the TOI field. The @versionBits information can represent the length of the version field in bits.

The @instanceIdBits information indicates the length of the instanceID field in the TOI field in bits.

The @validFromBits information indicates the length of the validFrom field in the TOI field in bits.

The @expirationBits information indicates the length of the expiration field in the TOI field in bits.

The @payloadFormatBits information indicates the length of the payloadFormat field in the TOI field in bits.

FIG. 95 illustrates a payload format element of a transport packet according to an embodiment of the present invention.

According to an embodiment of the present invention, a signaling message can be transmitted through a payload of a transport packet. To this end, the transport packet may include the payload format element shown in the figure. The transport packet corresponds to a packet carrying objects including broadcast data. The name of the transport packet according to the present invention may depend on the protocol by which the packet is processed. For example, when the packet is processed through ROUTE, the packet can be called a ROUTE packet.

The payload format element can be included in LSID as described above.

The payload format element of the transport packet according to the present invention can include @codePoint, @deliveryObjectFormat, @fragmentation, @deliveryOrder, @sourceFecPayloadID and/or TCID (TOI Configuration Instance Description) information.

The @codePoint information defines what code point is used for the corresponding payload. This information may play the same role as the aforementioned CP element or may have the same value as the CP element.

The @deliveryObjectFormat information specifies the payload format of an object for data delivery. For example, this information can indicate that the object carries a signaling message, a file, an entity, a package or metadata including an initialization segment.

The @fragmentation information specifies the type of fragmentation.

The @deliveryOrder information specifies the order of delivery of objects. For example, this information can be used to specify the order of objects transmitted through the current payload.

The @sourceFecPayloadID information defines the format of the Source FEC Payload ID.

When part of the TCID is used for description of variable-length signaling message related information, the TCID can include TOI field configuration information.

FIG. 96 illustrates TOI configuration instance description (TCID) according to an embodiment of the present invention.

Part of the TOI field is used for description of variable-length signaling message related information and a TOI field configuration can be dynamically changed in one transport session.

For description of signaling message related information in the variable-length TOI field, TPO field configuration information can be separately transmitted. Such TOI field configuration information may be transmitted in the illustrated format.

In the present embodiment, the TCID provides TOI field configuration information of transport packets corresponding to a group of packets mapped to one code point value. The TCID can be included in PayloadFormat in SourceFlow of the LSID. Internal fields of the TCID may correspond to those of the aforementioned TCD and indicate a TOI configuration of packets having the same CP value as @codePoint included along with the TCID in PayloadFormat. A method of configuring the TOI may correspond to the aforementioned TCD configuration method.

The TCID according to an embodiment of the present invention can include @typeBits, @versionBits, @instanceIdBits, @validFromBits, @expirationBits and/or @payloadFormatBits information. For description of such information, refer to description of the aforementioned information having the same names FIG. 97 illustrates a syntax of a fast information channel (FIC) payload according to an embodiment of the present invention.

While signaling data including information for service scan or acquisition is referred to as FIC in the present invention, the name of the signaling data is not limited thereto. A description will be given of signaling data providing information for acquiring broadcast services more effectively at a lower layer of the service layer (or level). For example, such signaling data can be called a service list table or a service list element.

While the signaling data structure is shown in the form of a binary table for convenience of description in the present invention, identical or similar information belonging to the table may be implemented in XML.

FIC according to an embodiment of the present invention can include FIC_protocol_version information, transport_s- tream_id information, num_partitions information, partition_id information, partition_protocol_version information, num_services information, service_id information, service_data_version information, service_channel_number information, service_category information, short_service_name_length information, short_service_name information, service_status information, service_distribution information, sp_indicator information, IP_version_flag information, SSC_source_IP_address_flag information, SSC_source_IP_address information, SSC_destination_IP_address information, SSC_destination_UDP_port information, SSC_TSI information, SSC_DP_ID information, num_partition_level_descriptors information, a partition_level_descriptor( ) element, num_FIC_level_descriptors information and/or an FIC_level_descriptor( ) element.

The FIC_protocol_version information specifies the version of the structure of the FIC.

The transport_stream_id information specifies a broadcast stream. This information may correspond to information specifying a whole broadcast stream.

The num_partitions information indicates the number of partitions in a broadcast stream. A single broadcast stream can be divided into one or more partitions and each partition can include one or more data pipes used by a single broadcaster (or broadcast source).

The partition_id information specifies a partition.

The partition_protocol_version information specifies the version of the structure of a partition.

The num_services information indicates the number of broadcast services one or more components of which are transmitted through the partition.

The service_id information specifies a service (or broadcast service).

The service_data_version information specifies a variation in a service entry for a service signaled by the FIC when the variation is present. In addition, the service_data_version information specifies a variation in a signaling table for services, included in a service signaling channel (or service level signaling) when the variation is present. The value of the service_data_version information can be increased whenever the variation is present to indicate the variation.

The service_channel_number information indicates the channel number for a service.

The service_category information indicates the category of a service. For example, the service_category information can indicate that a broadcast service is an A/V service, an audio service, an ESG (Electronic Service Guide), an App based service and/or CoD (Content on Demand)

The short_service_name_length information indicates the length of the short_service_name information. The short_service_name_length may have a value of 0 when the short_service_name information is not present.

The short_service_name information indicates the short name of a service. Each character indicated by the short_service_name information can be encoded per UTF-8. When there is an odd number of bytes in the short name, the second byte of the last of the byte pair per pair count indicated by the short_service_name_length field can contain 0x00.

The service_status information indicates the status of a service. The service_status information can indicate that the broadcast service is active, inactive, suspended, hidden and/or shown.

The service_distribution information specifies whether representation of broadcast services or broadcast content is possible only with the current partition, the current partition is necessary for the representation although the representation is impossible only with the current partition, other partitions are necessary for the representation, or other broadcast streams are necessary for the representation.

The sp_indicator information indicates application of service protection. The sp_indicator information specifies whether one or more components of a broadcast service, which are necessary for significant representation, are protected.

The IP_version_flag information specifies whether the IP address indicated by the SSC_source_IP_address information and/or the SSC_destination_IP_address is an IPv4 address or an IPv6 address.

The SSC_source_IP_address_flag information specifies presence of the SSC_source_IP_address information for services.

The SSC_source_IP_address information is present when the value of the SSC_source_IP_address_flag information is set to 1 and not present when the value of the SSC_source_IP_address_flag information is set to 0. The SSC_source_IP_address information indicates the source IP address of an IP datagram (or data unit) carrying signaling information for a service. The SSC_source_IP_address information can be 128 bits when an IPv6 address is used.

The SSC_destination_IP_address information indicates the destination IP address of the IP datagram (or data unit) carrying the signaling information for the service. The SSC_destination_IP_address information can be 128 bits when an IPv6 address s is used.

The SSC_destination_UDP_port information indicates the destination UDP port number for UDP/IP streams carrying the signaling information for the service.

The SSC_TSI information indicates a transport session identifier (TSI) of an LCT channel through which signaling information (or signaling table) for a service is transmitted.

The SSC_DP_ID information specifies a data pipe including signaling information (or a signaling table) for a service. The data pipe through which the signaling information is transmitted may correspond to the most robust data pipe in the current partition or broadcast stream.

The num_partition_level_descriptors information indicates the number of partition level descriptors defined for partitions.

The partition_level_descriptor( ) element includes one or more partition level descriptors. A partition level descriptor may include information necessary for the receiver to access, acquire or use partitions.

The num_FIC_level_descriptors information indicates the number of FIC level descriptors defined for the FIC.

The FIC_level_descriptor( ) element includes one or more FIC level descriptors. An FIC level descriptor can include additional signaling information for the FIC.

FIG. 98 illustrates a syntax of a payload of the FIC according to another embodiment of the present invention.

The payload of the FIC according to another embodiment of the present invention may additionally include SSC_delivery_type, SSC_URL_length and/or SSC_URL_data information in addition to the FIC payload in the aforementioned embodiment.

The SSC_delivery_type information specifies a path through which signaling information (e.g. service signaling channel or service level signaling) associated with a service is delivered. The SSC_delivery_type information can specify whether service level signaling data is transmitted through a broadband network (Internet). For example, the SSC_delivery_type information can indicate that service level signaling is transmitted through a broadcast network when the value thereof is 0x01. The SSC_delivery_type information can indicate that service level signaling is transmitted through the Internet when the value thereof is 0x02.

The SSC_URL_length information indicates the length of the SSC_URL_data information.

The SSC_URL_data information indicates the URL of a service or location providing signaling information associated with a service.

For description of information which is not described in the present embodiment, refer to the aforementioned corresponding description.

FIG. 99 illustrates a syntax of service level signaling according to another embodiment of the present invention.

Information necessary for the receiver to receive a broadcast service and/or broadcast content that a viewer desires may be referred to as service level signaling. The service level signaling includes information describing attributes of broadcast services and components included in broadcast services.

Service level signaling data according to another embodiment of the present invention may include a signaling message header and/or a service signaling message.

The service level signaling data according to another embodiment of the present invention can include @service_id information, @service_category information, @service_name information, @channel_number information, @service_status information, @service_distribution information, @SP_indicator information, a ROUTE Session element, @sourceIPAddr information, @destIPAddr information, @destUDPPort information, @LSID_DP information, a Targeting element, a Content Advisory element, a Right Issuer Service element, a Current Program element, an Original Service Identification element, a Content Labeling element, a Genre element, a Caption element and/or a Protection element.

The @service_id information specifies a broadcast service.

The @service_category information specifies the category of the broadcast service. For example, the @ service_category information can specify whether the broadcast service is an audio service, a real-time broadcast service, a non-real time broadcast service, a linear broadcast service, an app-based broadcast service or a service guide.

The @service_name information indicates the name of the broadcast service.

The @channel_number information indicates the channel number corresponding to the channel through which the broadcast service is transmitted. This channel number may correspond to a logical/physical channel number. This channel number may be used as information specifying a logical path or a transport unit through which service level signaling data is transmitted as necessary.

The @service_status information indicates the status of the broadcast service. The @service_status information may include information specifying whether the broadcast service is active or inactive. The @service_status information may include information specifying whether the broadcast service is hidden.

The @service_distribution information indicates how data or components for the broadcast service are distributed and transmitted.

The @SP_indicator information specifies whether service protection has been applied to the broadcast service or at least one component included in the broadcast service. The @SP_indicator information may correspond to information specifying whether service protection has been applied to data units or components for meaningful representation of the broadcast service.

The ROUTE Session element includes information about a ROUTE session through which the broadcast service or components included in the broadcast service are transmitted.

The @sourceIPAddr information indicates the source IP address of IP datagrams (or data units) carrying a ROUTE packet.

The @destIPAddr information indicates the destination IP address of the IP datagrams (or data units) carrying the ROUTE packet.

The @destUDPPort information indicates the destination port number of the IP datagrams (or data units) carrying the ROUTE packet.

The @LSID_DP information specifies a data pipe through which information (e.g. LSID) that describes transport parameters associated with the ROUTE session and/or lower sessions of the ROUTE session is delivered.

The Targeting element includes information for providing personalized broadcast services (targeted broadcast). This element can be included in service level signaling as a separate signaling structure. In this case, this element can include link information about the service level signaling.

The Content Advisory element includes information about rating of the broadcast service. This element can be included in service level signaling as a separate signaling structure. In this case, this element can include link information about the service level signaling. The Right Issuer Service element includes information related to the right to appropriately consume the broadcast service. This element can be included in service level signaling as a separate signaling structure. In this case, this element can include link information about the service level signaling.

The Current Program element includes information about the current broadcast program. This element can be included in service level signaling as a separate signaling structure. In this case, this element can include link information about the service level signaling.

The Original Service Identification element includes information for specifying the original service associated with the current broadcast service. This element can be included in service level signaling as a separate signaling structure. In this case, this element can include link information about the service level signaling.

The Content Labeling element includes information about content labeling. This element can be included in service level signaling as a separate signaling structure. In this case, this element can include link information about the service level signaling. The Genre element includes information for classifying the genre of the broadcast service. This element can be included in service level signaling as a separate signaling structure. In this case, this element can include link information about the service level signaling.

The Caption element includes information about the closed caption/subtitle of the broadcast service. This element can be included in service level signaling as a separate signaling structure. In this case, this element can include link information about the service level signaling.

The Protection element includes information about protection for the broadcast service. When the aforementioned @SP_indicator information specifies that protection has been applied to the broadcast service or broadcast components, the Protection element can provide detailed information about the protection. This element can be included in service level signaling as a separate signaling structure. In this case, this element can include link information about the service level signaling.

FIG. 100 illustrates component mapping description according to another embodiment of the present invention.

The component mapping description according to another embodiment of the present invention may further include @partitionID information in addition to the information or elements included in the component mapping description according to the aforementioned embodiment.

The @partitionID information specifies a partition indicating a broadcast station in a broadcast stream. The @partitionID information can be used as information that specifies the transmission source of broadcast components.

Description of other information or elements included in the component mapping description is replaced with the aforementioned description of information or elements in the same names FIG. 101 illustrates a syntax of URL signaling description according to another embodiment of the present invention.

As described above, signaling information that describes a broadcast service can be transmitted through a broadband network as well as a broadcast network. When the signaling information that describes a broadcast service is transmitted through the broadband network, the receiver can acquire the signaling information through the URL signaling description.

The URL signaling description according to another embodiment of the present invention can include @service_id, @smtURL, @mpdURL, @cmtURL, @astURL, @gatURL and/or @eatURL information.

The @service_id information specifies a service.

The @smtURL information indicates the URL of a server or location providing a service map table (SMT) when the SMT is transmitted through the broadband network.

The @mpdURL information indicates the URL of a server or location providing an MPD when the MPD is transmitted through the broadband network.

The @cmtURL information indicates the URL of a server or location providing a component mapping table (CMT) when the CMT is transmitted through the broadband network.

The @astURL information indicates the URL of a server or location providing an application signaling table (AST) when the AST is transmitted through the broadband network.

The @gatURL information indicates the URL of a server or location providing a guide access table (GAT) when the GAT is transmitted through the broadband network. The GAT corresponds to a signaling message including information for bootstrapping of an electronic service guide (ESG). That is, the GAT can correspond to a signaling message including information necessary for the receiver to access the ESG.

The @eatURL information indicates the URL of a server or location providing an emergency alert table (EAT) when the EAT is transmitted through the broadband network. The EAT corresponds to a signaling message including emergency alert related information and an emergency alert message.

FIG. 102 illustrates a SourceFlow element according to another embodiment of the present invention.

Broadcast service data can be transmitted per object through a ROUTE session. Objects can be individually recovered. A source protocol can be defined to transmit objects within one session, and the SourceFlow element including information related to source (object) delivery can be defined in the source protocol.

The SourceFlow element according to another embodiment of the present invention can further include @location information in addition to the information/attributes/elements included in the aforementioned SourceFlow element.

The @location information indicates a location or a data unit carrying source flow data. The @location information specifies a data pipe in a broadcast stream. The receiver can recognize that the source flow data is transmitted through the data pipe.

Description of other information/attributes/elements included in the SourceFlow element is replaced by description of the aforementioned SourceFlow element.

Figure 103:
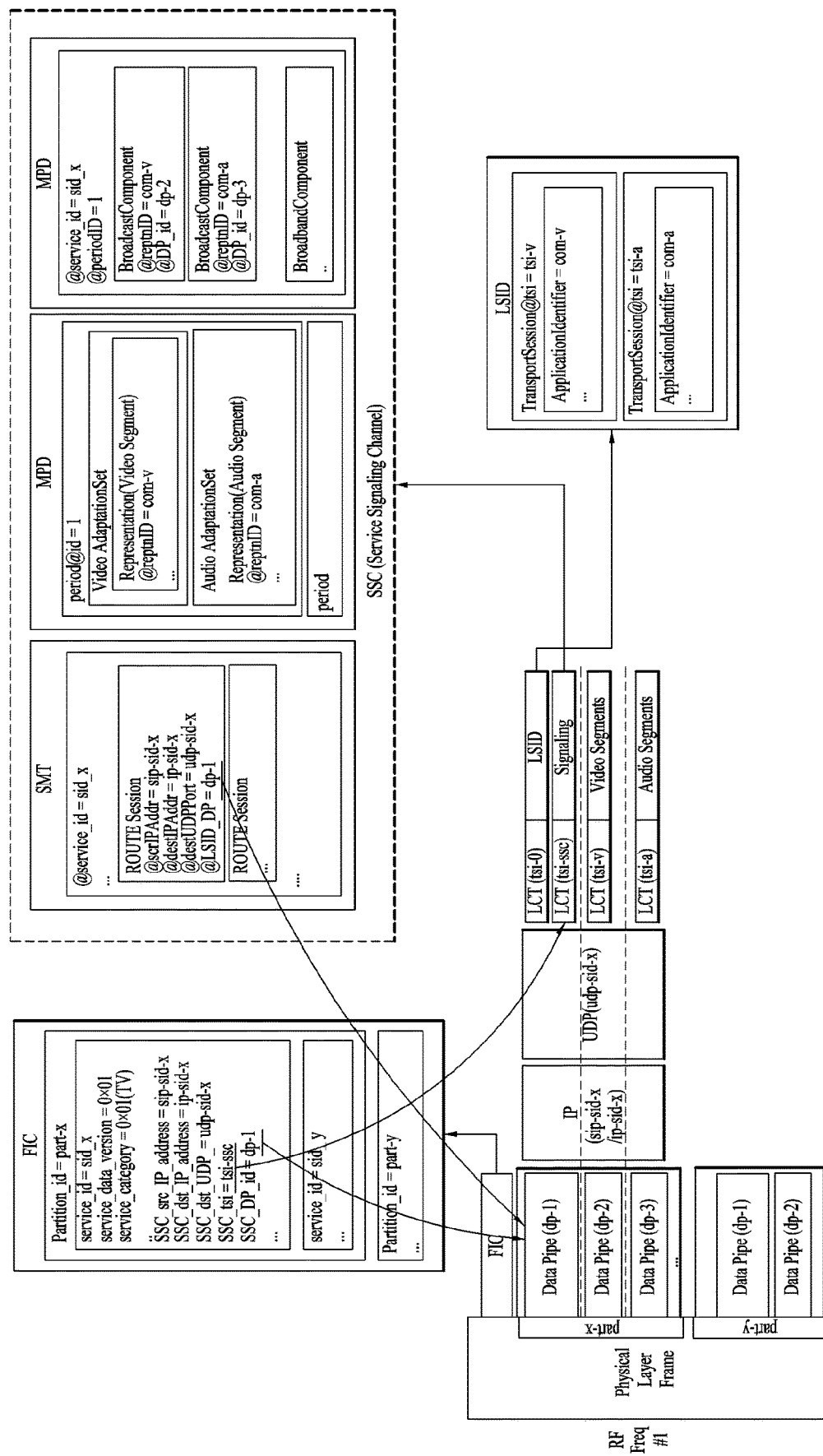
FIG. 103 illustrates a process of acquiring signaling information through a broadcast network according to another embodiment of the present invention.

FIG. 103 illustrates a process of acquiring signaling information through a broadcast network according to another embodiment of the present invention.

The receiver can access a location carrying data of a service signaling channel associated with a desired broadcast service using information that specifies services included in an FIC.

The receiver acquires information about the source IP address, destination IP address and/or UDP port number of IP datagrams carrying the data of the service signaling channel, in the FIC.

The receiver acquires information that specifies a data pipe including the data of the service signaling channel, in the FIC. The receiver can access the data pipe carrying the data of the service signaling channel through the acquired information.

The receiver can access an LCT session through which the data of the service signaling channel is transmitted using information that specifies the LCT session, which is included in the FIC. The LCT session through which the data of the service signaling channel is transmitted may be fixed to an LCT session having a specific TSI. In this case, the receiver can access the LCT session having the specific TSI in order to acquire the data of the service signaling channel without additional information. The receiver can access the corresponding location to acquire the data of the service signaling channel The receiver may access an LCT session through which the aforementioned LSID is transmitted. In this case, the TSI of the LCT session may be fixed, and the receiver can access the LCT session having the TSI to acquire the LSID. The receiver can acquire components included in the broadcast service using information of the LSID.

Figure 104:
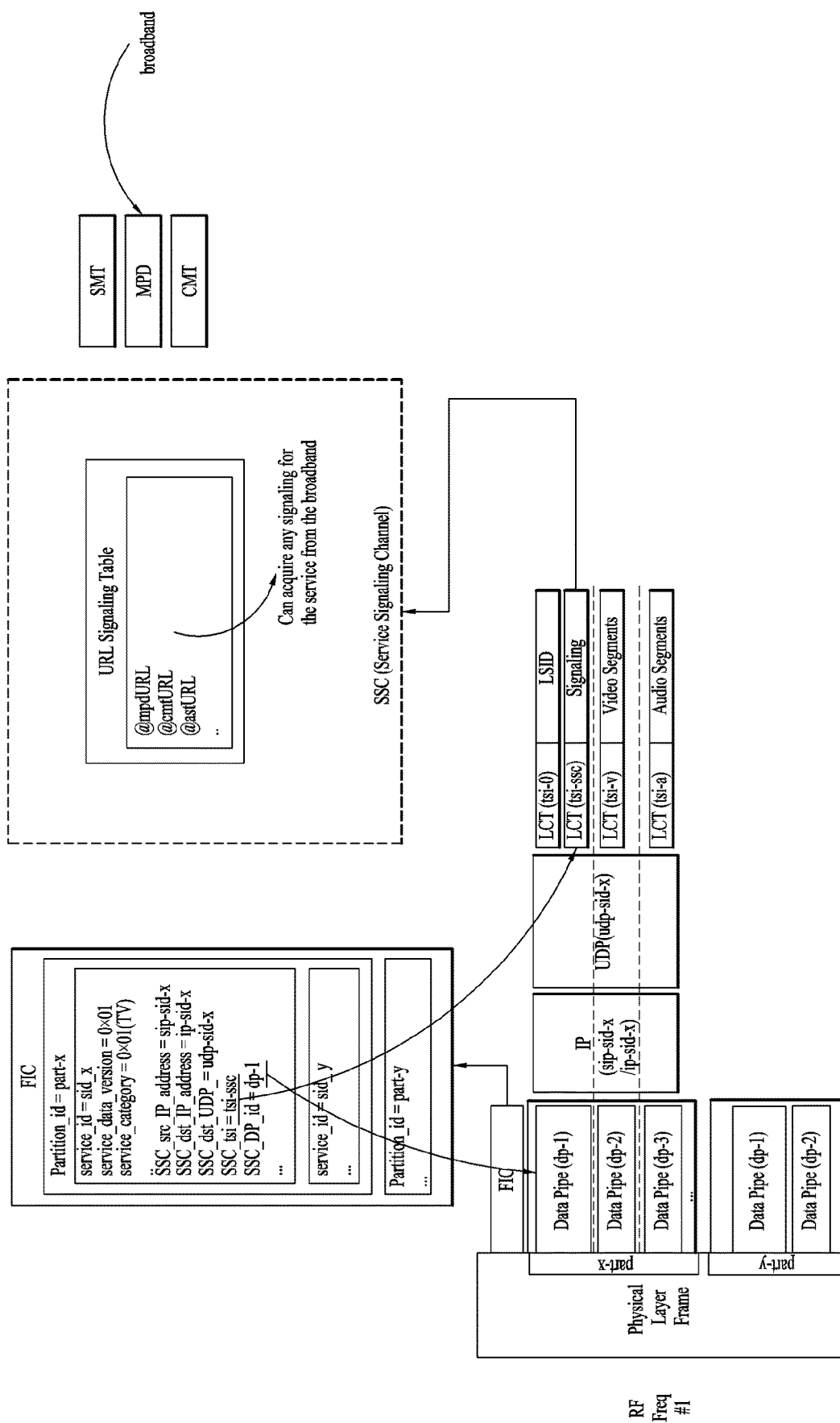
FIG. 104 illustrates a process of acquiring signaling information through a broadcast network and a broadband network according to another embodiment of the present invention.

FIG. 104 illustrates a process of acquiring signaling information through a broadcast network and a broadband network according to another embodiment of the present invention.

The receiver can access a location carrying data of a service signaling channel associated with a desired broadcast service using information that specifies services included in an FIC.

The receiver acquires information about the source IP address, destination IP address and/or UDP port number of IP datagrams carrying the data of the service signaling channel, in the FIC.

The receiver acquires information that specifies a data pipe including the data of the service signaling channel, in the FIC. The receiver can access the data pipe carrying the data of the service signaling channel through the acquired information.

The receiver accesses the data of the service signaling channel to acquire the aforementioned URL signaling table or URL signaling description. The receiver can access a server or location providing service level signaling using information included in the URL signaling table to acquire the service level signaling through the broadband network.

Figure 105:
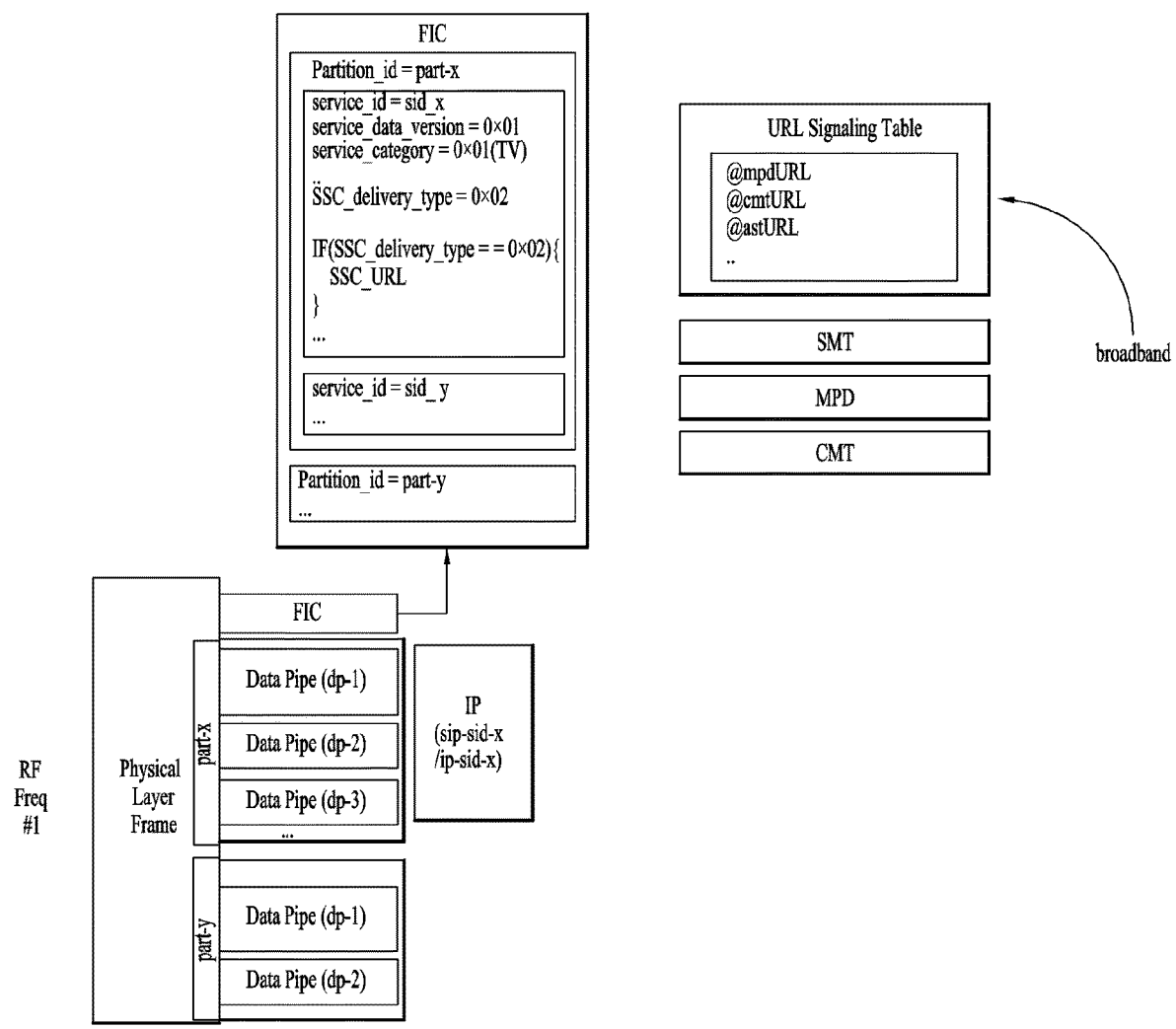
FIG. 105 illustrates a process of acquiring signaling information through a broadband network according to another embodiment of the present invention.

FIG. 105 illustrates a process of acquiring signaling information through a broadband network according to another embodiment of the present invention.

When information specifying the transport type of a service signaling channel, included in an FIC, indicates that data of the service signaling channel is transmitted through the broadband network, the receiver acquires URL information about a service or location providing the data of the service signaling channel in the FIC. In this case, the URL information can indicate the URL of a single server or location providing the whole data of the service signaling channel or URLs of servers or locations respectively providing signaling structures (SMT, MPD, CMT, etc.) that can be included in the service signaling channel.

The receiver accesses the server or location indicated by the URL information to acquire the data of the service signaling channel through the broadband network.

Figure 106:
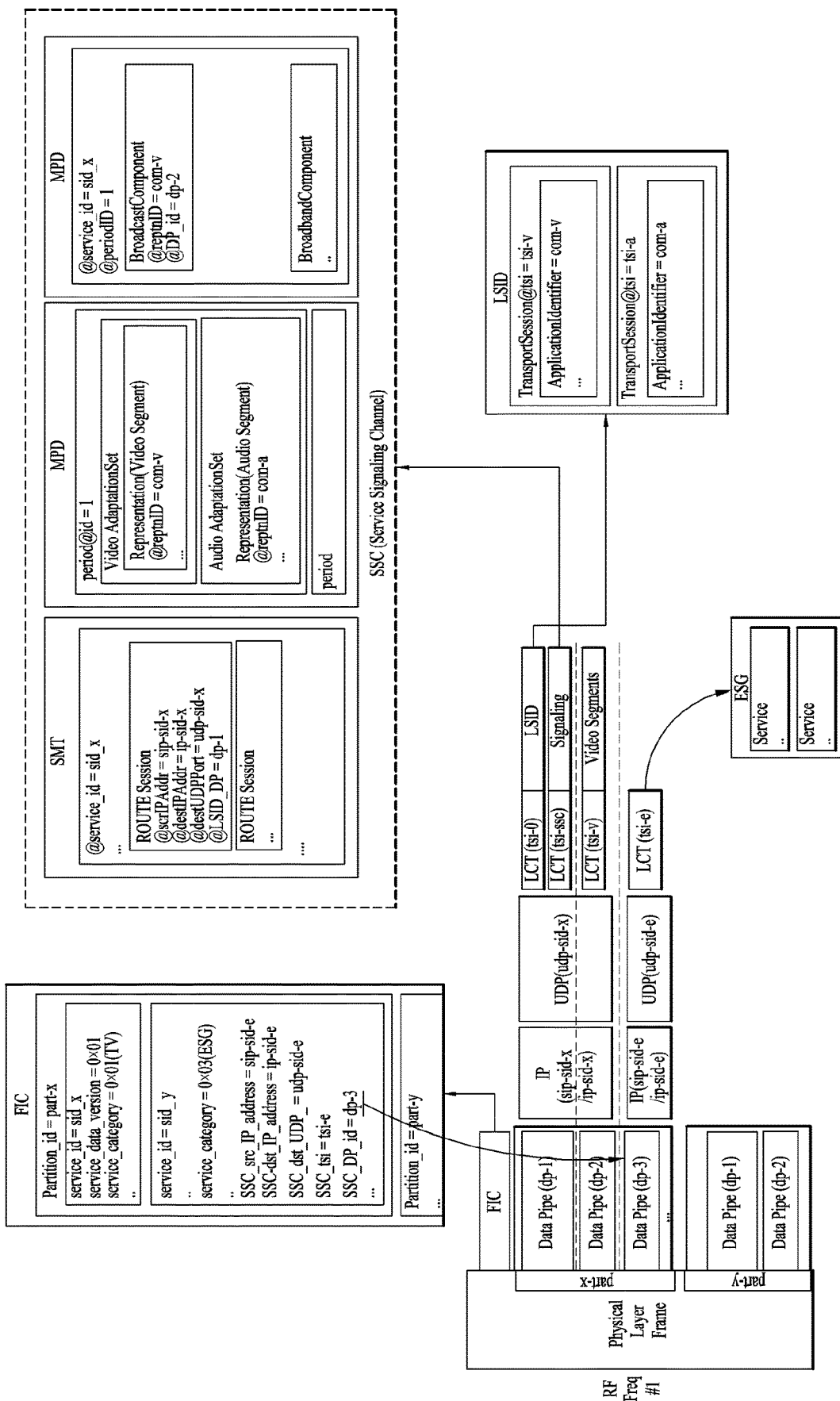
FIG. 106 illustrates a process of acquiring an electronic service guide (ESG) through a broadcast network according to another embodiment of the present invention.

FIG. 106 illustrates a process of acquiring an electronic service guide (ESG) through a broadcast network according to another embodiment of the present invention.

The receiver can recognize that a broadcast service corresponds to an ESG from information specifying the category of the service, which is included in an FIC, and acquire information specifying a data pipe through which data of a service signaling channel with respect to the corresponding service is transmitted.

The receiver can access the specified data pipe to acquire data of the ESG, transmitted through the data pipe.

While the ESG is regarded as a broadcast service, the ESG can be efficiently acquired through the aforementioned process since the complicated signaling structure to access general broadcast services need not be interpreted.

Figure 107:
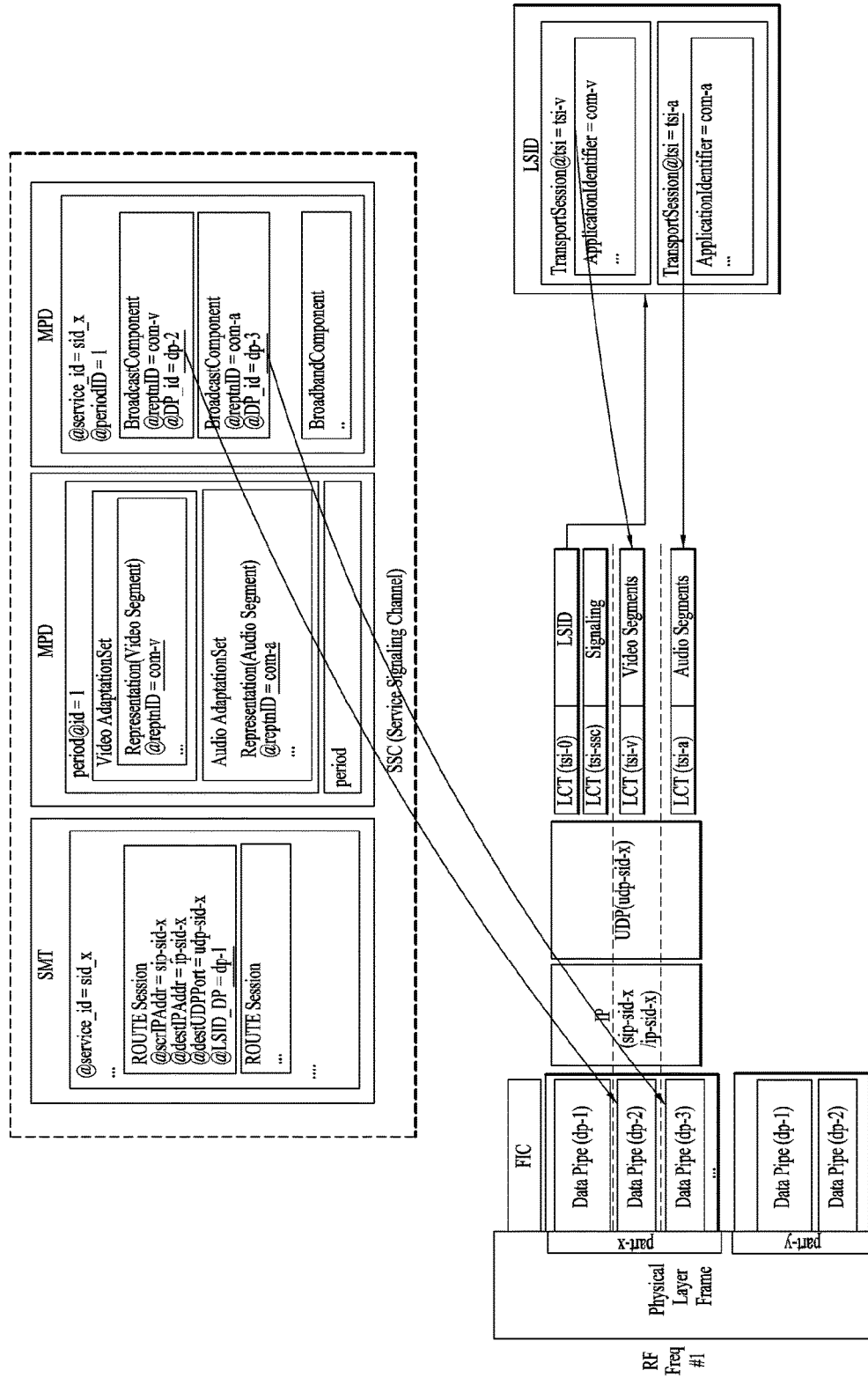
FIG. 107 illustrates a process of acquiring video segments and audio segments of broadcast services through a broadcast network according to another embodiment of the present invention.

FIG. 107 illustrates a process of acquiring video segments and audio segments of a broadcast service through a broadcast network according to another embodiment of the present invention.

The receiver acquires data of a service signaling channel and obtains a signaling structure (e.g. CMT) including information that describes components of the broadcast service, which is included in the data of the service signaling channel.

The receiver acquires information specifying a data pipe through which a video component of the broadcast service is transmitted in the signaling structure and accesses the data pipe using the acquired information. The receiver acquires a signaling structure (e.g. LSID) that describes an LCT session in a ROUTE session through which the data pipe is transmitted.

The receiver accesses the LCT session through which the video component of the broadcast service is transmitted to acquire the video component from the signaling structure that describes the LCT session.

The receiver acquires information specifying a data pipe through which an audio component of the broadcast service is transmitted and accesses the data pipe using the acquired information. The receiver acquires a signaling structure (e.g. LSID) that describes an LCT session in a ROUTE session through which the data pipe is transmitted.

The receiver accesses the LCT session through which the audio component of the broadcast service is transmitted to acquire the audio component from the signaling structure that describes the LCT session.

According to the present invention, it is possible to efficiently acquire components included in the broadcast service through the aforementioned signaling structure even when the components are transmitted through respective transport paths. In addition, the transmitter can freely transmit components of broadcast services through a region having a margin and thus can efficiently transmit a larger amount of broadcast data.

Figure 108:
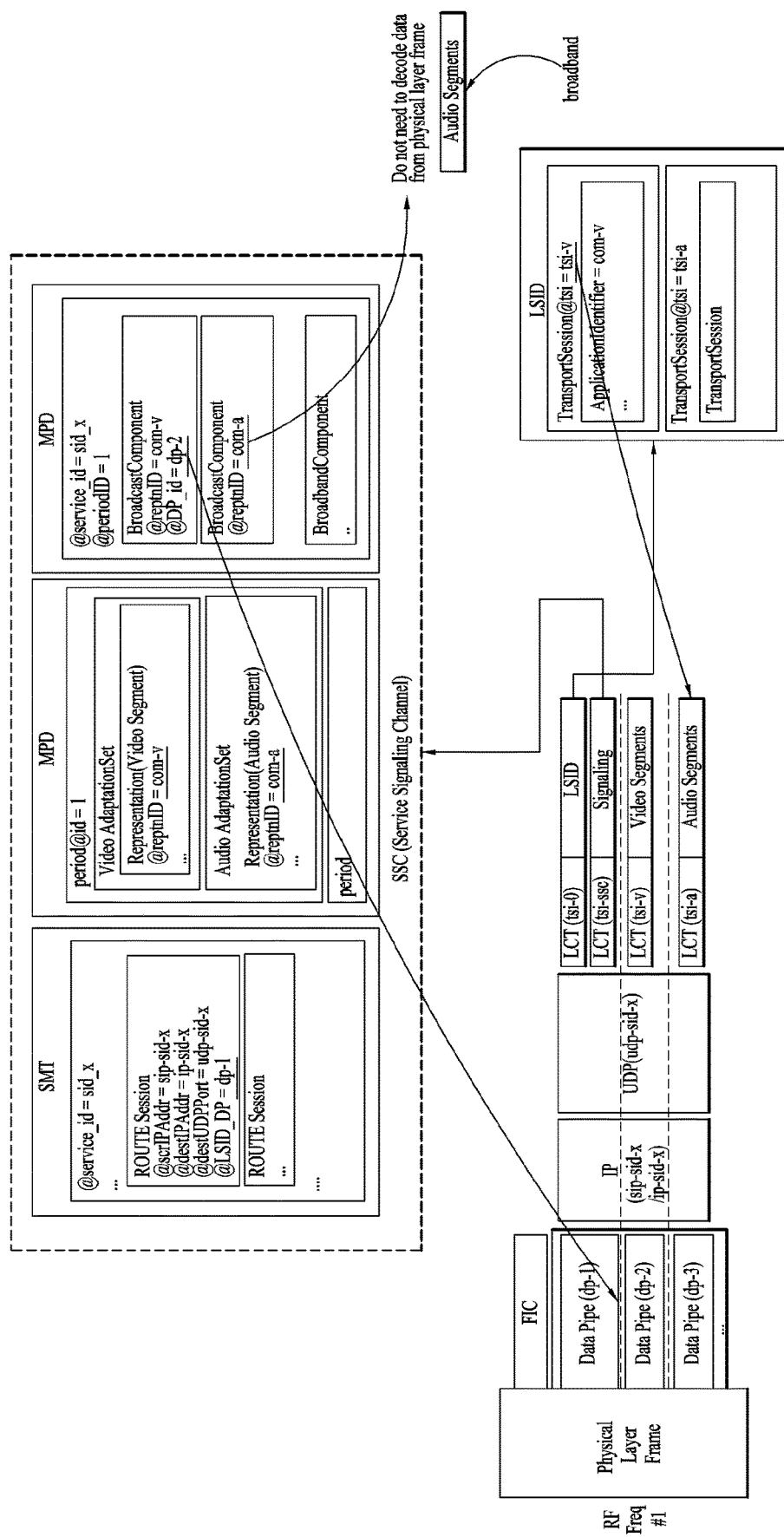
FIG. 108 illustrates a process of acquiring video segments through a broadcast network and acquiring audio segments through a broadband network according to another embodiment of the present invention.

FIG. 108 illustrates a process of acquiring video segments of a broadcast service through a broadcast network and acquiring audio segments of the broadcast service through a broadband network according to another embodiment of the present invention.

The receiver acquires data of a service signaling channel and obtains a signaling structure (e.g. CMT) including information that describes components of the broadcast service, which is included in the data of the service signaling channel.

The receiver acquires information specifying a data pipe through which a video component of the broadcast service is transmitted in the signaling structure and accesses the data pipe using the acquired information. The receiver acquires a signaling structure (e.g. LSID) that describes an LCT session in a ROUTE session through which the data pipe is transmitted.

The receiver accesses the LCT session through which the video component of the broadcast service is transmitted to acquire the video component from the signaling structure that describes the LCT session.

The receiver recognizes that an audio component is transmitted through the broadband network from the signaling structure including the information that describes the components of the broadcast service and acquires the address of a server or location carrying the audio component. Alternatively, the receiver acquires the address providing segments of the audio component using MPD and obtains the segments of the audio component from the address.

According to the present invention, even when components belonging to one broadcast service are respectively transmitted through heterogeneous networks, it is possible to efficiently access the components of the broadcast service through the aforementioned signaling structure.

FIG. 109 is a diagram showing the syntax of a payload of an FIC according to another embodiment of the present invention.

An object of the FIC described in the present invention is to provide information necessary for a receiver to rapidly acquire a service (a broadcast service, a broadband service, etc.). Accordingly, the FIC provides bootstrapping information for accessing service level signaling (service layer signaling). The receiver may receive the FIC at a lower layer of a service layer and rapidly acquire service level signaling, which is signaling information of the service layer, using information included in the FIC. The receiver may rapidly access the service using description information of a service included in the service level signaling.

Meanwhile, in another embodiment of the present invention, the FIC may provide information on a service and components (e.g., video, audio, etc.) configuring the service. In this case, when the receiver receives the FIC, the receiver may immediately access and reproduce the components of the service using information on the service included in the FIC or the components of the service, without accessing service level signaling. For example, an emergency alert service requiring rapid access, an electronic program guide (EPG) service, etc. may provide information necessary to acquire data configuring the service in the FIC. In this case, the receiver may omit a process of accessing the service level signaling and immediately access the service using the FIC.

The payload of the FIC according to another embodiment of the present invention may include FIC_protocol_version information, transport_stream_id information, num_partitions information, partition_id information, partition_protocol_version information, num_services information, service_id information, service_data_version information, service_channel_number information, service_category information, short_service_name_length information, short_ service_name information, service_status information, service_distribution information, sp_indicator information, IP_version_flag information, source_IP_address_flag information, bootstrap_mode information, source_IP_address information, destination_IP_address information, destination_UDP_port information, SSC_tsi information, SSC_dp_id information, num_component information, component_id information, component_tsi information, component_dp_id information, num_component_descriptor information, a component_level_descriptor( ) element, num_partition_level_descriptors information, a partition_level_descriptor( ) element, num_FIC_level_descriptors information and/or an FIC_level_descriptor element.

The bootstrap_mode information may indicate the bootstrap mode of broadcast service component data. For example, if the value of the bootstrap_mode information is 0x00, this may indicate that the field for this information is reserved for future use. If the value of the bootstrap_mode information is 0x01 or 0x03 to 0x07, this may indicate that a signaling system for a normal bootstrap mode (bootstrap is performed using the corresponding information after receiving service signaling) is provided in the broadcast system. That is, the normal bootstrap mode may refer to a mode for providing a signaling system such that a receiver performs a process of accessing service level signaling using information on an FIC and acquiring data and information necessary for a service using information included in the service level signaling. If the value of the bootstrap_mode information is 0x02, this may indicate that a signaling system for a fast bootstrap mode (fast bootstrap is performed using only signaling information received in the FIC) is provided in a broadcast system. That is, the fast bootstrap mode refers to a mode for providing a signaling system such that a receiver immediately acquires a service and components included in the service using information included in the FIC.

The bootstrap_mode information may identify a bootstrap mode indicating a signaling structure used to acquire one or more components included in a broadcast service. In one embodiment, the bootstrap_mode information identifies whether the bootstrap mode corresponds to a first bootstrap mode or a second bootstrap mode, the first bootstrap mode may correspond to a mode for identifying a transmission location of service level signaling (or first level signaling data) using information included in the FIC (or second level signaling data), acquiring service level signaling at the location, and acquiring one or more components using information included in the service level signaling, and the second bootstrap mode may correspond to a mode for acquiring one or more components using information included in the FIC.

If the bootstrap_mode information identifies that the bootstrap mode corresponds to the first bootstrap mode, the FIC may further include service identification information for uniquely identifying a broadcast service, num_component information indicating the number of components included in the broadcast service identified by the service identification information, component identification information for uniquely identifying a component included in the broadcast service, component transport session identification information for identifying a transport session for transmitting packets including data of the component identified by the component identification information, component data pipe identification information for identifying a data pipe of a physical layer for transmitting packets including the data of the component and/or a transport parameter descriptor including a transport protocol parameter of the packets including the data of the component. The transport parameter descriptor will be described below.

The num_component information may indicate the number of components included in the service.

The component_id information identifies a component. The component_id information may correspond to an identifier for uniquely identifying the component.

The component_tsi information identifies a transport session for transmitting a packet including the data of the component. The component_tsi information may indicate a packet id (identifier) indicating the flow of the corresponding packet.

The component_dp_id information identifies a data pipe of a physical layer for transmitting a packet including the data of the component.

The num_component_descriptor information indicates the number of component level descriptors for providing information on the component.

The Component_level_descriptor ( ) element may include a component level descriptor including information related to the component.

A description of the other information and/or elements included in the FIC is replaced by the above description of the information and/or elements having the same or similar names as in this specification.

FIG. 110 is a diagram showing the syntax of a payload of an FIC according to another embodiment of the present invention.

One broadcast service may be transmitted through one or more ROUTE sessions. In this case, for fast bootstrap, several pieces of information and/or elements may be included in the FIC. The receiver may access ROUTE sessions for transmitting data included in a broadcast service using only information included in the FIC and acquire data for the broadcast service.

The FIC according to another embodiment of the present invention may include FIC_protocol_version information, transport_stream_id information, num_partitions information, partition_id information, partition_protocol_version information, num_services information, service_id information, service_data_version information, service_channel_number information, service_category information, short_service_name_length information, short_service_name information, service_status information, service_distribution information, sp_indicator information, IP_version_flag information, num_ROUTE_session information, source_IP_address_flag information, ssc_flag information, bootstrap_mode information, source_IP_address information, destination_IP_address information, destination_UDP_port information, SSC_tsi information, SSC_dp_id information, num_component information, component_id information, component_tsi information, component_dp_id information, num_component_descriptor information, a component_level_descriptor( ) element, num_partition_level_descriptors information, a partition_level_descriptor( ) element, num_FIC_level_descriptors information, and an FIC_level_descriptor element.

The num_ROUTE_session information may include the number of ROUTE sessions for transmitting data for the broadcast service.

The ssc_flag information may indicate that a service signaling channel for transmitting service signaling is present in the ROUTE session. The ssc_flag information may indicate whether service signaling is transmitted in the ROUTE session. Here, the service signaling channel may correspond to service level signaling. If the service signaling is transmitted, information on a session for transmitting the service signaling and an identifier of a data pipe may be included.

A description of the other information and/or elements included in the FIC is replaced by the above description of the information and/or elements having the same or similar names as in this specification.

FIG. 111 is a diagram showing a transport_parameter_descriptor according to an embodiment of the present invention.

If data of each component is delivered through a transport protocol, when a transport protocol parameter for a transport packet including the data of the component is signaled, the receiver may efficiently process the transport packet including the data of each component using information included in the corresponding signaling.

In one embodiment of the present invention, the shown descriptor is proposed in order to signal a transport protocol related parameter. The shown descriptor may be represented in a bitstream or XML format.

The descriptor proposed in the present invention may be used as a descriptor of a component level, a partition level or an FIC level in the above-described FIC. Alternatively, the descriptor proposed in the present invention may be delivered to the receiver through signaling of a link layer which is a higher layer of a physical layer. Alternatively, the descriptor proposed in the present invention may be used as a descriptor of a component level and/or a service level in service signaling (service level signaling).

The transport_parameter_descriptor according to an embodiment of the present invention may include descriptor_tag information, descriptor_length information, codepoint_flag information, delivery_object_format_flag information, fragmentation_flag information, delivery_order_flag information, payload_id_scheme_flag information, code_point information, delivery_object_format information, fragmentation_scheme information, delivery_order information, and/or payload_id_scheme information.

The descriptor_tag information may indicate that the descriptor delivers the parameter of the transport protocol.

The descriptor_length information may indicate the length of the descriptor.

The codepoint_flag information may correspond to a flag indicating whether codepoint information is present in the descriptor. The codepoint information may be present if the value of the codepoint_flag information is "true" and may not be present if the value of the codepoint_flag information is "false".

The delivery_object_format_flag information may correspond to a flag indicating whether delivery_object_format information is present in the descriptor. The delivery_object_format information may be present if the value of the delivery_object_format_flag information is "true" and may not be present if the value of the delivery_object_format_flag information is "false".

The fragmentation_flag information may correspond to a flag indicating whether fragmentation_scheme information is present in the descriptor. The fragmentation_scheme information may be present if the value of the fragmentation_flag information is "true" and may not be present if the value of the fragmentation_flag information is "false".

The delivery_order_flag information may correspond to a flag indicating whether delivery_order information is present in the descriptor. The delivery_order information may be present if the value of the delivery_order_flag information is "true" and may not be present if the value of the delivery_order_flag information is "false".

The payload_id_scheme_flag information may correspond to a flag indicating whether payload_id_scheme information is present in the descriptor. The payload_id_scheme may be present if the value of the payload_id_scheme_flag information is "true" and may not be present if the value of the payload_id_scheme_flag information is "false".

The code_point information may indicate a parameter associated with a transport packet payload according to a codepoint value (e.g., a codepoint of an LCT packet header, etc.) if the codepoint value is included in a transport packet header. For example, a combination of the following delivery_object_format information, fragmentation_scheme information, delivery_order information and/or payload_id_scheme information may be indicated.

The delivery_object_format information may indicate the format of a delivery object included in the payload of the transport packet. In one embodiment, if the value of the delivery_object_format information is "0x00" and "0x05" to "0xff", this may indicate that the delivery_object_format information is reserved for future use. If the value of the delivery_object_format information is "0x01", this may indicate that the format of the delivery object is a file. If the value of the delivery_object_format information is "0x02", this may indicate that the format of the delivery object is an entity mode. The entity mode includes a header and payload of an entity. If the value of the delivery_object_format information is "0x03", this may indicate that the format of the delivery object is a package. The package is a combination of two or more files. If the value of the delivery_object_format information is "0x04", this may indicate that the delivery object includes metadata.

The fragmentation_scheme information may indicate a fragmentation scheme used when one delivery object is fragmented and transmitted in one or more transport packets. The fragmentation_scheme information indicates a scheme for fragmenting data transmitted in the delivery object if one or more transport packets are transmitted in one delivery object. In one embodiment, if the value of the fragmentation_scheme information is "0x00", the fragmentation_scheme information may indicate that the fragmentation scheme is arbitrary. That is, if the fragmentation_scheme information is "0x00", the fragmentation_scheme information may indicate that fragmentation is performed without predetermined scheme. If the fragmentation_scheme information is "0x01", the fragmentation_scheme information may indicate that one or more boxes of the ISOBMFF are fragmented such that the delivery object is included. If the fragmentation_scheme information is "0x02", the fragmentation_scheme information may indicate that data based on the sample of the ISOBMFF is fragmented such that the delivery object is included.

The delivery_order information indicates the delivery order of each transport packet if data included in one delivery object is fragmented and delivered in one or more transport packets. In one embodiment, if the value of the delivery_order information is "0x00", the delivery_order information may indicate that the delivery order is arbitrary. If the value of the delivery_order information is "0x01", the delivery_order information may indicate that the transport packets are transmitted in configuration order of the ISOB-MFF (in-order delivery). If the value of the delivery_order information is "0x02", the delivery_order information may indicate that the data is transmitted in the transport packets in order of the media samples of the ISOBMFF and the data is transmitted prior to the movie fragment in the ISOBMFF.

The payload_id_scheme information may indicate a scheme for allocating a payload id if a payload ID value is included in the transport packet header. In one embodiment, if the value of the payload_id_scheme information is "0x00", the payload_id_scheme information may indicate that an FEC payload ID is not present and all delivery objects are included in the packet. If the value of the payload_id_scheme information is "0x01", the payload_id_scheme information may indicate that an FEC payload ID is defined by 32 bits and a start offset is represented in this object. If the value of the payload_id_scheme information is "0x02" to "0xff", this may indicate that the payload_id_scheme information is reserved for future use.

According to the embodiment of the present invention, signaling information such as a transport_parameter_descriptor may be transmitted at a lower layer (e.g., a physical layer, a link layer and/or a network layer) of a layer for transmitting service level signaling, such that a receiver preferentially accesses a specific service before acquiring the service level signaling.

Figure 112:
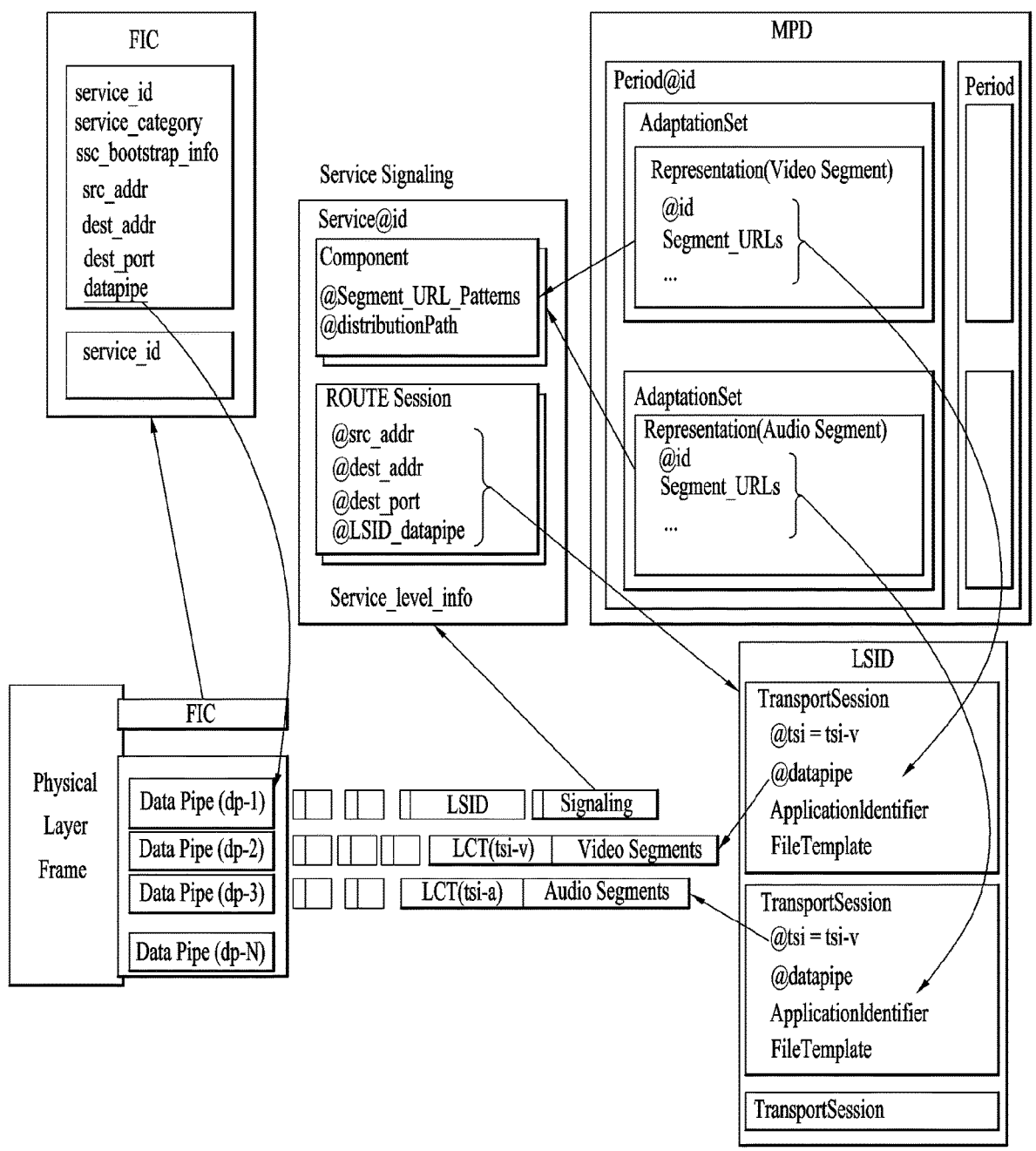
FIG. 112 is a diagram showing a signaling structure in a process of acquiring a broadcast service at a receiver according to another embodiment of the present invention.

FIG. 112 is a diagram showing a signaling structure in a process of acquiring a broadcast service at a receiver according to another embodiment of the present invention.

Referring to the figure, the receiver may acquire signaling information and/or video/audio data through the following steps.

Information on the bootstrap of service level signaling (service signaling) may be included in the FIC. The receiver may recognize the data pipe of the physical layer for transmitting service level signaling using the information included in the FIC.

The receiver may access the recognized data pipe to acquire service level signaling.

The receiver may recognize the data pipe for transmitting an LSID for providing information on one or more ROUTE sessions and/or information associated with each ROUTE session.

The receiver may acquire information on packets transmitted through the LCT session in the ROUTE session through the LSID and/or service level signaling.

The receiver may acquire and parse an MPD to acquire URL related information of a segment associated with video/audio.

The receiver may compare the URL related information of the segment associated with video/audio with a segment_URL_pattern of service level signaling to recognize a distribution path of the segment.

If the segment associated with video/audio is transmitted through a broadcast network, the receiver may compare the segment URL information with a file template in the LSID to recognize a transport session and join the transmission session, thereby acquiring the segment.

The receiver may reproduce video/audio using the acquired segment.

Figure 113:
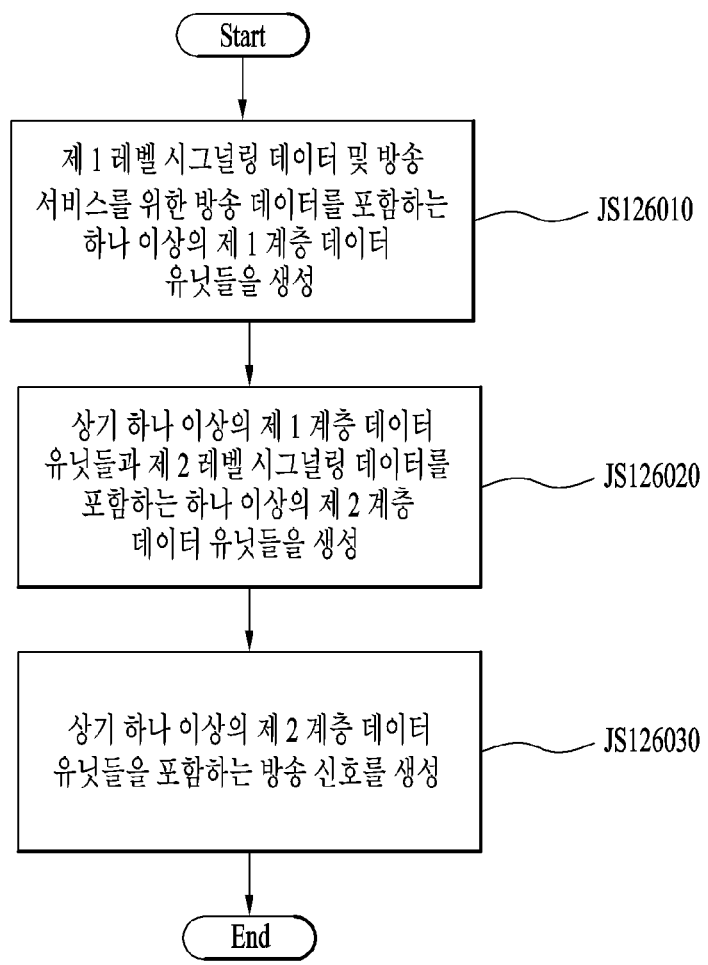
FIG. 113 is a flowchart illustrating a process of transmitting and processing a broadcast signal according to an embodiment of the present invention.

FIG. 113 is a flowchart illustrating a process of transmitting and processing a broadcast signal according to an embodiment of the present invention.

An apparatus for transmitting and processing a broadcast signal generates one or more first layer data units including first level signaling data and broadcast data for a broadcast service (JS126010).

The apparatus for transmitting and processing the broadcast signal generates one or more second layer data units including the one or more first layer data units and second level signaling data (JS126020).

The apparatus for transmitting and processing the broadcast signal generates a broadcast signal including the one or more second layer data units (JS12630).

Figure 114:
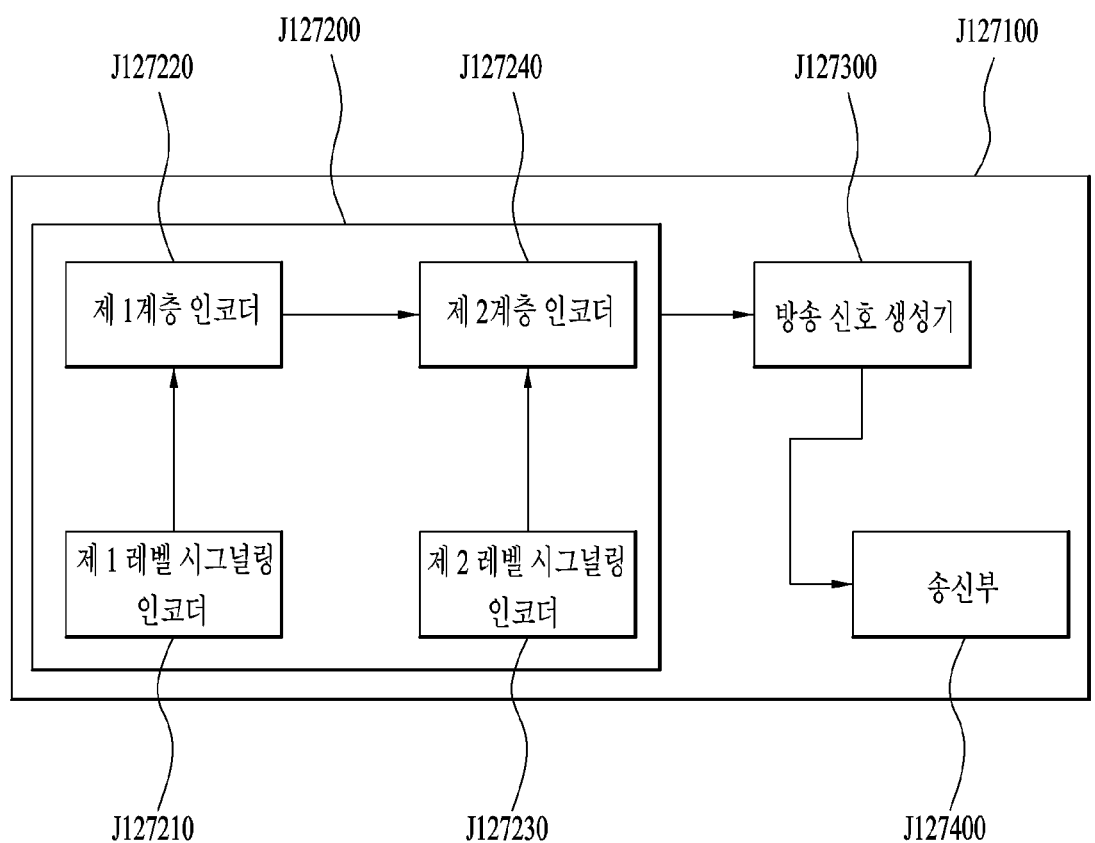
FIG. 114 is a diagram showing an apparatus for processing a broadcast signal according to an embodiment of the present invention.

FIG. 114 is a diagram showing an apparatus for processing a broadcast signal according to an embodiment of the present invention.

The broadcast signal processing apparatus J126100 according to the embodiment of the present invention may include a protocol processor J126200, a broadcast signal generator J126300 and a transmission unit J126400.

The protocol processor J126200 includes a first level signaling encoder J126210, a first layer encoder J126220, a second level signaling encoder J126230 and/or a second layer encoder J126240.

The protocol processor J126200 processes broadcast data or signaling data according to the protocol of the broadcast system.

The broadcast signal generator J126300 performs a series of processes of transmitting the data processed by the protocol processor. The broadcast signal generator J126300 may correspond to the above-described broadcast signal encoder/processor of the physical layer.

The transmission unit J126400 transmits the broadcast signal.

The first level signaling encoder J126210 generates first level signaling data. The first level signaling data may correspond to signaling information of a higher layer for providing information describing the broadcast service.

The first layer encoder J126220 generates broadcast data according to the protocol of the first layer. The protocol of the first layer may correspond to a protocol according to MPEG-DASH, NRT and MMT.

The second level signaling encoder J126230 generates second level signaling data. The second level signaling data may include information for obtaining information on the first level signaling data at a lower layer of a layer for processing the first level signaling data. The second level signaling data may include information necessary to scan the broadcast service at the lower layer of the layer for processing the first level signaling data to rapidly generate a map for the broadcast service.

The second layer encoder J126240 processes the data processed at the first layer according to the protocol of the second layer. The protocol of the second layer may correspond to an MMTP (MPEG Media Transport Protocol), ROUTE (ALC/LCT) and/or HTTP protocol.

According to the present invention, it is possible to rapidly acquire signaling information provided at each layer after physical layer processing.

According to the present invention, signaling information of a higher layer and/or processing broadcast data at each layer may be provided as signaling information, such that a receiver rapidly acquires and processes a broadcast service.

FIG. 115 is a diagram showing some of fast information channel (FIC) data according to another embodiment of the present invention.

FIG. 116 is a diagram showing the other of the FIC data according to another embodiment of the present invention.

In these figures, one table is shown in a state of being divided into two tables, due to spatial restriction.

The shown FIC data may further include a field indicating the type of a protocol for delivering service signaling information and a field indicating information on a path for delivering the service signaling information according to protocol. Here, the service signaling information may correspond to the above-described SLS. Here, the FIC data may correspond to the above-described SLT. Although the shown FIC data is represented in a bitstream format, the FIC data may be represented in another format such as XML.

The fields included in the FIC data according to the shown embodiment will be described. Fields having the same names may be equal to the above-described fields.

The FIC_protocol_version field may indicate the version of the FIC data or the protocol version of the FIC data. That is, this field may indicate the version or protocol version of the SLT.

The transport_stream_id field may be the identifier of the full broadcast stream. This field may be equal to the above-described bsid field. The broadcast stream may be unique in a specific area (e.g., North America).

The num_partitions field may indicate the number of partitions present in the broadcast stream. Here, the broadcast stream may mean a broadcast stream identified by the above-described transport_stream_id field. Here, assume that one broadcast stream may be divided into one or more partitions. Each partition may include a plurality of PLPs. Each partition may be used by one service provider (broadcaster). That is, each partition may mean a portion of a broadcast stream used by one service provider.

Information/fields of partitions corresponding in number to the number indicated by the above-described num_partitions field may be listed. The below-described fields may be information described with respect to one partition and more fields may be further included according to the number of partitions.

The partition_id field may be an identifier for identifying the partition. This field may correspond to the above-described @providerId. That is, this field may be used to identify each service provider. In some embodiments, the @providerId field may be included in the LLS table, instead of the SLT. The LLS table may include the SLT.

The partition_protocol_version field may indicate the version of the partition or the protocol version of the partition.

The transport_protocol_type field may indicate the type of the protocol for delivering components configuring one or more services provided by the broadcaster or service signaling information of the services. That is, if the service components provided by the broadcaster or the service signaling information is delivered through the protocol such as ROUTE or MMTP, which protocol is used may be indicated. This field may correspond to the above-described @slsProtocolType. In some embodiments, if this field is 0x01, this may indicate MMT and, if this field is 0x02, this may indicate a ROUTE protocol.

The num_services field may indicate the number of services included and delivered in the partition. In some embodiments, this field may indicate the number of services described in the SLT or FIC data. In another embodiment, this field may indicate the number of all services included and delivered in the broadcast stream.

Information/fields of the services corresponding in number to the number indicated by the above-described num_services field may be listed. The following fields may be information described with respect to one partition and more fields may be further included according to the number of services.

The service_id field may mean the service identifier of each service. The service_data_version field may indicate the version of the service or the protocol version of the service.

The service_channel_number field may indicate the channel number of the service. In some embodiments, this field may be divided into a field indicating the major channel number of the service and a field indicating the minor channel number. This field may correspond to the above-described @majorChannelNo and @minorChannelNo.

The service_category field may indicate the category of the service. This may correspond to the above-described @serviceCategory. For example, a category such as an A/V service, an audio-only service, an ESG service or an EA (Emergency Alert) service may be indicated by this field.

The short_service_name_length field may indicate the length of the below-described short_service_name field. The short_service_name field having the length indicated by this field may follow.

The short_service_name field may indicate the name or simplified name of the service. This field may correspond to the above-described @shortServiceName field.

The service_status field may indicate the status of the service. For example, the status of the service may be classified into active/suspended or hidden/shown.

The service_distribution field may indicate how the service is distributed. This field may indicate whether the service is delivered through only this partition, whether the service is not delivered through only this partition but is reproducible through only this partition, whether data of another partition is necessary for reproduction, whether data of another broadcast stream is necessary for reproduction, etc.

The sp_indicator field may be a flag indicating whether the service is in a production state. This field may indicate whether at least one service component included in the service is in a production state. Here, at least one service component may mean service components necessary to meaningfully reproduce the service. This field may correspond to the above-described @protected.

The IP_version_flag field is a flag and may indicate that a source_IP_address and a destination_IP_address field are IPv4 addresses if the value of this field is 0. If the value of this field is 1, this may indicate that the source_IP_address and the destination_IP_address field are IPv6 addresses. In some embodiments, this field may be reserved for future use.

The num_session field may indicate the number of transport sessions for delivering the service. Here, the transport session may mean the above-described ROUTE session or MMTP session. In some embodiments, this field may indicate the number of transport sessions for delivering the service signaling information of the service. In this embodiment, the number of transport sessions for delivering the service signaling information may be one and thus the num_session field may be omitted.

Information/fields of the sessions corresponding in number to the number indicated by the above-described num_session field may be listed. The below-described fields are information described with respect to one session and more fields may be further included according to the number of sessions.

The source_IP_address_flag field may be a flag indicating whether the below-described source_IP_address field is present.

The ssc_flag field may be a flag indicating whether the below-described SSC_tsi field and SSC_dp_id field are present.

The source_IP_address field may indicate source IP address information of the transport session for delivering the service signaling information of the service. Here, the transport session may mean the above-described ROUTE or MMTP session. This field may correspond to the above-described @slsSourceIpAddress field. Presence of this field may be determined according to the value of the above-described source_IP_address_flag field. In some embodiments, this field may indicate the source IP address information of the transport session for delivering the service data of the service.

The destination_IP_address field may indicate destination IP address information of the transport session for delivering the service signaling information of the service. This field may correspond to the above-described @slsDestinationIpAddress field. In some embodiments, this field may indicate the destination IP address information of the transport session for delivering the service data of the service.

The destination_UDP_port field may indicate destination UDP port information of the transport session for delivering the service signaling information of the service. This field may correspond to the above-described @slsDestinationUdpPort field. In some embodiments, this field may indicate the destination UDP port information of the transport session for delivering the service data of the service.

If the value of the above-described transport_protocol_type field is 0x01, that is, if the service components or the signaling information of the service is transmitted according to MMTP, a packet_id field and a dp_id field may be further added.

The packet_id field may have packet identifier information for identifying a packet flow for delivering the service components of the service or the service signaling information. Packets included in the MMTP packet flow may have packet identifiers indicated by this field. Through this information, the packet flow having the service signaling information may be identified in the MMTP transport session.

Although the packet flow for delivering the service signaling information is identified through the packet_id field in the present embodiment, this field may be omitted according to embodiments. According to embodiments, the service signaling information of the service may be delivered through a dedicated channel of the transport session. For example, a packet flow having a packet ID having a value of 00 may always deliver service signaling information in the transport session. That is, in this case, when an MMTP session is identified using IP and UDP information as bootstrap information, a packet flow identified by the packet ID having the value of 00 in the MMTP session may be accessed to acquire the service signaling information of the service. Here, the predefined packet ID may have a value other than 00.

The dp_id field may be an identifier for identifying a physical channel for delivering the service signaling information of the service, that is, a PLP.

If the value of the above-described transport_protocol_type field is 0x02, that is, if the components or the service signaling information of the service is transmitted according to the ROUTE protocol, an SSC_tsi field and an SSC_dp_id field may be further added. Presence of these fields may be determined according to the value of the ssc_flag field. In addition, in some embodiments, an LSID_tsi field and a dp_id field may be further added.

The SSC_tsi field may be session identifier information for identifying an LCT transport session for delivering the service signaling information of the service. Through this information, an LCT session having service signaling information may be identified in the ROUTE transport session.

Although the LCT session for delivering the service signaling information is identified through the SSC_tsi field in the present embodiment, this field may be omitted according to embodiments. In embodiments, the service signaling information of the service may be delivered through the dedicated channel of the transport session. For example, an LCT session having a tsi value of 0 may always deliver service signaling information in the transport session. That is, in this case, when the ROUTE session is identified using IP and UDP information as bootstrap information, an LCT session identified by the tsi value of 0 in the ROUTE session may be accessed to acquire the service signaling information of the service. Here, the predefined tsi value may have a value other than 0.

The SSC_dp_id field may be an identifier for identifying the physical channel for delivering the service signaling information of the service, that is, a PLP.

The LSID_tsi field may be session identifier information for identifying the LCT session for delivering the above-described LSID. The dp_id field may be PLP identifier information for identifying the physical channel for delivering the LSID. Here, the LSID may correspond to the above-described S-TSID. As described above, since the S-TSID is included in the service signaling information, these fields may be equal to the above-described SSC_tsi field and SSC_dp_id field and thus may be omitted. In an embodiment in which the LSID is transmitted independently of the service signaling information, these two fields (LSID_tsi field and dp_id field) may be necessary.

FIG. 117 is a diagram showing some of fast information channel (FIC) data according to another embodiment of the present invention.

FIG. 118 is a diagram showing the other of the FIC data according to another embodiment of the present invention.

In these figures, one table is shown in a state of being divided into two tables, due to spatial restriction.

The FIC data of the shown embodiment is similar to the above-described FIC data but may further include additional information/fields. Fields having the same names as the fields of the above-described FIC data may have the same meanings.

In the present embodiment, a bootstrap_mode field is added to each partition. This field may indicate the bootstrap mode of the component data of services included in the partition. For example, if this field has a value of 0x01, this may indicate that a normal bootstrap mode is used. If this field has a value of 0x02, this may indicate that a fast bootstrap mode is used. The other values may be reserved for future use. This field and the added fields may be omitted in a system which does not support the fast bootstrap mode cannot identify the bootstrap mode.

Here, the normal bootstrap mode is the above-described bootstrap mode in which an SLS is obtained using an SLT and service components of each service are accessed using the SLS.

Here, the fast bootstrap mode may mean that service components of each service are rapidly accessed using only information included in the SLT.

If the value of the bootstrap_mode field is 0x02, that is, in the case of the fast bootstrap mode, FIC data may have access information for acquiring the components of each service. The role of the service signaling information in the above-described embodiment may be regarded as being performed by FIC data.

In this case, a num_component field may be added to each service. This field may indicate the number of components of the service. Information on the components corresponding in number to the number of components indicated by the num_component field may follow.

The component_id field may indicate the identifier of the component. This identifier may be equal to an identifier for identifying DASH representation of an MPD or an asset ID of an MMT.

If the components of the service are transmitted according to the MMT protocol, a component_packet_id field may be further added. This field may indicate packet ID information of a packet flow for delivering the component. The MMTP packets of this packet flow may have this packet ID.

If the components of the service are transmitted according to the ROUTE protocol, a component_tsi field may be further added. This field may indicate an identifier of a subsession of a transport session for delivering the component. This subsession may mean an LCT session.

The component_dp_id field may identify a physical channel for transmitting packets (ROUTE/LCT packets or MMTP packets) for delivering the component. That is, this field may include ID information of the PLP.

The num_component_descriptor field may indicate the number of component level descriptors and component_level_descriptor( ) corresponding in number to the number indicated by this field may be present. The component level descriptor may include information related to the component.

Thereafter, the num_partition_level_descriptors field may be located to indicate the number of partition level descriptors. Partition_level_descriptor( ) corresponding in number to the number indicated by this field may be present. The partition level descriptor may include information related to the partition.

Thereafter, a num_FIC_level_descriptors field may be located to indicate the number of FIC level descriptors, and FIC_level_descriptor( ) corresponding in number to the number indicated by this field may be present. The FIC level descriptor may include information related to the FIC.

Although omitted in the above-described embodiment, the partition level descriptor and the FIC level descriptor may be added regardless of whether the bootstrap mode is supported, in other embodiments of the FIC data.

FIG. 119 is a diagram showing some of fast information channel (FIC) data according to another embodiment of the present invention.

FIG. 120 is a diagram showing the other of the FIC data according to another embodiment of the present invention.

In these figures, one table is shown in a state of being divided into two tables, due to spatial restriction.

The FIC data of the shown embodiment is similar to the above-described FIC data, but the location of the above-described transport_protocol_type field is changed. Fields having the same names as the fields of the above-described FIC data may have the same meanings.

In the above-described embodiment, the transport_protocol_type field is located at a partition level. In this case, the transport_protocol_type field indicates the transport protocol of all services included in the partition. One partition may refer to all data delivered by one broadcaster. In this case, when services included in one partition use different transport protocols, it is difficult to represent the services.

In the present embodiment, the transport_protocol_type field may be located at a service level. Therefore, a service provider using this partition may easily specify a transport protocol with respect to each service. In addition, the service provider may use various transport protocols, that is, use a ROUTE protocol with respect to a specific service and use MMT protocol with respect to another service, thereby ensuring system flexibility.

Figure 121:
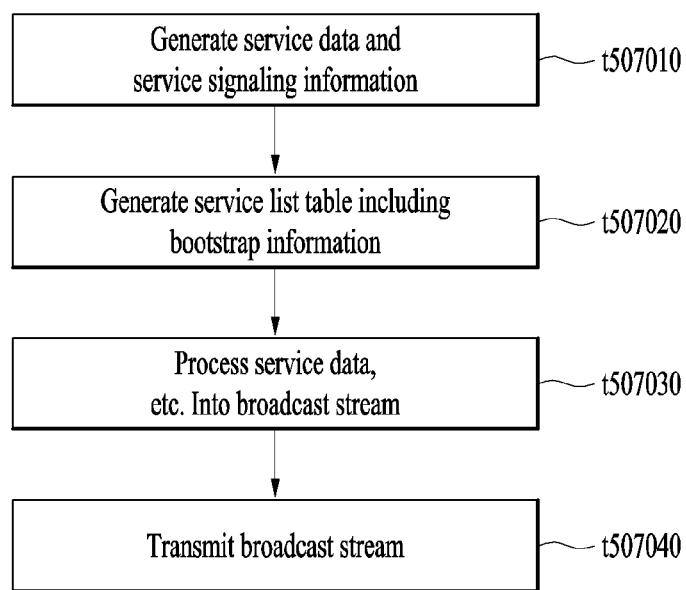

FIG. 121 is a diagram illustrating a method of processing service data according to an embodiment of the present invention.

The method of processing service data according to the embodiment of the present invention may include generating service data and service signaling information, generating a service list table including bootstrap information, processing the service data, etc. into broadcast stream and/or transmitting the broadcast stream.

First, the service data of the broadcast service and the service signaling information for signaling the service data may be generated (t507010). This step may be performed by a first module of a transmission side. The first module may correspond to a module for generating service data, etc. at a higher layer. Here, the service signaling information may include access information for acquiring the service data. Here, the service data may mean actual service data such as a service component included in the service and the service signaling information may correspond to the above-described SLS.

Thereafter, the service list table including the bootstrap information for locating the service signaling information may be generated (t507020). This step may also be performed by the first module of the transmission side. Here, the service list table may correspond to the above-described SLT. The bootstrap information may mean bootstrap information such as the above-described IP/UDP information.

The service data, the service signaling information and the service list table may be processed into the broadcast stream (t507030). This step may be performed by a second module of the transmission side. The second module may correspond to a module for managing a physical layer or a link layer. This step may correspond to the above-described process of the physical layer or the process of the physical layer and the link layer.

Thereafter, the generated broadcast stream may be transmitted (t507040). This step may be performed by a third module of the transmission side. The third module may mean a transmission system such as an antenna.

In the method of processing the service data according to another embodiment of the present invention, the service data and the service signaling information may be delivered according to a first transport protocol or a second transport protocol. Here, the first and second transport protocols may mean ROUTE and MMT protocols.

In the method of processing the service data according to another embodiment of the present invention, the service list table may further include service signaling protocol information, and the service signaling protocol information may indicate a type of a transport protocol used to deliver the service signaling information. Here, the service signaling protocol information may correspond to a field indicating the transport protocol for delivering the above-described SLS.

In the method of processing the service data according to another embodiment of the present invention, the bootstrap information may include Internet protocol (IP) information and user datagram protocol (UDP) information of a transport session for transmitting the service signaling information.

Here, the IP information and the UDP information may mean the above-described destination IP address and the destination UDP port number. This information may be used to identify a ROUTE or MMTP session for delivering an SLS.

In the method of processing the service data according to another embodiment of the present invention, if the service signaling information is delivered according to the first transport protocol, the service signaling information may be delivered through a dedicated subsession of the transport session, and the dedicated subsession may be identified by a predetermined session identifier value. Here, the transport session may correspond to a ROUTE session and the subsession may correspond to an LCT session. The dedicated subsession may mean an LCT session for delivering an SLS identified by tsi=0. Here, the predetermined session identifier value may mean tsi having a value of 0. In some embodiments, this value may not be 0.

In the method of processing the service data according to another embodiment of the present invention, if the service signaling information is delivered according to the second transport protocol, the service signaling information may be delivered by second transport protocol packets identified by a predetermined packet identifier value. Here, the second transport protocol packets may mean MMTP packets. The present embodiment may correspond to the case where the SLS is delivered by the packet flow identified by packet ID=00. The predetermined packet identifier value may mean a packet ID having a value of 00. In some embodiments, this value may not be 0.

In the method of processing the service data according to another embodiment of the present invention, if the service signaling information is delivered according to the first transport protocol, the service signaling information may be delivered through one subsession of the transport session, and the bootstrap information may further include session identifier information of the subsession for delivering the service signaling information. Here, the transport session may correspond to a ROUTE session and the subsession may correspond to an LCT session. The session identifier may mean tsi information.

In the method of processing the service data according to another embodiment of the present invention, if the service signaling information is delivered according to the second transport protocol, the service signaling information may be delivered through one packet flow of the transport session, and the bootstrap information may further include packet identifier information for identifying packets of a packet flow for delivering the service signaling information. Here, the transport session may correspond to an MMTP session and the packet flow may correspond to an MMTP packet flow. The packet identifier information may mean the above-described packet ID.

In the method of processing the service data according to another embodiment of the present invention, the bootstrap information may further include identifier information of a physical channel for transmitting the service signaling information. Here, the physical channel may mean the above-described PLP or DP. The bootstrap information may further include PLP ID information for delivering the SLS as described above.

In the method of processing the service data according to another embodiment of the present invention, the processing of the service data, the service signaling information and the service list table into the broadcast stream may include encapsulating the service data, the service signaling information and the service list table to generate link layer packets; and processing the link layer packets into the broadcast stream. This step may be performed by the second module of the transmission side. The process of encapsulating into the link layer packets may correspond to the above-described link layer operation. The process of processing the link layer packets into the broadcast stream may correspond to the above-described physical layer processing.

A method of processing service data at a reception side according to an embodiment of the present invention will now be described. This method is not shown in the figure.

The method of processing the service data at the reception side according to the embodiment of the present invention includes a first module of the reception side receiving a broadcast stream, a second module parsing the broadcast stream to acquire a service list table, a third module accessing service signaling information using the service list table, the third module acquiring service data using the service signaling information and/or a fourth module reproducing a service using the acquired service data.

The methods of processing the service data at the reception side according to the embodiments of the present invention may correspond to the methods of processing the service data at the transmission side according to the above-described embodiments of the present invention. The methods of processing the service data at the reception side may be performed by hardware modules (e.g., the first, second, third and fourth modules of the reception side) corresponding to the modules used in the method of processing the service data at the transmission side. The method of processing the service data at the reception side may have embodiments corresponding to the embodiments of the method of processing the service data at the transmission side.

The aforementioned steps may be omitted or replaced by other steps for performing similar/identical operations according to embodiments.

Figure 122:
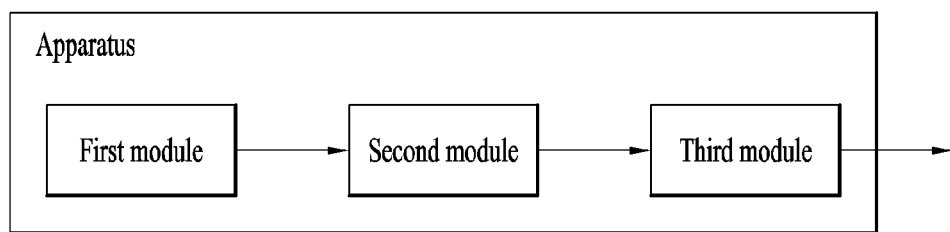

FIG. 122 is a diagram showing an apparatus for processing service data according to an embodiment of the present invention.

The apparatus for processing the service data according to the embodiment of the present invention may include a first module, a second module and/or a third module of the above-described transmission side. The blocks and modules have been described above.

The apparatus for processing the service data according to the embodiment of the present invention and the modules/blocks included therein may perform the embodiments of the method of processing the service data at the transmission side according to the present invention.

The apparatus for processing the service data at the reception side according to an embodiment of the present invention will be described. This apparatus is not shown in the figure.

The apparatus for processing the service data at the reception side according to the embodiment of the present invention may include a first module, a second module, a third module and/or a fourth module of the reception side. The blocks and modules have been described above.

The apparatus for processing the service data at the reception side according to the embodiment of the present invention and the modules/blocks included therein may perform the embodiments of the method of processing the service data at the reception side according to the present invention.

The blocks/modules of the above-described apparatus may be processors for performing a series of processes stored in a memory and may be hardware elements located inside or outside the apparatus according to embodiments.

The aforementioned modules may be omitted or replaced by other steps for performing similar/identical operations according to embodiments.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complimentarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complimentarily.

MODE FOR INVENTION

Various embodiments have been described in the best mode for carrying out the invention.

INDUSTRIAL APPLICABILITY

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

The invention claimed is:

1. A method of processing service data in a transmitting system, the method comprising:
   encoding the service data of a service delivered through one of a real time object delivery over unidirectional transport (ROUTE) session or a MPEG media transport protocol (MMTP) session;
   interleaving the encoded service data;
   encoding first signaling data for fast channel scans and service acquisition, wherein the first signaling data includes access information for obtaining second signaling data, service identification information for identifying the service, and status information for identifying whether the service is hidden and wherein the second signaling data provides information for discovery and acquisition of the service; and
   transmitting a broadcast signal including one or more transport frames that include the interleaved service data, the encoded first signaling data, and physical layer signaling data, wherein the physical layer signaling data includes encoding information and interleaving information of the service data,
   wherein the physical layer signaling data further includes flag information for identifying whether the first signaling data is included in a current transport frame,
   wherein the second signaling data is delivered through one of a broadcast network or a broadband network,
   wherein the access information in the first signaling data includes Internet Protocol (IP) address information and User Data Protocol (UDP) port number information to obtain the second signaling data which is delivered through the broadcast network, and
   wherein the access information in the first signaling data includes uniform resource location information to obtain the second signaling data which is delivered through the broadband network.

2. The method according to claim 1, wherein the second signaling data is delivered through a dedicated transport channel whose value is zero when the second signaling data is delivered through the broadcast network.

3. An apparatus for processing service data in a transmitting system, the apparatus comprising:
   a first encoder configured to encode the service data of a service delivered through one of a real time object delivery over unidirectional transport (ROUTE) session or a MPEG media transport protocol (MMTP) session;
   an interleaver configured to interleave the encoded service data;
   a second encoder configured to encode first signaling data for fast channel scans and service acquisition, wherein the first signaling data includes access information for obtaining second signaling data, service identification information for identifying the service, and status information for identifying whether the service is hidden;
a transmitter configured to transmit a broadcast signal including one or more transport frames that include the interleaved service data, the encoded first signaling data, and physical layer signaling data, wherein the physical layer signaling data includes encoding information and interleaving information of the service data,
wherein the physical layer signaling data further includes flag information for identifying whether the first signaling data is included in a current transport frame,
wherein the second signaling data is delivered through one of a broadcast network or a broadband network,
wherein the access information in the first signaling data includes Internet Protocol (IP) address information and User Data Protocol (UDP) port number information to obtain the second signaling data which is delivered through the broadcast network, and
wherein the access information in the first signaling data includes uniform resource location information to obtain the second signaling data which is delivered through the broadband network.

4. The apparatus according to claim 3, wherein the second signaling data is delivered through a dedicated transport channel whose value is zero when the second signaling data is delivered through the broadcast network.

5. A method of processing data in a receiving system, the method comprising:
receiving a broadcast signal including one or more transport frames that include service data of a service, first signaling data for fast channel scans and service acquisition, and physical layer signaling data,
wherein the physical layer signaling data includes encoding information and interleaving information of the service data,
wherein the physical layer signaling data further includes flag information for identifying whether the first signaling data is included in a current transport frame,
wherein the service data is delivered through one of a real time object delivery over unidirectional transport (ROUTE) session or a MPEG media transport protocol (MMTP) session,
wherein the first signaling data includes access information for obtaining second signaling data, service identification information for identifying the service, and status information for identifying whether the service is hidden, and
wherein the second signaling data provides information for discovery and acquisition of the service;
decoding the first signaling data;
deinterleaving the service data based on the interleaving information of the physical layer signaling data;
decoding the deinterleaved service data based on the encoding information of the physical layer signaling data;
obtaining the second signaling data based on the first signaling data; and
providing the service to a user by discovering and acquiring the service including the service data based on the second signaling data,
wherein the second signaling data is delivered through one of a broadcast network or a broadband network,
wherein the access information in the first signaling data includes Internet Protocol (IP) address information and User Data Protocol (UDP) port number information to obtain the second signaling data which is delivered through the broadcast network, and
wherein the access information in the first signaling data includes uniform resource location information to obtain the second signaling data which is delivered through the broadband network.

6. The method according to claim 5, wherein the second signaling data is delivered through a dedicated transport channel whose value is zero when the second signaling data is delivered through the broadcast network.

7. An apparatus for processing data in a receiving system, the apparatus comprising:
a tuner configured to receive a broadcast signal including one or more transport frames that include service data of a service, first signaling data for fast channel scans and service acquisition, and physical layer signaling data,
wherein the physical layer signaling data includes encoding information and interleaving information of the service data,
wherein the physical layer signaling data further includes flag information for identifying whether the first signaling data is included in a current transport frame,
wherein the service data is delivered through one of a real time object delivery over unidirectional transport (ROUTE) session or a MPEG media transport protocol (MMTP) session,
wherein the first signaling data includes access information for obtaining second signaling data, service identification information for identifying the service, and status information for identifying whether the service is hidden, and
wherein the second signaling data provides information for discovery and acquisition of the service;
a first decoder configured to decode the first signaling data;
a deinterleaver configured to deinterleave the service data based on the interleaving information of the physical layer signaling data; and
a second decoder configured to decode the deinterleaved service data based on the encoding information of the physical layer signaling data;
a first processor configured to obtaining the second signaling data based on the first signaling data; and
a second processor configured to providing the service to a user by discovering and acquiring the service including the service data based on the second signaling data,
wherein the second signaling data is delivered through one of a broadcast network or a broadband network,
wherein the access information in the first signaling data includes Internet Protocol (IP) address information and User Data Protocol (UDP) port number information to obtain the second signaling data which is delivered through the broadcast network, and
wherein the access information in the first signaling data includes uniform resource location information to obtain the second signaling data which is delivered through the broadband network.

8. The apparatus according to claim 7, wherein the second signaling data is delivered through a dedicated transport channel whose value is zero when the second signaling data is delivered through the broadcast network.

* * * * *